United States Patent
Nicola et al.

(10) Patent No.: US 12,551,475 B2
(45) Date of Patent: Feb. 17, 2026

(54) METHODS AND COMPOSITIONS FOR TREATING RNA VIRAL INFECTIONS

(71) Applicant: Model Medicines, Inc., La Jolla, CA (US)

(72) Inventors: George Nicola, La Jolla, CA (US); Daniel Haders, La Jolla, CA (US)

(73) Assignee: Model Medicines, Inc., San Diego, CA (US)

( * ) Notice: Subject to any disclaimer, the term of this patent is extended or adjusted under 35 U.S.C. 154(b) by 544 days.

(21) Appl. No.: 18/007,732

(22) PCT Filed: Jun. 1, 2021

(86) PCT No.: PCT/US2021/035282
§ 371 (c)(1),
(2) Date: Dec. 1, 2022

(87) PCT Pub. No.: WO2021/247601
PCT Pub. Date: Dec. 9, 2021

(65) Prior Publication Data
US 2023/0248712 A1 Aug. 10, 2023

Related U.S. Application Data

(60) Provisional application No. 63/182,507, filed on Apr. 30, 2021, provisional application No. 63/033,493, filed on Jun. 2, 2020.

(51) Int. Cl.
| | |
|---|---|
| *A61K 31/454* | (2006.01) |
| *A61K 31/4162* | (2006.01) |
| *A61K 31/495* | (2006.01) |
| *A61K 31/497* | (2006.01) |
| *A61K 31/502* | (2006.01) |
| *A61K 31/55* | (2006.01) |
| *A61K 31/675* | (2006.01) |
| *A61K 45/06* | (2006.01) |
| *A61P 31/14* | (2006.01) |

(52) U.S. Cl.
CPC ........ *A61K 31/454* (2013.01); *A61K 31/4162* (2013.01); *A61K 31/495* (2013.01); *A61K 31/497* (2013.01); *A61K 31/502* (2013.01); *A61K 31/55* (2013.01); *A61K 31/675* (2013.01); *A61K 45/06* (2013.01); *A61P 31/14* (2018.01)

(58) Field of Classification Search
CPC .............. A61K 2300/00; A61K 31/365; A61K 31/4162; A61K 31/454; A61K 31/495; A61K 31/497; A61K 31/502; A61K 31/55; A61K 31/675; A61K 31/7076; A61K 45/06; A61P 11/00; A61P 31/14; A61P 31/16; A61P 31/18
See application file for complete search history.

(56) References Cited

U.S. PATENT DOCUMENTS

| | | | |
|---|---|---|---|
| 4,144,317 | A | 3/1979 | Higuchi |
| 5,797,898 | A | 8/1998 | Santini et al. |
| 8,609,695 | B2 | 12/2013 | Labrie et al. |
| 2001/0007865 | A1 | 7/2001 | Kozak |
| 2006/0223790 | A1 | 10/2006 | Shytle et al. |
| 2008/0020018 | A1 | 1/2008 | Moodley et al. |
| 2010/0209496 | A1 | 8/2010 | Dokou et al. |
| 2018/0153803 | A1 | 6/2018 | Elmaleh |

FOREIGN PATENT DOCUMENTS

| | | | | |
|---|---|---|---|---|
| WO | WO 2015/135652 | | 9/2015 | |
| WO | WO-2021159044 A1 | * | 8/2021 | ............ A61K 45/06 |
| WO | WO-2021176088 A1 | * | 9/2021 | ............ A61K 31/58 |
| WO | WO-2021187842 A1 | * | 9/2021 | ............ A61K 38/13 |

OTHER PUBLICATIONS

Cleveland clinic, (https://my.clevelandclinic.org/health/diseases/21214-coronavirus-covid-19), 2025). (Year: 2025).*
American Lung Association, (https://www.lung.org/lung-health-diseases/lung-disease-lookup/covid-19/prevention, 2025). (Year: 2025).*
Figlerowicz, Medicinal Research Reviews, 2003 (Year: 2003).*
Griffin, PLOS Biology https://doi.org/10. 1371/journal.pbio.3001687 Jun. 1, 2022 (Year: 2022).*
Mohanty, World J Virol Dec. 25, 2023; 12(5): 242-255 (Year: 2023).*
Wolff (Burger's Medicinal Chemistry and Drug Discovery, 5th Edition, vol. I Principles and Practice, pp. 975-977, 1995 (Year: 1995).*
Banker (Modern Pharmaceutics, Third Edition and Expanded, pp. 451 and 596 (1996) (Year: 1996).*
CAS Registry Data (2008). (Year: 2008).*
Neerukonda et al. (Pathogens, May 29, 2020) (Year: 2020).*
Adis Insight, "Berzosertib—Merck KGaA," Springer retrieved on May 18, 2023, in 3 pages. https://adisinsight.springer.com/drugs/800037997.
Adis Insight, "Pipendoxifene," Springer retrieved on May 18, 2023, in 3 pages. https://adisinsight.springer.com/drugs/800011640.
Ammer et al., "The anti-obesity drug orlistat reveals anti-viral activity," Medical microbiology and immunology 2015, 204, 635-645.
Ammerman, et al., "Growth and maintenance of Vero cell lines," Current Protocols in Microbiology 2008, 11(1), in 7 pages.
Anaspec, "SensoLyte® Rh110 Furin Activity Assay Kit Fluorimetric—1 kit," anaspec.com retrieved on May 16, 2023, in 7 pages. https://www.anaspec.com/en/catalog/sensolyte-rh110-furin-activity-assay-kit-fluorimetric-1-kit~c632445f-2033-46f2-9510-892d5674510d.
Astuti & Ysrafil, "Severe Acute Respiratory Syndrome Coronavirus 2 (SARS-CoV-2): An overview of viral structure and host response," Diabetes & Metabolic Syndrome 2020, 14(4), 407-412.

(Continued)

*Primary Examiner* — Umamaheswari Ramachandran
(74) *Attorney, Agent, or Firm* — Dickinson Wright PLLC

(57) ABSTRACT

Methods and compositions for treating RNA viral infections, including behavior symptoms of the RNA viral infections, are disclosed herein. Also disclosed are methods and compositions for reducing the progression of clinical complications associated with RNA viral infections. The methods, for example, can include administering pharmaceutical compositions or analogues thereof to a patient in need. One or more additional therapeutic agents can also be administered to the patient in the disclosed methods.

11 Claims, 15 Drawing Sheets

(56) References Cited

OTHER PUBLICATIONS

Báez-Santos, et al., "The SARS-coronavirus papain-like protease: structure, function and inhibition by designed antiviral compounds," Antiviral Research 2015, 115, 21-38.

Bakowski, et al., "Oral drug repositioning candidates and synergistic remdesivir combinations for the prophylaxis and treatment of COVID-19," bioRxiv 2020, in 17 pages. https://doi.org/10.1101/2020.06.16.153403.

Becker, et al., "Synthetic recombinant bat SARS-like coronavirus is infectious in cultured cells and in mice," Proceedings of the National Academy of Sciences of the United States of America 2008, 105(50), 19944-19949.

Bestle, et al., "TMPRSS2 and furin are both essential for proteolytic activation and spread of SARS-CoV-2 in human airway epithelial cells and provide promising drug targets," bioRxiv 2020, in 33 pages. https://doi.org/10.1101/2020.04.15.042085.

BPSBioscience, "3CL Protease, Untagged (SARS-CoV-2) Assay Kit," bpsbioscience.com retrieved on May 17, 2023, in 5 pages. https://bpsbioscience.com/3cl-protease-untagged-sars-cov-2-assay-kit-78042.

BPSBioscience, "ACE2 Inhibitor Screening Assay Kit," bpsbioscience.com retrieved on May 17, 2023, in 4 pages. https://bpsbioscience.com/ace2-inhibitor-screening-assay-kit-79923.

BPSBioscience, "Furin Protease Assay Kit," bpsbioscience.com retrieved on May 17, 2023, in 4 pages. https://bpsbioscience.com/furin-protease-assay-kit-78040.

BPSBioscience, "Papain-like Protease (SARS-CoV-2) Assay Kit: Protease Activity," bpsbioscience.com retrieved on May 17, 2023, in 5 pages. https://bpsbioscience.com/papain-like-protease-sars-cov-2-assay-kit-protease-activity-79995.

BPSBioscience, "RdRp (SARS-CoV-2) TR-FRET Assay Kit (Discontinued)," bpsbioscience.com retrieved on May 17, 2023, in 4 pages. https://bpsbioscience.com/rdrp-sars-cov-2-tr-fret-assay-kit-78394.

BPSBioscience, "TMPRSS2 Fluorogenic Assay Kit," bpsbioscience.com retrieved on May 17, 2023, in 5 pages. https://bpsbioscience.com/tmprss2-fluorogenic-assay-kit-78083.

Braun & Sauter, "Furin-mediated protein processing in infectious diseases and cancer," Clinical & Translational Immunology 2019, 8, in 19 pages.

Bugge, et al., "Type II transmembrane serine proteases," Journal of Biological Chemistry 2009, 284(35), 23177-23181.

Center for Drug Evaluation and Research (CDER), "Estimating the Maximum Safe Starting Dose in Initial Clinical Trials for Therapeutics in Adult Healthy Volunteers," U.S. Food and Drug Administration Jul. 2005, in 30 pages. https://www.fda.gov/media/72309/download.

Center for Drug Evaluation and Research (CDER), "Pharmacology Review(s)," U.S. Food and Drug Administration Oct. 2, 2023, in 66 pages. https://www.accessdata.fda.gov/drugsatfda_docs/nda/2013/022247Orig1s000PharmR.pdf.

Centers for Disease Control and Prevention, "Interim Laboratory Biosafety Guidelines for Handling and Processing Specimens Associated with Coronavirus Disease 2019 (COVID-19)," cdc.gov retrieved on May 18, 2023, in 8 pages. https://www.cdc.gov/coronavirus/2019-ncov/lab/lab-biosafety-guidelines.html.

Chen, et al., "Drug Repurposing Screen for Compounds Inhibiting the Cytopathic Effect of SARS-CoV-2," bioRxiv 2020, in 20 pages. https://doi.org/10.1101/2020.08.18.255877.

Clarke & Turner, "Angiotensin-Converting Enzyme 2: The First Decade," International Journal of Hypertension 2012, 2012, in 12 pages.

Cotreau, et al., "Multiple-Dose, Safety, Pharmacokinetics, and Pharmacodynamics of a New Selective Estrogen Receptor Modulator, ERA-923, in Healthy Postmenopausal Women," The Journal of Clinical Pharmacology 2002, 42(2), 157-165. https://doi.org/10.1177/00912700222011193.

Coutard, et al., "The spike glycoprotein of the new coronavirus 2019-nCoV contains a furin-like cleavage site absent in CoV of the same clade," Antiviral Research 2020, 176, in 5 pages.

Crackower, et al., "Angiotensin-converting enzyme 2 is an essential regulator of heart function," Nature 2002, 417(6891), 822-828.

Dahms, et al., "The structure of a furin-antibody complex explains non-competitive inhibition by steric exclusion of substrate conformers," Scientific Reports 2016, 6(1), in 7 pages.

Declercq & Creemers, "Therapeutic Potential of Furin Inhibition: An Evaluation Using a Conditional Furin Knockout Mouse Model," Colloquium Series on Protein Activation and Cancer, 2012. 1(4), in 32 pages.

Donaldson, et al. "Regulation of the epithelial sodium channel by serine proteases in human airways," Journal of Biological Chemistry 2002, 277(10), 8338-8345.

Elfiky, "Anti-HCV, nucleotide inhibitors, repurposing against COVID-19," Life Sciences 2020, 248, in 6 pages.

Enzo Life Sciences, "Furin (human), (recombinant)," enzolifesciences.com retrieved on May 16, 2023, in 1 page. https://www.enzolifesciences.com/BML-SE536/furin-human-recombinant/.

Eurogentec, "Products," eurogentec.com retrieved on May 16, 2023, in 6 pages. https://www.eurogentec.com/en/catalog/sensolyte-rh110-furin-activity-assay-kit-fluorimetric-1-kit~60bf3bcc-606e-4439-a3db-811058e7c075.

Extended European Search Report dated Aug. 7, 2024 in European Patent Application No. 21817147.8.

Fokas, et al., "Targeting ATR in vivo using the novel inhibitor VE-822 results in selective sensitization of pancreatic tumors to radiation," Cell Death & Disease 2012, 3(12), in 10 pages. https://doi.org/10.1038/cddis.2012.181.

Fu, et al., "Protective Effects of STI-2020 Antibody Delivered Post-Infection by the Intranasal or Intravenous Route in a Syrian Golden Hamster COVID-19 Model," bioRxiv 2020, in 21 pages. https://doi.org/10.1101/2020.10.28.359836.

Fuller, et al., "Inhibition of Furin/Proprotein Convertase-Catalyzed Surface and Intracellular Processing by Small Molecules," Journal of Biological Chemistry 2009, 284(23), 15729-15738.

Gale & Altstedter, "All the Covid-19 Symptoms You Didn't Know About," Bloomberg retrieved on May 16, 2023, in 7 pages. https://www.bloomberg.com/news/features/2020-05-11/all-the-covid-19-symptoms-you-didn-t-know-about.

Gao, et al., "Structure of the RNA-dependent RNA polymerase from COVID-19 virus," Science 2020, 368(6492), 779-782.

Garcia, et al., "Antiviral Drug Screen of Kinase inhibitors Identifies Cellular Signaling Pathways Critical for SARS-CoV-2 Replication," bioRxiv 2020, in 29 pages. https://doi.org/10.1101/2020.06.24.150326.

Gordon, et al., "A SARS-CoV-2-Human Protein-Protein Interaction Map Reveals Drug Targets and Potential Drug-Repurposing," bioRxiv 2020, in 45 pages. https://doi.org/10.1101/2020.03.22.002386.

Gordon, et al., "Remdesivir is a direct-acting antiviral that inhibits RNA-dependent RNA polymerase from severe acute respiratory syndrome coronavirus 2 with high potency," Journal of Biological Chemistry 2020, 295(20), 6785-6797.

Guo, et al., "Coronavirus disease 2019 (COVID-19) and cardiovascular disease: a viewpoint on the potential influence of angiotensin-converting enzyme inhibitors/angiotensin receptor blockers on onset and severity of severe acute respiratory syndrome coronavirus 2 infection," Journal of the American Heart Association 2020, 9(7), in 5 pages.

Halford, "Influenza Antivirals to the Rescue," Chemical and Engineering News retrieved on May 18, 2023, in 3 pages. cen.acs.org/articles/96/i11/influenza-antivirals-to-the-rescue.html.

Hall, et al., "Potentiation of tumor responses to DNA damaging therapy by the selective ATR inhibitor VX-970," Oncotarget 2014, 5(14), 5674-5685. https://doi.org/10.18632/oncotarget.2158.

Henrich, et al., "The crystal structure of the proprotein processing proteinase furin explains its stringent specificity," Nature Structural & Molecular Biology 2003, 10(7), 520-526.

Hoffmann, et al., "SARS-CoV-2 Cell Entry Depends on ACE2 and TMPRSS2 and Is Blocked by a Clinically Proven Protease Inhibitor," Cell 2020, 181(2), 271-280.

Howes, "Structure of SARS-CoV-2 RNA-dependent RNA polymerase published," Chemical & Engineering News 2020, 98(15), in

(56) References Cited

OTHER PUBLICATIONS 3 pages. https://cen.acs.org/analytical-chemistry/structural-biology/Structure-SARS-CoV-2-RNA/98/115.

Huang, et al., "Pharmacological Therapeutics Targeting RNA-Dependent RNA Polymerase, Proteinase and Spike Protein: From Mechanistic Studies to Clinical Trials for COVID-19," Journal of Clinical Medicine 2020, 9(4), in 23 pages.

International Search Report and Written Opinion dated Sep. 1, 2021 in PCT Patent Application No. PCT/US2021/035282.

Iwasaki, et al., "Schlafen11 Expression Is Associated With the Antitumor Activity of Trabectedin in Human Sarcoma Cell Lines," Anticancer Research 2019, 39(7), 3553-3563. https://doi.org/10.21873/anticanres.13501.

Jeon et al., "Identification of antiviral drug candidates against SARS-CoV-2 from FDA-approved drugs," Antimicrobial agents and chemotherapy 2020, 64(7), 1110-1128.

Kaptein, et al., "Favipiravir at high doses has potent antiviral activity in SARS-CoV-2-infected hamsters, whereas hydroxychloroquine lacks activity," Proceedings of the National Academy of Sciences 2020, 117(43), 26955-26965.

Kouznetsova, et al., "Identification of 53 compounds that block Ebola virus-like particle entry via a repurposing screen of approved drugs," Emerging Microbes & Infections 2014, 3(12), in 7 pages. https://doi.org/10.1038/emi.2014.88.

Kramer, et al., "Bile acid derived HMG-CoA reductase inhibitors," Biochimica et Biophysica Acta (BBA)—Molecular Basis of Disease 1994, 1227(3), 137-154.

Kuba, et al., "Multiple Functions of Angiotensin-Converting Enzyme 2 and Its Relevance in Cardiovascular Diseases," Circulation Journal 2013, 77(2), 301-308.

Kumar, et al., "Selection of animal models for COVID-19 research," VirusDisease 2020, 31, 453-458.

Lai, et al., "Severe acute respiratory syndrome coronavirus 2 (SARS-CoV-2) and coronavirus disease-2019 (COVID-19): The epidemic and the challenges," International Journal of Antimicrobial Agents 2020, 55(3), in 9 pages.

Lan, et al., "Structure of the SARS-CoV-2 spike receptor-binding domain bound to the ACE2 receptor," Nature 2020, 581(7807), 215-220.

Lee, et al., "Oral SARS-CoV-2 Inoculation Establishes Subclinical Respiratory Infection with Virus Shedding in Golden Syrian Hamsters," Cell Reports Medicine 2020, 1(7), in 14 pages. https://doi.org/10.1016/j.xcrm.2020.100121.

Leyssen et al., "Molecular strategies to inhibit the replication of RNA viruses," Antiviral research 2008, 78(1), 9-25.

Liu, et al., "Research and Development on Therapeutic Agents and Vaccines for COVID-19 and Related Human Coronavirus Diseases," ACS Central Science 2020, 6, 315-331.

Lung, et al., "The potential chemical structure of anti-SARS-CoV-2 RNA-dependent RNA polymerase," Journal of Medical Virology 2020, 92(6), 693-697.

Matsuyama, et al., "Enhanced isolation of SARS-CoV-2 by TMPRSS2-expressing cells," Proceedings of the National Academy of Sciences 2020, 117(13), 7001-7003.

Melo, et al., "Anti-COVID-19 efficacy of ivermectin in the golden hamster," bioRxiv 2020, in 20 pages. https://doi.org/10.1101/2020.11.21.392639.

Mendes De Oliveira, et al., "Structural Characterization and Crystallization of Human TMPRSS2 Protease," Biophysical Journal 2018, 114(3), 567a.

Miller, et al., "Design, synthesis, and preclinical characterization of novel, highly selective indole estrogens," Journal of Medicinal Chemistry 2001, 44(11), 1654-1657.

Monchatre-Leroy, et al., "Hamster and ferret experimental infection with intranasal low dose of a single strain of SARS-CoV-2," bioRxiv 2020, in 15 pages. https://doi.org/10.1101/2020.09.24.311977.

Mourya, et al., "Establishment of Biosafety Level-3 (BSL-3) laboratory: Important criteria to consider while designing, constructing, commissioning & operating the facility in Indian setting," The Indian Journal of Medical Research 2014, 140(2), 171-183.

Muñoz-Fontela, et al., "Animal models for COVID-19," Nature 2020, 586, 509-515. https://doi.org/10.1038/s41586-020-2787-6.

National Cancer Institute, "Randomized Trial of Topotecan With M6620, an ATR Kinase Inhibitor, in Small Cell Lung Cancers and Small Cell Cancers Outside of the Lungs," Cancer.gov retrieved on May 18, 2023, in 6 pages. https://www.cancer.gov/clinicaltrials/NCI-2019-01769.

Nau, "Species differences in pharmacokinetics and drug teratogenesis," Environmental Health Perspectives 1986, 70, 113-129. https://doi.org/10.1289/ehp.8670113.

Nema, et al., "Excipients and Their Role in Approved Injectable Products: Current Usage and Future Directions," PDA Journal of Pharmaceutical Science and Technology 2011, 65(3), 287-332.

Partial Supplementary European Search Report dated May 17, 2024 in European Patent Application No. 21817147.8.

Penny, et al., "Mining of Ebola virus entry inhibitors identifies approved drugs as two-pore channel pore blockers," Biochimica et Biophysica Acta (BBA)—Molecular Cell Research 2019, 1866(7), 1151-1161. https://doi.org/https://doi.org/10.1016/j.bbamcr.2018.10.022.

Peprotech, "Recombinant Human Furin," peprotech. com retrieved on May 16, 2023, in 5 pages. https://www.peprotech.com/en/recombinant-human-furin.

Pinto, et al., "ACE2 Expression is Increased in the Lungs of Patients with Comorbidities Associated with Severe COVID-19," medRxiv 2020, in 16 pages. https://doi.org/10.1101/2020.03.21.20040261.

Pooladanda et al., "The current understanding and potential therapeutic options to combat COVID-19," Life sciences 2020, 254, in 19 pages.

Powell, et al., "Compendium of excipients for parenteral formulations," PDA Journal of Pharmaceutical Science and Technology 1998, 52(5), 238-311.

R&D Systems, "Recombinant Human Furin Protein, CF," rndsystems.com retrieved on May 16, 2023, in 7 pages. https://www.rndsystems.com/products/recombinant-human-furin-protein-cf_1503-se.

Rathnasinghe, et al., "Comparison of Transgenic and Adenovirus hACE2 Mouse Models for SARS-CoV-2 Infection," bioRxiv 2020, in 15 pages. https://doi.org/10.1101/2020.07.06.190066.

Ratia, et al., "Structural Basis for the Ubiquitin-Linkage Specificity and delSGylating activity of SARS-CoV papain-like protease," PLoS Pathogens 2014, 10(5), in 15 pages.

ReframeDB, "About reframedb," ReframeDB.org retrieved on May 17, 2023, in 4 pages. https://reframedb.org/about.

ReframeDB, "SARS-CoV-2/HeLa-ACE2 HCl assay—% infected cells," eframeDB.org retrieved on May 18, 2023. https://reframedb.org/assays/A00466.

ResearchGate, "How to extrapolate result from in vitro (ug/mL) to in vivo?" ResearchGate.net retrieved on May 18, 2023, in 7 pages. https://www.researchgate.net/post/How-to-extrapolate-result-from-in-vitro-ug-mL-to-in-vivo.

Reynolds, et al., "Renin-Angiotensin-Aldosterone System Inhibitors and Risk of Covid-19," New England Journal of Medicine 2020, 382(25), 2441-2448.

Riva, et al., "Discovery of SARS-CoV-2 antiviral drugs through large-scale compound repurposing," Nature 2020, 586(7827), 113-119. https://doi.org/10.1038/s41586-020-2577-1.

Rosenke, et al., "Hydroxychloroquine prophylaxis and treatment is ineffective in macaque and hamster SARS-CoV-2 disease models," JCI Insight 2020, 5(23), in 14 pages. https://doi.org/10.1172/jci.insight.143174.

Rosenke, et al., "Orally delivered MK-4482 inhibits SARS-CoV-2 replication in the Syrian hamster model," Research Square 2020, in 26 pages. https://www.ncbi.nlm.nih.gov/pmc/articles/PMC7553153/.

Rosenke, et al., "Defining the Syrian hamster as a highly susceptible preclinical model for SARS-CoV-2 infection," Emerging Microbes & Infections 2020, 9(1), 2673-2684.

Schiffer, et al., "Rapid viral expansion and short drug half-life explain the incomplete effectiveness of current herpes simplex virus 2-directed antiviral agents," Antimicrobial Agents and Chemotherapy 2013, 57(12), 5820-5829. https://doi.org/10.1128/AAC.01114-13.

(56) References Cited

OTHER PUBLICATIONS

Sommerstein, et al., "Coronavirus disease 2019 (COVID-19): do angiotensin-converting enzyme inhibitors/angiotensin receptor blockers have a biphasic effect?" Journal of the American Heart Association 2020, 9(7), in 4 pages.

Squire, et al., "Prostate Cancer as a Model System for Genetic Diversity in Tumors," Advances in Cancer Research 2011, 112, 183-216.

Tempestilli, et al., "Pharmacokinetics of remdesivir and GS-441524 in two critically ill patients who recovered from COVID-19," The Journal of Antimicrobial Chemotherapy 2020, 75(10), 2977-2980. https://doi.org/10.1093/jac/dkaa239.

Terranova, et al., "Population pharmacokinetics of ATR inhibitor berzosertib in phase I studies for different cancer types," Cancer Chemotherapy and Pharmacology 2021, 87, 185-196. https://doi.org/10.1007/s00280-020-04184-z.

Teuscher, "What is a Loading Dose?," Certara retrieved on May 18, 2023, in 2 pages. https://www.certara.com/knowledge-base/what-is-a-loading-dose/.

The Privalsky Lab, "Growth Area of Tissue Culture Plates and Dishes," ucdavis.edu retrieved on Sep. 27, 2016, in 2 pages. http://microbiology.ucdavis.edu/privalsky/tc-growth-area.

Thomas, "Furin at the cutting edge: From protein traffic to embryogenesis and disease," Nature Reviews Molecular Cell Biology 2002, 3(10), 753-766.

Turner et al., "ACE2: from vasopeptidase to SARS virus receptor," Trends in pharmacological sciences 2004, 25(6), 291-294.

U.S. National Library of Medicine, "126 Studies found for: hydroxychloroquine | Recruiting, Not yet recruiting, Active, not recruiting, Completed, Enrolling by invitation Studies | Covid19," ClinicalTrials.gov retrieved on May 18, 2023, in 3 pages. https://clinicaltrials.gov/ct2/results?term=hydroxychloroquine&cond=Covid19&Search=Apply&recrs=b&recrs=a&recrs=f&recrs=d&recrs=e&age_v=&gndr=&type=&rslt=.

U.S. National Library of Medicine, "3 Studies found for: EIDD-2801 | Recruiting, Not yet recruiting, Active, not recruiting, Completed, Enrolling by invitation Studies | Covid19," ClinicalTrials.gov 2023, in 2 pages. https://clinicaltrials.gov/ct2/results?term=EIDD-2801&cond=Covid19&Search=Apply&recrs=b&recrs=a&recrs=f&recrs=d&recrs=e&age_v=&gndr=&type=&rslt=.

U.S. National Library of Medicine, "5 Studies found for: MK-4482 | Covid19," ClinicalTrials.gov retrieved on May 18, 2023, in 3 pages. https://clinicaltrials.gov/ct2/results?recrs=&cond=Covid19&term=MK-4482&cntry=&state=&city=&dist=.

U.S. National Library of Medicine, "69 Studies found for: Favipiravir | Covid19," ClinicalTrials.gov retrieved on May 18, 2023, in 3 pages. https://clinicaltrials.gov/ct2/results?cond=Covid19&term=Favipiravir&cntry=&state=&city=&dist=.

U.S. National Library of Medicine, "7 Studies found for: STI-2020 | Covid19," ClinicalTrials.gov retrieved on May 18, 2023, in 2 pages. https://clinicaltrials.gov/ct2/results?recrs=&cond=Covid19&term=STI-2020&cntry=&state=&city=&dist=.

U.S. National Library of Medicine, "89 Studies found for: Ivermectin | Covid19," ClinicalTrials.gov retrieved on May 18, 2023, in 3 pages. https://clinicaltrials.gov/ct2/results?recrs=&cond=Covid19&term=Ivermectin&cntry=&state=&city=&dist=.

U.S. National Library of Medicine, "98 Studies found for: Ritonavir | Recruiting, Not yet recruiting, Active, not recruiting, Completed, Enrolling by invitation Studies | Covid19," ClinicalTrials.gov retrieved on May 18, 2023, in 3 pages. https://clinicaltrials.gov/ct2/results?term=Ritonavir&cond=Covid19&Search=Apply&recrs=b&recrs=a&recrs=f&recrs=d&recrs=e&age_v=&gndr=&type=&rslt=.

U.S. National Library of Medicine, "A Phase I/II Study of Universal Off-the-shelf NKG2D-ACE2 CAR-NK Cells for Therapy of COVID-19," ClinicalTrials.gov retrieved on May 18, 2023, in 9 pages. https://clinicaltrials.gov/ct2/show/NCT04324996.

U.S. National Library of Medicine, "Aerosol Combination Therapy of All-trans Retinoic Acid and Isotretinoin as a Novel Treatment for Inducing Neutralizing Antibodies in COVID-19 Infected Patients Better Than Vaccine: An Innovative Treatment (Antibodies)," ClinicalTrials.gov retrieved on May 18, 2023, in 9 pages. https://clinicaltrials.gov/ct2/show/NCT04396067.

U.S. National Library of Medicine, "Analyze the Predictive Value of Gene TMPRSS2-ETS in Response to Enzalutamide in Patients with Prostate Cancer (PREMIERE)," ClinicalTrials.gov retrieved on May 18, 2023, in 9 pages. https://clinicaltrials.gov/ct2/show/NCT02288936.

U.S. National Library of Medicine, "Combination of Recombinant Bacterial ACE2 Receptors—Like Enzyme of B38-CAP and Isotretinoin Could be Promising Treatment for COVID-19 Infection—and Its Inflammatory Complications," ClinicalTrials.gov retrieved on May 18, 2023, in 9 pages. https://clinicaltrials.gov/ct2/show/NCT04382950.

U.S. National Library of Medicine, "Controlled evaLuation of Angiotensin Receptor Blockers for COVID-19 respIraTorY Disease (CLARITY)," ClinicalTrials.gov retrieved on May 18, 2023, in 11 pages. https://clinicaltrials.gov/ct2/show/NCT04394117.

U.S. National Library of Medicine, "Effect of Triptorelin (Decapeptyl®) 22.5 mg on Two Biomarkers in Patients with Advanced Prostate Cancer (Triptocare)," ClinicalTrials.gov retrieved on May 18, 2023, in 6 pages. https://clinicaltrials.gov/ct2/show/NCT01020448.

U.S. National Library of Medicine, "Efficacy of Nafamostat in Covid-19 Patients (RACONA Study) (RACONA)," ClinicalTrials.gov retrieved on May 18, 2023, in 11 pages. https://clinicaltrials.gov/ct2/show/NCT04352400.

U.S. National Library of Medicine, "Non-Insulin Dependent Diabetes Mellitus (NIDDM) and Angiotensin Converting Enzyme 2 (ACE2): Diabetic Patients Treated with Antihypertensive Drugs," ClinicalTrials.gov retrieved on May 18, 2023, in 5 pages. https://clinicaltrials.gov/ct2/show/NCT00192803.

U.S. National Library of Medicine, "Study for the Use of the IL-6 Inhibitor Clazakizumab in Patients with Life-threatening COVID-19 Infection," ClinicalTrials.gov retrieved on May 18, 2023, in 9 pages. https://clinicaltrials.gov/ct2/show/NCT04381052.

U.S. National Library of Medicine, "Trial of Bi-shRNA-furin and GMCSF Augmented Autologous Tumor Cell Vaccine for Advanced Cancer," ClinicalTrials.gov retrieved on May 18, 2023, in 11 pages. https://clinicaltrials.gov/ct2/show/NCT01061840.

Ul Qamar, et al., "Structural basis of SARS-CoV-2 3CLpro and anti-COVID-19 drug discovery from medicinal plants," Journal of Pharmaceutical Analysis 2020, 10(4), 313-319.

Ulrich, et al., "Species differences in the distribution of drug-metabolizing enzymes in the pancreas," Toxicologic Pathology 2002, 30(2), 247-53.

V'Kovski, et al., "Coronavirus biology and replication: implications for SARS-CoV-2," Nature Reviews Microbiology 2020, 19, 155-170. https://doi.org/10.1038/s41579-020-00468-6.

Vaarala, et al., "Expression of transmembrane serine protease TMPRSS2 in mouse and human tissues," The Journal of pathology 2001, 193(1), 134-140.

Vandyck, et al., "ALG-097111, a potent and selective SARS-CoV-2 3-chymotrypsin-like cysteine protease inhibitor exhibits in vivo efficacy in a Syrian Hamster model," bioRxiv 2021, in 18 pages. https://doi.org/10.1101/2021.02.14.431129.

Venkataraman, et al., "RNA Dependent RNA Polymerases: Insights from Structure, Function and Evolution," Viruses 2018, 10(2), in 23 pages.

White, et al., "Plitidepsin has potent preclinical efficacy against SARS-CoV-2 by targeting the host protein eEF1A," Science 2021, 371(6532), 926-931.

Wikipedia, "RNA virus," wikipedia.org retrieved on May 18, 2023, in 14 pages. https://en.wikipedia.org/w/index.php?title=RNA_virus&oldid=950706403.

Wilkinson, et al., "ACCORD: A Multicentre, Seamless, Phase 2 Adaptive Randomisation Platform Study to Assess the Efficacy and Safety of Multiple Candidate Agents for the Treatment of COVID-19 in Hospitalised Patients: A structured summary of a study protocol for a randomised controlled trial," Trials 2020, 21(1), in 3 pages. https://doi.org/10.1186/s13063-020-04584-9.

Wilson, et al., "The membrane-anchored serine protease, TMPRSS2, activates PAR-2 in prostate cancer cells," Biochemical Journal 2005, 388(3), 967-972.

(56) References Cited

OTHER PUBLICATIONS

World Health Organization, "Coronavirus Disease (COVID-19) Dashboard," who.int retrieved on May 18, 2023, in 6 pages. https://covid19.who.int.

Wu, et al., "Analysis of therapeutic targets for SARS-CoV-2 and discovery of potential drugs by computational methods," Acta Pharmaceutica Sinica B 2020, 10(5), 766-788.

Xia & Lazartigues, "Angiotensin-Converting Enzyme 2: Central Regulator for Cardiovascular Function," Current Hypertension Reports 2010, 12(3), 170-175.

Yang et al., "Angiotensin-converting enzyme 2 (ACE2) mediates influenza H7N9 virus-induced acute lung injury," Scientific reports 2014, 4(1), in 6 pages.

Yang et al., "Galantamine protects against hydrochloric acid aspiration-induced acute respiratory distress syndrome in rabbits," Tropical Journal of Pharmaceutical Research 2018, 17(4), 669-673.

Yin, et al., "Structural basis for inhibition of the RNA-dependent RNA polymerase from SARS-CoV-2 by remdesivir," Science 2020, 368(6498), 1499-1504.

Yoon, et al., "Antiviral activity of sertindole, raloxifene and ibutamoren against transcription and replication-competent Ebola virus-like particles," BMB Reports 2020, 53(3), 166-171. https://doi.org/10.5483/BMBRep.2020.53.3.175.

Zhang, et al., "Crystal structure of SARS-CoV-2 main protease provides a basis for design of improved α-ketoamide inhibitors," Science 2020, 368(6489), 409-412.

Zhou, et al., "A pneumonia outbreak associated with a new coronavirus of probable bat origin," Nature 2020, 579(7798), 270-273.

Zhu, et al., "Hit identification and optimization in virtual screening: practical recommendations based on a critical literature analysis," Journal of Medicinal Chemistry 2013, 56(17), 6560-6572. https://doi.org/10.1021/jm301916b.

European Examination Report dated Jun. 23, 2025 in European Patent Application No. 21817147.8.

Wang, Kaiming, et al., "Angiotensin converting enzyme 2: a double-edged sword." Circulation 142.5 (2020): 426-428.

\* cited by examiner

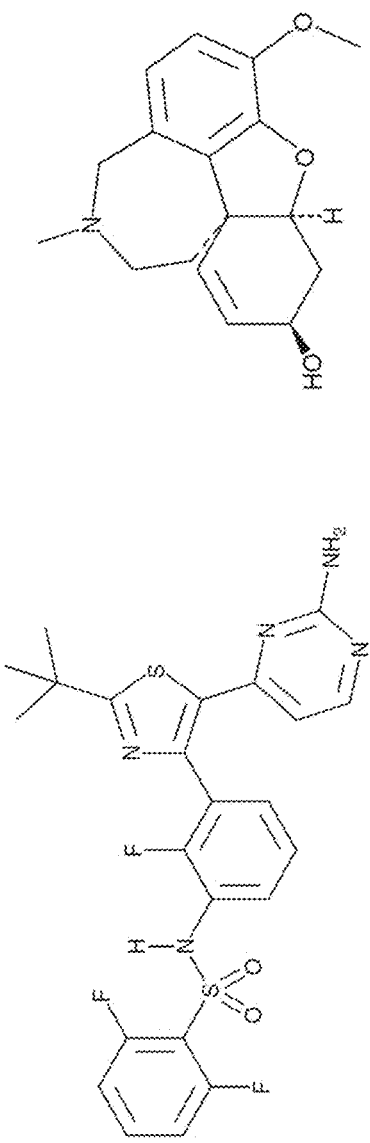
FIG. 8A
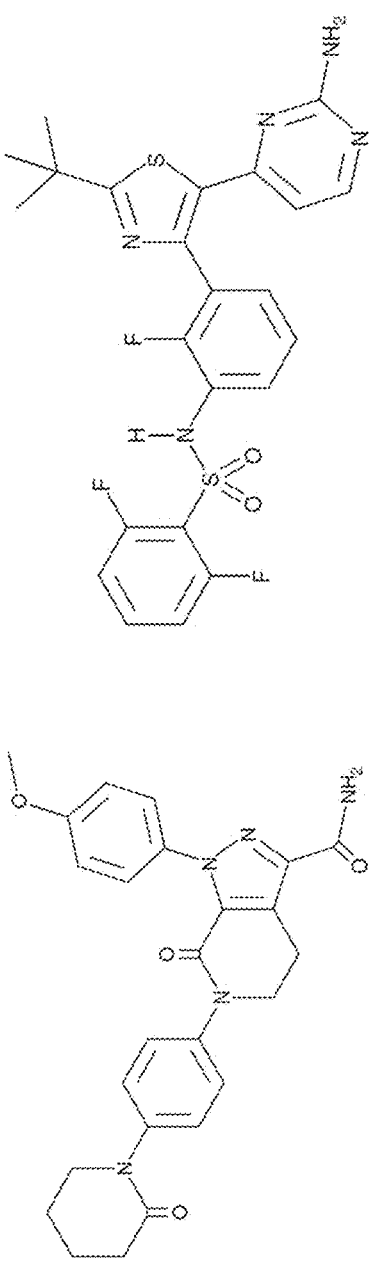
FIG. 8B
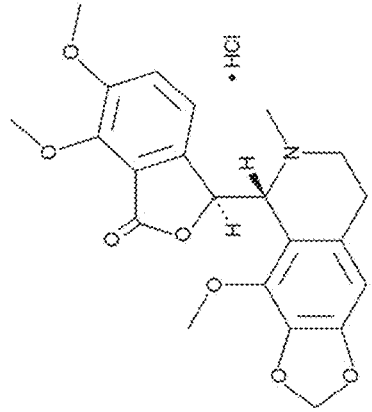
FIG. 8C
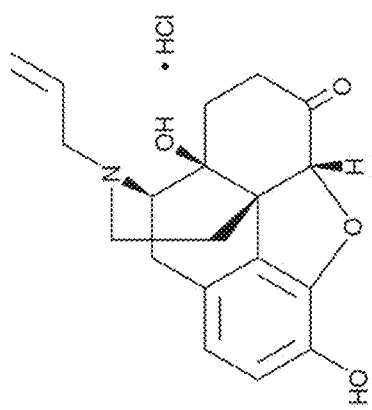
FIG. 8D
FIG. 8E

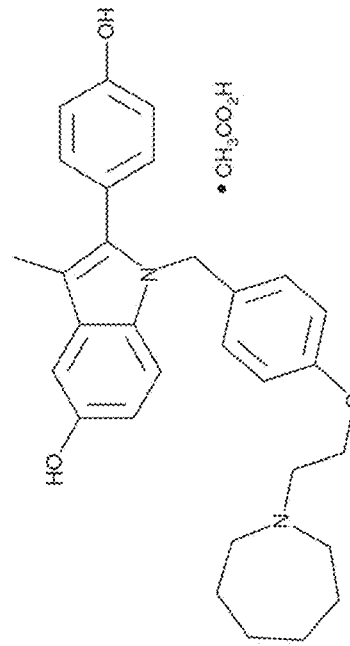
*FIG. 12A*
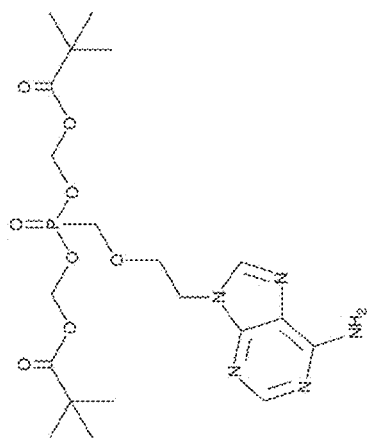
*FIG. 12B*
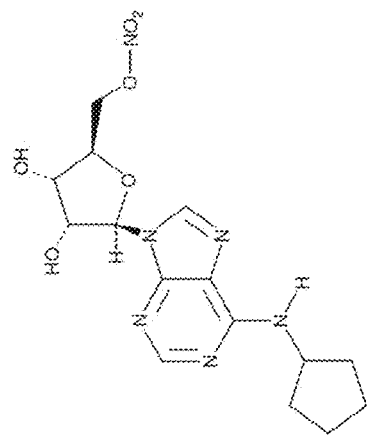
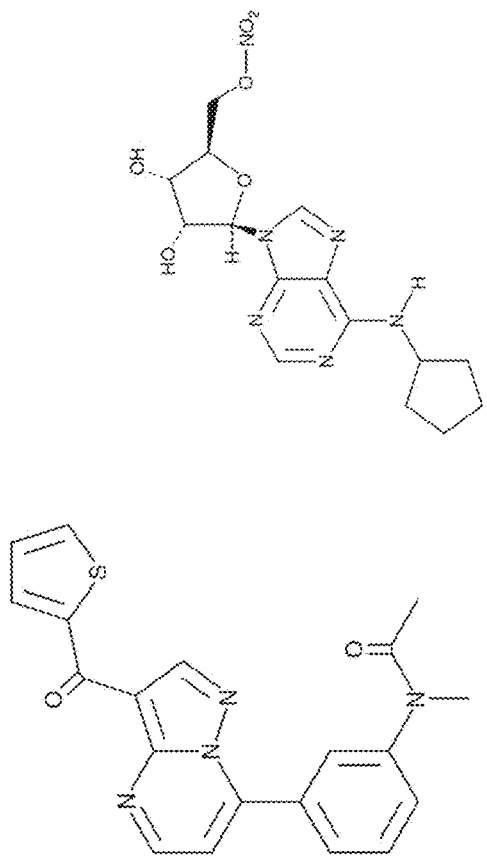
*FIG. 12D*
*FIG. 12E*
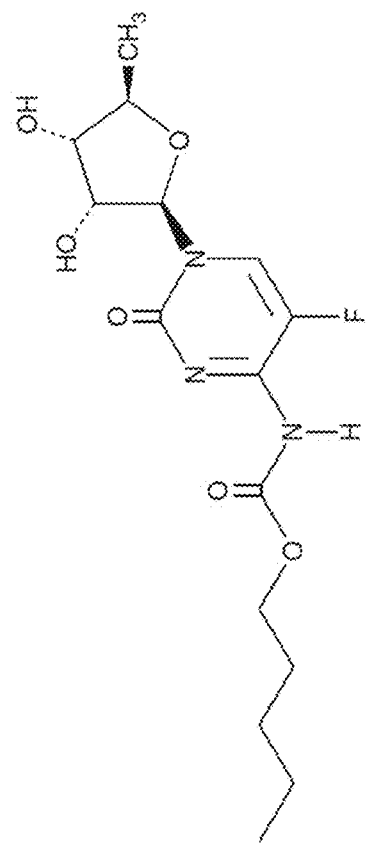
*FIG. 12C*

METHODS AND COMPOSITIONS FOR TREATING RNA VIRAL INFECTIONS

RELATED APPLICATIONS

The present application claims priority to U.S. Provisional Application No. 63/033,493, filed Jun. 2, 2020; and U.S. Provisional Application No. 63/182,507, filed Apr. 30, 2021. The entire contents of these applications are hereby expressly incorporated by reference in their entireties.

BACKGROUND

Field

The present disclosure generally relates to the use of drugs for the treatment of RNA viral infections. More specifically, the disclosure describes methods for the treatment of an RNA viral infection and/or treatment or prevention of symptoms of an RNA viral infection by administering pharmaceutical compositions or their analogues.

Description of the Related Art

An RNA virus is a virus that has RNA (ribonucleic acid) as its genetic material. This nucleic acid is usually single-stranded RNA (ssRNA) but may be double-stranded RNA (dsRNA). Notable human diseases caused by RNA viruses include the common cold, influenza, SARS, coronaviruses, COVID-19, hepatitis C, hepatitis E, West Nile fever, Ebola virus disease, rabies, polio and measles.

A large respiratory outbreak originating from Wuhan, China in December 2019 is currently spreading across many countries globally. The infectious disease was determined to be caused by a newly identified human coronavirus, severe acute respiratory syndrome coronavirus 2 (SARS-CoV-2). As of May 25, 2020, there are approximately 4.5 M confirmed cases of severe acute respiratory syndrome (SARS-CoV-2) globally with a 6.9% mortality rate (WHO). The main symptoms of this virus are cough, shortness of breath or difficulty breathing, fever, headache, sore throat, and loss of taste and/or smell. New symptoms caused by SARS-CoV-2 are surfacing frequently; examples of recently discovered effects on various organs and physiological systems can be viewed at Jason Gale 2020. For instance, a notably severe effect of the virus' infection in the respiratory tract is that it can induce Acute Respiratory Distress Syndrome (ARDS) in addition to general respiratory complications. Treatment that serves to block viral infection or attenuate symptoms of SARS-CoV-2 are of utmost interest.

SARS-CoV-2 is part of the genus Betacoronavirus and shares structural and sequence similarity with SARS-CoV and MERS-CoV. This novel coronavirus is an enveloped positive sense RNA virus. Its structure is mainly encompassed by a spike (S) glycoprotein, a small envelope (E) glycoprotein, membrane (M) glycoprotein, and a nucleocapsid (N) protein. The S Protein facilitates binding and fusion for host-cell entry. The S protein is composed of two subunits, S1 and S2, that require proteolytic activation by host enzymes furin and TMPRSS2. Once activated, the S1 subunit utilizes its receptor binding domain to recognize and bind to the host's angiotensin-converting enzyme 2 (ACE2) located in the type II alveolar cells of the respiratory tract. The S2 subunit contains fusion peptides that facilitate fusion of the viral and host membranes.

Following viral entry and fusion into the host cell, the virus releases its genome in a form that can be readily translated by the host's ribosomal machinery. Two virally encoded proteases, papain-like protease (PLpro or Nsp3) and 3C-like protease (3CLpro or Nsp5) are essential to process viral polyproteins pp1a and pp1ab which are necessary for production and maturation of nonstructural proteins (Nsp). The released Nsps are required for proper formation and execution of the virus' replication/transcription complex. Another important element of the replication/transcription complex is RNA-dependent RNA polymerase (RdRp or Nsp12). RdRp synthesizes a complete negative-strand RNA template that is then used to create more viral genomic RNA. Targeted inhibition of the key proteins furin, ACE2, TMPRSS2, 3CLpro, PLpro and RdRp could block cellular entry and propagation of SARS-CoV-2 and potentially other coronaviruses of the same genus.

The pharmaceutical candidates described herein have been investigated in various other diseases. In view of the large volume of data from the clinical investigation of these pharmaceutical candidates, and deep understanding of their clinical behaviors, it is beneficial to determine if these pharmaceutical candidates can be used to treat and/or prevent other disorders, for example RNA viral infections. There is an urgent need or compositions and methods for preventing, delaying the onset of, or treating an inflammatory effect of an infection or a disease caused by a RNA virus (e.g., SARS-CoV-2).

SUMMARY

Disclosed herein includes the use of pharmaceutical compositions and pharmaceutical composition analogues for the treatment or prevention of disorders related to the modulation of one or more receptors related to RNA viral infections, for example coronavirus infections (including the abnormal behavioral symptoms related to coronavirus infections).

Some embodiments provide methods for the treatment or prevention of RNA viral infections using a compound from Tables 1-6 or an analogue thereof, or pharmaceutical compositions containing a compound of Tables 1-6 or an analogue thereof, or pharmaceutical compositions containing one or more pro-drugs of the compound of Tables 1-6 or an analogue thereof by, for example, modulation of receptor related to RNA viral infection. Without being limited by any particular theory, it is believed that the treatment comprises causing the chemical effectors of the receptor related to RNA viral infection, by agonizing or antagonizing the effect of receptor related to RNA viral infection, which can also be used in addition to a safe and effective amount of one or more other agents to prevent or treat related symptoms and conditions. In some embodiments, the compound is Tocladesine, PRX-07034, AZD-5991, Berzosertib, Pipendoxifene, Bazedoxifene, R-428, Galantamine, or Semagacestat.

Provided herein includes a method for preventing or treating an RNA viral infection. In some embodiments, the method comprises administering to a subject having the RNA viral infection or having a risk (e.g., a high risk) to develop the RNA viral infection, a therapeutically effective amount of a compound from Tables 1-6 or an analogue thereof, or a pharmaceutically acceptable salt of the compound from Tables 1-6 or the analogue thereof, thereby treating the RNA viral infection in the subject. In some embodiments, the compound is Tocladesine, PRX-07034, AZD-5991, Berzosertib, Pipendoxifene, Bazedoxifene, R-428, Galantamine, or Semagacestat.

The method can, in some embodiments, comprise administrating one or more additional therapeutic agents to the subject. For example, the one or more additional therapeutic agents can comprise a binder of a receptor related to RNA viral infection. The binder of a receptor related to RNA viral infection can be a modulator for the receptor related to RNA viral infection, for example, an agonist or antagonist of the receptor related to RNA viral infection.

The RNA viral infection can be, for example, a coronavirus. In some embodiments, the RNA viral infection is SARS COV-1, SARS COV-2, the common cold, influenza, SARS, hepatitis C, hepatitis E, West Nile fever, Ebola virus disease, rabies, polio and measles, or a combination thereof. The International Committee on Taxonomy of Viruses (ICTV) classifies RNA viruses as those that belong to Group III, Group IV or Group V of the Baltimore classification system. Another term for RNA viruses is ribovirus. Viruses with RNA as their genetic material which also include DNA intermediates in their replication cycle are called retroviruses, and comprise Group VI of the Baltimore classification. Notable human retroviruses include HIV-1 and HIV-2, the cause of the disease AIDS. In some embodiments, the RNA viral infection is a results of viruses from Groups III, IV, V, or VI of the Baltimore classification system.

Non-limiting examples of RNA viral infection include Paramyxoviruses, Hendra and Nipah viruses, Measles, Severe acute respiratory syndrome coronavirus (SARS), COVID-19, Middle east respiratory syndrome coronavirus (MERS), Picornaviruses, Poliomyelitis ('Polio'), Hepatitis A virus (HAV), Rotavirus, Human immunodeficiency virus (HIV), Human T-cell lymphotropic virus (HTLV), Hepatitis C virus (HCV), Hepatitis E virus (HEV), Rabies, Ebola virus disease (EVD), Marburg virus, Lassa fever, Lymphocytic choriomeningitis virus (LCMV), Arboviruses ('ARthropod-BOrne viruses'), Japanese encephalitis (JE), West Nile fever, Yellow fever, Dengue fever, Zika virus, Equine encephalitis viruses, Chikungunya, O'nyong-nyong, Bunyaviruses, Rift valley fever and Crimean-Congo haemorrhagic fever, Hantavirus, or a combination thereof. The RNA viral infection can also be a complication due to a bacterial or parasitic infection.

In some embodiments, a compound from Tables 1-6 or the analogue thereof is administered in the form of a pro-drug. The compound from Tables 1-6 or the analogue thereof can be, for example, administered orally. In some embodiments, the compound from Tables 1-6 or the analogue thereof is administered in the form of a pill, a tablet, a microtablet, a pellet, a micropellet, a capsule, a capsule containing microtablets, or a liquid formulation. In some embodiments, the compound from Tables 1-6 or the analogue thereof is administered in the form of a capsule containing enteric coated microtablets.

The compound from Tables 1-6 or the analogue thereof or a pharmaceutically acceptable salt thereof can be administered in various frequency, for example, once, twice, or three times a day. In some embodiments, the compound of from Tables 1-6 or the analogue thereof or a pharmaceutically acceptable salt thereof can be administered no more than once, twice, or three times a day. In some embodiments, the compound from Tables 1-6 or the analogue thereof or a pharmaceutically acceptable salt thereof can be administered at least once, twice, or three times a day. In some embodiments, the compound from Tables 1-6 or the analogue thereof or a pharmaceutically acceptable salt thereof is administered once every day, every two days, every three days, every four days, or every five days. The duration for the treatment can vary. For example, the compound from Tables 1-6 or the analogue thereof or a pharmaceutically acceptable salt thereof can be administered over the course of at least one week, at least two weeks, at least three weeks, at least four weeks, at least five weeks, at least ten weeks, at least twenty weeks, at least twenty-six weeks, at least a year, or longer. In some embodiments, the compound from Tables 1-6 or the analogue thereof or a pharmaceutically acceptable salt thereof can be administered over the course of no more than five weeks, no more than ten weeks, no more than twenty weeks, no more than twenty-six weeks, or no more than a year.

Disclosed herein include kits, comprising a compound from Tables 1-6 or the analogue thereof, or a pharmaceutically acceptable salt thereof, and a label indicating that the kit is for the treatment or amelioration of one or more symptoms of an RNA viral infection. The compound from Tables 1-6 or the pharmaceutically acceptable salt thereof can be, for example, in a composition comprising the compound from Tables 1-6 or the analogue thereof, or the pharmaceutically acceptable salt thereof, and a pharmaceutically acceptable excipient. In some embodiments, the compound is Tocladesine, PRX-07034, AZD-5991, Berzosertib, Pipendoxifene, Bazedoxifene, R-428, Galantamine, or Semagacestat.

Also disclosed herein include compositions comprising a compound from Tables 1-6 or an analogue thereof, or a pharmaceutically acceptable salt of the compound from Tables 1-6 or an analogue thereof, for use in the treatment of an RNA viral infection in a subject. In some embodiments, the treatment comprises administrating one or more additional therapeutic agents to the subject. The one or more additional therapeutic agents can, for example, comprise a binder of a receptor related to RNA viral infection. In some embodiments, the compound is Tocladesine, PRX-07034, AZD-5991, Berzosertib, Pipendoxifene, Bazedoxifene, R-428, Galantamine, or Semagacestat.

Disclosed herein include methods for preventing, delaying the onset of, or treating an infection or a disease caused by a RNA virus. In some embodiments, the method comprises administering to a subject in need thereof a composition comprising a compound selected from the compounds listed in Tables 1-6, or a pharmaceutically acceptable salt, ester, solvate, stereoisomer, tautomer, or prodrug thereof, thereby preventing, delaying the onset of, or treating the infection or the disease. In some embodiments, the compound is Tocladesine, PRX-07034, AZD-5991, Berzosertib, Pipendoxifene, Bazedoxifene, R-428, Galantamine, or Semagacestat.

Disclosed herein include methods for preventing, delaying the onset of, or treating an inflammatory effect of an infection or a disease caused by a RNA virus. In some embodiments, the method comprises administering to a subject in need thereof a composition comprising a compound selected from the compounds listed in Tables 1-6, or a pharmaceutically acceptable salt, ester, solvate, stereoisomer, tautomer, or prodrug thereof, thereby preventing, delaying the onset of, or treating the inflammatory effect. In some embodiments, the compound is Tocladesine, PRX-07034, AZD-5991, Berzosertib, Pipendoxifene, Bazedoxifene, R-428, Galantamine, or Semagacestat.

Disclosed herein include methods for preventing, delaying the onset of, or treating an infection or a disease caused by a RNA virus. In some embodiments, the method comprises administering to a subject in need thereof a composition comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, thereby preventing, delaying the onset of, or treating the infection or the disease.

Disclosed herein include methods for preventing, delaying the onset of, or treating an inflammatory effect of an infection or a disease caused by a RNA virus. In some embodiments, the method comprises administering to a subject in need thereof a composition comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, thereby preventing, delaying the onset of, or treating the inflammatory effect.

In some embodiments, the inflammatory effect comprises respiratory failure, a sequela of respiratory failure, acute lung injury, or acute respiratory distress syndrome. In some embodiments, the sequela of respiratory failure comprises multi-organ failure.

In some embodiments, the composition comprises a therapeutically or prophylactically effective amount of the compound. In some embodiments, the subject in need is a subject that is suffering from the infection or the disease, or a subject that is at a risk for the infection or the disease. In some embodiments, the infection or the disease is in the respiratory tract of the subject. In some embodiments, the subject has been exposed to the RNA virus, is suspected to have been exposed to the RNA virus, or is at a risk of being exposed to the RNA virus. In some embodiments, the subject is a mammal. In some embodiments, the subject is a human.

In some embodiments, the RNA virus is a double-stranded RNA virus. In some embodiments, the RNA virus is a positive-sense single-stranded RNA virus. In some embodiments, the positive-sense single-stranded RNA virus is a coronavirus. In some embodiments, the coronavirus is an alpha coronavirus, a beta coronavirus, a gamma coronavirus, or a delta coronavirus. In some embodiments, the coronavirus is Middle East respiratory coronavirus (MERS-CoV), severe acute respiratory syndrome coronavirus (SARS-CoV), or SARS-CoV-2. In some embodiments, the infection or disease caused by the RNA virus is common cold, influenza, SARS, coronaviruses, COVID-19, hepatitis C, hepatitis E, West Nile fever, Ebola virus disease, rabies, polio, or measles.

In some embodiments, the composition is a pharmaceutical composition comprising the compound and one or more pharmaceutically acceptable excipients. The method can comprise administering to the subject one or more additional antiviral agents. In some embodiments, at least one of the one or more additional antiviral agents is co-administered to the subject with the composition. In some embodiments, at least one of the one or more additional antiviral agents is administered to the subject before the administration of the composition, after the administration of the composition, or both. In some embodiments, the composition comprises one or more additional therapeutic agents. In some embodiments, the one or more additional therapeutic agents comprise one or more antiviral agents. In some embodiments, the antiviral agent is selected from the group consisting of a nucleoside or a non-nucleoside analogue reverse-transcriptase inhibitor, a nucleotide analogue reverse-transcriptase inhibitor, a NS3/4A serine protease inhibitor, a NS5B polymerase inhibitor, and interferon alpha.

In some embodiments, the composition is administered to the subject by intravenous administration, nasal administration, pulmonary administration, oral administration, parenteral administration, or nebulization. In some embodiments, the composition is aspirated into at least one lung of the subject. In some embodiments, the composition is in the form of powder, pill, tablet, microtablet, pellet, micropellet, capsule, capsule containing microtablets, liquid, aerosols, or nanoparticles. In some embodiments, the composition is in a formulation for administration to the lungs.

In some embodiments, the composition is administered to the subject once, twice, or three times a day. In some embodiments, the composition is administered to the subject once every day, every two days, or every three days. In some embodiments, the composition is administered to the subject over the course of at least two weeks, at least three weeks, at least four weeks, or at least five weeks.

The method can comprise measuring the viral titer of the RNA virus in the subject before administering the composition to the subject, after administering the composition to the subject, or both. In some embodiments, the viral titer is lung bulk virus titer. In some embodiments, administrating the composition results in reduction of the viral titer of the RNA virus in the subject as compared to that in the subject before administration of the composition. The method can comprise determining global virus distribution in the lungs of the subject. The method can comprise measuring a neutrophil density within the lungs of the subject. In some embodiments, administering the composition results in reduction of the neutrophil density within the lungs of the subject as compared to that in the subject before administration of the composition. The method can comprise measuring a total necrotized cell count within the lungs of the subject. In some embodiments, administering the composition results in reduction of the total necrotized cell count in the subject as compared to that in the subject before administration of the composition. The method can comprise measuring a total protein level within the lungs of the subject. In some embodiments, administering the composition results in reduction of the total protein level within the lungs of the subject as compared to that in the subject before administration of the composition.

Disclosed herein include methods for preventing, delaying the onset of, or treating an infection or a disease caused by a RNA virus. In some embodiments, the method comprises administering to a subject in need thereof a first compound selected from the compounds listed in Tables 1-6, or a pharmaceutically acceptable salt, ester, solvate, stereoisomer, tautomer, or prodrug thereof, and a second compound selected from the compounds listed in Tables 1-6, or a pharmaceutically acceptable salt, ester, solvate, stereoisomer, tautomer, or prodrug thereof, thereby preventing, delaying the onset of, or treating the inflammatory effect, wherein the first compound and the second compound are different. In some embodiments, the first compound and the second compound are each independently selected from the group consisting of Tocladesine, PRX-07034, AZD-5991, Berzosertib, Pipendoxifene, Bazedoxifene, R-428, Galantamine, and Semagacestat. In some embodiments, the first compound is selected from the compounds listed in Tables 1-6, and the second compound is selected from the group consisting of Tocladesine, PRX-07034, AZD-5991, Berzosertib, Pipendoxifene, Bazedoxifene, R-428, Galantamine, and Semagacestat.

Disclosed herein include methods for preventing, delaying the onset of, or treating an inflammatory effect of an infection or a disease caused by a RNA virus. In some embodiments, the method comprises administering to a subject in need thereof a first compound selected from the compounds listed in Tables 1-6, or a pharmaceutically acceptable salt, ester, solvate, stereoisomer, tautomer, or prodrug thereof, and a second compound selected from the compounds listed in Tables 1-6, or a pharmaceutically acceptable salt, ester, solvate, stereoisomer, tautomer, or prodrug thereof, thereby preventing, delaying the onset of, or treating the inflammatory effect, wherein the first compound and the second compound are different. In some embodiments, the first compound and the second compound are each independently selected from the group consisting of Tocladesine, PRX-07034, AZD-5991, Berzosertib, Pipendoxifene, Bazedoxifene, R-428, Galantamine, and Semagacestat. In some embodiments, the first compound is selected from the compounds listed in Tables 1-6, and the second compound is selected from the group consisting of Tocladesine, PRX-07034, AZD-5991, Berzosertib, Pipendoxifene, Bazedoxifene, R-428, Galantamine, and Semagacestat.

Disclosed herein include methods for preventing, delaying the onset of, or treating an infection or a disease caused by a RNA virus. In some embodiments, the method comprises administering to a subject in need thereof a first compound selected from the group comprising Tocladesine, PRX-07034, AZD-5991, Berzosertib, Pipendoxifene, Bazedoxifene, R-428, or a pharmaceutically salt, ester, solvate, stereoisomer, tautomer or prodrug thereof, and a second compound selected from the group comprising Tocladesine, PRX-07034, AZD-5991, Berzosertib, Pipendoxifene, Bazedoxifene, R-428, or a pharmaceutically salt, ester, solvate, stereoisomer, tautomer, or prodrug thereof, thereby preventing, delaying the onset of, or treating the inflammatory effect, wherein the first compound and the second compound are different.

Disclosed herein include methods for preventing, delaying the onset of, or treating an inflammatory effect of an infection or a disease caused by a RNA virus. In some embodiments, the method comprises administering to a subject in need thereof a first compound selected from the group comprising Tocladesine, PRX-07034, AZD-5991, Berzosertib, Pipendoxifene, Bazedoxifene, R-428, or a pharmaceutically salt, ester, solvate, stereoisomer, tautomer or prodrug thereof, and a second compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, thereby preventing, delaying the onset of, or treating the inflammatory effect, wherein the first compound and the second compound are different.

In some embodiments, the inflammatory effect comprises respiratory failure, a sequela of respiratory failure, acute lung injury, or acute respiratory distress syndrome. In some embodiments, the sequela of respiratory failure comprises multi-organ failure.

In some embodiments, the first compound is selected from the compounds listed in Table 1, and the second compound is selected from the compounds listed in Table 2. In some embodiments, the first compound is selected from the compounds listed in Table 1, and the second compound is selected from the compounds listed in Table 3. In some embodiments, the first compound is selected from the compounds listed in Table 1, and the second compound is selected from the compounds listed in Table 4. In some embodiments, the first compound is selected from the compounds listed in Table 1, and the second compound is selected from the compounds listed in Table 5. In some embodiments, the first compound is selected from the compounds listed in Table 1, and the second compound is selected from the compounds listed in Table 6.

In some embodiments, the first compound is selected from the compounds listed in Table 2, and the second compound is selected from the compounds listed in Table 3. In some embodiments, the first compound is selected from the compounds listed in Table 2, and the second compound is selected from the compounds listed in Table 4. In some embodiments, the first compound is selected from the compounds listed in Table 2, and the second compound is selected from the compounds listed in Table 5. In some embodiments, the first compound is selected from the compounds listed in Table 2, and the second compound is selected from the compounds listed in Table 6.

In some embodiments, the first compound is selected from the compounds listed in Table 3, and the second compound is selected from the compounds listed in Table 4. In some embodiments, the first compound is selected from the compounds listed in Table 3, and the second compound is selected from the compounds listed in Table 5. In some embodiments, the first compound is selected from the compounds listed in Table 3, and the second compound is selected from the compounds listed in Table 6.

In some embodiments, the first compound is selected from the compounds listed in Table 4, and the second compound is selected from the compounds listed in Table 5. In some embodiments, the first compound is selected from the compounds listed in Table 4, and the second compound is selected from the compounds listed in Table 6. In some embodiments, the first compound is selected from the compounds listed in Table 5, and the second compound is selected from the compounds listed in Table 6 In some embodiments, the first compound is Tocladesine, Pipendoxifene, or Bazedoxifene, and the second compound is PRX-07034, AZD-5991, Berzosertib, or R-428.

The method can comprise administering to the subject a third compound selected from the compounds listed in Tables 1-6, or a pharmaceutically acceptable salt, ester, solvate, stereoisomer, tautomer, or prodrug thereof, wherein the first, second and third compounds are different.

In some embodiments, the first compound is selected from the compounds listed in Table 1, the second compound is selected from the compounds listed in Table 2, and the third compound is selected from the compounds listed in Table 3. In some embodiments, the first compound is selected from the compounds listed in Table 1, the second compound is selected from the compounds listed in Table 2, and the third compound is selected from the compounds listed in Table 4. In some embodiments, the first compound is selected from the compounds listed in Table 1, the second compound is selected from the compounds listed in Table 2, and the third compound is selected from the compounds listed in Table 5. In some embodiments, the first compound is selected from the compounds listed in Table 1, the second compound is selected from the compounds listed in Table 2, and the third compound is selected from the compounds listed in Table 6. In some embodiments, the first compound is selected from the compounds listed in Table 1, the second compound is selected from the compounds listed in Table 3, and the third compound is selected from the compounds listed in Table 4. In some embodiments, the first compound is selected from the compounds listed in Table 1, the second compound is selected from the compounds listed in Table 3, and the third compound is selected from the compounds listed in Table 5. In some embodiments, the first compound is selected from the compounds listed in Table 1, the second compound is selected from the compounds listed in Table 3, and the third compound is selected from the compounds listed in Table 6. In some embodiments, the first compound is selected from the compounds listed in Table 1, the second compound is selected from the compounds listed in Table 4, and the third compound is selected from the compounds listed in Table 5. In some embodiments, the first compound is selected from the compounds listed in Table 1, the second compound is selected from the compounds listed in Table 4, and the third compound is selected from the compounds listed in Table 6. In some embodiments, the first compound is selected from the compounds listed in Table 1, the second compound is selected from the compounds listed in Table 5, and the third compound is selected from the compounds listed in Table 6.

In some embodiments, the first compound is selected from the compounds listed in Table 2, the second compound is selected from the compounds listed in Table 3, and the third compound is selected from the compounds listed in Table 4. In some embodiments, the first compound is selected from the compounds listed in Table 2, the second compound is selected from the compounds listed in Table 3, and the third compound is selected from the compounds listed in Table 5. In some embodiments, the first compound is selected from the compounds listed in Table 2, the second compound is selected from the compounds listed in Table 3, and the third compound is selected from the compounds listed in Table 6. In some embodiments, the first compound is selected from the compounds listed in Table 2, the second compound is selected from the compounds listed in Table 4, and the third compound is selected from the compounds listed in Table 5. In some embodiments, the first compound is selected from the compounds listed in Table 2, the second compound is selected from the compounds listed in Table 4, and the third compound is selected from the compounds listed in Table 6. In some embodiments, the first compound is selected from the compounds listed in Table 2, the second compound is selected from the compounds listed in Table 5, and the third compound is selected from the compounds listed in Table 6.

In some embodiments, the first compound is selected from the compounds listed in Table 3, the second compound is selected from the compounds listed in Table 4, and the third compound is selected from the compounds listed in Table 5. In some embodiments, the first compound is selected from the compounds listed in Table 3, the second compound is selected from the compounds listed in Table 4, and the third compound is selected from the compounds listed in Table 6. In some embodiments, the first compound is selected from the compounds listed in Table 3, the second compound is selected from the compounds listed in Table 5, and the third compound is selected from the compounds listed in Table 6. In some embodiments, the first compound is selected from the compounds listed in Table 4, the second compound is selected from the compounds listed in Table 5, and the third compound is selected from the compounds listed in Table 6.

In some embodiments, the first compound is Tocladesine, Pipendoxifene, or Bazedoxifene, the second compound is PRX-07034, AZD-5991, Berzosertib, or R-428, and the third compound is selected from the compounds listed in Table 1. In some embodiments, the first compound is Tocladesine, Pipendoxifene, or Bazedoxifene, the second compound is PRX-07034, AZD-5991, Berzosertib, or R-428, and the third compound is selected from the compounds listed in Table 2. In some embodiments, the first compound is Tocladesine, Pipendoxifene, or Bazedoxifene, the second compound is PRX-07034, AZD-5991, Berzosertib, or R-428, and the third compound is selected from the compounds listed in Table 3. In some embodiments, the first compound is Tocladesine, Pipendoxifene, or Bazedoxifene, the second compound is PRX-07034, AZD-5991, Berzosertib, or R-428, and the third compound is selected from the compounds listed in Table 4. In some embodiments, the first compound is Tocladesine, Pipendoxifene, or Bazedoxifene, the second compound is PRX-07034, AZD-5991, Berzosertib, or R-428, and the third compound is selected from the compounds listed in Table 5. In some embodiments, the first compound is Tocladesine, Pipendoxifene, or Bazedoxifene, the second compound is PRX-07034, AZD-5991, Berzosertib, or R-428, and the third compound is selected from the compounds listed in Table 6.

In some embodiments, the first compound, the second compound, and/or the third compound is administered in a therapeutically or prophylactically effective amount. In some embodiments, the subject in need thereof is a subject that is suffering from the infection or the disease, or a subject that is at a risk for the infection or the disease. In some embodiments, the infection or the disease is in the respiratory tract of the subject. In some embodiments, the subject has been exposed to the RNA virus, is suspected to have been exposed to the RNA virus, or is at a risk of being exposed to the RNA virus. In some embodiments, the subject is a mammal. In some embodiments, the subject is a human.

In some embodiments, the RNA virus is a double-stranded RNA virus. In some embodiments, the RNA virus is a positive-sense single-stranded RNA virus. In some embodiments, the positive-sense single-stranded RNA virus is a coronavirus. In some embodiments, the coronavirus is an alpha coronavirus, a beta coronavirus, a gamma coronavirus, or a delta coronavirus. In some embodiments, the coronavirus is Middle East respiratory coronavirus (MERS-CoV), severe acute respiratory syndrome coronavirus (SARS-CoV), or SARS-CoV-2. In some embodiments, the infection or disease caused by the RNA virus is common cold, influenza, SARS, coronaviruses, COVID-19, hepatitis C, hepatitis E, West Nile fever, Ebola virus disease, rabies, polio, or measles.

In some embodiments, the first, second and/or third compound is in a pharmaceutical composition comprising one or more pharmaceutically acceptable excipients. The method can comprise administering to the subject one or more additional therapeutic agents. In some embodiments, the therapeutic agent is selected from the group consisting of a nucleoside or a non-nucleoside analogue reverse-transcriptase inhibitor, a nucleotide analogue reverse-transcriptase inhibitor, a NS3/4A serine protease inhibitor, a NS5B polymerase inhibitor, and interferon alpha.

In some embodiments, at least one of the one or more additional therapeutic agents is administered to the subject before the administration of the first, second or third compound; after the administration of the first, second or third compound; or both. In some embodiments, at least two of the first, second and third compounds are co-administered in a single composition or in separate compositions to the subject. In some embodiments, the first, second and third compounds are co-administered in a single composition or in separate compositions to the subject. In some embodiments, the first, second and/or third compound is administered to the subject by intravenous administration, nasal administration, pulmonary administration, oral administration, parenteral administration, nebulization, or a combination thereof. In some embodiments, the first, second and/or third compound is aspirated into at least one lung of the subject. In some embodiments, at least one of the first, second and third compounds is in a composition in the form of powder, pill, tablet, microtablet, pellet, micropellet, capsule, capsule containing microtablets, liquid, aerosols, or nanoparticles. In some embodiments, at least one of the first, second and third compounds is in a composition in a formulation for administration to the lungs. In some embodiments, at least one of the first, second and third compounds is administered to the subject once, twice, or three times a day. In some embodiments, at least one of the first, second and third compounds is administered to the subject once every day, every two days, or every three days. In some embodiments, at least one of the first, second and third compounds is administered to the subject over the course of at least two weeks, at least three weeks, at least four weeks, or at least five weeks.

The method can comprise measuring the viral titer of the RNA virus in the subject before administering the first, second and/or the third compound to the subject, after administering the first, second and/or the third compound to the subject, or both. In some embodiments, the viral titer is lung bulk virus titer. In some embodiments, administrating the first, second and/or the third compound results in reduction of the viral titer of the RNA virus in the subject as compared to that in the subject before administration of the first, second and/or the third compound. The method can comprise determining global virus distribution in the lungs of the subject. The method can comprise measuring a neutrophil density within the lungs of the subject. In some embodiments, administering the first, second and/or the third compound results in reduction of the neutrophil density within the lungs of the subject as compared to that in the subject before administration of the first, second and/or the third compound. The method can comprise measuring a total necrotized cell count within the lungs of the subject. In some embodiments, administering the first, second and/or the third compound results in reduction of the total necrotized cell count in the subject as compared to that in the subject before administration of the first, second and/or the third compound. The method can comprise measuring a total protein level within the lungs of the subject. In some embodiments, administering the first, second and/or the third compound results in reduction of the total protein level within the lungs of the subject as compared to that in the subject before administration of the first, second and/or the third compound.

Disclosed herein include kits comprising a first compound selected from the compounds listed in Tables 1-6, or a pharmaceutically acceptable salt, ester, solvate, stereoisomer, tautomer, or prodrug thereof, and a label indicating that the kit is for preventing, delaying the onset of, or treating an infection or a disease caused by a RNA virus. In some embodiments, the first compound is Tocladesine, PRX-07034, AZD-5991, Berzosertib, Pipendoxifene, Bazedoxifene, R-428, Galantamine, or Semagacestat.

Disclosed herein include kits comprising a first compound selected from the compounds listed in Tables 1-6 or a pharmaceutically acceptable salt, ester, solvate, stereoisomer, tautomer, or prodrug thereof, and a label indicating that the kit is for preventing, delaying the onset of, or treating an inflammatory effect of an infection or a disease caused by a RNA virus. In some embodiments, the first compound is Tocladesine, PRX-07034, AZD-5991, Berzosertib, Pipendoxifene, Bazedoxifene, R-428, Galantamine, or Semagacestat.

Disclosed herein include kits comprising a first compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof; and a label indicating that the kit is for preventing, delaying the onset of, or treating an infection or a disease caused by a RNA virus.

Disclosed herein include kits comprising a first compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof; and a label indicating that the kit is for preventing, delaying the onset of, or treating an inflammatory effect of an infection or a disease caused by a RNA virus.

The kit can comprise a second compound selected from the compounds listed in Tables 1-6, or a pharmaceutically acceptable salt, ester, solvate, stereoisomer, tautomer, or prodrug thereof, wherein the first compound and the second compound is different. In some embodiments, the first compound and the second compound are each independently selected from the group consisting of Tocladesine, PRX-07034, AZD-5991, Berzosertib, Pipendoxifene, Bazedoxifene, R-428, Galantamine, and Semagacestat. In some embodiments, the first compound is selected from the compounds listed in Tables 1-6, and the second compound is selected from the group consisting of Tocladesine, PRX-07034, AZD-5991, Berzosertib, Pipendoxifene, Bazedoxifene, R-428, Galantamine, and Semagacestat.

In some embodiments, the first compound is selected from the compounds listed in Table 1, and the second compound is selected from the compounds listed in Table 2. In some embodiments, the first compound is selected from the compounds listed in Table 1, and the second compound is selected from the compounds listed in Table 3. In some embodiments, the first compound is selected from the compounds listed in Table 1, and the second compound is selected from the compounds listed in Table 4. In some embodiments, the first compound is selected from the compounds listed in Table 1, and the second compound is selected from the compounds listed in Table 5. In some embodiments, the first compound is selected from the compounds listed in Table 1, and the second compound is selected from the compounds listed in Table 6.

In some embodiments, the first compound is selected from the compounds listed in Table 2, and the second compound is selected from the compounds listed in Table 3. In some embodiments, the first compound is selected from the compounds listed in Table 2, and the second compound is selected from the compounds listed in Table 4. In some embodiments, the first compound is selected from the compounds listed in Table 2, and the second compound is selected from the compounds listed in Table 5. In some embodiments, the first compound is selected from the compounds listed in Table 2, and the second compound is selected from the compounds listed in Table 6.

In some embodiments, the first compound is selected from the compounds listed in Table 3, and the second compound is selected from the compounds listed in Table 4. In some embodiments, the first compound is selected from the compounds listed in Table 3, and the second compound is selected from the compounds listed in Table 5. In some embodiments, the first compound is selected from the compounds listed in Table 3, and the second compound is selected from the compounds listed in Table 6.

In some embodiments, the first compound is selected from the compounds listed in Table 4, and the second compound is selected from the compounds listed in Table 5. In some embodiments, the first compound is selected from the compounds listed in Table 4, and the second compound is selected from the compounds listed in Table 6.

In some embodiments, the first compound is selected from the compounds listed in Table 5, and the second compound is selected from the compounds listed in Table 6. The kit can comprise a second compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, wherein the first compound and the second compound is different.

The kit can comprise a third compound selected from the compounds listed in Tables 1-6, or a pharmaceutically acceptable salt, solvate, stereoisomer, tautomer, or prodrug thereof, wherein the first, second and third compound are different.

In some embodiments, the first compound is selected from the compounds listed in Table 1, the second compound is selected from the compounds listed in Table 2, and the third compound is selected from the compounds listed in Table 3. In some embodiments, the first compound is selected from the compounds listed in Table 1, the second compound is selected from the compounds listed in Table 2, and the third compound is selected from the compounds listed in Table 4. In some embodiments, the first compound is selected from the compounds listed in Table 1, the second compound is selected from the compounds listed in Table 2, and the third compound is selected from the compounds listed in Table 5. In some embodiments, the first compound is selected from the compounds listed in Table 1, the second compound is selected from the compounds listed in Table 2, and the third compound is selected from the compounds listed in Table 6. In some embodiments, the first compound is selected from the compounds listed in Table 1, the second compound is selected from the compounds listed in Table 3, and the third compound is selected from the compounds listed in Table 4. In some embodiments, the first compound is selected from the compounds listed in Table 1, the second compound is selected from the compounds listed in Table 3, and the third compound is selected from the compounds listed in Table 5. In some embodiments, the first compound is selected from the compounds listed in Table 1, the second compound is selected from the compounds listed in Table 3, and the third compound is selected from the compounds listed in Table 6. In some embodiments, the first compound is selected from the compounds listed in Table 1, the second compound is selected from the compounds listed in Table 4, and the third compound is selected from the compounds listed in Table 5. In some embodiments, the first compound is selected from the compounds listed in Table 1, the second compound is selected from the compounds listed in Table 4, and the third compound is selected from the compounds listed in Table 6. In some embodiments, the first compound is selected from the compounds listed in Table 1, the second compound is selected from the compounds listed in Table 5, and the third compound is selected from the compounds listed in Table 6.

In some embodiments, the first compound is selected from the compounds listed in Table 2, the second compound is selected from the compounds listed in Table 3, and the third compound is selected from the compounds listed in Table 4. In some embodiments, the first compound is selected from the compounds listed in Table 2, the second compound is selected from the compounds listed in Table 3, and the third compound is selected from the compounds listed in Table 5. In some embodiments, the first compound is selected from the compounds listed in Table 2, the second compound is selected from the compounds listed in Table 3, and the third compound is selected from the compounds listed in Table 6. In some embodiments, the first compound is selected from the compounds listed in Table 2, the second compound is selected from the compounds listed in Table 4, and the third compound is selected from the compounds listed in Table 5. In some embodiments, the first compound is selected from the compounds listed in Table 2, the second compound is selected from the compounds listed in Table 4, and the third compound is selected from the compounds listed in Table 6. In some embodiments, the first compound is selected from the compounds listed in Table 2, the second compound is selected from the compounds listed in Table 5, and the third compound is selected from the compounds listed in Table 6.

In some embodiments, the first compound is selected from the compounds listed in Table 3, the second compound is selected from the compounds listed in Table 4, and the third compound is selected from the compounds listed in Table 5. In some embodiments, the first compound is selected from the compounds listed in Table 3, the second compound is selected from the compounds listed in Table 4, and the third compound is selected from the compounds listed in Table 6. In some embodiments, the first compound is selected from the compounds listed in Table 3, the second compound is selected from the compounds listed in Table 5, and the third compound is selected from the compounds listed in Table 6. In some embodiments, the first compound is selected from the compounds listed in Table 4, the second compound is selected from the compounds listed in Table 5, and the third compound is selected from the compounds listed in Table 6.

In some embodiments, the first compound is Tocladesine, Pipendoxifene, or Bazedoxifene, the second compound is PRX-07034, AZD-5991, Berzosertib, or R-428, and the third compound is selected from the compounds listed in Table 1. In some embodiments, the first compound comprises one or more Tocladesine, Pipendoxifene, or Bazedoxifene, the second compound is PRX-07034, AZD-5991, Berzosertib, or R-428, and the third compound is selected from the compounds listed in Table 2. In some embodiments, the first compound is Tocladesine, Pipendoxifene, or Bazedoxifene, the second compound is PRX-07034, AZD-5991, Berzosertib, or R-428, and the third compound is selected from the compounds listed in Table 3. In some embodiments, the first compound is Tocladesine, Pipendoxifene, or Bazedoxifene, the second compound is PRX-07034, AZD-5991, Berzosertib, or R-428, and the third compound is selected from the compounds listed in Table 4. In some embodiments, the first compound is Tocladesine, Pipendoxifene, or Bazedoxifene, the second compound is PRX-07034, AZD-5991, Berzosertib, or R-428, and the third compound is selected from the compounds listed in Table 5. In some embodiments, the first compound is Tocladesine, Pipendoxifene, or Bazedoxifene, the second compound is PRX-07034, AZD-5991, Berzosertib, or R-428, and the third compound is selected from the compounds listed in Table 6.

In some embodiments, the RNA virus is a coronavirus. In some embodiments, the coronavirus is Middle East respiratory coronavirus (MERS-CoV), severe acute respiratory syndrome coronavirus (SARS-CoV), or SARS-CoV-2.

Disclosed herein include compositions comprising a compound selected from the compounds listed in Tables 1-6 or a pharmaceutically acceptable salt, ester, solvate, stereoisomer, tautomer, or prodrug thereof, for use in preventing, delaying the onset of, or treating an infection or a disease caused by a RNA virus. In some embodiments, the compound is Tocladesine, PRX-07034, AZD-5991, Berzosertib, Pipendoxifene, Bazedoxifene, R-428, Galantamine, or Semagacestat.

Disclosed herein include compositions comprising a compound selected from the compounds listed in Tables 1-6, or a pharmaceutically acceptable salt, ester, solvate, stereoisomer, tautomer, or prodrug thereof, for use in preventing, delaying the onset of, or treating an inflammatory effect of an infection or a disease caused by a RNA virus. In some embodiments, the compound is Tocladesine, PRX-07034, AZD-5991, Berzosertib, Pipendoxifene, Bazedoxifene, R-428, Galantamine, or Semagacestat.

Disclosed herein include compositions comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, for use in preventing, delaying the onset of, or treating an infection or a disease caused by a RNA virus.

Disclosed herein include compositions comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, for use in preventing, delaying the onset of, or treating an inflammatory effect of an infection or a disease caused by a RNA virus.

In some embodiments, the inflammatory effect comprises respiratory failure, a sequela of respiratory failure, acute lung injury, or acute respiratory distress syndrome. In some embodiments, the sequela of respiratory failure comprises multi-organ failure. In some embodiments, the composition comprises a therapeutically or prophylactically effective amount of the compound.

In some embodiments, the RNA virus is a double-stranded RNA virus. In some embodiments, the RNA virus is a positive-sense single-stranded RNA virus. In some embodiments, the positive-sense single-stranded RNA virus is a coronavirus. In some embodiments, the coronavirus is an alpha coronavirus, a beta coronavirus, a gamma coronavirus, or a delta coronavirus. In some embodiments, the coronavirus is Middle East respiratory coronavirus (MERS-CoV), severe acute respiratory syndrome coronavirus (SARS-CoV), or SARS-CoV-2.

In some embodiments, the composition is a pharmaceutical composition comprising the compound and one or more pharmaceutically acceptable excipients. In some embodiments, the composition comprises one or more additional therapeutic agents. In some embodiments, the one or more additional therapeutic agents comprise one or more antiviral agents. In some embodiments, the one or more antiviral agents is selected from the group consisting of a nucleoside or a non-nucleoside analogue reverse-transcriptase inhibitor, a nucleotide analogue reverse-transcriptase inhibitor, a NS3/4A serine protease inhibitor, a NS5B polymerase inhibitor, and interferon alpha. In some embodiments, the composition is in the form of powder, pill, tablet, microtablet, pellet, micropellet, capsule, capsule containing microtablets, liquid, aerosols, or nanoparticles. In some embodiments, the composition is in a formulation for administration to the lungs.

BRIEF DESCRIPTION OF THE DRAWINGS

FIG. 1A depicts non-limiting exemplary data related to Tocladesine; $EC_{50}=>9.59$ µM; $CC_{50}=>39.80$ µM (uninfected HeLa-ACE2); SI: >4.15 * FIG. 1B depicts non-limiting exemplary data related to Remdesivir (control). $EC_{50}=0.130$ µM (CoV-2 cells); $CC_{50}=8.87$ µM (uninfected HeLa-ACE2); SI: 68.23. SI*: The reported selectivity value may not represent of the true selectivity index of tocladesine. $SI=CC_{50}/EC_{50}$, The top and the bottom of the equation is currently unknown.

FIG. 2A depicts non-limiting exemplary data related to PRX-07034; $EC_{50}=5.29$ µM (CoV-2 cells); $CC_{50}=22.13$ µM (uninfected HeLa-ACE2); SI: 4.18. FIG. 2B depicts non-limiting exemplary data related to Remdesivir (control). $EC_{50}=0.130$ µM (CoV-2 cells); $CC_{50}=8.87$ µM (uninfected HeLa-ACE2); SI: 68.23.

FIG. 3A depicts non-limiting exemplary data related to AZD-5991. $EC_{50}=8.81$ µM; $CC_{50}=0.527$ µM; SI: 0.06. FIG. 3B depicts non-limiting exemplary data related to Remdesivir (control). $EC_{50}=0.130$ µM (CoV-2 cells); $CC_{50}=8.87$ µM (uninfected HeLa-ACE2); SI: 68.23.

FIG. 4A depicts non-limiting exemplary data related to VE-822/Berzosertib. $EC_{50}=0.114$ µM; $CC_{50}=3.14$ µM; SI: 27.56. FIG. 4B depicts non-limiting exemplary data related to Remdesivir (control). $EC_{50}=0.130$ µM (CoV-2 cells). $CC_{50}=8.87$ µM (uninfected HeLa-ACE2). SI: 68.23.

FIG. 5A depicts non-limiting exemplary data related to Pipendoxifene. $EC_{50}=8.24$ µM (CoV-2 cells); $CC_{50}=>39.80$ µM (in uninfected cells); SI: >4.83*. FIG. 5B depicts non-limiting exemplary data related to Remdesivir (control). $EC_{50}=0.130$ µM (CoV-2 cells); $CC_{50}=8.87$ µM (in uninfected cells); SI: 68.23. SI*: The reported selectivity value above is not representative of the true selectivity index of pipendoxifene. $SI=CC_{50}/EC_{50}$, The top of the equation is "infinite" based on the study reported data.

FIG. 8A-FIG. 8E depict non-limiting exemplary structures of predicted 3CLpro inhibitor compounds Apixaban (FIG. 8A), Dabrafenib (FIG. 8B), Galantamine (FIG. 8C), Naloxone (hydrochloride) (FIG. 8D), and Noscapine (hydrochloride) (FIG. 8E).

FIG. 12A-FIG. 12J depict non-limiting exemplary structures of predicted RdRp inhibitor compounds Adefovir dipivoxil (FIG. 12A), Bazedoxifene (acetate) (FIG. 12B), Capecitabine (FIG. 12C), Indiplon (FIG. 12D), INNO-8875 (Trabodenoson) (FIG. 12E), LOXO-101 (FIG. 12F), NUC-1031 (FIG. 12G), Piclidenoson (FIG. 12H), Regadenoson (FIG. 12I), and Triciribine (FIG. 12J).

DETAILED DESCRIPTION

Figure 1A:
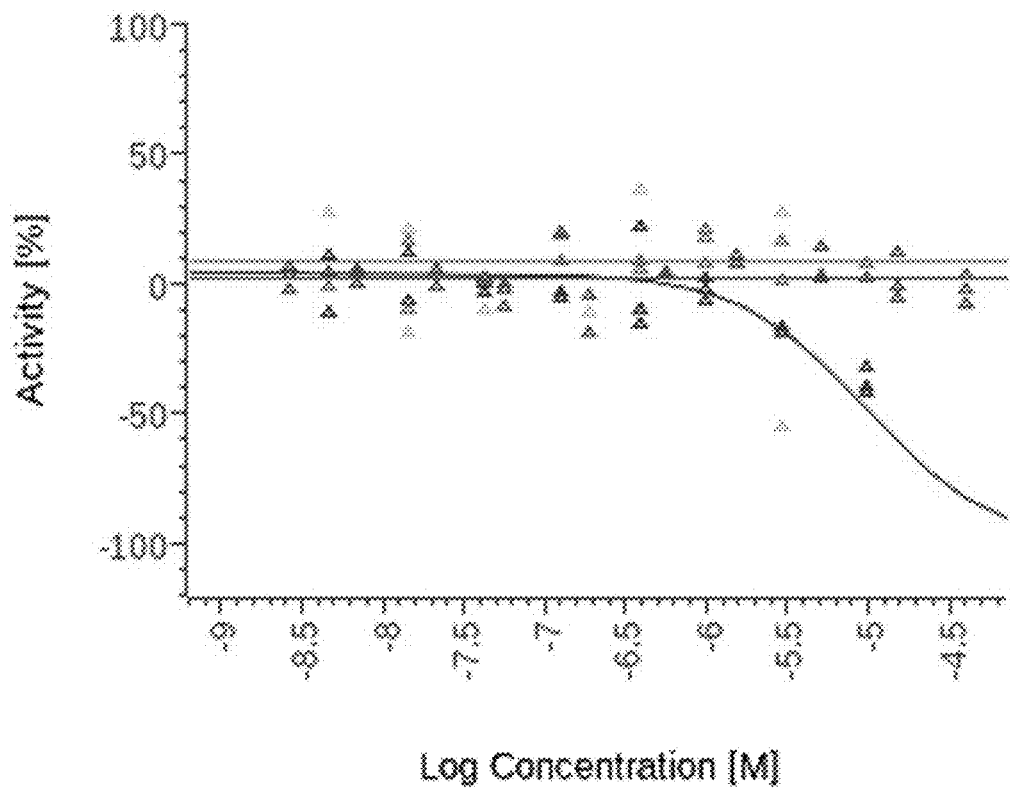
FIG. 1A-FIG. 1B depict non-limiting exemplary data related to Tocladesine and Remdesivir (control).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and sequences from GenBank, and other databases referred to herein are incorporated by reference in their entirety with respect to the related technology.

The methods, compounds, pharmaceutical compositions and articles of manufacture provided herein are characterized by a variety of component ingredients, steps of preparation, and steps of execution and associated biophysical, physical, biochemical or chemical parameters. As would be apparent to those of skill in the art, the methods provided herein can include any and all permutations and combinations of the compounds, compositions, articles of manufacture and associated ingredients, steps and/or parameters as described below Disclosed herein include methods for preventing, delaying the onset of, or treating an infection or a disease caused by a RNA virus. In some embodiments, the method comprises administering to a subject in need thereof a composition comprising a compound selected from the compounds listed in Tables 1-6, or a pharmaceutically acceptable salt, ester, solvate, stereoisomer, tautomer, or prodrug thereof, thereby preventing, delaying the onset of, or treating the infection or the disease.

Disclosed herein include methods for preventing, delaying the onset of, or treating an inflammatory effect of an infection or a disease caused by a RNA virus. In some embodiments, the method comprises administering to a subject in need thereof a composition comprising a compound selected from the compounds listed in Tables 1-6, or a pharmaceutically acceptable salt, ester, solvate, stereoisomer, tautomer, or prodrug thereof, thereby preventing, delaying the onset of, or treating the inflammatory effect.

Disclosed herein include methods for preventing, delaying the onset of, or treating an infection or a disease caused by a RNA virus. In some embodiments, the method comprises administering to a subject in need thereof a composition comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, thereby preventing, delaying the onset of, or treating the infection or the disease.

Disclosed herein include methods for preventing, delaying the onset of, or treating an inflammatory effect of an infection or a disease caused by a RNA virus. In some embodiments, the method comprises: administering to a subject in need thereof a composition comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, thereby preventing, delaying the onset of, or treating the inflammatory effect.

Disclosed herein include methods for preventing, delaying the onset of, or treating an infection or a disease caused by a RNA virus. In some embodiments, the method comprises administering to a subject in need thereof a first compound selected from the compounds listed in Tables 1-6, or a pharmaceutically acceptable salt, ester, solvate, stereoisomer, tautomer, or prodrug thereof, and a second compound selected from the compounds listed in Tables 1-6, or a pharmaceutically acceptable salt, ester, solvate, stereoisomer, tautomer, or prodrug thereof, thereby preventing, delaying the onset of, or treating the inflammatory effect, wherein the first compound and the second compound are different.

Disclosed herein include methods for preventing, delaying the onset of, or treating an inflammatory effect of an infection or a disease caused by a RNA virus. In some embodiments, the method comprises administering to a subject in need thereof a first compound selected from the compounds listed in Tables 1-6, or a pharmaceutically acceptable salt, ester, solvate, stereoisomer, tautomer, or prodrug thereof, and a second compound selected from the compounds listed in Tables 1-6, or a pharmaceutically acceptable salt, ester, solvate, stereoisomer, tautomer, or prodrug thereof, thereby preventing, delaying the onset of, or treating the inflammatory effect, wherein the first compound and the second compound are different.

Disclosed herein include methods for preventing, delaying the onset of, or treating an infection or a disease caused by a RNA virus. In some embodiments, the method comprises administering to a subject in need thereof a first compound selected from the group comprising Tocladesine, PRX-07034, AZD-5991, Berzosertib, Pipendoxifene, Bazedoxifene, R-428, or a pharmaceutically salt, ester, solvate, stereoisomer tautomer or prodrug thereof, and a second compound selected from the group comprising Tocladesine, PRX-07034, AZD-5991, Berzosertib, Pipendoxifene, Bazedoxifene, R-428, or a pharmaceutically salt, ester, solvate, stereoisomer, tautomer, or prodrug thereof, thereby preventing, delaying the onset of, or treating the inflammatory effect, wherein the first compound and the second compound are different.

Disclosed herein include methods for preventing, delaying the onset of, or treating an inflammatory effect of an infection or a disease caused by a RNA virus. In some embodiments, the method comprises administering to a subject in need thereof a first compound selected from the group comprising Tocladesine, PRX-07034, AZD-5991, Berzosertib, Pipendoxifene, Bazedoxifene, R-428, or a pharmaceutically salt, ester, solvate, stereoisomer, tautomer or prodrug thereof, and a second compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, thereby preventing, delaying the onset of, or treating the inflammatory effect, wherein the first compound and the second compound are different.

Disclosed herein include kits comprising a first compound selected from the compounds listed in Tables 1-6, or a pharmaceutically acceptable salt, ester, solvate, stereoisomer, tautomer, or prodrug thereof, and a label indicating that the kit is for preventing, delaying the onset of, or treating an infection or a disease caused by a RNA virus.

Disclosed herein include kits comprising a first compound selected from the compounds listed in Tables 1-6, or a pharmaceutically acceptable salt, ester, solvate, stereoisomer, tautomer, or prodrug thereof, and a label indicating that the kit is for preventing, delaying the onset of, or treating an inflammatory effect of an infection or a disease caused by a RNA virus.

Disclosed herein include kits comprising a first compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof; and a label indicating that the kit is for preventing, delaying the onset of, or treating an infection or a disease caused by a RNA virus.

Disclosed herein include kits comprising a first compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof; and a label indicating that the kit is for preventing, delaying the onset of, or treating an inflammatory effect of an infection or a disease caused by a RNA virus.

Disclosed herein include compositions comprising a compound selected from the compounds listed in Tables 1-6, or a pharmaceutically acceptable salt, ester, solvate, stereoisomer, tautomer, or prodrug thereof, for use in preventing, delaying the onset of, or treating an infection or a disease caused by a RNA virus.

Disclosed herein include compositions comprising a compound selected from the compounds listed in Tables 1-6, or a pharmaceutically acceptable salt, ester, solvate, stereoisomer, tautomer, or prodrug thereof, for use in preventing, delaying the onset of, or treating an inflammatory effect of an infection or a disease caused by a RNA virus.

Disclosed herein include compositions comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, for use in preventing, delaying the onset of, or treating an infection or a disease caused by a RNA virus.

Disclosed herein include compositions comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, for use in preventing, delaying the onset of, or treating an inflammatory effect of an infection or a disease caused by a RNA virus.

Definitions

Unless defined otherwise, technical and scientific terms used herein have the same meaning as commonly understood by one of ordinary skill in the art to which the present disclosure belongs. See, e.g. Singleton et al., Dictionary of Microbiology and Molecular Biology 2nd ed., J. Wiley & Sons (New York, NY 1994); Sambrook et al., Molecular Cloning, A Laboratory Manual, Cold Spring Harbor Press (Cold Spring Harbor, NY 1989). For purposes of the present disclosure, the following terms are defined below.

As used herein, a "subject" refers to an animal that is the object of treatment, observation or experiment. "Animals" include cold- and warm-blooded vertebrates and invertebrates such as fish, shellfish, reptiles and, in particular, mammals. "Mammal" includes, without limitation, mice; rats; rabbits; guinea pigs; dogs; cats; sheep; goats; cows; horses; primates, such as monkeys, chimpanzees, and apes, and, in particular, humans.

As used herein, a "patient" refers to a subject that is being treated by a medical professional, such as a Medical Doctor (i.e. Doctor of Allopathic medicine or Doctor of Osteopathic medicine) or a Doctor of Veterinary Medicine, to attempt to cure, or at least ameliorate the effects of, a particular disease or disorder or to prevent the disease or disorder from occurring in the first place.

As used herein, "administration" or "administering" refers to a method of giving a dosage of a pharmaceutically active ingredient to a vertebrate.

As used herein, a "dosage" refers to the combined amount of the active ingredients (e.g., berzosertib and/or pipendoxifene).

As used herein, "therapeutically effective amount" or "pharmaceutically effective amount" is meant an amount of therapeutic agent, which has a therapeutic effect. The dosages of a pharmaceutically active ingredient which are useful in treatment are therapeutically effective amounts. Thus, as used herein, a therapeutically effective amount means an amount of therapeutic agent which produces the desired therapeutic effect as judged by clinical trial results and/or model animal studies.

As used herein, a "therapeutic effect" relieves, to some extent, one or more of the symptoms of a disease or disorder. For example, a therapeutic effect may be observed by a reduction of the subjective discomfort that is communicated by a subject (e.g., reduced discomfort noted in self-administered patient questionnaire). "Treat," "treatment," or "treating," as used herein refers to administering a therapeutic agent or pharmaceutical composition to a subject for prophylactic and/or therapeutic purposes. The term "prophylactic treatment" refers to treating a subject who does not yet exhibit symptoms of a disease or condition, but who is susceptible to, or otherwise at risk of, a particular disease or condition, whereby the treatment reduces the likelihood that the patient will develop the disease or condition. The term "therapeutic treatment" refers to administering treatment to a subject already suffering from a disease or condition.

As used herein, $EC_{50}$ is the value of a graded dose response curve that represents the concentration of a compound where 50% of its maximal effect is observed.

As used herein, $CC_{50}$ is the 50% cytotoxic concentration defined as the compound's concentration (μg/mL) required for the reduction of cell viability by 50%.

As used herein, SI=$CC_{50}/EC_{50}$. The selectivity index (SI) is a ratio that measures the window between cytotoxicity and antiviral activity by dividing the $CC_{50}$ value into the $EC_{50}$ value. The higher the SI ratio, the theoretically more effective and safe a drug would be during in vivo treatment for a given viral infection.

"Individual" as used herein refers to a; person, human adult or child, mammal, or non-human primate.

"IC50" as used herein refers to the molar concentration of a compound, for example a compound from Tables 1-6 or an analogue thereof, which binds 50% of receptor related to RNA viral infection in vitro.

"Ki" as used herein refers to the kinetic inhibition constant in molar concentration units which denotes the affinity of the compound from Tables 1-6 or an analogue thereof for the receptor related to RNA viral infection as measured by a binding assay or as calculated from the IC50 value using the Cheng-Prusoff equation.

"Patient" as used herein refers to a mammal, e.g., a human, mouse, rat, guinea pig, dog, cat, horse, cow, pig, or non-human primate, such as a monkey, chimpanzee, baboon or rhesus.

"Pharmaceutically acceptable" as used herein means approved by a regulatory agency of the Federal or a state government or listed in the U.S. Pharmacopeia or other generally recognized pharmacopeia for use in animals, and more particularly in humans.

"Pharmaceutically acceptable salt" refers to a salt of a compound that is pharmaceutically acceptable and that possesses the desired pharmacological activity of the parent compound. Such salts include but are not limited to: (1) acid addition salts, formed with inorganic acids such as hydrochloric acid, hydrobromic acid, sulfuric acid, nitric acid, phosphoric acid, and the like; or formed with organic acids such as acetic acid, propionic acid, hexanoic acid, cyclopentanepropionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl) benzoic acid, cinnamic acid, mandelic acid, methanesulfonic acid, ethanesulfonic acid, 1,2-ethane-disulfonic acid, 2-hydroxyethanesulfonic acid, benzenesulfonic acid, 4-chlorobenzenesulfonic acid, 2-naphthalenesulfonic acid, 4-toluenesulfonic acid, camphorsulfonic acid, 4-methylbicyclo[2.2.2]-oct-2-ene-1-carboxylic acid, glucoheptonic acid, 3-phenylpropionic acid, trimethylacetic acid, tertiary butylacetic acid, lauryl sulfuric acid, gluconic acid, glutamic acid, hydroxynaphthoic acid, salicylic acid, stearic acid, muconic acid, and the like; or (2) salts formed when an acidic proton present in the parent compound either is replaced by a metal ion, e.g., an alkali metal ion, an alkaline earth ion, or an aluminum ion; or coordinates with an organic base such as ethanolamine, diethanolamine, triethanolamine, N-methylglucamine and the like.

"Pharmaceutically acceptable vehicle" refers to a diluent, adjuvant, excipient or carrier with which a compound disclosed herein is administered.

"Preventing" or "prevention" refers to a reduction in risk of acquiring a disease or disorder (i.e., causing at least one of the clinical symptoms of the disease not to develop in a patient that may be exposed to or predisposed to the disease but does not yet experience or display symptoms of the disease).

"Prodrug" refers to a derivative of a drug molecule that requires a transformation within the body to release the active drug. Prodrugs are frequently (though not necessarily) pharmacologically inactive until converted to the parent drug. Typically, prodrugs are designed to overcome pharmaceutical and/or pharmacokinetically based problems associated with the parent drug molecule that would otherwise limit the clinical usefulness of the drug.

"Promoiety" refers to a form of protecting group that when used to mask a functional group within a drug molecule converts the drug into a prodrug. Typically, the promoiety will be attached to the drug via bond(s) that are cleaved by enzymatic or non-enzymatic means in vivo. Ideally, the promoiety is rapidly cleared from the body upon cleavage from the prodrug.

"Protecting group" refers to a grouping of atoms that when attached to a reactive group in a molecule masks, reduces or prevents that reactivity. Examples of protecting groups can be found in Green et al., "Protective Groups in Organic Chemistry", (Wiley, 2.sup.nd ed. 1991) and Harrison et al., "Compendium of Synthetic Organic Methods", Vols. 18 (John Wiley and Sons, 1971 1996). Representative amino protecting groups include, but are not limited to, formyl, acetyl, trifluoroacetyl, benzyl, benzyloxycarbonyl ("CBZ"), tert-butoxycarbonyl ("Boc"), trimethylsilyl ("TMS"), 2-trimethylsilyl-ethanesulfonyl ("SES"), trityl and substituted trityl groups, allyloxycarbonyl, 9-fluorenyl-methyloxycarbonyl ("FMOC"), nitro-veratryloxycarbonyl ("NVOC") and the like. Representative hydroxy protecting groups include, but are not limited to, those where the hydroxy group is either acylated or alkylated such as benzyl, and trityl ethers as well as alkyl ethers, tetrahydropyranyl ethers, trialkylsilyl ethers and allyl ethers.

"Treating" or "treatment" of any disease or disorder as used herein, refers, in one embodiment, to ameliorating the disease or disorder (i.e., arresting or reducing the development of the disease or at least one of the clinical symptoms thereof). In another embodiment "treating" or "treatment" refers to ameliorating at least one physical parameter, which may not be discernible by the patient. In yet another embodiment, "treating" or "treatment" refers to inhibiting the disease or disorder, either physically, (e.g., stabilization of a discernible symptom), physiologically, (e.g., stabilization of a physical parameter), or both. In yet another embodiment, "treating" or "treatment" refers to delaying the onset of the disease or disorder.

"Therapeutically effective amount" as used herein, means the amount of a compound that, when administered to an individual for treating a disease, is sufficient to effect such treatment for the disease or to achieve the desired clinical response. The "therapeutically effective amount" will vary depending on the compound, the disease and its severity and the age, weight, etc., of the patient to be treated.

As used herein, a "subject" refers to an animal that is the object of treatment, observation or experiment. "Animal" includes cold- and warm-blooded vertebrates and invertebrates such as fish, shellfish, reptiles and, in particular, mammals. "Mammal" includes, without limitation, mice; rats; rabbits; guinea pigs; dogs; cats; sheep; goats; cows; horses; primates, such as monkeys, chimpanzees, and apes, and, in particular, humans.

As used herein, a "dosage" refers to an amount of therapeutic agent administered to a patient.

As used herein, a "daily dosage" refers to the total amount of therapeutic agent administered to a patient in a day.

As used herein, the term "therapeutic agent" means a substance that is effective in the treatment of a disease or condition.

As described herein with computationally generated data, pharmaceutical compositions from Tables 1-6 (e.g. Tocladesine, PRX-07034, AZD-5991, Berzosertib, Pipendoxifene, Bazedoxifene, R-428) were unexpectedly found to be able to bind to receptors related to RNA viral infection. As described herein, this prediction is expected to have favorable biological activity at the same clinically validated protein receptor that is targeted by drugs used for completely different indications, including RNA viral infections.

Computational Predictions

There is an urgent need for medicines that can be identified quickly as treatments for patients in health crises. A large number of patients with rare, neglected, and challenging diseases have little or no therapeutic options available because the cost:benefit ratio to pharmaceutical companies do not incentivize them to tackle these diseases. An approach to addressing this problem is to use computational technology that is able to predict novel mechanism of action of existing drugs, thereby creating an opportunity to pursue rapid therapeutic development at a much lower cost than traditional paths. The use of software and advanced computing in pharmaceutical research has shown to be an effective approach to discovering new drugs. Many of these computational methods have been adopted from other fields, including mathematics and physics. One of the most fascinating examples of this interdisciplinary approach is the successful application of data science and artificial intelligence to biomedical research. Of particular interest is the use of machine learning and its more sophisticated variant, artificial neural network (ANN) deep learning. ANNs resemble the neural connections of the human brain and work by solving problems—running queries through different hierarchies of concepts and related questions to find answers. These algorithms are trained on existing data in order to make predictions. For example, large experimental datasets of small molecules and their known protein binding targets are curated and processed; an expansive set of chemical descriptors, structural moieties, and biophysical features are then extracted from the small molecules and captured in machine-readable formats. This robust representation of each small molecule structure can then serve as the training set for a probabilistic neural network model, which has no bias towards known pharmacophores a priori. The deep learning approach is capable of discovering attributes relevant to binding potency, intrinsic to the chemical composition of a query molecule, that are not readily discernable using empirical methods. The algorithm priority-ranks the predictions using a probability score to identify the compounds disclosed in the application. Thus chemical information can be used in neural networks to predict protein binding interactions for any drug compound, and therefore new therapeutic uses for existing drugs, which alleviates much of the time, cost, and burden of advancing a therapeutic treatment to patients suffering from rare or challenging illnesses, including emerging pathogenic epidemics.

Experimental Validation

Once predictions are generated, laboratory experiments are used as evaluation criteria to ensure efficacy of compounds as effective therapies for illnesses. A non-exhaustive list of examples of these laboratory experiments may include biochemical (binding, competition, kinetics, agonism, antagonism, activity, potency), cellular (activity, solubility, motility, translocation, calcium flux), tissue (contractility, translocation, phenotypic) and genetic (gene expression, translational modifications).

Bioassays

The receptors related to RNA viral infection are available from various distributors. For example, Furin can be purchased from the following vendors: https://www.enzolifesciences.com/BML-SE536/furin-human-recombinant/, https://www.peprotech.com/en/recombinant-human-furin, https://www.rndsystems.com/products/recombinant-human-furin-protein-cf_1503.

Bioassays of RNA viruses binding to mammalian cells are known in the art. Commercial kits can be purchased and used to measure binding, activity, competition at the active site, consumption of substrate, or production of product over time. The concentration of substrates/products as well as the activity of enzymes can be assayed. For example, Furin Activity Assays are available from the following distributors: https://secure.eurogentec.com/product/research-furin-activity-assay-kit.html, https://www.anaspec.com/products/product.asp?id=59036&productid=35055.

The efficacy of the pharmaceutical compositions disclosed herein may also be tested in a live viral Plaque Assay. An example of such an assay is described briefly: The protocol can use a Vero E6 cell line, which is highly susceptible to SARS-CoV-2 infection, and useful for drugs modulating SARS-CoV-2. Vero-E6 cells is grown in Dulbecco's Modified Eagle's Medium (DMEM, Thermo Fisher). SARS-CoV-2 Virus is isolated and titered using a plaque assay as previously described with fixation of cells 72 hours post infection. Clinical-grade soluble recombinant human ACE2 is produced by Polymun Scientific from CHO cells according to Good Manufacturing Practice guidelines and formulated as a physiologic aqueous solution. Vero E6 cells are seeded in 48-well containing ACE2 and mixed with different concentration of virus (1:1). Samples are then analyzed for the presence of viral RNA by qRT-PCR. To determine cytotoxicity Vero E6 cells are seeded in a 96-well plate, and CellTiter-Glo® Luminescent cell viability assay (Promega) is conducted following the manufacturer's protocol.

The efficacy of the pharmaceutical compositions disclosed herein can also be tested in a Cytopathic Endpoint Assay (CPE) that scores for virus-induced cytopathic effects on cultured cells. An example of such an assay is described briefly: The protocol uses dilutions of drugs incubated with Vero E6 cells, giving a final cell count of 20,000 cells per well in a 96-well plate. Ten microlites of virus at a concentration of 10,000 PFU/well can then be added to each of the test wells. The plates are incubated at 37° C. in 5% $CO_2$ for 3 days and observed daily for CPE. The endpoint is drug dilution that inhibited 100% of the CPE in quadruplicate wells. To determine cytotoxicity the plates are examined after viral challenge for toxicity effects by using an inverted microscope.

The efficacy of the pharmaceutical compositions disclosed herein may also be tested in a multi-channel 3-D microfluidic cell culture chip that simulates the activities, mechanics and physiological response of entire organs and organ systems, or a type of artificial organ. The microfluidic cell culture may be called "organ-on-chip", "microtissue", "micro organ". The microfluidic cell culture chip may be composed of polymers that contain hollow microfluidic channels lined by living human cells. Mechanical forces may be applied to mimic the physical microenvironment of living organs, including breathing motions in lung, active 2D and 3D neural circuits of a brain, spontaneously beating heart cells, and peristalsis-like deformations in the intestine. These chips may also include other physiological models for the heart, brain, lungs, gut, or other organ. The cells may include primary cells, transformed cells, or induced pluripotent stem cells, and may be constructed on plates designed for screening of drug efficacy and toxicity.

Clinical Observations of Receptors Related to RNA Viral Infection

The following studies on ClinicalTrials.gov, and references cited therein, are representative examples of indications related to RNA viral infections and where binding the receptors related to the RNA viral infection can be beneficial:

https://clinicaltrials.gov/ct2/show/NCT04381052
https://clinicaltrials.gov/ct2/show/NCT01061840
https://clinicaltrials.gov/ct2/show/NCT04324996
https://clinicaltrials.gov/ct2/show/NCT00192803
https://clinicaltrials.gov/ct2/show/NCT04382950
https://clinicaltrials.gov/ct2/show/NCT04396067
https://clinicaltrials.gov/ct2/show/NCT04394117
https://clinicaltrials.gov/ct2/show/NCT02288936
https://clinicaltrials.gov/ct2/show/NCT04352400
https://clinicaltrials.gov/ct2/show/NCT01020448

Pharmaceutical Compositions and Analogues Thereof, and Methods and Compositions for Treatment The compound from Tables 1-6 and analogues thereof, a pharmaceutically acceptable salt of the compound from Tables 1-6 and analogues thereof, and/or a prodrug of the compound from Tables 1-6 and analogues thereof can be used in the methods and compositions disclosed herein for the treatment of disorders related to the modulation of receptors related to viral infection, for example coronavirus (including the abnormal behavioral symptoms related to the RNA viral infection).

TABLE 1

PREDICTED ACE2 INHIBITORS

| Drug name | SMILES | CAS | DrugBankID | FORMULA |
|---|---|---|---|---|
| orlistat | ccccCCCCCCC[C@@H](C[C@@H]1OC(=O)[C@H]1CCCCCC)OC(=O)[C@H](CC(C)C)NC=O | 96829-58-2, 96829-58-2 111397-16-1 | DB01083 | C29H53NO5 |
| clindamycin palmitate | CCCCCCCCCCCCCCCC(=O)O[C@@H]1[C@@H](O)[C@@H](O)[C@@H]([C@H](NC(=O)[C@@H]2C[C@@H](CCC)CN2C)[C@H](C)Cl)O[C@@H]1SC | 36688-78-5, 25507-04-4 34850-73-2 35208-55-0 | DB01190 | C18H33ClN2O5S |
| icosabutate | CC/C=C\C/C=C\C/C=C\C/C=C\C/C=C\CCCCOC(CC)C(=O)O | | DB12990 | C24H38O3 |
| limaprost | CC/C=C\C/C=C\C/C=C\C/C=C\C/C=C\CCCCOC(CC)C(=O)O | 74397-12-9, 10016-20-3 135514-70-4 23513-50-0 41871-62-9 47910-04-3 114868-77-8 88852-12-4 108866-14-4 120825-95-8 55648-20-9 106200-28-6 | DB09211 | C22H36O5 |
| gemeprost | CCCCC(C)(C)[C@H](O)/C=C/[C@H]1[[C@H](O)CC(=O)[C@@H]1CCCC/C=C/C(=O)OC | 64318-79-2, 64318-79-2 68372-89-4 65135-28-6 | DB08964 | C23H38O5 |
| gpi-1485 | CCC(C)(C)C(=O)C(=O)N1CCC[C@H]1C(=O)OCCCc1cccnc1 | | DB05814 | C12H19NO4 |
| biricodar | COc1cc(C(=O)C(=O)N2CCCC[C@H]2C(=O)OC(CCCc2cccnc2)CCCc2cccnc2)cc(OC)c1OC | 174254-13-8 159997-94-1 | DB04851 | C34H41N3O7 |
| implitapide (BAY 13-9952) | Cc1cc(C)c2c3ccccc3n(Cc3cccc([C@@H](C(=O)N[C@@H](CO)c4ccccc4)C4CCCC4)c3)c2n1 | 177469-96-4 | DB04852 | C35H37N3O2 |
| pactimibe (CS-505) | CCCCCCCCN1CCc2c(C)c(CC(=O)O)c(C)c(NC(=O)C(C)(C)C)c21 | 189198-30-9 | DB12971 | C25H40N2O3 |
| fedovapagon | Cc1cc(C(=O)N2CCCCc3ccccc32)ccc1CNC(=O)N1CCC[C@H]1C(=O)N(C)C | | DB11734 | C27H34N4O3 |
| 1-756423 | CC(C)(C)NC(=O)[C@@H]1CN(Cc2cc3ccccc3o2)CCN1C[C@@H](O)C[C@@H](Cc1ccccc1)C(=O)NC1c2ccccc2C[C@H]1O | | DB02009 | C39H48N4O5 |
| acetylleucine | CC(=O)NC(CC(C)C)C(=O)O | 99-15-0, 99-15-0 1188-21-2 24160-46-1 90243-88-2 | DB13226 | C8H15NO3 |
| tipranavir, tipranavir c-14 | CCC[C@@]1(CCc2ccccc2)CC(O)=C([C@H](CC)c2cccc(NS(=O)(=O)c3ccc(C(F)(F)F)cn3)c2)C(=O)O1 | 174484-41-4, 191150-83-1 174484-41-4 174484-81-2 174590-27-3 174484-42-5 174590-26-2 | DB00932 | C31H33F3N2O5S |
| ezatiostat (TLK-199, Telintra) | CCOC(=O)[C@@H](N)CCC(=O)N[C@@H](CSCc1ccccc1)C(=O)N[C@@H](C(=O)OCC)c1ccccc1 | | DB05460 | C27H35N3O6S |
| epelsiban | CC[C@H](C)[C@@H]1C(=O)N[C@H](C2Cc3ccccc3C2)C(=O)N1[C@@H](C(=O)N1CCOCC1)c1ccc(C)nc1C | | DB11934 | C30H38N4O4 |
| 1cl-161 | CN[C@@H](C)C(=O)N[C@H](C(=O)N1CCC[C@H]1c1nc(C(=O)c2ccc(F)cc2)cs1)C1CCCCC1 | | DB12085 | C26H33FN4O3S |
| alk-4290 | Cc1cc(C(=O)N(C)C)cc(NC(=O)[C@H]2CCC(=O)N2C2CCN(Cc3ccc(Cl)c(C)c3)CC2)n1 | | DB15269 | C27H34ClN5O3 |
| repaglinide | CCOc1cc(CC(=O)N[C@@H](CC(C)C)c2ccccc2N2CCCCC2)ccc1C(=O)O | 135062-02-1, 135062-02-1 135969-54-9 | DB00912 | C27H36N2O4 |

TABLE 1-continued

PREDICTED ACE2 INHIBITORS

| Drug name | SMILES | CAS | DrugBankID | FORMULA |
|---|---|---|---|---|
| gdc-0152 | CN[C@@H](C)C(=O)N[C@H](C(=O)N1CCC[C@H]1C(=O)Nc1snnc1-c1ccccc1)C1CCCCC1 | | DB12380 | C25H34N6O3S |
| nateglinide | CC(C)[C@@H]1CC[C@@H](C(=O)N[C@H](Cc2ccccc2)C(=O)O)CC1 | 105816-04-4, 105816-04-4 105746-37-0 105816-06-6 | DB00731 | C19H27NO3 |
| lumateperone | CN1CCN2c3c(cccc31)[C@@H]1CN(CCCC(=O)c3ccc(F)cc3)CC[C@@H]12 | | DB06077 | C24H28FN3O |
| pf-03814735 | CC(=O)NCC(=O)N1[C@H]2CC[C@@H]1c1cc(Nc3ncc(C(F)(F)F)c(NC4CCC4)n3)ccc12 | | DB13059 | C23H25F3N6O2 |
| retosiban | CC[C@H](C)[C@@H]1C(=O)N[C@H](C2Cc3ccccc3C2)C(=O)N1[C@@H](C(=O)N1CCOCC1)c1coc(C)n1 | | DB11818 | C27H34N4O5 |
| tiropramide | CCCN(CCC)C(=O)C(Cc1ccc(OCCN(CC)CC)cc1)NC(=O)c1ccccc1 | 55837-29-1, 55837-29-1 57287-56-6 57227-16-4 | DB13091 | C28H41N3O3 |
| pagoclone | CC(C)CCC(=O)CC1c2ccccc2C(=O)N1c1ccc2ccc(Cl)nc2n1 | 133737-32-3 133737-48-1 | DB04903 | C23H22ClN3O2 |
| semagacestat | CC(C)[C@H](O)C(=O)N[C@@H](C)C(=O)N[C@@H]1C(=O)N(C)CCc2ccccc21 | | DB12463 | C19H27N3O4 |
| elobixibat | CCCCC1(CCCC)CN(c2ccccc2)c2cc(SC(OCC(=O)NC(=O)NCC(=O)O)c3ccccc3)cc2S(=O)(=O)C1 | 439087-18-0 | DB12486 | C36H45N3O7S2 |
| Nocloprost | CCCCC(C)(C)C(O)C=CC1C(O)CC(Cl)C1CC=CCCCC(=O)O | 79360-43-3 | | C22H37ClO4 |

TABLE 2

PREDICTED FURIN INHIBITORS

| Drug name | SMILES | CAS | DrugBankID | FORMULA |
|---|---|---|---|---|
| feprazone | CC(C)=CCC1C(=O)N(c2ccccc2)N(c2ccccc2)C1=O | 30748-29-9 | DB13364 | C20H20N2O2 |
| nefiracetam | Cc1ccccc(C)c1NC(=O)CN1CCCC1=O | 77191-36-7 | DB13082 | C14H18N2O2 |
| clemizole (EPX-100) | Clc1ccc(Cn2c(CN3CCCC3)nc3ccccc32)cc1 | 442-52-4, 442-52-4 61853-30-3 61853-31-4 1163-36-6 6001-63-4 17162-20-8 | | C19H20ClN3 |
| lisofylline, pcs-499 | C[C@@H](O)CCCCN1C(=O)c2c(ncn2C)N(C)C1=O | 100324-81-0 6493-06-7 | DB12406, DB15122 | C13H20N4O3 |
| pentoxifylline | CC(=O)CCCCN1C(=O)c2c(ncn2C)N(C)C1=O | 6493-05-06 | DB00806 | C13H18N4O3 |
| itopride | COc1ccc(C(=O)NCc2ccc(OCCN(C)C)cc2)cc1OC | 122898-67-3, 122898-67-3 122892-31-3 | DB04924 | C20H26N2O4 |
| etofylline nicotinate | CN1C(=O)c2c(ncn2CCOC(=O)c2cccnc2)N(C)C1=O | 13425-39-3 | DB13842 | C15H15N5O4 |
| daniquidone (batracylin) | Nc1ccc2c(c1)CN1C(=O)c3ccccc3C1=N2 | 67199-66-0 | DB12804 | C15H11N3O |
| trimetazidine | COc1ccc(CN2CCNCC2)c(OC)c1OC | 5011-34-7, 5011-34-7 13171-25-0 | DB09069 | C14H22N2O3 |
| varespladib | CCc1c(C(=O)C(N)=O)c2c(OCC(=O)O)ccccc2n1Cc1ccccc1 | 172732-68-2 172733-42-5 | DB11909 | C21H20N2O5 |
| balaglitazone | CN1C(=O)c2ccccc2N=C1OCc1ccc(CC2SC(=O)NC2=O)cc1 | | DB12781 | C20H17N3O4S |
| doxofylline | CN1C(=O)c2c(ncn2CC2OCCO2)N(C)C1=O | 69975-86-6 | DB09273 | C11H14N4O4 |
| troxipide | COc1cc(C(=O)NC2CCCNC2)cc(OC)c1OC | 30751-05-4, 30751-05-4 30751-03-2 | DB13419 | C15H22N2O4 |
| oxtriphylline | CN1C(=O)c2[nH]cnc2N(C)C1=O | | DB01303 | C12H21N5O3 |
| kebuzone | CC(=O)CCC1C(=O)N(c2ccccc2)N(c2ccccc2)C1=O | 853-34-9 | DB08940 | C19H18N2O3 |
| afloqualone | Cc1ccccc1N1C(=O)c2cc(N)ccc2N=C1CF | 56287-74-2 | | C16H14FN3O |

TABLE 3

PREDICTED TMPRSS2 INHIBITORS

| Drug name | SMILES | CAS | DrugBankID | FORMULA |
|---|---|---|---|---|
| pri-724 | C[C@H]1[C@H]2N(C(=O)CN(C)N2C(=O)NCc2ccccc2)[C@@H](Cc2ccc(OP(=O)(O)O)cc2)C(=O)N1Cc1cccc2cccnc12 | | DB15034 | C33H35N6O7P |
| elobixibat | CCCCC1(CCCC)CN(c2ccccc2)c2cc(SC)c(OCC(=O)N[C@@H](C(=O)NCC(=O)O)c3ccccc3)cc2S(=O)(=O)C1 | | DB12486 | C36H45N3O7S2 |
| azd-7295 | CCCS(=O)(=O)N1CCN(Cc2ccc(NC(=O)c3ccc(-c4cc(NC(=O)C5CC5)ccc4OC(F)(F)F)cc3)cc2)CC1 | | DB12724 | C32H35F3N4O5S |
| lifitegrast | CS(=O)(=O)c1cccc(C[C@H](NC(=O)c2c(Cl)cc3c(c2Cl)CCN(C(=O)c2ccc4ccoc4c2)C3)C(=O)O)c1 | | DB11611 | C29H24Cl2N2O7S |
| cilengitide (EMD 121974) | CC(C)[C@H]1C(=O)N[C@@H](CCCNC(=N)N)C(=O)NCC(=O)N[C@@H](CC(=O)O)C(=O)N[C@H](Cc2ccccc2)C(=O)N1C | 188968-51-6 | DB11890 | C27H40N8O7 |
| rotigaptide (GAP-486, ZP-123) | CC(=O)N[C@H](Cc1ccc(O)cc1)C(=O)N1CCC[C@@H]1C(=O)N1C[C@@H](O)C[C@@H]1C(=O)NCC(=O)N[C@H](C)C(=O)NCC(N)=O | 355151-12-1 | DB13067 | C28H39N7O9 |
| lopinavir | Cc1cccc(C)c1OCC(=O)N[C@@H](Cc1ccccc1)[C@@H](O)C[C@H](Cc1ccccc1)NC(=O)[C@H](C(C)C)N1CCCNC1=O | 192725-17-0 369372-47-4 | DB01601 | C37H48N4O5 |
| ivosidenib | N#Cc1ccnc(N2C(=O)CC[C@H]2C(=O)N(c2cncc(F)c2)[C@H](C(=O)NC2CC(F)(F)C2)c2ccccc2Cl)c1 | | DB14568 | C28H22ClF3N6O3 |
| vidupiprant | CC(C)(C)NC(=O)c1ccc(Oc2cc(F)c(CC(=O)O)cc2Cl)c(NS(=O)(=O)c2ccc(C3CC3)cc2Cl)c1 | | DB12272 | C28H27Cl2FN2O6S |
| elamipretide | Cc1cc(O)cc(C)c1C[C@H](NC(=O)[C@H](N)CCCNC(=N)N)C(=O)N[C@@H](CCCCN)C(=O)N[C@@H](Cc1ccccc1)C(N)=O | | DB11981 | C32H49N9O5 |
| sparsentan | CCCCC1=NC2(CCCC2)C(=O)N1Cc1ccc(-c2ccccc2S(=O)(=O)Nc2noc(C)c2C)c(COCC)c1 | | DB12548 | C32H40N4O5S |
| zafirlukast | COc1cc(C(=O)NS(=O)(=O)c2ccccc2C)ccc1Cc1cn(C)c2ccc(NC(=O)OC3CCCC3)cc12 | 107753-78-6 | DB00549 | C31H33N3O6S |
| relcovaptan (SR-49059) | COc1ccc(S(=O)(=O)N2c3ccc(Cl)cc3[C@](O)(c3ccccc3Cl)[C@@H]2C(=O)N2CCC(N)=O)cc1OC | 150375-75-0 | DB13929 | C28H27Cl2N3O7S |
| nelivaptan | COc1ccc(S(=O)(=O)N2C(=O)[C@@](c3ccccc3OC)(N3C[C@H](O)C[C@H3C(=O)N(C)C)c3cc(Cl)ccc32)c(OC)c1 | | DB12643 | C30H32ClN3O8S |
| cr665 | CCCC[C@@H](NC(=O)[C@@H](Cc1ccccc1)NC(=O)[C@H](N)Cc1ccccc1)C(=O)N[C@H](CCCNC(=N)N)C(=O)NCc1ccncc1 | | DB05155 | C36H49N9O4 |

TABLE 4

PREDICTED 3CLPRO INHIBITORS

| Drug name | SMILES | CAS | DrugBankID | FORMULA |
|---|---|---|---|---|
| berzosertib | CNCc1ccc(-c2cc(-c3nc(-c4ccc(S(=O)(=O)C(C)C)cc4)cnc3N)on2)cc1 | | DB11794 | C24H25N5O3S |
| azd-5991 | Cc1c2c(nn1C)CSCc1cc(n(C)n1)CSc1cc(c3ccccc3c1)OCCCc1c(C(=O)O)n(c3)cc2-c(Cl)ccc13 | | DB14792 | C35H34ClN5O3S2 |
| dabrafenib | CC(C)(C)c1nc(-c2cccc(NS(=O)(=O)c3c(F)cccc3F)c2F)c(-c2ccnc(N)n2)s1 | 1195765-45-7 | DB08912 | C23H20F3N5O2S2 |
| tofimilast | CCc1nn(C2CCCC2)c2c1CCn1c(-c3cccs3)nnc1-2 | | DB11681 | C18H21N5S |
| gsk-356278 | CCn1ncc2c(NC3CCOCC3)c(-c3nnc(Cc4sc(C)nc4C)o3)cnc21 | | DB12542 | C21H25N7O2S |
| naloxone | C=CCN1CC[C@]23c4c5ccc(O)c4O[C@H]2C(=O)cc[C@@]3(O)[C@H]1C5 | 357-08-4 465-65-6 51481-60-8 30299-78-6 65700-73-4 69133-14-8 92522-87-7 352020-56-5 | DB01183 | C19H21NO4 |
| srt-2104 | Cc1nc(-c2cccnc2)sc1C(=O)Nc1ccccc1-c1cn2c(n1)SC=C2CN1CCOCC1 | | DB12186 | C26H24N6O2S2 |
| glumetinib (SCC24) | Cn1cc(C2=Cn3c(S(=O)(=O)n4ncc5ncc(-c6cnn(C)c6)cc54)cnc3C=C2)cn1 | | DB15630 | C21H17N9O2S |
| ro-6870810 | Cc1sc2c(c1C)C(c1cccc(Cl)cc1)=N[C@@H](CC(=O)NCCN1CCN(C)CC1)c1nnc(C)n1-2 | | DB15151 | C27H34ClN7OS |
| tas-116 | CCc1cc(C(N)=O)cc1-n1nc(C(C)C)c2c(-n3cnc(-c4cnn(C)c4)c3)cnc21 | | DB14876 | C25H26N8O |
| nicergoline | CO[C@H]12C[C@@H](COC(=O)c3cncc(Br)c3)CN(C)[C@@H]1Cc1cn(C)c3cccc2c13 | 27848-84-6 | DB00699 | C24H26BrN3O3 |
| rogaratinib | COCc1c(-c2cc3cc(C)cc(OC)c3s2)c2n(c1CN1CCNC(=O)C1)N=CN=C2N | | DB15078 | C23H26N6O3S |

TABLE 4-continued

PREDICTED 3CLPRO INHIBITORS

| Drug name | SMILES | CAS | DrugBankID | FORMULA |
|---|---|---|---|---|
| balipodect (TAK-063) | COC1=CN(c2ccc(-n3cccn3)cc2F)N=C(c2ccnn2-c2ccccc2)C1=O | | DB14774 | C23H17FN6O2 |
| indiplon | CC(=O)N(C)c1cccc(C2=CC=Nc3c(C(=O)c4cccs4)cnn32)c1 | 325715-02-4 | DB12590 | C20H16N4O2S |
| olorinab | CC(C)(C)[C@@H](CO)NC(=O)c1nn(-c2c[n+]([O-])ccn2)c2c1C[C@@H]1C[C@H]21 | | DB14998 | C18H23N5O3 |
| funapide | O=C1N(Cc2ccc(C(F)(F)Fo2)c2ccccc2[C@]12COc1cc3c(cc12)OCO3 | | DB11769 | C22H14F3NO5 |
| methylnaltrexone | C[N+]1(CC2CC2)CC[C@]23c4c5ccc(O)c4O[C@@H]2C(=O)CC[C@@]3(O)[C@H]1C5 | 83387-25-1 | DB06800 | C21H26NO4 |
| noscapine | COc1ccc2c(c1OC)C(=O)O[C@@H]2[C@H]1c2c(cc3c(c2OC)OCO3)CCN1C | 128-62-1, 128-62-1 25333-79-3 912-60-7 82824-08-6 76404-10-9 6055-90-9 1368-39-4 567-86-2 8055-18-3 8057-19-0 6035-40-1 3860-46-6 106611-48-7 79682-27-2 79682-26-1 | DB06174 | C22H23NO7 |
| max-40279 | COc1cc(F)ccc1-c1c(C)sc2cnc(Nc3cnn(C4CCNCC4)c3)nc12 | | DB15191 | C22H23FN6OS |
| birabresib (MK-8628, OTX-015) | Cc1sc2c(c1C)C(c1ccc(Cl)cc1)=N[C@@H](CC(=O)Nc1ccc(O)cc1)c1nnc(C)n1-2 | | DB15189 | C25H22ClN5O2S |
| cositecan (BNP-1350; DB-172) | CC[C@@]1(O)C(=O)OCC2=C1C=C1c3nc4ccccc4c(CC[Si](C)(C)C)c3CN1C2=O | | DB05806 | C25H28N2O4Si |
| galantamine | COc1ccc2c3c1O[C@H]1C[C@@H](O)C=C[C@@]31CCN(C)C2 | 121587 24746891 24870739 676392 908828 16757784 11860544 9651 3449 | DB00674 | C17H21NO3 |
| apixaban | COc1ccc(-n2nc(C(N)=O)c3c2C(=O)N(c2ccc(N4CCCCC4=O)cc2)CC3)cc1 | 503612-47-3 | DB06605 | C25H25N5O4 |
| bms-986141 | COC1=Nn2cc(-c3cc4c(OCc5csc(-c6ccc(C(=O)N(C)C)cc6)n5)cc(OC)cc4o3)nc2S1 | | DB14942 | C27H23N5O5S2 |
| alvelestat (MPH-966) | CC1=C(c2ccnn2C)C=C(C(=O)NCc2ccc(S(C)(=O)=O)cn2)C(=O)N1c1cccc(C(F)(F)F)c1 | | DB11863 | C25H22F3N5O4S |
| orm-12741 | COC[C@@]1(C)CCCN2CCc3c(oc4ccccc34)[C@@H]21 | | DB12057 | C18H23NO2 |
| bms-830216 | COc1cc(N2C=Nc3cc(-c4ccc(Cl)cc4)sc3C2=O)ccc1OC[C@H](OP(=O)(O)O)C1CC1 | | DB14787 | C24H22ClN2O7PS |
| pexacerfont | CC[C@@H](C)NC1=NC(C)=Nc2c(-c3ccc(OC)nc3C)c(C)nn21 | | DB12572 | C18H24N6O |
| gw-468816 | O=C(O)[C@H]1C/C(=C2//CCN(c3ccccc3)C2=O)c2ccc(Cl)cc2N1 | | DB15099 | C20H17ClN2O3 |
| relcovaptan (SR-49059) | COc1ccc(S(=O)(=O)N2c3ccc(Cl)cc3[C@](O)(c3ccccc3Cl)[C@@H]2C(=O)N2CCC[C@H]2C(N)=O)cc1OC | 150375-75-0 | DB13929 | C28H27Cl2N3O7S |
| prx-07034 | COc1cc(Cl)cc(C(C)Nc2cc(N3CCNCC3)ccc2S(C)(=O)=O)c1OC | | DB05993 | C21H29Cl2N3O4S |
| Altizide | C=CCSCC1Nc2cc(Cl)c(S(N)(=O)=O)cc2S(=O)(=O)N1 | 5588-16-9, 5588-16-9 76270-06-9 | | C11H14ClN3O4S3 |
| acediasufone | Nc1ccc(S(=O)(=O)c2ccc(NCC(=O)O)cc2)cc1 | 80-03-5, 127-60-6 80-03-5 | DB08926 | C14H14N2O4S |
| R-428 (Bemcentinib) | Nc1nc(Nc2ccc3c(c2)CC[C@@H](N2CCCC2)CC3)nn1-c1cc2c(nn1)-c1ccccc1CCC2 | | DB12411 | |

TABLE 5

PREDICTED PLPRO INHIBITORS

| Drug name | SMILES | CAS | DrugBankID | FORMULA |
|---|---|---|---|---|
| amprenavir | CC(C)CN(C[C@@H](O)[C@H](Cc1ccccc1)NC(=O)O[C@H]1CCOC1)S(=O)(=O)c1ccc(N)cc1 | 161814-49-9 | DB00701 | C25H35N3O6S |
| lapachone (ARQ 501) | CC1(C)CCC2=C(O1)c1ccccc1C(=O)C2=O | | DB11948 | C15H14O3 |
| saquinavir | CC(C)(C)NC(=O)[C@@H]1C[C@@H]2CCCC[C@@H]2CN1C[C@@H](O)[C@H](Cc1ccccc1)NC(=O)[C@H](CC(N)=O)NC(=O)c1ccc2ccccc2n1 | 127779-20-8, 127779-20-8 149845-06-7 | DB01232 | C38H50N6O5 |
| telinavir | CC(C)CN(C[C@@H](O)[C@H](Cc1ccccc1)NC(=O)[C@@H](CC(N)=O)NC(=O)c1ccc2ccccc2n1)C(=O)NC(C)(C)C | 143224-34-4 | DB12178 | C33H44N6O5 |

TABLE 5-continued

PREDICTED PLPRO INHIBITORS

| Drug name | SMILES | CAS | DrugBankID | FORMULA |
|---|---|---|---|---|
| indinavir | CC(C)(C)NC(=O)[C@@H]1CN(Cc2cccnc2)CCN1C[C@@H](O)C[C@@H](Cc1ccccc1)C(=O)N[C@H]1c2ccccc2C[C@H]1O | 150378-17-9, 157810-81-6 150378-17-9 180683-37-8 166746-42-5 216884-06-9 | DB00224 | C36H47N5O4 |
| griseofulvin | COC1=CC(=O)C[C@@H](C)[C@]12Oc1c(Cl)c(OC)cc(OC)c1C2=O | 0126-07-08 | DB00400 | C17H17ClO6 |
| ulimorelin (TZP-101) | C[C@@H]1CN[C@@H](C2CC2)C(=O)N(C)[C@H](C)C(=O)N[C@H](Cc2ccc(O)cc2)C(=O)NCCCc2ccccc2O1 | | DB12128 | C30H39FN4O4 |
| rotigaptide (GAP-486, ZP-123) | CC(=O)N[C@H](Cc1ccc(O)cc1)C(=O)N1CCC[C@@H]1C(=O)N1C[C@@H](O)C[C@@H]1C(=O)NCC(=O)N[C@H](C)C(=O)NCC(N)=O | 355151-12-1 | DB13067 | C28H39N7O9 |
| nrx-1074 (apimostinel) | C[C@@H](O)[C@H](N)C(=O)N1CCC[C@@H]1C(=O)N1CCC[C@@]1(Cc1ccccc1)C(=O)N[C@H](C(N)=O)[C@@H](C)O | | DB11784 | C25H37N5O6 |
| relacatib | CC(C)C[C@H](NC(=O)c1cc2ccccc2o1)C(=O)N[C@H]1C[C@@H](C)N(S(=O)(=O)c2ccccn2)CC1=O | | DB06367 | C27H32N4O6S |
| funapide | O=C1N(Cc2ccc(C(F)(F)F)o2)c2ccccc2[C@]12COc1cc3c(c12)OCO3 | | DB11769 | C22H14F3NO5 |
| gpx-150 | COc1cccc2c1C(=N)c1c(O)c3c(c(O)c1C2=O)C[C@@](O)(C(=O)CO)C[C@@H]3O[C@H]1C[C@H](N)[C@H](O)[C@@H](C)O1 | | DB13103 | C27H30N2O10 |
| biricodar | COc1cc(C(=O)C(=O)N2CCCC[C@H]2C(=O)OC(CCCc2ccnc2)CCCc2ccnc2)cc(OC)c1OC | 174254-13-8 159997-94-1 | DB04851 | C34H41N3O7 |
| moexipril | CCOC(=O)[C@H](CCc1ccccc1)N[C@@H](C)C(=O)N1Cc2cc(OC)c(OC)cc2C[C@@H]1C(=O)O | 103775-10-6, 82586-52-5 103775-10-6 109715-88-0 | DB00691 | C27H34N2O7 |
| moexiprilat | COc1cc2c(cc1OC)CN(C(=O)[C@H](C)N[C@@H](CCc1ccccc1)C(=O)O)[C@H](C(=O)O)C2 | 103775-14-0 119479-07-1 119479-10-6 119479-11-7 | DB14210 | C25H30N2O7 |
| incyclinide (Metastat) | NC(=O)C1=C(O)C[C@@H]2C[C@@H]3Cc4cccc(O)c4C(=O)C3=C(O)[C@@]2(O)C1=O | | DB11647 | C19H17NO7 |
| cositecan (BNP-1350; DB-172) | CC[C@@]1(O)C(=O)OCC2=C1C=C1c3nc4ccccc4c(CC[Si](C)(C)C)c3CN1C2=O | | DB05806 | C25H28N2O4Si |
| elamipretide | Cc1cc(O)cc(C)c1C[C@H](NC(=O)[C@H](N)CCCNC(=N)N)C(=O)N[C@@H](CCCCN)C(=O)N[C@@H](Cc1ccccc1)C(N)=O | | DB11981 | C32H49N9O5 |
| naltrexone | O=C1CC[C@@]2(O)[C@H]3Cc4ccc(O)c5c4[C@@]2(CCN3CC2CC2)[C@H]1O5 | 16590-41-3 16676-29-2 | DB00704 | C20H23NO4 |
| retosiban | CC[C@H](C)[C@@H]1C(=O)N[C@H](C2Cc3ccccc3C2)C(=O)N1[C@@H](C(=O)N1CCOCC1)c1oc(C)n1 | | DB11818 | C27H34N4O5 |
| tolvaptan | Cc1ccccc1C(=O)Nc1ccc(C(=O)N2CCCC(O)c3cc(Cl)ccc32)c(C)c1 | 150683-30-0 | DB06212 | C26H25ClN2O3 |
| gimatecan | CC[C@@]1(O)C(=O)OCC2=C1C=C1c3nc4ccccc4c(/C=N/OC(C)(C)C)c3CN1C2=O | 292618-32-7 292620-90-7 | DB06721 | C25H25N3O5 |
| exatecan (DX-8951 | CC[C@@]1(O)C(=O)OCC2=C1C=C1c3nc4cc(F)c(C)c5c4c(c3CN1C2=O)[C@@H](N)CC5 | 171335-80-1, 197720-53-9 171335-80-1 | DB12185 | C24H22FN3O4 |
| methylnaltrexone | C[N+]1(CC2CC2)CC[C@]23c4c5ccc(O)c4O[C@@H]2C(=O)CC[C@@]3(O)[C@H]1C5 | 83387-25-1 | DB06800 | C21H26NO4 |
| topotecan | CC[C@@]1(O)C(=O)OCC2=C1C=C1c3nc4ccc(O)c(CN(C)C)c4cc3CN1C2=O | 123948-87-8, 119413-54-6 123948-87-8 | DB01030 | C23H23N3O5 |
| namitecan (ST-1968) | CC[C@@]1(O)C(=O)OCC2=C1C=C1c3nc4ccccc4c(/C=N/OCCN)c3CN1C2=O | | DB12124 | C23H22N4O5 |
| belotecan | CC[C@@]1(O)C(=O)OCC2=C1C=C1c3nc4ccccc4c(CCNC(C)C)c3CN1C2=O | 256411-32-2, 256411-32-2 213819-48-8 | DB12459 | C25H27N3O4 |
| furegrelate | O=C(O)c1cc2cc(Cc3cccnc3)ccc2o1 | 87463-91-0 85666-24-6 85666-17-7 | | C15H11NO3 |

TABLE 6

PREDICTED RDRP INHIBITORS

| Drug name | SMILES | CAS | DrugBankID | FORMULA |
|---|---|---|---|---|
| cf-102 | CNC(=O)[C@H]1O[C@@H](n2cnc3c(NCc4cccc(I)c4)nc(Cl)nc32)[C@H](O)[C@@H]1O | | DB12885 | C18H18ClIN6O4 |
| piclidenoson | CNC(=O)[C@H]1O[C@@H](n2cnc3c(NCc4cccc(I)c4)ncnc32)[C@H](O)[C@@H]1O | | DB05511 | C18H19IN6O4 |

TABLE 6-continued

PREDICTED RDRP INHIBITORS

| Drug name | SMILES | CAS | DrugBankID | FORMULA |
|---|---|---|---|---|
| citicoline | C[N+](C)(C)CCOP(=O)(O)OP(=O)(O)OC[C@H]1O[C@@H](N2C=CC(N)=NC2=O)[C@H](O)[C@@H]1O | 1477-47-0 33818-15-4 987-78-0 67463-73-4 | DB12153 | C14H26N4O11P2 |
| triciribine phosphate (PTX-200) | CN1N=C(N)c2cn([C@@H]3O[C@H](COP(=O)(O)O)[C@@H](O)[C@H]3O)c3ncnc1c23 | | DB14636 | C13H17N6O7P |
| besifovir dipivoxil | CC(C)(C)C(=O)OCOP(=O)(COC1(Cn2cnc3cnc(N)nc32)CC1)OCOC(=O)C(C)(C)C | | DB05020 | C22H34N5O8P |
| adefovir dipivoxil | CC(C)(C)C(=O)OCOP(=O)(COCCn1cnc2c(N)ncnc21)OCOC(=O)C(C)(C)C | 142340-99-6 | DB00718 | C20H32N5O8P |
| tocladesine | Nc1ncnc2c1nc(Cl)n2[C@@H]1O[C@@H]2COP(=O)(O)O[C@H]2[C@H]1O | | DB13046 | C10H11ClN5O6P |
| bms-929075 | CNC(=O)c1c(-c2ccc(F)cc2)oc2ccc(-c3cc(C(=O)NC4(c5ncccn5)CC4)ccc3C)c(F)c12 | | DB14950 | C31H24F2N4O3 |
| bazedoxifene | Cc1c(-c2ccc(O)cc2)n(Cc2ccc(OCCN3CCCCCC3)cc2)c2ccc(O)cc12 | 198481-32-2, 198481-32-2 198481-33-3 | DB06401 | C30H34N2O3 |
| recoflavone (DA-6034) | COc1ccc(C2=CC(=O)c3c(OC)cc(OCC(=O)O)cc3O2)cc1OC | | DB12058 | C20H18O8 |
| psi-352938 (GS-0938) | CCOc1nc(N)nc2c1ncn2[C@@H]1O[C@@H]2CO[P@@](=O)(OC(C)(C)O[C@H]2[C@@]1(C)F | | DB12896 | C16H23FN5O6P |
| preladenant | COCCOc1ccc(N2CCN(CCn3ncc4c3N=C(N)n3nc(-c5ccco5)nc3-4)CC2)cc1 | | DB11864 | C25H29N9O3 |
| gw-493838 | CC(C)(C)c1nnc([C@H]2O[C@@H](n3cnc4c(Nc5ccc(Cl)cc5F)ncnc43)[C@H](O)[C@@H]2O)o1 | | DB12760 | C21H21ClFN7O4 |
| indiplon | CC(=O)N(C)c1ccc(C2=CC=Nc3c(C(=O)c4cccs4)cnn32)c1 | 325715-02-4 | DB12590 | C20H16N4O2S |
| Larotrectinib (LOXO-101) | O=C(Nc1cnn2c1N=C(N1CCC[C@@H]1c1cc(F)ccc1F)C=C2)N1CC[C@H](O)C1 | | DB14723 | C21H22F2N6O2 |
| capecitabine | CCCCCOC(=O)NC1=NC(=O)N([C@@H]2O[C@H](C)[C@@H](O)[C@H]2O)C=C1F | 154361-50-9, 154361-50-9 158798-73-3 | DB01101 | C15H22FN3O6 |
| nuc-1031 (Acelarin) | C[C@H](NP(=O)(OC[C@H]1O[C@@H](N2C=CC(N)=NC2=O)C(F)(F)[C@@H]1O)Oc1ccccc1)C(=O)OCc1ccccc1 | | DB15057 | C25H27F2N4O8P |
| triciribine | CN1N=C(N)c2cn([C@@H]3O[C@H](CO)[C@@H](O)[C@H]3O)c3ncnc1c23 | 35943-35-2 | DB12405 | C13H16N6O4 |
| belinostat | O=C(C=Cc1cccc(S(=O)(=O)Nc2ccccc2)c1)NO | 414864-00-9 | DB05015 | C15H14N2O4S |
| trabodenoson | O=[N+]([O-])OC[C@H]1O[C@@H](n2cnc3c(NC4CCCC4)ncnc32)[C@H](O)[C@@H]1O | | DB13122 | C15H20N6O6 |
| regadenoson | CNC(=O)c1cnn(-c2nc(N)c3ncn([C@@H]4O[C@H](CO)[C@@H](O)[C@H]4O)c3n2)c1 | 313348-27-5, 313348-27-5 875148-45-1 | DB06213 | C15H18N8O5 |
| pipendoxifene | Cc1c(-c2ccc(O)cc2)n(Cc2ccc(OCCN3CCCCC3)cc2)c2ccc(O)cc12 | 198480-55-6 | DB05414 | C29H32N2O3 |
| nelivaptan | COc1ccc(S(=O)(=O)N2C(=O)[C@@](c3ccccc3OC)(N3C[C@H](O)C[C@H]3C(=O)N(C)C)c3cc(Cl)ccc32)c(OC)c1 | | DB12643 | C30H32ClN3O8S |

The compound from Tables 1-6 and analogues thereof are known and well described in the art. The structures and properties of the compound from Tables 1-6 and analogues thereof, and exemplary suitable chemical synthesis processes for these compounds have been described in details in various patents and patent application publications. It is contemplated herein that the compound from Tables 1-6 and analogues thereof (for example, the analogues disclosed in the above-listed patents and patent applications) have similar chemical and biological properties, and can bind to receptors related to RNA viral infection as demonstrated herein, and thus can be used to treat RNA viral infections.

As disclosed herein, the compound from Tables 1-6 or an analogue thereof comprises to individual stereoisomers, diastereomers, conformational isomers as well as the racemates and pro-drugs thereof. The compound from Tables 1-6 or an analogue thereof can be used, for example, to treat RNA viral infections. For example, the compound from Tables 1-6 or an analogue thereof can be administered to a patient in need (for example, a patient suffering from, or at a risk of developing, one or more of the RNA viral infections disclosed herein) at a daily dosage in the range of about 0.01 to 9000 mg administered orally, for an average adult human. It is recognized by those of skill in the art that the exact dosage may be adjusted depending on the severity of symptoms, body weight of the individual and/or other clinical circumstances existing in a given individual. Moreover, it is also recognized that dosage may be adjusted when the compound from Tables 1-6 is used in combination with other pharmacologically active substances.

To prepare the pharmaceutical compositions of the present disclosure, the compounds from Tables 1-6 or analogues of compounds from Tables 1-6 can be intimately admixed with a pharmaceutically acceptable vehicle carrier according to conventional pharmaceutical compounding techniques, which may take a wide variety of forms depending on the form of preparation desired for administration (e.g., oral, transdermal, transmucosal, buccal, sublingual, transdermal, inhalation, nasal, rectal, vaginal, parenteral). In preparing the compositions in oral dosage form, any of the usual pharmaceutical media may be employed. Thus, for liquid oral preparations, such as for example, suspensions, elixirs and solutions, suitable carriers and additives include water, glycols, oils, alcohols, flavoring agents, preservatives, coloring agents and the like; for solid oral preparations such as, for example, powders, capsules and tablets, suitable carriers and additives include starches, sugars, diluents, granulating agents, lubricants, binders, disintegrating agents and the like. Because of their ease in administration, tablets and capsules represent an advantageous oral dosage unit form, in which case solid pharmaceutical carriers are obviously employed. If desired, tablets may be sugar coated or enteric coated by standard techniques.

In addition, various controlled-release delivery methods, well known to those skilled in the art may be employed to improve bioavailability, reduce side effects, or transdermal delivery may be facilitated by various permeability enhancers or devises. Suppositories may be prepared, in which case cocoa butter could be used as the carrier. For parenterals, the carrier usually comprise sterile water, though other ingredients, for example, for purposes such as aiding solubility or for preservation, may be included. Injectable suspensions may also be prepared in which case appropriate liquid carriers, suspending agents and the like may be employed. Inhalable formulations and aerosols, topical formulations, nanoparticle and microparticle formulations and bioerodible and non-bioerodible formulations may also be prepared.

Included within the scope of the present disclosure are the various individual anomers, diastereomers and enantiomers as well as mixtures thereof. Such compounds are included within the definition from Tables 1-6. For example, the selective use of a particular enantiomer (e.g. R or S) of compounds from Tables 1-6 to achieve a desired therapeutic effect is contemplated within the scope of the present disclosure since various enantiomers may have differential affinities for the receptor related to RNA viral infection. Also contemplated herein is the selective combination of various individual isomers, such as enantiomers in specific ratios (e.g. 3R:1S) to achieve a therapeutic effect. In addition, the compounds disclosed herein also include any pharmaceutically acceptable salts, for example: alkali metal salts, such as sodium and potassium; ammonium salts; monoalkylammonium salts; dialkylammonium salts; trialkylammonium salts; tetraalkylammonium salts; and tromethamine salts. Hydrates and other solvates of the compound of Tables 1-6 are included within the scope of the present disclosure.

Pharmaceutically acceptable salts of the compounds from Tables 1-6 or analogues thereof can be prepared by reacting the derivatives from Tables 1-6 with the appropriate base and recovering the salt. In some embodiments, a compound from Tables 1-6 or an analogues thereof is administered to the subject in a dosage of about 5-25 mg twice daily, or about 50 mg two or three times daily, or 100 mg once, twice or three times daily.

Also included within the scope of the present disclosure are various pro-drugs that may be converted by various physiologic processes into the active drug substance or which otherwise improves the bioavailability and/or pharmacological characteristics of the compounds disclosed herein. It is known to those of skill in the art that such pro-dugs may be created by creating derivatives of the compound from Tables 1-6 which may be changed by normal physiologic and/or metabolic processes occurring with the individual into the pharmacologically active molecules from Tables 1-6 or by combining the compound from Tables 1-6 with another molecule or promoiety so as to enhance or control for example; absorption, distribution, metabolism and/or excretion in an individual.

The present disclosure also encompasses prodrugs of the compounds disclosed herein, which on administration undergo chemical conversion by metabolic processes before becoming active pharmacological substances. In general, such prodrugs are functional derivatives of the present compounds, which are readily convertible in vivo into the required compound from Tables 1-6. Prodrugs are any covalently bonded compounds, which release the active parent drug from Tables 1-6 in vivo. In cases in which compounds have unsaturated carbon-carbon double bonds, both the cis (Z) and trans (E) isomers are within the scope of the present disclosure. In cases wherein compounds may exist in tautomeric forms, such as ketoenol tautomers, each tautomeric form is contemplated as being included within the present disclosure whether existing in equilibrium or predominantly in one form. Conventional procedures for the selection and preparation of suitable prodrug derivatives are described, for example, in "Design of Prodrugs", ed. H. Bundgaard, Elsevier, 1985. Prodrug designs are generally discussed in Hardma et al. (eds.), Goodman and Gilman's The Pharmacological Basis of Therapeutics, 9th ed., pages 11-16 (1996). A further thorough study of prodrug design is presented in Higuchi et al., Prodrugs as Novel Delivery Systems, vol. 14, ASCD Symposium Series, and in Roche (ed.), Bioreversible Carriers in Drug Design, American Pharmaceutical Association and Pergamon Press (1987).

The compounds from Tables 1-6 can be linked, coupled or otherwise attached to another molecule which would facilitate the transport of the compounds or derivatives across cellular or tissue barriers. For example, gastrointestinal absorption can be enhanced by coupling, linking or attaching to another molecule such as a bile acid derivative or analogues to exploit the intestinal bile acid uptake pathway so as to enhance the intestinal absorption. Examples of such conjugations of a specific drug molecule with a carrier molecule, for example a bile acid, are well known to those familiar with the art. For example, Kramer (Biochim. Biophys. Acta. 1227: 137-154, 1994b) describes the conjugation of bile acids with cholesterol lowering drugs (i.e. HMG-CoA reductase inhibitors) for example lovastatin to improve gastrointestinal absorption and to facilitate more specific target organ drug delivery.

In addition, the compounds from Tables 1-6 or analogues thereof can be linked, coupled or otherwise attached to molecules which improve penetration of the blood brain barrier. For example, coupling, linking or attaching the compounds or derivatives to an essential fatty acid or vitamin to improve penetration into the central nervous system. Such techniques and a large range of molecules and promoieties which can achieve these effects are well known to those skilled in the art of pharmaceutical science. Methods to produce prodrugs using choline derivatives are described in US Patent Application published as US2001007865. The specific examples noted in the foregoing examples are provided for illustrative purposes and are not meant in any way to limit the scope contemplated herein.

The compounds contemplated in the scope of the present disclosure may be used in conjunction with one or more other therapeutic agents (e.g., drug compounds) and used according to the methods of the present disclosure, for example the therapeutic agents have a use that is also effective in treating RNA viral infection and/or co-morbid conditions.

When administered, the pharmaceutical composition comprising one or more of the compounds disclosed herein are applied in pharmaceutically acceptable amounts and in pharmaceutically acceptable compositions. Such preparations may routinely contain salts, buffering agents, preservatives, compatible carriers, and optionally other therapeutic ingredients. When used in medicine the salts should be pharmaceutically acceptable, but non-pharmaceutically acceptable salts may conveniently be used to prepare pharmaceutically acceptable salts thereof and are not excluded herein. Such pharmacologically and pharmaceutically acceptable salts include, but are not limited to, those prepared from the following acids: hydrochloric, hydrobromic, sulfuric, nitric, phosphoric, maleic, acetic, salicylic, p-toluene sulfonic, tartaric, citric, methane sulfonic, formic, malonic, succinic, naphthalene-2-sulfonic, and benzene sulfonic. Also, pharmaceutically acceptable salts can be prepared as alkaline metal or alkaline earth salts, such as sodium, potassium or calcium salts. Suitable buffering agents include: acetic acid and a salt (1-2% W/V); citric acid and a salt (1-3% W/V); boric acid and a salt (0.5-2.5% W/V); and phosphoric acid and a salt (0.8-2% W/V). Suitable preservatives include benzalkonium chloride (0.003-0.03% W/V); chlorobutanol (0.3-0.9% W/V); parabens (0.01-0.25% W/V) and thimerosal (0.004-0.02% W/V).

The compound from Tables 1-6 and analogues thereof are preferred to be administered in safe and effective amounts. An effective amount means that amount necessary to delay; the onset, inhibit the progression, halt altogether the onset or progression of, or to reduce the clinical manifestations or symptoms of the particular condition being treated. In general, an effective amount for treating an RNA viral infection are an amount necessary to inhibit the symptoms of the particular RNA viral infection in situ in a particular individual. When administered to an individual, effective amounts depends on the particular condition being treated; the severity of the condition; individual patient parameters including age, physical condition, size and weight; concurrent treatment; frequency of treatment; and the mode of administration. These factors are well known to those of ordinary skill in the art and can be addressed with no more than routine experimentation. It is preferred generally that a minimum dose be used, that is, the lowest safe dosage that provides appropriate relief of symptoms.

Dosage may be adjusted appropriately to achieve desired drug levels, locally or systemically. Daily doses of active compounds can be from about 0.001 mg/kg per day to 200 mg/kg per day. However, it is recognized that these are general ranges and the actual dose used as contemplated in a given individual may less or greater than this dosage range. In the event that the response in an individual subject is insufficient at such doses, even higher doses (or effective higher doses by a different, more localized delivery route) may be employed to the extent that patient tolerance permits.

A variety of administration routes can be suitable to the methods and compositions disclosed herein. The particular administration route selected can depend upon the particular drug selected, the severity of the disease state(s) being treated and the dosage required for therapeutic efficacy. The methods may be practiced using any mode of administration that is medically acceptable, meaning any mode that produces effective levels of the active compounds without causing clinically unacceptable adverse effects and multiple doses over a given period of time are also contemplated. Such modes of administration include oral, rectal, sublingual, transmucosal, buccal, inhalation, rectal, vaginal, parenteral topical, nasal, transdermal or parenteral routes. The term "parenteral" includes subcutaneous, intravenous, intramuscular, or infusion. Depot intramuscular injections suitably prepared may also be used for administration within the scope of the present disclosure.

The compositions may be conveniently presented in unit dosage form and may be prepared by any of the methods well known in the art of pharmacy. In general, the compositions are prepared by uniformly and intimately bringing the compounds into association with a liquid carrier, a finely divided solid carrier, or both, and then, if necessary, shaping the product.

Compositions suitable for oral administration may be presented as discrete units such as capsules, cachets, tablets, or lozenges, each containing a predetermined amount of the active compound. Other compositions include suspensions in aqueous liquors or non-aqueous liquids such as; a syrup, an elixir, or an emulsion.

Other delivery systems can include time-release, delayed release, sustained release or targeted release delivery systems. Such systems can avoid repeated administrations of the active compounds, increasing convenience to the subject and the physician or target release of the active compound to the tissue of interest. Many types of release delivery systems are available and known to those of ordinary skill in the art. They include polymer based systems such as polylactic and polyglycolic acid, polyanhydrides and polycaprolactone; nonpolymer systems that are lipids including sterols such as cholesterol, cholesterol esters and fatty acids or neutral fats such as mono-, di and triglycerides; hydrogel release systems; silastic systems; peptide based systems; wax coatings, compressed tablets using conventional binders and excipients, partially fused implants and the like. In addition, a pump-based hardware delivery system can be used, some of which are adapted for implantation, others of which are adapted for inhalation administration by nose or mouth.

Long-term sustained release devices, pharmaceutical compositions or molecular derivatives also may be used with the compounds described herein. "Long-term" release, as used herein, means that the drug delivery devise is constructed and arranged to deliver therapeutic levels of the active ingredient for at least 2 days, and preferably as long as 60 days. Long-term sustained release devices such as patches, implants and suppositories are well known to those of ordinary skill in the art and include some of the release systems described above. It is also contemplated by the inventors that the compounds described by the inventors may be formulated in such ways as to achieve various plasma profiles of the compounds in given individuals so as to maintain certain effective profiles of given plasma levels over a period of time. Such formulation strategies are well known to those skilled in the art and may for example include special coatings on tablets or granules containing the compounds disclosed herein either alone or in combination with other pharmacologically active substances. All such formulations are contemplated with the scope of the present disclosure.

Methods for Treating Viral Infection

Disclosed herein include methods for preventing, delaying the onset of, or treating an infection or a disease caused by a RNA virus. In some embodiments, the method comprises administering to a subject in need thereof a composition comprising a compound selected from the compounds listed in Tables 1-6, or a pharmaceutically acceptable salt, ester, solvate, stereoisomer, tautomer, or prodrug thereof, thereby preventing, delaying the onset of, or treating the infection or the disease.

Disclosed herein include methods for preventing, delaying the onset of, or treating an inflammatory effect of an infection or a disease caused by a RNA virus. In some embodiments, the method comprises administering to a subject in need thereof a composition comprising a compound selected from the compounds listed in Tables 1-6, or a pharmaceutically acceptable salt, ester, solvate, stereoisomer, tautomer, or prodrug thereof, thereby preventing, delaying the onset of, or treating the inflammatory effect.

Disclosed herein include methods for preventing, delaying the onset of, or treating an infection or a disease caused by a RNA virus. In some embodiments, the method comprises administering to a subject in need thereof a composition comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, thereby preventing, delaying the onset of, or treating the infection or the disease.

Disclosed herein include methods for preventing, delaying the onset of, or treating an inflammatory effect of an infection or a disease caused by a RNA virus. In some embodiments, the method comprises: administering to a subject in need thereof a composition comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, thereby preventing, delaying the onset of, or treating the inflammatory effect.

The inflammatory effect can comprise respiratory failure, a sequela of respiratory failure, acute lung injury, or acute respiratory distress syndrome. The sequela of respiratory failure can comprise multi-organ failure. As used herein, the terms "inflammation" and "inflammatory response" shall be given their ordinary meaning, and also include immune-related responses and/or allergic reactions to a physical, chemical, or biological stimulus. Measuring inflammation (e.g. lung inflammation) can comprise measuring the level of a pro-inflammatory cytokine, an anti-inflammatory cytokine, or a combination of pro-inflammatory cytokines and anti-inflammatory cytokines. Inflammation (e.g. lung inflammation) can comprise mast cell degranulation, plasma extravasation, and bronchoconstriction. Administering the composition can result in an at least, or at least about, 2% (e.g., 2%, 3%, 4%, 5%, 6%, 7%, 8%, 9%, 10%, 11%, 12%, 13%, 14%, 15%, 16%, 17%, 18%, 19%, 20%, 25%, 30%, 40%, 50%, 75%, 100%, 150%, 200%, 250%, 500%, 1000%, or higher and overlapping ranges therein) reduction of one or more of mast cell degranulation, plasma extravasation, and bronchoconstriction. In some embodiments of the methods and compositions provided herein, lymphopenia and/or mononuclear cell infiltration in the lungs is reduced by at least, or at least about, 2% (e.g., 2%, 3%, 4%, 5%, 6%, 7%, 8%, 9%, 10%, 11%, 12%, 13%, 14%, 15%, 16%, 17%, 18%, 19%, 20%, 25%, 30%, 40%, 50%, 75%, 100%, 150%, 200%, 250%, 500%, 1000%, or higher and overlapping ranges therein).

A pro-inflammatory cytokine or a pro-inflammatory mediator can be an immuno-regulatory cytokine that favor inflammation. Pro-inflammatory cytokines that are generally responsible for early immune responses include IL-1, IL-6, and TNF-α. IL-1, IL-6, and TNF-α are also considered endogenous pyrogens as they contribute to increasing body temperature. Other examples of pro-inflammatory cytokines or pro-inflammatory mediators include IL-8, IL-11, IL-12, IL-18, GM-CSF, IFN-γ, TGF-β, leukemia inhibitory factors (LIF), oncostatin M (OSM), and a variety of chemokines that attract inflammatory cells. A pro-inflammatory cytokine generally up-regulates or increases the synthesis of secondary pro-inflammatory mediators and other pro-inflammatory cytokines by immune cells. In addition, pro-inflammatory cytokines can stimulate production of acute phase proteins that mediate inflammation and attract inflammatory cells.

The method can comprise an at least, or at least about, 2-fold (e.g., 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, or a number or a range between any of these values) reduction in the level of one or more of interferon-γ (IFNγ), IL-1, IL-6, transforming growth factor-α (TGFα), transforming growth factor-β (TGFβ), CCL2, CXCL10, IL-11, IL-12, IL-18, GM-CSF, CXCL9 and IL-8 in the subject. The compositions and methods provided herein can reduce the production and/or amount of a pro-inflammatory cytokine and/or a pro-inflammatory mediator in the lung and/or serum by at least, or at least about, 2% (e.g., 2%, 3%, 4%, 5%, 6%, 7%, 8%, 9%, 10%, 11%, 12%, 13%, 14%, 15%, 16%, 17%, 18%, 19%, 20%, 25%, 30%, 40%, 50%, 75%, 100%, 150%, 200%, 250%, 500%, 1000%, or higher and overlapping ranges therein) compared to if the methods and compositions are not used.

The composition can comprise a therapeutically or prophylactically effective amount of one or more compounds disclosed herein. The subject in need can be a subject that can be suffering from the infection or the disease, or a subject that can be at a risk for the infection or the disease. The infection or the disease can be in the respiratory tract of the subject. The subject can have been exposed to the RNA virus, can be suspected to have been exposed to the RNA virus, or can be at a risk of being exposed to the RNA virus. The subject can be a mammal. The subject can be a human.

In some embodiments, the RNA virus can be a double-stranded RNA virus. The RNA virus can be a positive-sense single-stranded RNA virus. The positive-sense single-stranded RNA virus can be a coronavirus. The coronavirus can be an alpha coronavirus, a beta coronavirus, a gamma coronavirus, or a delta coronavirus. The coronavirus can be Middle East respiratory coronavirus (MERS-CoV), severe acute respiratory syndrome coronavirus (SARS-CoV), or SARS-CoV-2. The infection or a disease caused by the RNA virus can be common cold, influenza, SARS, coronaviruses, COVID-19, hepatitis C, hepatitis E, West Nile fever, Ebola virus disease, rabies, polio, or measles.

The method can comprise administering to the subject one or more additional antiviral agents. At least one of the one or more additional antiviral agents can be co-administered to the subject with the composition. At least one of the one or more additional antiviral agents can be administered to the subject before the administration of the composition, after the administration of the composition, or both. The composition can comprise one or more additional therapeutic agents. The one or more additional therapeutic agents comprise one or more antiviral agents. The antiviral agent can be selected from the group consisting of a nucleoside or a non-nucleoside analogue reverse-transcriptase inhibitor, a nucleotide analogue reverse-transcriptase inhibitor, a NS3/4A serine protease inhibitor, a NS5B polymerase inhibitor, and interferon alpha.

The composition can be a pharmaceutical composition comprising a disclosed compound and one or more pharmaceutically acceptable excipients. The composition can be administered to the subject by intravenous administration, nasal administration, pulmonary administration, oral administration, parenteral administration, or nebulization. The composition can be aspirated into at least one lung of the subject. The composition can be in the form of powder, pill, tablet, microtablet, pellet, micropellet, capsule, capsule containing microtablets, liquid, aerosols, or nanoparticles. The composition can be in a formulation for administration to the lungs. The compounds of the disclosure (e.g. a compound listed in Tables 1-6, or a pharmaceutically acceptable salt, ester, solvate, stereoisomer, tautomer, or prodrug thereof) can also be used prophylactically for preventing, delaying the onset of, or treating an infection or a disease or inflammation caused by a RNA virus. The prophylactically effective amount of a compound of the disclosure can be any therapeutically effective amount of a compound described herein.

The compounds of the disclosure (e.g. a compound listed in Tables 1-6, or a pharmaceutically acceptable salt, ester, solvate, stereoisomer, tautomer, or prodrug thereof) can be administered via any suitable route. Potential routes of administration of a disclosed compound include without limitation oral, parenteral (including intramuscular, subcutaneous, intradermal, intravascular, intravenous, intraarterial, intramedullary and intrathecal), intracavitary, intraperitoneal, and topical (including dermal/epicutaneous, transdermal, mucosal, transmucosal, intranasal [e.g., by nasal spray or drop], intraocular [e.g., by eye drop], pulmonary [e.g., by oral or nasal inhalation], buccal, sublingual, rectal and vaginal). In certain embodiments, a disclosed compound is administered orally (e.g., as a capsule or tablet, optionally with an enteric coating). In other embodiments, a disclosed compound is administered parenterally (e.g., intravenously, subcutaneously or intradermally). In further embodiments, a disclosed compound is administered topically (e.g., dermally/epicutaneously, transdermally, mucosally, transmucosally, buccally or sublingually).

In additional embodiments, a disclosed compound is administered without food. In some embodiments, a disclosed compound is administered at least about 1 or 2 hours before or after a meal. In certain embodiments, a disclosed compound is administered at least about 2 hours after an evening meal. The compound disclosed herein can also be taken substantially concurrently with food (e.g., within about 0.5, 1 or 2 hours before or after a meal, or with a meal).

The composition can be administered to the subject once, twice, or three times a day. The composition can be administered to the subject once every day, every two days, or every three days. The composition can be administered to the subject over the course of at least two weeks, at least three weeks, at least four weeks, or at least five weeks. The therapeutically effective amount and the frequency of administration of, and the length of treatment with, a disclosed compound may depend on various factors, including the nature and the severity of the lung inflammation and/or infection/disease, the potency of the compound, the mode of administration, the age, the body weight, the general health, the gender and the diet of the subject, and the response of the subject to the treatment, and can be determined by the treating physician. In some embodiments, a disclosed compound (e.g., a compound listed in Tables 1-6, or a pharmaceutically acceptable salt, ester, solvate, stereoisomer, tautomer, or prodrug thereof) is administered under a chronic dosing regimen. In certain embodiments, a therapeutically effective amount of a disclosed compound is administered over a period of at least about 6 weeks, 2 months, 10 weeks, 3 months, 4 months, 5 months, 6 months, 1 year, 1.5 years, 2 years, 3 years or longer (e.g., at least about 6 weeks, 2 months, 3 months or 6 months).

A disclosed compound can also be used prophylactically to for preventing, delaying the onset of, or treating an infection or a disease or inflammation caused by a RNA virus. The prophylactically effective amount of a disclosed compound can be any therapeutically effective amount of a compound described herein.

Administrating the composition can result in reduction of the viral titer of the RNA virus in the subject as compared to that in the subject before administration of the composition. The method can comprise determining global virus distribution in the lungs of the subject. The method can comprise measuring the viral titer of the RNA virus in the subject before administering the composition to the subject, after administering the composition to the subject, or both. The viral titer can be lung bulk virus titer.

The method can comprise measuring a neutrophil density within the lungs of the subject. Administering the composition can result in reduction of the neutrophil density within the lungs of the subject as compared to that in the subject before administration of the composition. Administering the composition can result in an at least, or at least about, 2% (e.g., 2%, 3%, 4%, 5%, 6%, 7%, 8%, 9%, 10%, 11%, 12%, 13%, 14%, 15%, 16%, 17%, 18%, 19%, 20%, 25%, 30%, 40%, 50%, 75%, 100%, 150%, 200%, 250%, 500%, 1000%, or higher and overlapping ranges therein) reduction of the neutrophil density within the lungs of the subject as compared to that in the subject before administration of the composition.

The method can comprise measuring a total necrotized cell count within the lungs of the subject. Administering the composition can result in reduction of the total necrotized cell count in the subject as compared to that in the subject before administration of the composition. The method can comprise measuring a total protein level within the lungs of the subject. Administering the composition can result in reduction of the total protein level within the lungs of the subject as compared to that in the subject before administration of the composition. In some embodiments, administering the composition results in an at least, or at least about, 2% (e.g., 2%, 3%, 4%, 5%, 6%, 7%, 8%, 9%, 10%, 11%, 12%, 13%, 14%, 15%, 16%, 17%, 18%, 19%, 20%, 25%, 30%, 40%, 50%, 75%, 100%, 150%, 200%, 250%, 500%, 1000%, or higher and overlapping ranges therein) reduction of the total protein level within the lungs of the subject as compared to that in the subject before administration of the composition.

Combination Therapy

Disclosed herein include methods for preventing, delaying the onset of, or treating an infection or a disease caused by a RNA virus. In some embodiments, the method comprises administering to a subject in need thereof a first compound selected from the compounds listed in Tables 1-6, or a pharmaceutically salt, ester, solvate, stereoisomer, tautomer, or prodrug thereof, and a second compound selected from the compounds listed in Tables 1-6, or a pharmaceutically salt, ester, solvate, stereoisomer, tautomer, or prodrug thereof, thereby preventing, delaying the onset of, or treating the inflammatory effect, wherein the first compound and the second compound are different.

Disclosed herein include methods for preventing, delaying the onset of, or treating an inflammatory effect of an infection or a disease caused by a RNA virus. In some embodiments, the method comprises administering to a subject in need thereof a first compound selected from the compounds listed in Tables 1-6, or a pharmaceutically salt, ester, solvate, stereoisomer, tautomer, or prodrug thereof, and a second compound selected from the compounds listed in Tables 1-6, or a pharmaceutically acceptable salt, ester, solvate, stereoisomer, tautomer, or prodrug thereof, thereby preventing, delaying the onset of, or treating the inflammatory effect, wherein the first compound and the second compound are different.

Disclosed herein include methods for preventing, delaying the onset of, or treating an infection or a disease caused by a RNA virus. In some embodiments, the method comprises administering to a subject in need thereof a first compound selected from the group comprising Tocladesine, PRX-07034, AZD-5991, Berzosertib, Pipendoxifene, Bazedoxifene, R-428, or a pharmaceutically salt, ester, solvate, stereoisomer tautomer or prodrug thereof, and a second compound selected from the group comprising Tocladesine, PRX-07034, AZD-5991, Berzosertib, Pipendoxifene, Bazedoxifene, R-428, or a pharmaceutically salt, ester, solvate, stereoisomer, tautomer, or prodrug thereof, thereby preventing, delaying the onset of, or treating the inflammatory effect, wherein the first compound and the second compound are different.

Disclosed herein include methods for preventing, delaying the onset of, or treating an inflammatory effect of an infection or a disease caused by a RNA virus. In some embodiments, the method comprises administering to a subject in need thereof a first compound selected from the group comprising Tocladesine, PRX-07034, AZD-5991, Berzosertib, Pipendoxifene, Bazedoxifene, R-428, or a pharmaceutically salt, ester, solvate, stereoisomer tautomer or prodrug thereof, and a second compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, thereby preventing, delaying the onset of, or treating the inflammatory effect, wherein the first compound and the second compound are different.

As disclosed herein, co-administration of particular ratios and/or amounts of a disclosed compound and one or more additional therapeutic agents (e.g., antiviral agents) can result in synergistic effects with regards to preventing, delaying the onset of, or treating an infection or a disease or inflammation caused by a RNA virus. These synergistic effects can be such that the one or more effects of the combination compositions are greater than the one or more effects of each component alone at a comparable dosing level, or they can be greater than the predicted sum of the effects of all of the components at a comparable dosing level, assuming that each component acts independently. The synergistic effect can be, be about, be greater than, or be greater than about, 5, 10, 20, 30, 50, 75, 100, 110, 120, 150, 200, 250, 350, or 500% better than the effect of treating a subject with one of the components alone, or the additive effects of each of the components when administered individually. The effect can be any of the measurable effects described herein. The composition comprising a plurality of components can be such that the synergistic effect is and that is reduced to a greater degree as compared to the sum of the effects of administering each component, determined as if each component exerted its effect independently, also referred to as the predicted additive effect herein. For example, if a composition comprising component (a) yields an effect of a 20% reduction in lung inflammation and a composition comprising component (b) yields an effect of 50% reduction in lung inflammation, then a composition comprising both component (a) and component (b) would have a synergistic effect if the combination composition's effect on lung inflammation was greater than 70%.

A synergistic combination composition can have an effect that is greater than the predicted additive effect of administering each component of the combination composition alone as if each component exerted its effect independently. For example, if the predicted additive effect is 70%, an actual effect of 140% is 70% greater than the predicted additive effect or is 1 fold greater than the predicted additive effect. The synergistic effect can be at least, or at least about, 20, 50, 75, 90, 100, 150, 200 or 300% greater than the predicted additive effect. In some embodiments, the synergistic effect can be at least, or at least about, 0.2, 0.5, 0.9, 1.1, 1.5, 1.7, 2, or 3 fold greater than the predicted additive effect.

In some embodiments, the synergistic effect of the combination compositions can also allow for reduced dosing amounts, leading to reduced side effects to the subject and reduced cost of treatment. Furthermore, the synergistic effect can allow for results that are not achievable through any other treatments. Therefore, proper identification, specification, and use of combination compositions can allow for significant improvements. The inflammatory effect can comprise respiratory failure, a sequela of respiratory failure, acute lung injury, or acute respiratory distress syndrome. The sequela of respiratory failure can comprise multi-organ failure.

The first compound can be selected from the compounds listed in Table 1, and the second compound can be selected from the compounds listed in Table 2. The first compound can be selected from the compounds listed in Table 1, and the second compound can be selected from the compounds listed in Table 3. The first compound can be selected from the compounds listed in Table 1, and the second compound can be selected from the compounds listed in Table 4. The first compound can be selected from the compounds listed in Table 1, and the second compound can be selected from the compounds listed in Table 5. The first compound can be selected from the compounds listed in Table 1, and the second compound can be selected from the compounds listed in Table 6. The first compound can be selected from the compounds listed in Table 2, and the second compound can be selected from the compounds listed in Table 3. The first compound can be selected from the compounds listed in Table 2, and the second compound can be selected from the compounds listed in Table 4. The first compound can be selected from the compounds listed in Table 2, and the second compound can be selected from the compounds listed in Table 5. The first compound can be selected from the compounds listed in Table 2, and the second compound can be selected from the compounds listed in Table 6. The first compound can be selected from the compounds listed in Table 3, and the second compound can be selected from the compounds listed in Table 4. The first compound can be selected from the compounds listed in Table 3, and the second compound can be selected from the compounds listed in Table 5. The first compound can be selected from the compounds listed in Table 3, and the second compound can be selected from the compounds listed in Table 6. The first compound can be selected from the compounds listed in Table 4, and the second compound can be selected from the compounds listed in Table 5. The first compound can be selected from the compounds listed in Table 4, and the second compound can be selected from the compounds listed in Table 6. The first compound can be selected from the compounds listed in Table 5, and the second compound can be selected from the compounds listed in Table 6. The first compound can comprise one or more of Tocladesine, Pipendoxifene, or Bazedoxifene, and the second compound can comprise one or more of PRX-07034, AZD-5991, Berzosertib, or R-428.

The method can comprise administering to the subject a third compound selected from the compounds listed in Tables 1-6, or a pharmaceutically acceptable salt, ester, solvate, stereoisomer, tautomer, or prodrug thereof, wherein the first, second and third compounds are different. The first compound can be selected from the compounds listed in Table 1, the second compound can be selected from the compounds listed in Table 2, and the third compound can be selected from the compounds listed in Table 3. The first compound can be selected from the compounds listed in Table 1, the second compound can be selected from the compounds listed in Table 2, and the third compound can be selected from the compounds listed in Table 4. The first compound can be selected from the compounds listed in Table 1, the second compound can be selected from the compounds listed in Table 2, and the third compound can be selected from the compounds listed in Table 5. The first compound can be selected from the compounds listed in Table 1, the second compound can be selected from the compounds listed in Table 2, and the third compound can be selected from the compounds listed in Table 6. The first compound can be selected from the compounds listed in Table 1, the second compound can be selected from the compounds listed in Table 3, and the third compound can be selected from the compounds listed in Table 4. The first compound can be selected from the compounds listed in Table 1, the second compound can be selected from the compounds listed in Table 3, and the third compound can be selected from the compounds listed in Table 5. The first compound can be selected from the compounds listed in Table 1, the second compound can be selected from the compounds listed in Table 3, and the third compound can be selected from the compounds listed in Table 6. The first compound can be selected from the compounds listed in Table 1, the second compound can be selected from the compounds listed in Table 4, and the third compound can be selected from the compounds listed in Table 5. The first compound can be selected from the compounds listed in Table 1, the second compound can be selected from the compounds listed in Table 4, and the third compound can be selected from the compounds listed in Table 6. The first compound can be selected from the compounds listed in Table 1, the second compound can be selected from the compounds listed in Table 5, and the third compound can be selected from the compounds listed in Table 6.

The first compound can be selected from the compounds listed in Table 2, the second compound can be selected from the compounds listed in Table 3, and the third compound can be selected from the compounds listed in Table 4. The first compound can be selected from the compounds listed in Table 2, the second compound can be selected from the compounds listed in Table 3, and the third compound can be selected from the compounds listed in Table 5. The first compound can be selected from the compounds listed in Table 2, the second compound can be selected from the compounds listed in Table 3, and the third compound can be selected from the compounds listed in Table 6. The first compound can be selected from the compounds listed in Table 2, the second compound can be selected from the compounds listed in Table 4, and the third compound can be selected from the compounds listed in Table 5. The first compound can be selected from the compounds listed in Table 2, the second compound can be selected from the compounds listed in Table 4, and the third compound can be selected from the compounds listed in Table 6. The first compound can be selected from the compounds listed in Table 2, the second compound can be selected from the compounds listed in Table 5, and the third compound can be selected from the compounds listed in Table 6.

The first compound can be selected from the compounds listed in Table 3, the second compound can be selected from the compounds listed in Table 4, and the third compound can be selected from the compounds listed in Table 5. The first compound can be selected from the compounds listed in Table 3, the second compound can be selected from the compounds listed in Table 4, and the third compound can be selected from the compounds listed in Table 6. The first compound can be selected from the compounds listed in Table 3, the second compound can be selected from the compounds listed in Table 5, and the third compound can be selected from the compounds listed in Table 6. The first compound can be selected from the compounds listed in Table 4, the second compound can be selected from the compounds listed in Table 5, and the third compound can be selected from the compounds listed in Table 6.

The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 1. The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 2. The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 3. The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 4. The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 5. The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 6.

The first compound, the second compound, and/or the third compound can be administered in a therapeutically or prophylactically effective amount. The subject in need thereof can be a subject that can be suffering from the infection or the disease, or a subject that can be at a risk for the infection or the disease. The infection or the disease can be in the respiratory tract of the subject. The subject can have been exposed to the RNA virus, can be suspected to have been exposed to the RNA virus, or can be at a risk of being exposed to the RNA virus. The subject can be a mammal. The subject can be a human.

The RNA virus can be a double-stranded RNA virus. The RNA virus can be a positive-sense single-stranded RNA virus. The coronavirus can be an alpha coronavirus, a beta coronavirus, a gamma coronavirus, or a delta coronavirus. The coronavirus can be Middle East respiratory coronavirus (MERS-CoV), severe acute respiratory syndrome coronavirus (SARS-CoV), or SARS-CoV-2. The infection or a disease caused by the RNA virus can be common cold, influenza, SARS, coronaviruses, COVID-19, hepatitis C, hepatitis E, West Nile fever, Ebola virus disease, rabies, polio, or measles.

The first, second and/or third compound can be in a pharmaceutical composition comprising one or more pharmaceutically acceptable excipients. The method can comprise administering to the subject one or more additional therapeutic agents. The therapeutic agent can be selected from the group consisting of a nucleoside or a non-nucleoside analogue reverse-transcriptase inhibitor, a nucleotide analogue reverse-transcriptase inhibitor, a NS3/4A serine protease inhibitor, a NS5B polymerase inhibitor, and interferon alpha. At least one of the one or more additional therapeutic agents can be administered to the subject before the administration of the first, second or third compound; after the administration of the first, second or third compound; or both.

At least two of the first, second and third compounds can be co-administered in a single composition or in separate compositions to the subject. The first, second and third compounds can be co-administered in a single composition or in separate compositions to the subject. The first, second and/or third compound can be administered to the subject by intravenous administration, nasal administration, pulmonary administration, oral administration, parenteral administration, nebulization, or a combination thereof. The first, second and/or third compound can be aspirated into at least one lung of the subject.

At least one of the first, second and third compounds can be in a composition in the form of powder, pill, tablet, microtablet, pellet, micropellet, capsule, capsule containing microtablets, liquid, aerosols, or nanoparticles. At least one of the first, second and third compounds can be in a composition in a formulation for administration to the lungs.

At least one of the first, second and third compounds can be administered to the subject once, twice, or three times a day. At least one of the first, second and third compounds can be administered to the subject once every day, every two days, or every three days. At least one of the first, second and third compounds can be administered to the subject over the course of at least two weeks, at least three weeks, at least four weeks, or at least five weeks.

The method can comprise measuring the viral titer of the RNA virus in the subject before administering the first, second and/or the third compound to the subject, after administering the first, second and/or the third compound to the subject, or both. The viral titer can be lung bulk virus titer. Administrating the first, second and/or the third compound can result in reduction of the viral titer of the RNA virus in the subject as compared to that in the subject before administration of the first, second and/or the third compound. The method can comprise determining global virus distribution in the lungs of the subject.

The method can comprise measuring a neutrophil density within the lungs of the subject.

Administering the first, second and/or the third compound can result in reduction of the neutrophil density within the lungs of the subject as compared to that in the subject before administration of the first, second and/or the third compound. The method can comprise measuring a total necrotized cell count within the lungs of the subject. Administering the first, second and/or the third compound can result in reduction of the total necrotized cell count in the subject as compared to that in the subject before administration of the first, second and/or the third compound.

The method can comprise measuring a total protein level within the lungs of the subject. Administering the first, second and/or the third compound can result in reduction of the total protein level within the lungs of the subject as compared to that in the subject before administration of the first, second and/or the third compound.

Kits and Compositions

Disclosed herein include kits comprising a first compound selected from the compounds listed in Tables 1-6, or a pharmaceutically acceptable salt, solvate, stereoisomer thereof, and a label indicating that the kit is for preventing, delaying the onset of, or treating an infection or a disease caused by a RNA virus.

Disclosed herein include kits comprising a first compound selected from the compounds listed in Tables 1-6, or a pharmaceutically acceptable salt, solvate, stereoisomer thereof, and a label indicating that the kit is for preventing, delaying the onset of, or treating an inflammatory effect of an infection or a disease caused by a RNA virus.

Disclosed herein include kits comprising a first compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof; and a label indicating that the kit is for preventing, delaying the onset of, or treating an infection or a disease caused by a RNA virus.

Disclosed herein include kits comprising a first compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof; and a label indicating that the kit is for preventing, delaying the onset of, or treating an inflammatory effect of an infection or a disease caused by a RNA virus.

The kit can comprise a second compound selected from the compounds listed in Tables 1-6, or a pharmaceutically acceptable salt, ester, solvate, stereoisomer, tautomer, or prodrug thereof, wherein the first compound and the second compound is different. The first compound can be selected from the compounds listed in Table 1, and the second compound can be selected from the compounds listed in Table 2. The first compound can be selected from the compounds listed in Table 1, and the second compound can be selected from the compounds listed in Table 3. The first compound can be selected from the compounds listed in Table 1, and the second compound can be selected from the compounds listed in Table 4. The first compound can be selected from the compounds listed in Table 1, and the second compound can be selected from the compounds listed in Table 5. The first compound can be selected from the compounds listed in Table 1, and the second compound can be selected from the compounds listed in Table 6.

The first compound can be selected from the compounds listed in Table 2, and the second compound can be selected from the compounds listed in Table 3; The first compound can be selected from the compounds listed in Table 2, and the second compound can be selected from the compounds listed in Table 4. The first compound can be selected from the compounds listed in Table 2, and the second compound can be selected from the compounds listed in Table 5. The first compound can be selected from the compounds listed in Table 2, and the second compound can be selected from the compounds listed in Table 6.

The first compound can be selected from the compounds listed in Table 3, and the second compound can be selected from the compounds listed in Table 4. The first compound can be selected from the compounds listed in Table 3, and the second compound can be selected from the compounds listed in Table 5. The first compound can be selected from the compounds listed in Table 3, and the second compound can be selected from the compounds listed in Table 6.

The first compound can be selected from the compounds listed in Table 4, and the second compound can be selected from the compounds listed in Table 5. The first compound can be selected from the compounds listed in Table 4, and the second compound can be selected from the compounds listed in Table 6. The first compound can be selected from the compounds listed in Table 5, and the second compound can be selected from the compounds listed in Table 6.

The kit can comprise a second compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, wherein the first compound and the second compound is different.

The kit can comprise a third compound selected from the compounds listed in Tables 1-6, or a pharmaceutically acceptable salt, solvate, stereoisomer, tautomer, or prodrug thereof, wherein the first, second and third compound are different. The first compound can be selected from the compounds listed in Table 1, the second compound can be selected from the compounds listed in Table 2, and the third compound can be selected from the compounds listed in Table 3. The first compound can be selected from the compounds listed in Table 1, the second compound can be selected from the compounds listed in Table 2, and the third compound can be selected from the compounds listed in Table 4. The first compound can be selected from the compounds listed in Table 1, the second compound can be selected from the compounds listed in Table 2, and the third compound can be selected from the compounds listed in Table 5. The first compound can be selected from the compounds listed in Table 1, the second compound can be selected from the compounds listed in Table 2, and the third compound can be selected from the compounds listed in Table 6. The first compound can be selected from the compounds listed in Table 1, the second compound can be selected from the compounds listed in Table 3, and the third compound can be selected from the compounds listed in Table 4. The first compound can be selected from the compounds listed in Table 1, the second compound can be selected from the compounds listed in Table 3, and the third compound can be selected from the compounds listed in Table 5. The first compound can be selected from the compounds listed in Table 1, the second compound can be selected from the compounds listed in Table 3, and the third compound can be selected from the compounds listed in Table 6. The first compound can be selected from the compounds listed in Table 1, the second compound can be selected from the compounds listed in Table 4, and the third compound can be selected from the compounds listed in Table 5. The first compound can be selected from the compounds listed in Table 1, the second compound can be selected from the compounds listed in Table 4, and the third compound can be selected from the compounds listed in Table 6. The first compound can be selected from the compounds listed in Table 1, the second compound can be selected from the compounds listed in Table 5, and the third compound can be selected from the compounds listed in Table 6.

The first compound can be selected from the compounds listed in Table 2, the second compound can be selected from the compounds listed in Table 3, and the third compound can be selected from the compounds listed in Table 4. The first compound can be selected from the compounds listed in Table 2, the second compound can be selected from the compounds listed in Table 3, and the third compound can be selected from the compounds listed in Table 5. The first compound can be selected from the compounds listed in Table 2, the second compound can be selected from the compounds listed in Table 3, and the third compound can be selected from the compounds listed in Table 6. The first compound can be selected from the compounds listed in Table 2, the second compound can be selected from the compounds listed in Table 4, and the third compound can be selected from the compounds listed in Table 5. The first compound can be selected from the compounds listed in Table 2, the second compound can be selected from the compounds listed in Table 4, and the third compound can be selected from the compounds listed in Table 6. The first compound can be selected from the compounds listed in Table 2, the second compound can be selected from the compounds listed in Table 5, and the third compound can be selected from the compounds listed in Table 6. The first compound can be selected from the compounds listed in Table 3, the second compound can be selected from the compounds listed in Table 4, and the third compound can be selected from the compounds listed in Table 5. The first compound can be selected from the compounds listed in Table 3, the second compound can be selected from the compounds listed in Table 4, and the third compound can be selected from the compounds listed in Table 6. The first compound can be selected from the compounds listed in Table 3, the second compound can be selected from the compounds listed in Table 5, and the third compound can be selected from the compounds listed in Table 6.

The first compound can be selected from the compounds listed in Table 4, the second compound can be selected from the compounds listed in Table 5, and the third compound can be selected from the compounds listed in Table 6.

The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 1. The first compound can comprise one or more Tocladesine, Pipendoxifene, or Bazedoxifene, the second compound can comprise one or more of PRX-07034, AZD-5991, Berzosertib, or R-428, and the third compound can be selected from the compounds listed in Table 2. The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 3. The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 4. The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 5. The first compound can comprise one or more of Tocladesine, Pipendoxifene, or Bazedoxifene, the second compound can comprise one or more of PRX-07034, AZD-5991, Berzosertib, or R-428, and the third compound can be selected from the compounds listed in Table 6.

The RNA virus can be a coronavirus. The coronavirus can be Middle East respiratory coronavirus (MERS-CoV), severe acute respiratory syndrome coronavirus (SARS-CoV), or SARS-CoV-2.

Disclosed herein include compositions comprising a compound selected from the compounds listed in Tables 1-6, or a pharmaceutically acceptable salt, ester, solvate, stereoisomer, tautomer, or prodrug thereof, for use in preventing, delaying the onset of, or treating an infection or a disease caused by a RNA virus.

Disclosed herein include compositions comprising a compound selected from the compounds listed in Tables 1-6, or a pharmaceutically acceptable salt, ester, solvate, stereoisomer, tautomer, or prodrug thereof, for use in preventing, delaying the onset of, or treating an inflammatory effect of an infection or a disease caused by a RNA virus.

Disclosed herein include compositions comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, for use in preventing, delaying the onset of, or treating an infection or a disease caused by a RNA virus.

Disclosed herein include compositions comprising a compound selected from the group comprising Tocladesine, PRX-07034, AZD-5991, Berzosertib, Pipendoxifene, Bazedoxifene, R-428, or a pharmaceutically acceptable salt, ester, solvate, stereoisomer, tautomer, or prodrug thereof, for use in preventing, delaying the onset of, or treating an inflammatory effect of an infection or a disease caused by a RNA virus.

The inflammatory effect can comprise respiratory failure, a sequela of respiratory failure, acute lung injury, or acute respiratory distress syndrome. The sequela of respiratory failure can comprise multi-organ failure. The composition can comprise a therapeutically or prophylactically effective amount of the compound.

The therapeutically effective amount and the frequency of administration of, and the length of treatment with, a disclosed compound (e.g., a compound listed in Tables 1-6, or a pharmaceutically acceptable salt, ester, solvate, stereoisomer, tautomer, or prodrug thereof) may depend on various factors, including the nature and the severity of the lung inflammation and/or infection/disease, the potency of a disclosed compound (e.g., a compound listed in Tables 1-6, or a pharmaceutically acceptable salt, ester, solvate, stereoisomer, tautomer, or prodrug thereof), the mode of administration, the age, the body weight, the general health, the gender and the diet of the subject, and the response of the subject to the treatment, and can be determined by the treating physician. In some embodiments, a therapeutically effective amount of a disclosed compound (e.g., a compound listed in Tables 1-6, or a pharmaceutically acceptable salt, ester, solvate, stereoisomer, tautomer, or prodrug thereof) for treating or preventing lung inflammation, an infection, and/or a disease as described herein is about 0.1-200 mg, 0.1-150 mg, 0.1-100 mg, 0.1-50 mg, 0.1-30 mg, 0.5-20 mg, 0.5-10 mg or 1-10 mg (e.g., per day or per dose), or as deemed appropriate by the treating physician, which can be administered in a single dose or in divided doses. In certain embodiments, the therapeutically effective dose (e.g., per day or per dose) of a disclosed compound (e.g., a compound listed in Tables 1-6, or a pharmaceutically acceptable salt, ester, solvate, stereoisomer, tautomer, or prodrug thereof) for treating or preventing lung inflammation, an infection, and/or a disease as described herein is about 0.1-1 mg (e.g., about 0.1 mg, 0.5 mg or 1 mg), about 1-5 mg (e.g., about 1 mg, 2 mg, 3 mg, 4 mg or 5 mg), about 5-10 mg (e.g., about 5 mg, 6 mg, 7 mg, 8 mg, 9 mg or 10 mg), about 10-20 mg (e.g., about 10 mg, 15 mg or 20 mg), about 20-30 mg (e.g., about 20 mg, 25 mg or 30 mg), about 30-40 mg (e.g., about 30 mg, 35 mg or 40 mg), about 40-50 mg (e.g., about 40 mg, 45 mg or 50 mg), about 50-100 mg (e.g., about 50 mg, 60 mg, 70 mg, 80 mg, 90 mg or 100 mg), about 100-150 mg (e.g., about 100 mg, 125 mg or 150 mg), about 150-200 mg (e.g., about 150 mg, 175 mg or 200 mg), about 200-300 mg (e.g., about 200 mg, 220 mg, 240 mg, 260 mg, 280 mg, or 300 mg), about 300-400 mg (e.g., about 300 mg, 320 mg, 340 mg, 360 mg, 380 mg, or 400 mg), about 400-500 mg (e.g., about 400 mg, 420 mg, 440 mg, 460 mg, 480 mg, or 500 mg), about 500-600 mg (e.g., about 500 mg, 520 mg, 540 mg, 560 mg, 580 mg, or 600 mg), or about 600-700 mg (e.g., about 600 mg, 620 mg, 640 mg, 660 mg, 680 mg, or 700 mg). In some embodiments, one or more of the disclosed compounds (e.g., a compound listed in Tables 1-6, or a pharmaceutically acceptable salt, ester, solvate, stereoisomer, tautomer, or prodrug thereof) is administered for treating or preventing lung inflammation, an infection, and/or a disease as described herein at a daily dose, weekly dose, and/or monthly dose of about 0.1-1 mg (e.g., about 0.1 mg, 0.5 mg or 1 mg), about 1-5 mg (e.g., about 1 mg, 2 mg, 3 mg, 4 mg or 5 mg), about 5-10 mg (e.g., about 5 mg, 6 mg, 7 mg, 8 mg, 9 mg or 10 mg), about 10-20 mg (e.g., about 10 mg, 15 mg or 20 mg), about 20-30 mg (e.g., about 20 mg, 25 mg or 30 mg), about 30-40 mg (e.g., about 30 mg, 35 mg or 40 mg), about 40-50 mg (e.g., about 40 mg, 45 mg or 50 mg), about 50-100 mg (e.g., about 50 mg, 60 mg, 70 mg, 80 mg, 90 mg or 100 mg), about 100-150 mg (e.g., about 100 mg, 125 mg or 150 mg), about 150-200 mg (e.g., about 150 mg, 175 mg or 200 mg), about 200-300 mg (e.g., about 200 mg, 220 mg, 240 mg, 260 mg, 280 mg, or 300 mg), about 300-400 mg (e.g., about 300 mg, 320 mg, 340 mg, 360 mg, 380 mg, or 400 mg), about 400-500 mg (e.g., about 400 mg, 420 mg, 440 mg, 460 mg, 480 mg, or 500 mg), about 500-600 mg (e.g., about 500 mg, 520 mg, 540 mg, 560 mg, 580 mg, or 600 mg), or about 600-700 mg (e.g., about 600 mg, 620 mg, 640 mg, 660 mg, 680 mg, or 700 mg). The daily dose, weekly dose, and/or monthly dose of the disclosed compounds can comprise a single administration (e.g., a weekly dose can administered once per week) or multiple administrations. In some embodiments, the dosing regimen comprises administering one or more loading doses and one or more maintenance doses. The term "loading dose" shall be given its ordinary meaning, and shall also refer to a single dose or short duration regimen of a multiple doses having a dosage higher than one or more maintenance doses. A loading dose can, for example, rapidly increase the blood concentration level of disclosed compounds. In some embodiments, the loading dose can increase the blood concentration of a compound to a therapeutically effective level in conjunction with a maintenance dose of the compound. The loading dose can be administered once per day, or more than once per day (e.g., up to 4 times per day). The term "maintenance dose" as used herein shall be given its ordinary meaning, and shall also refer to a dose that is serially administered (e.g., at least twice) which is intended to either slowly raise blood concentration levels of a disclosed compound to a therapeutically effective level, or to maintain such a therapeutically effective level. The daily dose of the maintenance dose can lower than the total daily dose of the loading dose.

The RNA virus can be a double-stranded RNA virus. The RNA virus can be a positive-sense single-stranded RNA virus. The positive-sense single-stranded RNA virus can be a coronavirus. The coronavirus can be an alpha coronavirus, a beta coronavirus, a gamma coronavirus, or a delta coronavirus. The coronavirus can be Middle East respiratory coronavirus (MERS-CoV), severe acute respiratory syndrome coronavirus (SARS-CoV), or SARS-CoV-2.

The composition can be a pharmaceutical composition comprising the compound and one or more pharmaceutically acceptable excipients. The composition can comprise one or more additional therapeutic agents. The one or more additional therapeutic agents comprise one or more antiviral agents. The one or more antiviral agents can be selected from the group consisting of a nucleoside or a non-nucleoside analogue reverse-transcriptase inhibitor, a nucleotide analogue reverse-transcriptase inhibitor, a NS3/4A serine protease inhibitor, a NS5B polymerase inhibitor, and interferon alpha.

The composition can be in the form of powder, pill, tablet, microtablet, pellet, micropellet, capsule, capsule containing microtablets, liquid, aerosols, or nanoparticles. The composition can be in a formulation for administration to the lungs. As disclosed herein, the compounds of the disclosure (e.g., a compound listed in Tables 1-6, or a pharmaceutically acceptable salt, ester, solvate, stereoisomer, tautomer, or prodrug thereof) can be formulated for administration in a pharmaceutical composition comprising a physiologically acceptable surface active agents, carriers, diluents, excipients, smoothing agents, suspension agents, film forming substances, coating assistants, or a combination thereof. In some embodiments, a compound of the disclosure (e.g., a compound listed in Tables 1-6, or a pharmaceutically acceptable salt, ester, solvate, stereoisomer, tautomer, or prodrug thereof) is formulated for administration with a pharmaceutically acceptable carrier or diluent. The compounds of the disclosure (e.g., a compound listed in Tables 1-6, or a pharmaceutically acceptable salt, ester, solvate, stereoisomer, tautomer, or prodrug thereof) can be formulated as a medicament with a standard pharmaceutically acceptable carrier(s) and/or excipient(s) as is routine in the pharmaceutical art. The exact nature of the formulation will depend upon several factors including the desired route of administration. Compounds of the disclosure (e.g., a compound listed in Tables 1-6, or a pharmaceutically acceptable salt, ester, solvate, stereoisomer, tautomer, or prodrug thereof) can be formulated for oral, intravenous, intragastric, intravascular or intraperitoneal administration. Standard pharmaceutical formulation techniques may be used, such as those disclosed in Remington's The Science and Practice of Pharmacy, 21st Ed., Lippincott Williams & Wilkins (2005), incorporated herein by reference in its entirety.

The term "pharmaceutically acceptable carrier" or "pharmaceutically acceptable excipient" includes any and all solvents, dispersion media, coatings, antibacterial and antifungal agents, isotonic and absorption delaying agents and the like. The use of such media and agents for pharmaceutically active substances is well known in the art. Except insofar as any conventional media or agent is incompatible with the active ingredient, its use in the therapeutic compositions is contemplated. In addition, various adjuvants such as are commonly used in the art may be included. Considerations for the inclusion of various components in pharmaceutical compositions are described, e.g., in Gilman et al. (Eds.) (1990); Goodman and Gilman's: The Pharmacological Basis of Therapeutics, 8th Ed., Pergamon Press, which is incorporated herein by reference in its entirety.

Some examples of substances, which can serve as pharmaceutically-acceptable carriers or components thereof, are sugars, such as lactose, glucose and sucrose: starches, such as corn starch and potato starch; cellulose and its derivatives, such as sodium carboxymethyi cellulose, powdered tragacanth; malt; gelatin; talc; solid lubricants, such as stearic acid and magnesium stearate; calcium sulfate; vegetable oils, such as peanut oil, cottonseed oil, sesame oil, olive oil, corn oil and oil of theobroraa; polyols such as propylene glycol, glycerine, sorbitol, mannitol, and polyethylene glycol; aiginic acid; emulsifiers, such as the TWEENS; wetting agents, such sodium lauryl sulfate; coloring agents; flavoring agents; tableting agents, stabilizers; antioxidants; preservatives; pyrogen-free water; isotonic saline; and phosphate buffer solutions.

The choice of a pharmaceutically-acceptable carrier to be used in conjunction with the subject therapeutic agent is basically determined by the way the composition is to be administered.

The compositions described herein are preferably provided in unit dosage form. As used herein, a "unit dosage form" is a composition containing an amount of a compound of the disclosure (e.g., a compound listed in Tables 1-6, or a pharmaceutically acceptable salt, ester, solvate, stereoisomer, tautomer, or prodrug thereof) that is suitable for administration to an animal, preferably mammal subject, in a single dose, according to good medical practice. The preparation of a single or unit dosage form however, does not imply that the dosage form is administered once per day or once per course of therapy. Such dosage forms are contemplated to be administered once, twice, thrice or more per day and may be administered as infusion over a period of time (e.g., from about 30 minutes to about 2-6 hours), or administered as a continuous infusion, and may be given more than once during a course of therapy, though a single administration is not specifically excluded. The skilled artisan will recognize that the formulation does not specifically contemplate the entire course of therapy and such decisions are left for those skilled in the art of treatment rather than formulation.

The compositions useful as described above may be in any of a variety of suitable forms for a variety of routes for administration, for example, for oral, nasal, rectal, topical (including transdermal), ocular, intracerebral, intracranial, intrathecal, intra-arterial, intravenous, intramuscular, or other parental routes of administration. The skilled artisan will appreciate that oral and nasal compositions include compositions that are administered by inhalation, and made using available methodologies. Depending upon the particular route of administration desired, a variety of pharmaceutically-acceptable carriers well-known in the art may be used. Pharmaceutically-acceptable carriers include, for example, solid or liquid fillers, diluents, hydrotropes, surface-active agents, and encapsulating substances. Optional pharmaceutically-active materials may be included, which do not substantially interfere with the activity of the compounds of the disclosure (e.g., a compound listed in Tables 1-6, or a pharmaceutically acceptable salt, ester, solvate, stereoisomer, tautomer, or prodrug thereof). The amount of carrier employed in conjunction with the compounds of the disclosure (e.g., a compound listed in Tables 1-6, or a pharmaceutically acceptable salt, ester, solvate, stereoisomer, tautomer, or prodrug thereof) is sufficient to provide a practical quantity of material for administration per unit dose of the disclosed compositions. Techniques and compositions for making dosage forms useful in the methods described herein are described in the following references, ail incorporated by reference herein: Modern Pharmaceutics, 4th Ed., Chapters 9 and 10 (Banker & Rhodes, editors, 2002); Lieberman et al, Pharmaceutical Dosage Forms: Tablets (1989), and Ansel, Introduction to Pharmaceutical Dosage Forms 8th Edition (2004).

Various oral dosage forms can be used, including such solid forms as tablets, capsules, and granules. Tablets can be compressed, tablet triturates, enteric-coated, sugar-coated, film-coated, or multiple-compressed, containing suitable binders, lubricants, diluents, disintegrating agents, coloring agents, flavoring agents, flow-inducing agents, and melting agents. Liquid oral dosage forms include aqueous solutions, emulsions, suspensions, solutions and/or suspensions reconstituted from non-effervescent granules, and effervescent preparations reconstituted from effervescent granules, containing suitable solvents, preservatives, emulsifying agents, suspending agents, diluents, sweeteners, melting agents, coloring agents and flavoring agents.

The pharmaceutically-acceptable carriers suitable for the preparation of unit dosage forms for peroral administration is well-known in the art. Tablets typically comprise conventional pharmaceutically-compatible adjuvants as inert diluents, such as calcium carbonate, sodium carbonate, mannitol, lactose and cellulose; binders such as starch, gelatin and sucrose; disintegrants such as starch, alginic acid and croscarmellose; lubricants such as magnesium stearate, stearic acid and talc. Glidants such as silicon dioxide can be used to improve flow characteristics of the powder mixture. Coloring agents, such as the FD&C dyes, can be added for appearance. Sweeteners and flavoring agents, such as aspartame, saccharin, menthol, peppermint, and fruit flavors, are useful adjuvants for chewable tablets. Capsules typically comprise one or more solid diluents disclosed above. The selection of carrier components depends on secondary considerations like taste, cost, and shelf stability, which are not critical, and can be readily made by a person skilled in the art.

Peroral compositions also include liquid solutions, emulsions, suspensions, and the like. The pharmaceutically-acceptable carriers suitable for preparation of such compositions are well known in the art. Typical components of carriers for syrups, elixirs, emulsions and suspensions include ethanol, glycerol, propylene glycol, polyethylene glycol, liquid sucrose, sorbitol and water. For a suspension, typical suspending agents include sodium carboxymethyl cellulose, AVICEL RC-591, tragacanth and sodium alginate; typical wetting agents include lecithin and polysorbate 80; and typical preservatives include methyl paraben and sodium benzoate. Peroral liquid compositions may also contain one or more components such as sweeteners, flavoring agents and colorants disclosed above.

Other compositions useful for attaining systemic delivery of the subject therapeutic agents include sublingual, buccal and nasal dosage forms. Such compositions typically comprise one or more of soluble filler substances such as sucrose, sorbitol and mannitol; and binders such as acacia, microcrystalline cellulose, carboxymethyl cellulose and hydroxypropyi methyl cellulose. Glidants, lubricants, sweeteners, colorants, antioxidants and flavoring agents disclosed above may also be included.

For topical use, creams, ointments, gels, solutions or suspensions, etc., containing a compound of the disclosure (e.g., a compound listed in Tables 1-6, or a pharmaceutically acceptable salt, ester, solvate, stereoisomer, tautomer, or prodrug thereof) disclosed herein are employed. Topical formulations may generally be comprised of a pharmaceutical carrier, co-solvent, emulsifier, penetration enhancer, preservative system, and emollient.

For intravenous administration, the compounds of the disclosure (e.g., a compound listed in Tables 1-6, or a pharmaceutically acceptable salt, ester, solvate, stereoisomer, tautomer, or prodrug thereof) and compositions described herein may be dissolved or dispersed in a pharmaceutically acceptable diluent, such as a saline or dextrose solution. Suitable excipients may be included to achieve the desired pH, including but not limited to NaOH, sodium carbonate, sodium acetate, HCl, and citric acid. In various embodiments, the pH of the final composition ranges from 2 to 8, or preferably from 4 to 7. Antioxidant excipients may include sodium bisulfite, acetone sodium bisulfite, sodium formaldehyde, sulfoxylate, thiourea, and EDTA. Other non-limiting examples of suitable excipients found in the final intravenous composition may include sodium or potassium phosphates, citric acid, tartaric acid, gelatin, and carbohydrates such as dextrose, mannitol, and dextran. Further acceptable excipients are described in Powell, et al., Compendium of Excipients for Parenteral Formulations, PDA J Pharm Sci and Tech 1998, 52 238-311 and Nema et al., Excipients and Their Role in Approved Injectable Products: Current Usage and Future Directions, PDA J Pharm Sci and Tech 2011, 65 287-332, both of which are incorporated herein by reference in their entirety. Antimicrobial agents may also be included to achieve a bacteriostatic or fungistatic solution, including but not limited to phenyl mercuric nitrate, thimerosal, benzethonium chloride, benzalkonium chloride, phenol, cresol, and chlorobutanol.

The compositions for intravenous administration may be provided to caregivers in the form of one more solids that are reconstituted with a suitable diluent such as sterile water, saline or dextrose in water shortly prior to administration. In other embodiments, the compositions are provided in solution ready to administer parenterally. In still other embodiments, the compositions are provided in a solution that is further diluted prior to administration. In embodiments that include administering a combination of a compound of the disclosure (e.g., a compound listed in Tables 1-6, or a pharmaceutically acceptable salt, ester, solvate, stereoisomer, tautomer, or prodrug thereof) and another agent, the combination may be provided to caregivers as a mixture, or the caregivers may mix the two agents prior to administration, or the two agents may be administered separately.

In non-human animal studies, applications of potential products are commenced at higher dosage levels, with dosage being decreased until the desired effect is no longer achieved or adverse side effects disappear. The dosage may range broadly, depending upon the desired effects and the therapeutic indication. Typically, dosages may be between about 0.1 mg/kg and 4000 mg/kg body weight, preferably between about 80 mg/kg and 1600 mg/kg body weight. Alternatively dosages may be based and calculated upon the surface area of the patient, as understood by those of skill in the art.

Depending on the severity and responsiveness of the condition to be treated, dosing can also be a single administration of a slow release composition, with course of treatment lasting from several days to several weeks or until cure is effected or diminution of the disease state is achieved. The amount of a composition to be administered will depend on many factors including the subject being treated, the severity of the affliction, the manner of administration, the judgment of the prescribing physician. The compounds of the disclosure (e.g., a compound listed in Tables 1-6, or a pharmaceutically acceptable salt, ester, solvate, stereoisomer, tautomer, or prodrug thereof) or combination of therapeutic agents disclosed herein may be administered orally or via injection at a dose from 0, 1 mg/kg to 4000 mg/kg of the patient's body weight per day. The dose range for adult humans is generally from 1 g to 100 g/day. Tablets or other forms of presentation provided in discrete units may conveniently contain an amount of a compound of the disclosure (e.g., a compound listed in Tables 1-6, or a pharmaceutically acceptable salt, ester, solvate, stereoisomer, tautomer, or prodrug thereof) or combination of compounds disclosed herein which is effective at such dosage or as a multiple of the same, for instance, units containing 1 g to 60 g (for example, from about 5 g to 20 g, from about 10 g to 50 g, from about 20 g to 40 g, or from about 25 g to 35 g). The precise amount of therapeutic agent administered to a patient is the responsibility of the attendant physician. However, the dose employed can depend on a number of factors, including the age and sex of the patient, the precise disorder being treated, and its severity. Additionally, the route of administration may vary depending on the condition and its severity. A typical dose of the compounds of the disclosure (e.g., a compound listed in Tables 1-6, or a pharmaceutically acceptable salt, ester, solvate, stereoisomer, tautomer, or prodrug thereof) can be from 0.02 g to 1.25 g per kg of body weight, for example from 0.1 g to 0.5 g per kg of body weight, depending on such parameters. In some embodiments, the dosage of a disclosed compound (e.g., a compound listed in Tables 1-6, or a pharmaceutically acceptable salt, ester, solvate, stereoisomer, tautomer, or prodrug thereof) can be from 1 g to 100 g, for example, from 10 g to 80 g, from 15 g to 60 g, from 20 g to 40 g, or from 25 g to 35 g. In A physician will be able to determine the required dosage of the compounds of the disclosure (e.g., a compound listed in Tables 1-6, or a pharmaceutically acceptable salt, ester, solvate, stereoisomer, tautomer, or prodrug thereof) for any particular subject.

The exact formulation, route of administration and dosage for the pharmaceutical compositions comprising one or more compounds of the disclosure (e.g., a compound listed in Tables 1-6, or a pharmaceutically acceptable salt, ester, solvate, stereoisomer, tautomer, or prodrug thereof) or combination of therapeutic agents disclosed herein can be chosen by the individual physician in view of the patient's condition. (See, e.g., Fingl et al. 1975, in "The Pharmacological Basis of Therapeutics," which is hereby incorporated herein by reference, with particular reference to Ch. 1). Typically, the dose range of the composition administered to the patient can be from about 0.1 to about 4000 mg/kg of the patient's body weight. The dosage may be a single one or a series of two or more given in the course of one or more days, as is needed by the patient. In instances where human dosages for therapeutic agents have been established for at least some condition, the present disclosure will use those same dosages, or dosages that are between about 0.1% and about 5000%, more preferably between about 25% and about 1000% of the established human dosage. Where no human dosage is established, as will be the case for newly-discovered pharmaceutical compounds, a suitable human dosage can be inferred from $ED_{50}$ or $ID_{50}$ values, or other appropriate values derived from in vitro or in vivo studies, as qualified by toxicity studies and efficacy studies in animals.

It should be noted that the attending physician would know how to and when to terminate, interrupt, or adjust administration due to toxicity or organ dysfunctions. Conversely, the attending physician would also know to adjust treatment to higher levels if the clinical response were not adequate (precluding toxicity). The magnitude of an administrated dose in the management of the disorder of interest will vary with the severity of the condition to be treated and to the route of administration. The severity of the condition may, for example, be evaluated, in part, by standard prognostic evaluation methods. Further, the dose and perhaps dose frequency, will also vary according to the age, body weight, and response of the individual patient. A program comparable to that discussed above may be used in veterinary medicine.

Although the exact dosage will be determined on a drug-by-drug basis, in most cases, some generalizations regarding the dosage can be made. In cases of administration of a pharmaceutically acceptable salt, dosages may be calculated as the free base. In some embodiments, the composition is administered 1 to 4 times per day. Alternatively the compositions disclosed herein may be administered by continuous intravenous infusion, e.g., at a dose of each active ingredient up to 100 g per day. As will be understood by those of skill in the art, in certain situations it may be necessary to administer the compositions disclosed herein in amounts that exceed, or even far exceed, the above-stated, preferred dosage range in order to effectively and aggressively treat particularly aggressive diseases or infections. In some embodiments, a compound of the disclosure (e.g., a compound listed in Tables 1-6, or a pharmaceutically acceptable salt, ester, solvate, stereoisomer, tautomer, or prodrug thereof) or combination of therapeutic agents disclosed herein will be administered for a period of continuous therapy, for example for a week or more, or for months or years.

In some embodiments, the dosing regimen of the compounds of the disclosure (e.g., a compound listed in Tables 1-6, or a pharmaceutically acceptable salt, ester, solvate, stereoisomer, tautomer, or prodrug thereof) or combination of therapeutic agents disclosed herein is administered for a period of time, which time period can be, for example, from at least about 1 week to at least about 4 weeks, from at least about 4 weeks to at least about 8 weeks, from at least about 4 weeks to at least about 12 weeks, from at least about 4 weeks to at least about 16 weeks, or longer. The dosing regimen of a compound of the disclosure (e.g., a compound listed in Tables 1-6, or a pharmaceutically acceptable salt, ester, solvate, stereoisomer, tautomer, or prodrug thereof) or combination of therapeutic agents disclosed herein can be administered three times a day, twice a day, daily, every other day, three times a week, every other week, three times per month, once monthly, substantially continuously or continuously.

A compound disclosed herein can be administered alone or in the form of a composition (e.g., a pharmaceutical composition). In some embodiments, a pharmaceutical composition comprises one or more compounds of the disclosure (e.g., a compound listed in Tables 1-6, or a pharmaceutically acceptable salt, ester, solvate, stereoisomer, tautomer, or prodrug thereof) or a pharmaceutically acceptable salt, solvate, hydrate, clathrate, polymorph, tautomer, prodrug or metabolite thereof, and one or more pharmaceutically acceptable carriers or excipients. The composition can optionally contain one or more additional therapeutic agents as described herein. A pharmaceutical composition contains a therapeutically effective amount of a compound of the disclosure (e.g., a compound listed in Tables 1-6, or a pharmaceutically acceptable salt, ester, solvate, stereoisomer, tautomer, or prodrug thereof) and one or more pharmaceutically acceptable carriers or excipients, and is formulated for administration to a subject for therapeutic use. For purposes of the content of a pharmaceutical composition, the terms "therapeutic agent", "active ingredient", "active agent" and "drug" encompass prodrugs.

A pharmaceutical composition contains one or more compounds of the disclosure (e.g., a compound listed in Tables 1-6, or a pharmaceutically acceptable salt, ester, solvate, stereoisomer, tautomer, or prodrug thereof) in substantially pure form. In some embodiments, the purity of the therapeutic agent is at least about 95%, 96%, 97%, 98% or 99%. In certain embodiments, the purity of the therapeutic agent is at least about 98% or 99%. In addition, a pharmaceutical composition is substantially free of contaminants or impurities. In some embodiments, the level of contaminants or impurities other than residual solvent in a pharmaceutical composition is no more than about 5%, 4%, 3%, 2% or 1% relative to the combined weight of the intended active and inactive ingredients. In certain embodiments, the level of contaminants or impurities other than residual solvent in a pharmaceutical composition is no more than about 2% or 1% relative to the combined weight of the intended active and inactive ingredients. Pharmaceutical compositions generally are prepared according to current good manufacturing practice (GMP), as recommended or required by, e.g., the Federal Food, Drug, and Cosmetic Act § 501(a)(2)(B) and the International Conference on Harmonisation Q7 Guideline.

Pharmaceutically acceptable carriers and excipients include pharmaceutically acceptable materials, vehicles and substances. Non-limiting examples of excipients include liquid and solid fillers, diluents, binders, lubricants, glidants, solubilizers, surfactants, dispersing agents, disintegration agents, emulsifying agents, wetting agents, suspending agents, thickeners, solvents, isotonic agents, buffers, pH adjusters, stabilizers, preservatives, antioxidants, antimicrobial agents, antibacterial agents, antifungal agents, absorption-delaying agents, sweetening agents, flavoring agents, coloring agents, adjuvants, encapsulating materials and coating materials. The use of such excipients in pharmaceutical formulations is known in the art. For example, conventional vehicles and carriers include without limitation oils (e.g., vegetable oils, such as sesame oil), aqueous solvents (e.g., saline, phosphate-buffered saline [PBS] and isotonic solutions [e.g., Ringer's solution]), and solvents (e.g., dimethyl sulfoxide [DMSO] and alcohols [e.g., ethanol, glycerol and propylene glycol]). Except insofar as any conventional carrier or excipient is incompatible with the active ingredient, the disclosure encompasses the use of conventional carriers and excipients in formulations containing a therapeutic agent (e.g., a compound of the disclosure, such as Tocladesine, PRX-07034, AZD-5991, Berzosertib, Pipendoxifene, Bazedoxifene, R-428). See, e.g., Remington: The Science and Practice of Pharmacy, 21st Ed., Lippincott Williams & Wilkins (Philadelphia, Pennsylvania [2005]); Handbook of Pharmaceutical Excipients, 5th Ed., Rowe et al., Eds., The Pharmaceutical Press and the American Pharmaceutical Association (2005); Handbook of Pharmaceutical Additives, 3rd Ed., Ash and Ash, Eds., Gower Publishing Co. (2007); and Pharmaceutical Preformulation and Formulation, Gibson, Ed., CRC Press (Boca Raton, Florida, 2004).

Proper formulation can depend on various factors, such as the mode of administration chosen. Potential modes of administration of pharmaceutical compositions comprising a compound of the disclosure (e.g., a compound listed in Tables 1-6, or a pharmaceutically acceptable salt, ester, solvate, stereoisomer, tautomer, or prodrug thereof) include without limitation oral, parenteral (including intramuscular, subcutaneous, intradermal, intravascular, intravenous, intraarterial, intraperitoneal, intramedullary, intrathecal and topical), intracavitary, and topical (including dermal/epicutaneous, transdermal, mucosal, transmucosal, intranasal [e.g., by nasal spray or drop], pulmonary [e.g., by oral or nasal inhalation], buccal, sublingual, rectal [e.g., by suppository], and vaginal [e.g., by suppository]).

As an example, formulations of a compound of the disclosure (e.g., a compound listed in Tables 1-6, or a pharmaceutically acceptable salt, ester, solvate, stereoisomer, tautomer, or prodrug thereof) suitable for oral administration can be presented as, e.g., boluses; tablets, capsules, pills, cachets or lozenges; as powders or granules; as semisolids, electuaries, pastes or gels; as solutions or suspensions in an aqueous liquid or/and a non-aqueous liquid; or as oil-in-water liquid emulsions or water-in-oil liquid emulsions.

Tablets can contain a compound of the disclosure (e.g., a compound listed in Tables 1-6, or a pharmaceutically acceptable salt, ester, solvate, stereoisomer, tautomer, or prodrug thereof) in admixture with, e.g., a filler or inert diluent (e.g., calcium carbonate, calcium phosphate, lactose, mannitol or microcrystalline cellulose), a binding agent (e.g., a starch, gelatin, acacia, alginic acid or a salt thereof, or microcrystalline cellulose), a lubricating agent (e.g., stearic acid, magnesium stearate, talc or silicon dioxide), and a disintegrating agent (e.g., crospovidone, croscarmellose sodium or colloidal silica), and optionally a surfactant (e.g., sodium lauryl sulfate). The tablets can be uncoated or can be coated with, e.g., an enteric coating that protects the active ingredient from the acidic environment of the stomach, or with a material that delays disintegration and absorption of the active ingredient in the gastrointestinal tract and thereby provides a sustained action over a longer time period. In certain embodiments, a tablet comprises a compound of the disclosure (e.g., a compound listed in Tables 1-6, or a pharmaceutically acceptable salt, ester, solvate, stereoisomer, tautomer, or prodrug thereof), mannitol, microcrystalline cellulose, magnesium stearate, silicon dioxide, croscarmellose sodium and sodium lauryl sulfate, and optionally lactose monohydrate, and the tablet is optionally film-coated (e.g., with Opadry®).

Push-fit capsules or two-piece hard gelatin capsules can contain a compound of the disclosure (e.g., a compound listed in Tables 1-6, or a pharmaceutically acceptable salt, ester, solvate, stereoisomer, tautomer, or prodrug thereof) in admixture with, e.g., a filler or inert solid diluent (e.g., calcium carbonate, calcium phosphate, kaolin or lactose), a binder (e.g., a starch), a glidant or lubricant (e.g., talc or magnesium stearate), and a disintegrant (e.g., crospovidone), and optionally a stabilizer or/and a preservative. For soft capsules or single-piece gelatin capsules, a compound of the disclosure (e.g., a compound listed in Tables 1-6, or a pharmaceutically acceptable salt, ester, solvate, stereoisomer, tautomer, or prodrug thereof) can be dissolved or suspended in a suitable liquid (e.g., liquid polyethylene glycol or an oil medium, such as a fatty oil, peanut oil, olive oil or liquid paraffin), and the liquid-filled capsules can contain one or more other liquid excipients or/and semisolid excipients, such as a stabilizer or/and an amphiphilic agent (e.g., a fatty acid ester of glycerol, propylene glycol or sorbitol).

Compositions for oral administration can also be formulated as solutions or suspensions in an aqueous liquid or/and a non-aqueous liquid, or as oil-in-water liquid emulsions or water-in-oil liquid emulsions. Dispersible powder or granules of a compound of the disclosure (e.g., a compound listed in Tables 1-6, or a pharmaceutically acceptable salt, ester, solvate, stereoisomer, tautomer, or prodrug thereof) can be mixed with any suitable combination of an aqueous liquid, an organic solvent or/and an oil and any suitable excipients (e.g., any combination of a dispersing agent, a wetting agent, a suspending agent, an emulsifying agent or/and a preservative) to form a solution, suspension or emulsion.

In some embodiments, a compound of the disclosure (e.g., a compound listed in Tables 1-6, or a pharmaceutically acceptable salt, ester, solvate, stereoisomer, tautomer, or prodrug thereof) is contained in an amphiphilic vehicle of a liquid or semi-solid formulation for oral administration which provides improved solubility, stability and bioavailability of the compound, as described in US 2010/0209496. The amphiphilic vehicle contains a solution, suspension, emulsion (e.g., oil-in-water emulsion) or semi-solid mixture of the compound admixed with liquid or/and semi-solid excipients which fills an encapsulated dosage form (e.g., a hard gelatin capsule or a soft gelatin capsule containing a plasticizer [e.g., glycerol or/and sorbitol]). In some embodiments, the amphiphilic vehicle comprises an amphiphilic agent selected from fatty acid esters of glycerol (glycerin), propylene glycol and sorbitol. In certain embodiments, the amphiphilic agent is selected from mono- and di-glycerides of $C_8$-$C_{12}$ saturated fatty acids. In further embodiments, the amphiphilic agent is selected from CAPMUL® MCM, CAPMUL® MCM 8, CAPMUL® MCM 10, IMWITOR® 308, IMWITOR® 624, IMWITOR® 742, IMWITOR® 988, CAPRYOL™ PGMC, CAPRYOL™ 90, LAUROGLYCOL™ 90, CAPTEX® 200, CRILL™ 1, CRILL™ 4, PECEOL® and MAISINE™ 35-1. In some embodiments, the amphiphilic vehicle further comprises propylene glycol, a propylene glycol-sparing agent (e.g., ethanol or/and glycerol), or an antioxidant (e.g., butylated hydroxyanisole, butylated hydroxytoluene, propyl gallate or/and sodium sulfite), or any combination thereof. In additional embodiments, the amphiphilic vehicle contains on a weight basis about 0.1-5% of the compound, about 50-90% of the amphiphilic agent, about 5-40% of propylene glycol, about 5-20% of the propylene glycol-sparing agent, and about 0.01-0.5% of the antioxidant.

A compound of the disclosure (e.g., a compound listed in Tables 1-6, or a pharmaceutically acceptable salt, ester, solvate, stereoisomer, tautomer, or prodrug thereof) can also be formulated for parenteral administration by injection or infusion to circumvent gastrointestinal absorption and first-pass metabolism. A representative parenteral route is intravenous.

Additional advantages of intravenous administration include direct administration of a therapeutic agent into systemic circulation to achieve a rapid systemic effect, and the ability to administer the agent continuously or/and in a large volume if desired. Formulations for injection or infusion can be in the form of, e.g., solutions, suspensions or emulsions in oily or aqueous vehicles, and can contain excipients such as suspending agents, dispersing agents or/and stabilizing agents. For example, aqueous or non-aqueous (e.g., oily) sterile injection solutions can contain a compound of the disclosure (e.g., a compound listed in Tables 1-6, or a pharmaceutically acceptable salt, ester, solvate, stereoisomer, tautomer, or prodrug thereof) along with excipients such as an antioxidant, a buffer, a bacteriostat and solutes that render the formulation isotonic with the blood of the subject. Aqueous or non-aqueous sterile suspensions can contain a compound of the disclosure (e.g., a compound listed in Tables 1-6, or a pharmaceutically acceptable salt, ester, solvate, stereoisomer, tautomer, or prodrug thereof) along with excipients such as a suspending agent and a thickening agent, and optionally a stabilizer and an agent that increases the solubility of the compound to allow for the preparation of a more concentrated solution or suspension. As another example, a sterile aqueous solution for injection or infusion (e.g., subcutaneously or intravenously) can contain a compound of the disclosure (e.g., a compound listed in Tables 1-6, or a pharmaceutically acceptable salt, ester, solvate, stereoisomer, tautomer, or prodrug thereof), NaCl, a buffering agent (e.g., sodium citrate), a preservative (e.g., meta-cresol), and optionally a base (e.g., NaOH) or/and an acid (e.g., HCl) to adjust pH.

For topical administration, a compound of the disclosure (e.g., a compound listed in Tables 1-6, or a pharmaceutically acceptable salt, ester, solvate, stereoisomer, tautomer, or prodrug thereof) can be formulated as, e.g., a buccal or sublingual tablet or pill. Advantages of a buccal or sublingual tablet or pill include avoidance of first-pass metabolism and circumvention of gastrointestinal absorption. A buccal or sublingual tablet or pill can also be designed to provide faster release of the compound for more rapid uptake of it into systemic circulation. In addition to a therapeutically effective amount of a disclosed compound (e.g., a compound listed in Tables 1-6, or a pharmaceutically acceptable salt, ester, solvate, stereoisomer, tautomer, or prodrug thereof), the buccal or sublingual tablet or pill can contain suitable excipients, including without limitation any combination of fillers and diluents (e.g., mannitol and sorbitol), binding agents (e.g., sodium carbonate), wetting agents (e.g., sodium carbonate), disintegrants (e.g., crospovidone and croscarmellose sodium), lubricants (e.g., silicon dioxide [including colloidal silicon dioxide] and sodium stearyl fumarate), stabilizers (e.g., sodium bicarbonate), flavoring agents (e.g., spearmint flavor), sweetening agents (e.g., sucralose), and coloring agents (e.g., yellow iron oxide).

For topical administration, a compound of the disclosure (e.g., a compound listed in Tables 1-6, or a pharmaceutically acceptable salt, ester, solvate, stereoisomer, tautomer, or prodrug thereof) can also be formulated for intranasal administration. The nasal mucosa provides a big surface area, a porous endothelium, a highly vascular subepithelial layer and a high absorption rate, and hence allows for high bioavailability. An intranasal solution or suspension formulation can comprise a compound of the disclosure (e.g., a compound listed in Tables 1-6, or a pharmaceutically acceptable salt, ester, solvate, stereoisomer, tautomer, or prodrug thereof) along with excipients such as a solubility enhancer (e.g., propylene glycol), a humectant (e.g., mannitol or sorbitol), a buffer and water, and optionally a preservative (e.g., benzalkonium chloride), a mucoadhesive agent (e.g., hydroxyethylcellulose) or/and a penetration enhancer. In certain embodiments, a nasal spray formulation comprises a compound of the disclosure (e.g., a compound listed in Tables 1-6, or a pharmaceutically acceptable salt, ester, solvate, stereoisomer, tautomer, or prodrug thereof), microcrystalline cellulose, sodium carboxymethylcellulose, dextrose and water, and optionally an acid (e.g., HCl) to adjust pH. An intranasal solution or suspension formulation can be administered to the nasal cavity by any suitable means, including but not limited to a dropper, a pipette, or spray using, e.g., a metering atomizing spray pump.

An additional mode of topical administration is pulmonary, including by oral inhalation and nasal inhalation, which is described in detail below.

Other suitable topical formulations and dosage forms include without limitation ointments, creams, gels, lotions, pastes and the like, as described in Remington: The Science and Practice of Pharmacy, 21st Ed., Lippincott Williams & Wilkins (Philadelphia, Pennsylvania, 2005).

Ointments are semi-solid preparations that are typically based on petrolatum or a petroleum derivative. Creams are viscous liquids or semi-solid emulsions, either oil-in-water or water-in-oil. Cream bases are water-washable, and contain an oil phase, an emulsifier and an aqueous phase. The oil phase, also called the "internal" phase, generally comprises petrolatum and a fatty alcohol (e.g., cetyl or stearyl alcohol). The aqueous phase typically, although not necessarily, exceeds the oil phase in volume, and usually contains a humectant. The emulsifier in a cream formulation is generally a non-ionic, anionic, cationic or amphoteric surfactant. Gels are semi-solid, suspension-type systems. Single-phase gels contain organic macromolecules (polymers) distributed substantially uniformly throughout the carrier liquid, which is typically aqueous but can also contain an alcohol (e.g., ethanol or isopropanol) and optionally an oil. Lotions are preparations to be applied to the skin surface without friction, and are typically liquid or semi-liquid preparations in which solid particles, including the active agent, are present in a water or alcohol base. Lotions are usually suspensions of finely divided solids and typically contain suspending agents to produce better dispersion as well as compounds useful for localizing and holding the active agent in contact with the skin. Pastes are semi-solid dosage forms in which the active agent is suspended in a suitable base. Depending on the nature of the base, pastes are divided between fatty pastes or those made from single-phase aqueous gels.

Various excipients can be included in a topical formulation. For example, solvents, including a suitable amount of an alcohol, can be used to solubilize the active agent. Other optional excipients include without limitation gelling agents, thickening agents, emulsifiers, surfactants, stabilizers, buffers, antioxidants, preservatives, cooling agents (e.g., menthol), opacifiers, fragrances and colorants. For an active agent having a low rate of permeation through the skin or mucosal tissue, a topical formulation can contain a permeation enhancer to increase the permeation of the active agent through the skin or mucosal tissue. A topical formulation can also contain an irritation-mitigating excipient that reduces any irritation to the skin or mucosa caused by the active agent, the permeation enhancer or any other component of the formulation.

In some embodiments, a compound of the disclosure (e.g., a compound listed in Tables 1-6, or a pharmaceutically acceptable salt, ester, solvate, stereoisomer, tautomer, or prodrug thereof) is delivered from a sustained-release composition. As used herein, the term "sustained-release composition" encompasses sustained-release, prolonged-release, extended-release, slow-release and controlled-release compositions, systems and devices. Use of a sustained-release composition can have benefits, such as an improved profile of the amount of the drug or an active metabolite thereof delivered to the target site(s) over a time period, including delivery of a therapeutically effective amount of the drug or an active metabolite thereof over a prolonged time period. In certain embodiments, the sustained-release composition delivers the compound over a period of at least about 1 day, 2 days, 3 days, 1 week, 2 weeks, 3 weeks, 1 month, 2 months, 3 months or longer. In some embodiments, the sustained-release composition is a drug-encapsulation system, such as nanoparticles, microparticles or a capsule made of, e.g., a biodegradable polymer or/and a hydrogel. In certain embodiments, the sustained-release composition comprises a hydrogel. Non-limiting examples of polymers of which a hydrogel can be composed include polyvinyl alcohol, acrylate polymers (e.g., sodium poly acrylate), and other homopolymers and copolymers having a relatively large number of hydrophilic groups (e.g., hydroxyl or/and carboxylate groups). In other embodiments, the sustained-release drug-encapsulation system comprises a membrane-enclosed reservoir, wherein the reservoir contains a drug and the membrane is permeable to the drug. Such a drug-delivery system can be in the form of, e.g., a transdermal patch.

In some embodiments, the sustained-release composition is an oral dosage form, such as a tablet or capsule. For example, a drug can be embedded in an insoluble porous matrix such that the dissolving drag must make its way out of the matrix before it can be absorbed through the gastrointestinal tract. Alternatively, a drug can be embedded in a matrix that swells to form a gel through which the drug exits. Sustained release can also be achieved by way of a single-layer or multi-layer osmotic controlled-release oral delivery system (OROS). An OROS is a tablet with a semi-permeable outer membrane and one or more small laser-drilled holes in it. As the tablet passes through the body, water is absorbed through the semipermeable membrane via osmosis, and the resulting osmotic pressure pushes the drug out through the hole(s) in the tablet and into the gastrointestinal tract where it can be absorbed.

In further embodiments, the sustained-release composition is formulated as polymeric nanoparticles or microparticles, wherein the polymeric particles can be delivered, e.g., by inhalation or injection or from an implant. In some embodiments, the polymeric implant or polymeric nanoparticles or microparticles are composed of a biodegradable polymer. In certain embodiments, the biodegradable polymer comprises lactic acid or/and glycolic acid [e.g., an L-lactic acid-based copolymer, such as poly(L-lactide-co-glycolide) or poly(L-lactic acid-co-D,L-2-hydroxyoctanoic acid)]. For example, biodegradable polymeric microspheres composed of polylactic acid or/and polyglycolic acid can serve as sustained-release pulmonary drug-delivery systems. The biodegradable polymer of the polymeric implant or polymeric nanoparticles or microparticles can be selected so that the polymer substantially completely degrades around the time the period of treatment is expected to end, and so that the byproducts of the polymer's degradation, like the polymer, are biocompatible.

For a delayed or sustained release of a compound of the disclosure (e.g., a compound listed in Tables 1-6, or a pharmaceutically acceptable salt, ester, solvate, stereoisomer, tautomer, or prodrug thereof), a composition can also be formulated as a depot that can be implanted in or injected into a subject, e.g., intramuscularly or subcutaneously. A depot formulation can be designed to deliver the compound over a longer period of time, e.g., over a period of at least about 1 week, 2 weeks, 3 weeks, 1 month, 6 weeks, 2 months, 3 months or longer. For example, the compound can be formulated with a polymeric material (e.g., polyethylene glycol (PEG), polylactic acid (PLA) or polyglycolic acid (PGA), or a copolymer thereof (e.g., PLGA)), a hydrophobic material (e.g., as an emulsion in an oil) or/and an ion-exchange resin, or as a sparingly soluble derivative (e.g., a sparingly soluble salt). As an illustrative example, a compound of the disclosure (e.g., a compound listed in Tables 1-6, or a pharmaceutically acceptable salt, ester, solvate, stereoisomer, tautomer, or prodrug thereof) can be incorporated or embedded in sustained-release microparticles composed of PLGA and formulated as a monthly depot.

A compound of the disclosure (e.g., a compound listed in Tables 1-6, or a pharmaceutically acceptable salt, ester, solvate, stereoisomer, tautomer, or prodrug thereof) can also be contained or dispersed in a matrix material. The matrix material can comprise a polymer (e.g., ethylene-vinyl acetate) and controls the release of the compound by controlling dissolution or/and diffusion of the compound from, e.g., a reservoir, and can enhance the stability of the compound while contained in the reservoir. Such a release system can be designed as a sustained-release system, can be configured as, e.g., a transdermal or transmucosal patch, and can contain an excipient that can accelerate the compound's release, such as a water-swellable material (e.g., a hydrogel) that aids in expelling the compound out of the reservoir. For example, U.S. Pat. Nos. 4,144,317 and 5,797,898 describe examples of such a release system.

The release system can provide a temporally modulated release profile (e.g., pulsatile release) when time variation in plasma levels is desired, or a more continuous or consistent release profile when a constant plasma level is desired. Pulsatile release can be achieved from an individual reservoir or from a plurality of reservoirs. For example, where each reservoir provides a single pulse, multiple pulses ("pulsatile" release) are achieved by temporally staggering the single pulse release from each of multiple reservoirs.

Alternatively, multiple pulses can be achieved from a single reservoir by incorporating several layers of a release system and other materials into a single reservoir. Continuous release can be achieved by incorporating a release system that degrades, dissolves, or allows diffusion of a compound through it over an extended time period. In addition, continuous release can be approximated by releasing several pulses of a compound in rapid succession ("digital" release). An active release system can be used alone or in conjunction with a passive release system, as described in U.S. Pat. No. 5,797,898.

In addition, pharmaceutical compositions comprising a compound of the disclosure (e.g., a compound listed in Tables 1-6, or a pharmaceutically acceptable salt, ester, solvate, stereoisomer, tautomer, or prodrug thereof) can be formulated as, e.g., liposomes, micelles (e.g., those composed of biodegradable natural or/and synthetic polymers, such as lactosomes), microspheres, microparticles or nanoparticles, whether or not designed for sustained release. For example, liposomes can be used as sustained release pulmonary drug-delivery systems that deliver drugs to the alveolar surface for treatment of lung diseases and systemic diseases.

The pharmaceutical compositions can be manufactured in any suitable manner known in the art, e.g., by means of conventional mixing, dissolving, suspending, granulating, dragee-making, levigating, emulsifying, encapsulating, entrapping or compressing processes.

A pharmaceutical composition can be presented in unit dosage form as a single dose wherein all active and inactive ingredients are combined in a suitable system, and components do not need to be mixed to form the composition to be administered. The unit dosage form can contain an effective dose, or an appropriate fraction thereof, of a therapeutic agent (e.g., a compound listed in Tables 1-6, or a pharmaceutically acceptable salt, ester, solvate, stereoisomer, tautomer, or prodrug thereof). Representative examples of a unit dosage form include a tablet, capsule or pill for oral administration, and powder in a vial or ampoule for oral or nasal inhalation.

Alternatively, a pharmaceutical composition can be presented as a kit, wherein the active ingredient, excipients and carriers (e.g., solvents) are provided in two or more separate containers (e.g., ampoules, vials, tubes, bottles or syringes) and need to be combined to form the composition to be administered. The kit can contain instructions for storing, preparing and administering the composition (e.g., a solution to be injected intravenously).

A kit can contain all active and inactive ingredients in unit dosage form or the active ingredient and inactive ingredients in two or more separate containers, and can contain instructions for using the pharmaceutical composition.

In some embodiments, a kit contains a compound of the disclosure (e.g., a compound listed in Tables 1-6, or a pharmaceutically acceptable salt, ester, solvate, stereoisomer, tautomer, or prodrug thereof) or a pharmaceutically acceptable salt, solvate, hydrate, clathrate, polymorph, prodrug or metabolite thereof, and instructions for administering the compound. In certain embodiments, the compound is contained or incorporated in, or provided by, a device or system configured for pulmonary delivery of the compound by oral inhalation, such as a metered-dose inhaler, a dry powder inhaler or a nebulizer.

Inhalation Formulations and Devices

Pulmonary administration can be accomplished by, e.g., oral inhalation or nasal inhalation. Advantages of pulmonary drug delivery include, but are not limited to: 1) avoidance of first pass hepatic metabolism; 2) fast drug action; 3) large surface area of the alveolar region for absorption, high permeability of the lungs (thin air-blood barrier), and profuse vasculature of the airways; 4) smaller doses to achieve equivalent therapeutic effect compared to other oral routes; 5) local action within the respiratory tract; 6) reduced systemic side effects; and 7) reduced extracellular enzyme levels compared to the gastrointestinal tract due to the large alveolar surface area. An advantage of oral inhalation over nasal inhalation includes deeper penetration/deposition of the drug into the lungs. Pulmonary administration, whether by oral or nasal inhalation, can be a suitable route of administration for drugs that are intended to act locally in the lungs or/and systemically, for which the lungs serve as a portal to the systemic circulation.

Oral or nasal inhalation can be achieved by means of, e.g., a metered-dose inhaler (MDI), a nebulizer or a dry powder inhaler (DPI). For example, a compound of the disclosure (e.g., a compound listed in Tables 1-6, or a pharmaceutically acceptable salt, ester, solvate, stereoisomer, tautomer, or prodrug thereof) can be formulated for aerosol administration to the respiratory tract by oral or nasal inhalation. The drug is delivered in a small particle size (e.g., between about 0.5 micron and about 5 microns), which can be obtained by micronization, to improve, e.g., drug deposition in the lungs and drug suspension stability. The drug can be provided in a pressurized pack with a suitable propellant, such as a hydrofluoroalkane (HFA, e.g., 1,1,1,2-tetrafluoroethane [HFA-134a]), a chlorofluorocarbon (CFC, e.g., dichlorodifluoromethane, trichlorofluoromethane or dichlorotetrafluoroethane), or a suitable gas (e.g., oxygen, compressed air or carbon dioxide). The drug in the aerosol formulation is dissolved, or more often suspended, in the propellant for delivery to the lungs. The aerosol can contain excipients such as a surfactant (which enhances penetration into the lungs by reducing the high surface tension forces at the air-water interface within the alveoli, may also emulsify, solubilize or/and stabilize the drug, and can be, e.g., a phospholipid such as lecithin) or/and a stabilizer. For example, an MDI formulation can comprise a compound of the disclosure (e.g., a compound listed in Tables 1-6, or a pharmaceutically acceptable salt, ester, solvate, stereoisomer, tautomer, or prodrug thereof), a propellant (e.g., an HFA such as 1,1,1,2-tetrafluoroethane), a surfactant (e.g., a fatty acid such as oleic acid), and a co-solvent (e.g., an alcohol such as ethanol). The MDI formulation can optionally contain a dissolved gas (e.g., $CO_2$). After device actuation, the bursting of $CO_2$ bubbles within the emitted aerosol droplets breaks up the droplets into smaller droplets, thereby increasing the respirable fraction of drug. As another example, a nebulizer formulation can comprise a compound of the disclosure (e.g., a compound listed in Tables 1-6, or a pharmaceutically acceptable salt, ester, solvate, stereoisomer, tautomer, or prodrug thereof), a surfactant (e.g., a Tween® such as polysorbate 80), a chelator or preservative (e.g., edetate disodium), an isotonicity agent (e.g., sodium chloride), pH buffering agents (e.g., citric acid/sodium citrate), and water. The drug can be delivered by means of, e.g., a nebulizer or an MDI with or without a spacer, and the drug dose delivered can be controlled by a metering chamber (nebulizer) or a metering valve (MDI).

Metered-dose inhalers (also called pressurized metered-dose inhalers [pMDI]) are the most widely used inhalation devices. A metering valve delivers a precise amount of aerosol (e.g., about 20-100 µL) each time the device is actuated. MDIs typically generate aerosol faster than the user can inhale, which can result in deposition of much of the aerosol in the mouth and the throat. The problem of poor coordination between device actuation and inhalation can be addressed by using, e.g., a breath-actuated MDI or a coordination device. A breath-actuated MDI (e.g., Easibreathe®) is activated when the device senses the user's inspiration and discharges a drug dose in response. The inhalation flow rate is coordinated through the actuator and the user has time to actuate the device reliably during inhalation. In a coordination device, a spacer (or valved holding chamber), which is a tube attached to the mouthpiece end of the inhaler, serves as a reservoir or chamber holding the drug that is sprayed by the inhaler and reduces the speed at which the aerosol enters the mouth, thereby allowing for the evaporation of the propellant from larger droplets. The spacer simplifies use of the inhaler and increases the amount of drug deposited in the lungs instead of in the upper airways. The spacer can be made of an anti-static polymer to minimize electrostatic adherence of the emitted drug particles to the inner walls of the spacer.

Nebulizers generate aerosol droplets of about 1-5 microns. They do not require user coordination between device actuation and inhalation, which can significantly affect the amount of drug deposited in the lungs. Compared to MDIs and DPIs, nebulizers can deliver larger doses of drug, albeit over a longer administration time. Examples of nebulizers include without limitation human-powered nebulizers, jet nebulizers (e.g., AeroEclipse® II BAN [breath-actuated], CompAIR™ NE-C801 [virtual valve], PARI LC® Plus [breath-enhanced] and SideStream Plus [breath-enhanced]), ultrasonic wave nebulizers, and vibrating mesh nebulizers (e.g., Akita2® Apixneb, I-neb AAD System with metering chambers, Micro Air® NE-U22, Omron U22 and PARI eFlow® rapid). As an example, a pulsed ultrasonic nebulizer can aerosolize a fixed amount of the drug per pulse, and can comprise an opto-acoustical trigger that allows the user to synchronize each breath to each pulse.

Respimat® Soft Mist™ inhaler combines advantages of an MDI and a nebulizer. It is a small, hand-held inhaler that does not need a power supply (like an MDI) and slowly aerosolizes a propellant-free drug solution as a soft mist (like a nebulizer), thereby reducing drug deposition in the oropharyngeal region and increasing drug deposition in the central and peripheral lung regions. The Soft Mist™ inhaler can create a large fraction of respirable droplets with slow velocity from a metered volume of drug solution. A drug delivered from the Soft Mist™ inhaler can potentially achieve the same therapeutic outcome at a significantly lower dose compared to delivery from an MDI.

For oral or nasal inhalation using a dry powder inhaler (DPI), a compound of the disclosure (e.g., a compound listed in Tables 1-6, or a pharmaceutically acceptable salt, ester, solvate, stereoisomer, tautomer, or prodrug thereof) can be provided in the form of a dry micronized powder, where the drug particles are of a certain small size (e.g., between about 0.5 micron and about 5 microns) to improve, e.g., aerodynamic properties of the dispersed powder and drug deposition in the lungs. Particles between about 0.5 micron and about 5 microns deposit by sedimentation in the terminal bronchioles and the alveolar regions. By contrast, the majority of larger particles (>5 microns) do not follow the stream of air into the many bifurcations of the airways, but rather deposit by impaction in the upper airways, including the oropharyngeal region of the throat. A DPI formulation can contain the drug particles alone or blended with a powder of a suitable larger base/carrier, such as lactose, starch, a starch derivative (e.g., hydroxypropylmethyl cellulose) or polyvinylpyrrolidine. The carrier particles enhance flow, reduce aggregation, improve dose uniformity and aid in dispersion of the drug particles. A DPI formulation can optionally contain an excipient such as magnesium stearate or/and leucine that improves the performance of the formulation by interfering with inter-particle bonding (by anti-adherent action). The powder formulation can be provided in unit dose form, such as a capsule (e.g., a gelatin capsule) or a cartridge in a blister pack, which can be manually loaded or pre-loaded in an inhaler. The drug particles can be drawn into the lungs by placing the mouthpiece or nosepiece of the inhaler into the mouth or nose, taking a sharp, deep inhalation to create turbulent airflow, and holding the breath for a period of time (e.g., about 5-10 seconds) to allow the drug particles to settle down in the bronchioles and the alveolar regions. When the user actuates the DPI and inhales, airflow through the device creates shear and turbulence, inspired air is introduced into the powder bed, and the static powder blend is fluidized and enters the user's airways. There, the drug particles separate from the carrier particles due to turbulence and are carried deep into the lungs, while the larger carrier particles impact on the oropharyngeal surfaces and are cleared. Thus, the user's inspiratory airflow achieves powder de-agglomeration and aerosolisation, and determines drug deposition in the lungs. (While a passive DPI requires rapid inspiratory airflow to de-agglomerate drug particles, rapid inspiration is not recommended with an MDI or nebulizer, since it creates turbulent airflow and fast velocity which increase drug deposition by impaction in the upper airways.) Compared to an MDI, a DPI (including a passive, breath-activated DPI) can potentially deliver larger doses of drug, and larger-size drugs (e.g., macromolecules), to the lungs.

Lactose (e.g., alpha-lactose monohydrate) is the most commonly used carrier in DPI formulations. Examples of grades/types of lactose monohydrate for DPI formulations include without limitation DCL 11, Flowlac® 100, Inhalac® 230, Lactohale® 300, Lactopress® SD 250 (spray-dried lactose), Respitose® SV003 and Sorbolac® 400. A DPI formulation can contain a single lactose grade or a combination of different lactose grades. For example, a fine lactose grade like Lactohale® 300 or Sorbolac® 400 may not be a suitable DPI carrier and may need to be blended with a coarse lactose grade like DCL 11, Flowlac® 100, Inhalac® 230 or Respitose® SV003 (e.g., about a 1:9 ratio of fine lactose to coarse lactose) to improve flow. Tables 7 and 8 show non-limiting examples of grades/types of lactose that can be used in DPI formulations. The distribution of the carrier particle sizes affects the fine particle fraction/dose (FPF or FPD) of the drug, with a high FPF being desired for drug delivery to the lungs. FPF/FPD is the respirable fraction/dose mass out of the DPI device with an aerodynamic particle size <5 microns in the inspiration air. High FPF, and hence good DPI performance, can be obtained from, e.g., DPI formulations having an approximately 1:9 ratio of fine lactose (e.g., Lactohale® 300) to coarse lactose (e.g., Respitose® SV003) and about 20% w/w overages to avoid deposition of the drug in the capsule shell or the DPI device and to deliver essentially all of the drug to the airways.

Other carriers for DPI formulations include without limitation glucose, mannitol (e.g., crystallized mannitol [Pearlitol 110 C] and spray-dried mannitol [Pearlitol 100 SD]), maltitol (e.g., crystallized maltitol [Maltisorb P90]), sorbitol and xylitol.

To improve the performance of DPI formulations, pulmospheres can be used. These relatively large porous, hollow particles have low particle density and improved dispersibility. Pulmospheres can be prepared using a polymeric or non-polymeric excipient by, e.g., solvent evaporation or spray drying. For example, pulmospheres can be made of phosphatidylcholine, the primary component of human lung surfactant. The relatively large size of pulmospheres allows them to remain in the alveolar region longer than their non-porous counterparts by avoiding phagocytic clearance. Pulmospheres can also be used in aerosol formulations for MDIs as well as for DPIs.

Dry powder inhalers can be classified by dose type into single-unit dose (including disposable and reusable) and multi-dose (including multi-dose reservoirs and multi-unit dose). In a single-unit dose DPI, the formulation can be a powder mix of a micronized drug powder and a carrier and can be supplied in individual capsules, which are inserted into the inhaler for a single dose and are removed and discarded after use. The capsule body containing the dose falls into the device, while the cap is retained in the entry port for subsequent disposal. As the user inhales, the portion of the capsule containing the drug experiences erratic motion in the airstream, causing dislodged particles to be entrained and subsequently inhaled. Particle de-aggregation is caused mainly by turbulence promoted by the grid upstream of the mouthpiece or nosepiece. Examples of single-unit dose DPIs include without limitation Aerolizer®, AIR®, Conix One® (foil seal), Diskhaler®, Diskus®, Handihaler®, Microhaler®, Rotahaler® and Turbo Spin®.

A multi-unit dose DPI uses factory-metered and -sealed doses packaged in a manner so that the device can hold multiple doses without the user having to reload. The packaging typically contains replaceable disks or cartridges, or strips of foil-polymer blister packaging that may or may not be reloadable. For example, individual doses can be packaged in blister packs on a disk cassette. Following piercing, inspiratory flow through the packaging depression containing the drug induces dispersion of the powder. The aerosol stream is mixed with a bypass flow entering through holes in the mouthpiece or nosepiece, which gives rise to turbulence and promotes particle de-agglomeration. Advantages of the prepackaging include protection from the environment until use and insurance of adequate control of dose uniformity. Examples of multi-unit dose DPIs include without limitation Acu-Breath®, Bulkhaler®, Certihaler®, DirectHaler®, Diskhaler®, Diskus®, Dispohaler®, M®, MF-DPI®, Miat-Haler®, NEXT DPI®, Prohaler®, Swinhaler® and Technohaler®.

A multi-dose reservoir DPI stores the formulation in bulk, and has a built-in mechanism to meter individual doses from the bulk upon actuation. It contains multiple doses of small pellets of micronized drug that disintegrate into their primary particles during metering and inhalation. One dose can be dispensed into the dosing chamber by a simple back-and-forth twisting action on the base of the reservoir. Scrapers actively force the drug into conical holes, which causes the pellets to disintegrate. Fluidization of the powder is achieved by shear force as air enters the inhaler, and particle de-agglomeration occurs via turbulence. Advantages of multi-dose reservoir DPIs include their relative ease and low cost of manufacture, and the ease of inclusion of a large number of doses within the device. Examples of multi-dose reservoir DPIs include without limitation Acu-Breath®, Airmax®, Bulkhaler®, Certihaler®, Clickhaler®, Cyclovent®, Dispohaler®, JAGO®, MF-DPI®, Miat-Haler®, NEXT DPI®, Swinhaler® and Turbuhaler®.

Most DPIs are breath-activated ("passive"), relying on the user's inhalation for aerosol generation. Examples of passive DPIs include without limitation Airmax®, Novolizer®, Otsuka DPI (compact cake), and the DPIs mentioned above. The air classifier technology (ACT) is an efficient passive powder dispersion mechanism employed in DPIs. In ACT, multiple supply channels generate a tangential airflow that results in a cyclone within the device during inhalation. There are also power-assisted ("active") DPIs (based on, e.g., pneumatics, impact force or vibration) that use energy to aid, e.g., particle de-agglomeration. For example, the active mechanism of Exubera® inhalers utilizes mechanical energy stored in springs or compressed-air chambers. Examples of active DPIs include without limitation Actispire® (single-unit dose), Aspirair® (multi-dose), Exubera® (single-unit dose), MicroDose® (multi-unit dose and electronically activated), Omnihaler® (single-unit dose), Pfeiffer DPI (single-unit dose), and Spiros® (multi-unit dose).

RNA Viruses

Disclosed herein include methods for preventing, delaying the onset of, or treating an infection, disease, or inflammation caused by a RNA virus. The present disclosure contemplates treating a broad range of viral diseases, including infections of all types, locations, sizes, and characteristics. The RNA virus can be a double-stranded RNA virus. The RNA virus can be a positive-sense single-stranded RNA virus. The positive-sense single-stranded RNA virus can be a coronavirus. The coronavirus can be an alpha coronavirus, a beta coronavirus, a gamma coronavirus, or a delta coronavirus. The coronavirus can be Middle East respiratory coronavirus (MERS-CoV), severe acute respiratory syndrome coronavirus (SARS-CoV), or SARS-CoV-2.

The infection or disease caused by the RNA virus can be common cold, influenza, SARS, coronaviruses, COVID-19, hepatitis C, hepatitis E, West Nile fever, Ebola virus disease, rabies, polio, or measles.

The methods and compositions disclosed herein are useful for preventing, delaying the onset of, or treating an infection, disease, or inflammation caused by a RNA virus. The subject can have been exposed to the RNA virus, can be suspected to have been exposed to the RNA virus, or can be at a risk of being exposed to the RNA virus. The compositions may be used as a prophylactic (to prevent the development of a viral infection) or may be used to treat existing viral infections.

The RNA virus can be an enveloped virus. The RNA virus can a retrovirus. The RNA virus can be a filovirus, arenavirus, bunyavirus, or a rhabdovirus. The RNA virus can be a hepadnavirus, coronavirus, or a flavivirus. The RNA virus can be Respiratory syncytial virus, Parainfluenza virus, Enterovirus 71, Hantavirus, SARS virus, SARS-associated coronavirus, severe acute respiratory syndrome coronavirus (SARS-CoV), or SARS-CoV-2, Sin Nombre virus, Respiratory reovirus. The present disclosure encompasses the treatment of infections with derivatives of any of the viruses disclosed herein. As disclosed herein, the term "derivative of a virus" can refer to a strain of virus that has mutated from an existing viral strain.

The RNA virus can comprise any serotype of human rhinovirus (HRV). HRV may include, without limitation, the species Rhinovirus A (including, but not limited to, serotypes HRV-A1, HRV-A2, HRV-A7, HRV-A8, HRV-A9, HRV-A10, HRV-A11, HRV-A12, HRV-A13, HRV-A15, HRV-A16, HRV-A18, HRV-A19, HRV-A20, HRV-A21, HRV-A22, HRV-A23, HRV-A24, HRV-A25, HRV-A28, HRV-A29, HRV-A30, HRV-A31, HRV-A32, HRV-A33, HRV-A34, HRV-A36, HRV-A38, HRV-A39, HRV-A40, HRV-A41, HRV-A43, HRV-A44, HRV-A45, HRV-A46, HRV-A47, HRV-A49, HRV-A50, HRV-A51, HRV-A53, HRV-A54, HRV-A55, HRV-A56, HRV-A57, HRV-A58, HRV-A59, HRV-A60, HRV-A61, HRV-A62, HRV-A63, HRV-A64, HRV-A65, HRV-A66, HRV-A67, HRV-A68, HRV-A71, HRV-A73, HRV-A74, HRV-A75, HRV-A76, HRV-A77, HRV-A78, HRV-A80, HRV-A81, HRV-A82, HRV-A85, HRV-A88, HRV-A89, HRV-A90, HRV-A94, HRV-A95, HRV-A96, HRV-A98, HRV-A100, HRV-A101, HRV-A102 and HRV-A103), Rhino virus B (including, but not limited to, the serotypes HRV-B3, HRV-B4, HRV-B5, HRV-B6, HRV-B14, HRV-B17, HRV-B26, HRV-B27, HRV-B35, HRV-B37, HRV-B42, HRV-B48, HRV-B52, HRV-B69, HRV-B70, HRV-B72, HRV-B79, HRV-B83, HRV-B84, HRV-B86, HRV-B91, HRV-B92, HRV-B93, HRV-B97, and HRV-B99), and Rhinovirus C (including, but not limited to, serotypes HRV-C1, HRV-C2, HRV-C3, HRV-C4, HRV-C5, HRV-C6, HRV-C7, HRV-C8, HRV-C9, HRV-C10, HRV-C11, HRV-C12, HRV-C13, HRV-C14, HRV-C15, HRV-C16, HRV-C17, HRV-C18, HRV-C19, HRV-C20, HRV-C21, HRV-C22, HRV-C23, HRV-C24, HRV-C25, HRV-C26, HRV-C27, HRV-C28, HRV-C29, HRV-C30, HRV-C31, HRV-C32, HRV-C33, HRV-C34, HRV-C35, HRV-C36, HRV-C37, HRV-C38, HRV-C39, HRV-C40, HRV-C41, HRV-C42, HRV-C43, HRV-C44, HRV-C45, HRV-C46, HRV-C47, HRV-C48, HRV-C49, HRV-C50 and HRV-C51).

In some embodiments the RNA virus is an influenza A virus. Non-limiting examples of influenza A viruses include subtype H10N4, subtype H10N5, subtype H10N7, subtype H10N8, subtype H10N9, subtype H11N1, subtype H11N13, subtype H11N2, subtype H11N4, subtype H11N6, subtype H11N8, subtype H11N9, subtype H12N1, subtype H12N4, subtype H12N5, subtype H12N8, subtype H13N2, subtype H13N3, subtype H13N6, subtype H13N7, subtype H14N5, subtype H14N6, subtype H15N8, subtype H15N9, subtype H16N3, subtype H1N1, subtype H1N2, subtype H1N3, subtype H1N6, subtype H1N9, subtype H2N1, subtype H2N2, subtype H2N3, subtype H2N5, subtype H2N7, subtype H2N8, subtype H2N9, subtype H3N1, subtype H3N2, subtype H3N3, subtype H3N4, subtype H3N5, subtype H3N6, subtype H3N8, subtype H3N9, subtype H4N1, subtype H4N2, subtype H4N3, subtype H4N4, subtype H4N5, subtype H4N6, subtype H4N8, subtype H4N9, subtype H5N1, subtype H5N2, subtype H5N3, subtype H5N4, subtype H5N6, subtype H5N7, subtype H5N8, subtype H5N9, subtype H6N1, subtype H6N2, subtype H6N3, subtype H6N4, subtype H6N5, subtype H6N6, subtype H6N7, subtype H6N8, subtype H6N9, subtype H7N1, subtype H7N2, subtype H7N3, subtype H7N4, subtype H7N5, subtype H7N7, subtype H7N8, subtype H7N9, subtype H8N4, subtype H8N5, subtype H9N1, subtype H9N2, subtype H9N3, subtype H9N5, subtype H9N6, subtype H9N7, subtype H9N8, and subtype H9N9.

Specific examples of strains of influenza A virus include, but are not limited to: A/sw/Iowa/15/30 (H1N1); A/WSN/33 (H1N1); A/eq/Prague/1/56 (H7N7); A/PR/8/34; A/mallard/Potsdam/178-4/83 (H2N2); A/herring gull/DE/712/88 (H16N3); A/sw/Hong Kong/168/1993 (H1N1); A/mallard/Alberta/211/98 (H1N1); A/shorebird/Delaware/168/06 (H16N3); A/sw/Netherlands/25/80 (H1N1); A/sw/Germany/2/81 (H1N1); A/sw/Hannover/1/81 (H1N1); A/sw/Potsdam/1/81 (H1N1); A/sw/Potsdam/15/81 (H1N1); A/sw/Potsdam/268/81 (H1N1); A/sw/Finistere/2899/82 (H1N1); A/sw/Potsdam/35/82 (H3N2); A/sw/Cote d'Armor/3633/84 (H3N2); A/sw/Gent/1/84 (H3N2); A/sw/Netherlands/12/85 (H1N1); A/sw/Karrenzien/2/87 (H3N2); A/sw/Schwerin/103/89 (H1N1); A/turkey/Germany/3/91 (H1N1); A/sw/Germany/8533/91 (H1N1); A/sw/Belgium/220/92 (H3N2); A/sw/GentN230/92 (H1N1); A/sw/Leipzig/145/92 (H3N2); A/sw/Re220/92 hp (H3N2); A/sw/Bakum/909/93 (H3N2); A/sw/Schleswig-Holstein/1/93 (H1N1); A/sw/Scotland/419440/94 (H1N2); A/sw/Bakum/5/95 (H1N1); A/sw/Best/5C/96 (H1N1); A/sw/England/17394/96 (H1N2); A/sw/Jena/5/96 (H3N2); A/sw/Oedenrode/7C/96 (H3N2); A/sw/Lohne/1/97 (H3N2); A/sw/Cote d'Armor/790/97 (H1N2); A/sw/Bakum/1362/98 (H3N2); A/sw/Italy/1521/98 (H1N2); A/sw/Italy/1553-2/98 (H3N2); A/sw/Italy/1566/98 (H1N1); A/sw/Italy/1589/98 (H1N1); A/sw/Bakum/8602/99 (H3N2); A/sw/Cotes d'Armor/604/99 (H1N2); A/sw/Cote d'Armor/1482/99 (H1N1); A/sw/Gent/7625/99 (H1N2); A/Hong Kong/1774/99 (H3N2); A/sw/Hong Kong/5190/99 (H3N2); A/sw/Hong Kong/5200/99 (H3N2); A/sw/Hong Kong/5212/99 (H3N2); A/sw/Ille et Villaine/1455/99 (H1N1); A/sw/Italy/1654-1/99 (H1N2); A/sw/Italy/2034/99 (H1N1); A/sw/Italy/2064/99 (H1N2); A/sw/Berlin/1578/00 (H3N2); A/sw/Bakum/1832/00 (H1N2); A/sw/Bakum/1833/00 (H1N2); A/sw/Cote d'Armor/800/00 (H1N2); A/sw/Hong Kong/7982/00 (H3N2); A/sw/Italy/1081/00 (H1N2); A/sw/Belzig/2/01 (H1N1); A/sw/Belzig/54/01 (H3N2); A/sw/Hong Kong/9296/01 (H3N2); A/sw/Hong Kong/9745/01 (H3N2); A/sw/Spain/33601/01 (H3N2); A/sw/Hong Kong/1144/02 (H3N2); A/sw/Hong Kong/1197/02 (H3N2); A/sw/Spain/39139/02 (H3N2); A/sw/Spain/42386/02 (H3N2); A/Switzerland/8808/2002 (H1N1); A/sw/Bakum/1769/03 (H3N2); A/sw/Bissendorf/IDT1864/03 (H3N2); A/sw/Ehren/IDT2570/03 (H1N2); A/sw/Gescher/IDT2702/03 (H1N2); A/sw/Haselünne/2617/03 hp (H1N1); A/sw/Loningen/IDT2530/03 (H1N2); A/sw/IVD/IDT2674/03 (H1N2); A/sw/Nordkirchen/IDT1993/03 (H3N2); A/sw/Nordwalde/IDT2197/03 (H1N2); A/sw/Norden/IDT2308/03 (H1N2); A/sw/Spain/50047/03 (H1N1); A/sw/Spain/51915/03 (H1N1); A/sw/Vechta/2623/03 (H1N1); A/sw/Visbek/IDT2869/03 (H1N2); A/sw/Waltersdorf/IDT2527/03 (H1N2); A/sw/Damme/IDT2890/04 (H3N2); A/sw/Geldern/IDT2888/04 (H1N1); A/sw/Granstedt/IDT3475/04 (H1N2); A/sw/Greven/IDT2889/04 (H1N1); A/sw/Gudensberg/IDT2930/04 (H1N2); A/sw/Gudensberg/IDT2931/04 (H1N2); A/sw/Lohne/IDT3357/04 (H3N2); A/sw/Nortrup/IDT3685/04 (H1N2); A/sw/Seesen/IDT3055/04 (H3N2); A/sw/Spain/53207/04 (H1N1); A/sw/Spain/54008/04 (H3N2); A/sw/Stolzenau/IDT3296/04 (H1N2); A/sw/Wedel/IDT2965/04 (H1N1); A/sw/Bad Griesbach/IDT4191/05 (H3N2); A/sw/Cloppenburg/IDT4777/05 (H1N2); A/sw/Dotlingen/IDT3780/05 (H1N2); A/sw/Dotlingen/IDT4735/05 (H1N2); A/sw/Egglham/IDT5250/05 (H3N2); A/sw/Harkenblek/IDT4097/05 (H3N2); A/sw/Hertzen/IDT4317/05 (H3N2); A/sw/Krogel/IDT4192/05 (H1N1); A/sw/Laer/IDT3893/05 (H1N1); A/sw/Laer/IDT4126/05 (H1N1); A/sw/Merzen/IDT4114/05 (H3N2); A/sw/Muesleringen-S./IDT4263/05 (H3N2); A/sw/Osterhofen/IDT4004/05

(H3N2); A/sw/Sprenge/IDT3805/05 (H1N2); A/sw/Stadtlohn/IDT3853/05 (H1N2); A/swNoglarn/IDT4096/05 (H1N1); A/sw/Wohlerst/IDT4093/05 (H1N1); A/sw/Bad Griesbach/IDT5604/06 (H1N1); A/sw/Herzlake/IDT5335/06 (H3N2); A/sw/Herzlake/IDT5336/06 (H3N2); A/sw/Herzlake/IDT5337/06 (H3N2); and A/wild boar/Germany/R169/2006 (H3N2).

Other specific examples of strains of influenza A virus include, but are not limited to: A/Toronto/3141/2009 (H1N1); A/Regensburg/D6/2009 (H1N1); A/Bayern/62/2009 (H1N1); A/Bayern/62/2009 (H1N1); A/Bradenburg/19/2009 (H1N1); A/Bradenburg/20/2009 (H1N1); A/Distrito Federal/2611/2009 (H1N1); A/Mato Grosso/2329/2009 (H1N1); A/Sao Paulo/1454/2009 (H1N1); A/Sao Paulo/2233/2009 (H1N1); A/Stockholm/37/2009 (H1N1); A/Stockholm/41/2009 (H1N1); A/Stockholm/45/2009 (H1N1); A/swine/Alberta/OTH-33-1/2009 (H1N1); A/swine/Alberta/OTH-33-14/2009 (H1N1); A/swine/Alberta/OTH-33-2/2009 (H1N1); A/swine/Alberta/OTH-33-21/2009 (H1N1); A/swine/Alberta/OTH-33-22/2009 (H1N1); A/swine/Alberta/OTH-33-23/2009 (H1N1); A/swine/Alberta/OTH-33-24/2009 (H1N1); A/swine/Alberta/OTH-33-25/2009 (H1N1); A/swine/Alberta/OTH-33-3/2009 (H1N1); A/swine/Alberta/OTH-33-7/2009 (H1N1); A/Beijing/502/2009 (H1N1); A/Firenze/10/2009 (H1N1); A/Hong Kong/2369/2009 (H1N1); A/Italy/85/2009 (H1N1); A/Santo Domingo/572N/2009 (H1N1); A/Catalonia/385/2009 (H1N1); A/Catalonia/386/2009 (H1N1); A/Catalonia/387/2009 (H1N1); A/Catalonia/390/2009 (H1N1); A/Catalonia/394/2009 (H1N1); A/Catalonia/397/2009 (H1N1); A/Catalonia/398/2009 (H1N1); A/Catalonia/399/2009 (H1N1); A/Sao Paulo/2303/2009 (H1N1); A/Akita/1/2009 (H1N1); A/Castro/JXP/2009 (H1N1); A/Fukushima/1/2009 (H1N1); A/Israel/276/2009 (H1N1); A/Israel/277/2009 (H1N1); A/Israel/70/2009 (H1N1); A/Iwate/1/2009 (H1N1); A/Iwate/2/2009 (H1N1); A/Kagoshima/1/2009 (H1N1); A/Osaka/180/2009 (H1N1); A/Puerto Montt/Bio87/2009 (H1N1); A/Sao Paulo/2303/2009 (H1N1); A/Sapporo/1/2009 (H1N1); A/Stockholm/30/2009 (H1N1); A/Stockholm/31/2009 (H1N1); A/Stockholm/32/2009 (H1N1); A/Stockholm/33/2009 (H1N1); A/Stockholm/34/2009 (H1N1); A/Stockholm/35/2009 (H1N1); A/Stockholm/36/2009 (H1N1); A/Stockholm/38/2009 (H1N1); A/Stockholm/39/2009 (H1N1); A/Stockholm/40/2009 (H1N1) A/Stockholm/42/2009 (H1N1); A/Stockholm/43/2009 (H1N1); A/Stockholm/44/2009 (H1N1); A/Utsunomiya/2/2009 (H1N1); A/WRAIR/0573N/2009 (H1N1); and A/Zhejiang/DTID-ZJU01/2009 (H1N1).

In some embodiments the RNA virus is an influenza B virus. Non-limiting examples of influenza B viruses include strain Aichi/5/88, strain Akita/27/2001, strain Akita/5/2001, strain Alaska/16/2000, strain Alaska/1777/2005, strain Argentina/69/2001, strain Arizona/146/2005, strain Arizona/148/2005, strain Bangkok/163/90, strain Bangkok/34/99, strain Bangkok/460/03, strain Bangkok/54/99, strain Barcelona/215/03, strain Beijing/15/84, strain Beijing/184/93, strain Beijing/243/97, strain Beijing/43/75, strain Beijing/5/76, strain Beijing/76/98, strain Belgium/WV106/2002, strain Belgium/WV107/2002, strain Belgium/WV109/2002, strain Belgium/WV114/2002, strain Belgium/WV122/2002, strain Bonn/43, strain Brazil/952/2001, strain Bucharest/795/03, strain Buenos Aires/161/00), strain Buenos Aires/9/95, strain Buenos Aires/SW16/97, strain Buenos AiresNL518/99, strain Canada/464/2001, strain Canada/464/2002, strain Chaco/366/00, strain Chaco/R113/00, strain Cheju/303/03, strain Chiba/447/98, strain Chongqing/3/2000, strain clinical isolate SA1 Thailand/2002, strain clinical isolate SA10 Thailand/2002, strain clinical isolate SA100 Philippines/2002, strain clinical isolate SA101 Philippines/2002, strain clinical isolate SA110 Philippines/2002), strain clinical isolate SA112 Philippines/2002, strain clinical isolate SA113 Philippines/2002, strain clinical isolate SA114 Philippines/2002, strain clinical isolate SA2 Thailand/2002, strain clinical isolate SA20 Thailand/2002, strain clinical isolate SA38 Philippines/2002, strain clinical isolate SA39 Thailand/2002, strain clinical isolate SA99 Philippines/2002, strain CNIC/27/2001, strain Colorado/2597/2004, strain CordobaNA418/99, strain Czechoslovakia/16/89, strain Czechoslovakia/69/90, strain Daeku/10/97, strain Daeku/45/97, strain Daeku/47/97, strain Daeku/9/97, strain B/Du/4/78, strain B/Durban/39/98, strain Durban/43/98, strain Durban/44/98, strain B/Durban/52/98, strain Durban/55/98, strain Durban/56/98, strain England/1716/2005, strain England/2054/2005), strain England/23/04, strain Finland/154/2002, strain Finland/159/2002, strain Finland/160/2002, strain Finland/161/2002, strain Finland/162/03, strain Finland/162/2002, strain Finland/162/91, strain Finland/164/2003, strain Finland/172/91, strain Finland/173/2003, strain Finland/176/2003, strain Finland/184/91, strain Finland/188/2003, strain Finland/190/2003, strain Finland/220/2003, strain Finland/WV5/2002, strain Fujian/36/82, strain Geneva/5079/03, strain Genoa/11/02, strain Genoa/2/02, strain Genoa/21/02, strain Genova/54/02, strain Genova/55/02, strain Guangdong/05/94, strain Guangdong/08/93, strain Guangdong/5/94, strain Guangdong/55/89, strain Guangdong/8/93, strain Guangzhou/7/97, strain Guangzhou/86/92, strain Guangzhou/87/92, strain Gyeonggi/592/2005, strain Hannover/2/90, strain Harbin/07/94, strain Hawaii/10/2001, strain Hawaii/1990/2004, strain Hawaii/38/2001, strain Hawaii/9/2001, strain Hebei/19/94, strain Hebei/3/94), strain Henan/22/97, strain Hiroshima/23/2001, strain Hong Kong/110/99, strain Hong Kong/1115/2002, strain Hong Kong/112/2001, strain Hong Kong/123/2001, strain Hong Kong/1351/2002, strain Hong Kong/1434/2002, strain Hong Kong/147/99, strain Hong Kong/156/99, strain Hong Kong/157/99, strain Hong Kong/22/2001, strain Hong Kong/22/89, strain Hong Kong/336/2001, strain Hong Kong/666/2001, strain Hong Kong/9/89, strain Houston/1/91, strain Houston/1/96, strain Houston/2/96, strain Hunan/4/72, strain Ibaraki/2/85, strain ncheon/297/2005, strain India/3/89, strain India/77276/2001, strain Israel/95/03, strain Israel/WV187/2002, strain Japan/1224/2005, strain Jiangsu/10/03, strain Johannesburg/1/99, strain Johannesburg/96/01, strain Kadoma/1076/99, strain Kadoma/122/99, strain Kagoshima/15/94, strain Kansas/22992/99, strain Khazkov/224/91, strain Kobe/1/2002, strain, strain Kouchi/193/99, strain Lazio/1/02, strain Lee/40, strain Leningrad/129/91, strain Lissabon/2/90), strain Los Angeles/1/02, strain Lusaka/270/99, strain Lyon/1271/96, strain Malaysia/83077/2001, strain Maputo/1/99, strain Mar del Plata/595/99, strain Maryland/1/01, strain Memphis/i/01, strain Memphis/12/97-MA, strain Michigan/22572/99, strain Mie/1/93, strain Milano/1/01, strain Minsk/318/90, strain Moscow/3/03, strain Nagoya/20/99, strain Nanchang/1/00, strain Nashville/107/93, strain Nashville/45/91, strain Nebraska/2/01, strain Netherland/801/90, strain Netherlands/429/98, strain New York/1/2002, strain NIB/48/90, strain Ningxia/45/83, strain Norway/1/84, strain Oman/16299/2001, strain Osaka/1059/97, strain Osaka/983/97-V2, strain Oslo/1329/2002, strain Oslo/1846/2002, strain Panama/45/90, strain Paris/329/90, strain Parma/23/02, strain Perth/211/2001, strain Peru/1364/2004, strain Philippines/5072/2001, strain Pusan/270/99, strain Quebec/173/98, strain Quebec/465/98, strain Quebec/7/01, strain Roma/1/03, strain Saga/S172/99, strain Seoul/

13/95, strain Seoul/37/91, strain Shangdong/7/97, strain Shanghai/361/2002), strain Shiga/T30/98, strain Sichuan/379/99, strain Singapore/222/79, strain Spain/WV27/2002, strain Stockholm/10/90, strain Switzerland/5441/90, strain Taiwan/0409/00, strain Taiwan/0722/02, strain Taiwan/97271/2001, strain Tehran/80/02, strain Tokyo/6/98, strain Trieste/28/02, strain Ulan Ude/4/02, strain United Kingdom/34304/99, strain USSR/100/83, strain Victoria/103/89, strain Vienna/1/99, strain Wuhan/356/2000, strain WV194/2002, strain Xuanwu/23/82, strain Yamagata/1311/2003, strain Yamagata/K500/2001, strain Alaska/12/96, strain GA/86, strain NAGASAKI/1/87, strain Tokyo/942/96, and strain Rochester/02/2001.

In some embodiments the RNA virus is an influenza C virus. Non-limiting examples of influenza C viruses include strain Aichi/1/81, strain Ann Arbor/i/50, strain Aomori/74, strain California/78, strain England/83, strain Greece/79, strain Hiroshima/246/2000, strain Hiroshima/252/2000, strain Hyogo/1/83, strain Johannesburg/66, strain Kanagawa/1/76, strain Kyoto/1/79, strain Mississippi/80, strain Miyagi/1/97, strain Miyagi/5/2000, strain Miyagi/9/96, strain Nara/2/85, strain NewJersey/76, strain pig/Beijing/115/81, strain Saitama/3/2000), strain Shizuoka/79, strain Yamagata/2/98, strain Yamagata/6/2000, strain Yamagata/9/96, strain BERLIN/1/85, strain ENGLAND/892/8, strain GREAT LAKES/1167/54, strain JJ/50, strain PIG/BEIJING/10/81, strain PIG/BEIJING/439/82), strain TAYLOR/1233/47, and strain C/YAMAGATA/10/81.

Additional Therapeutic Agents

In some embodiments, the method can comprise administering to the subject in need thereof one or more additional therapeutic agents (e.g., antiviral agents). The additional therapeutic agents (e.g., antiviral agents) can be co-administered to the subject with the composition. The additional therapeutic agents (e.g., antiviral agents) can be administered to the subject before the administration of the composition, after the administration of the composition, or both. The composition can comprise one or more additional therapeutic agents (e.g., antiviral agents).

The antiviral agent can be selected from the group consisting of a nucleoside or a non-nucleoside analogue reverse-transcriptase inhibitor, a nucleotide analogue reverse-transcriptase inhibitor, a NS3/4A serine protease inhibitor, a NS5B polymerase inhibitor, and interferon alpha.

As disclosed herein, co-administration of particular ratios and/or amounts of a compound of the disclosure (e.g., a compound listed in Tables 1-6, or a pharmaceutically acceptable salt, ester, solvate, stereoisomer, tautomer, or prodrug thereof) and one or more additional therapeutic agents (e.g., antiviral agents) can result in synergistic effects in preventing, delaying the onset of, or treating an infection, disease, or inflammatory effect caused by a RNA virus. These synergistic effects can be such that the one or more effects of the combination compositions are greater than the one or more effects of each component alone at a comparable dosing level, or they can be greater than the predicted sum of the effects of all of the components at a comparable dosing level, assuming that each component acts independently. The synergistic effect can be, be about, be greater than, or be greater than about, 5, 10, 20, 30, 50, 75, 100, 110, 120, 150, 200, 250, 350, or 500% better than the effect of treating a subject with one of the components alone, or the additive effects of each of the components when administered individually. The effect can be any of the measurable effects described herein. The composition comprising a plurality of components can be such that the synergistic effect is, for example, a reduction in lung inflammation and that lung inflammation is reduced to a greater degree as compared to the sum of the effects of administering each component, determined as if each component exerted its effect independently, also referred to as the predicted additive effect herein. For example, if a composition comprising component (a) yields an effect of a 20% reduction in lung inflammation and a composition comprising component (b) yields an effect of 50% reduction in lung inflammation, then a composition comprising both component (a) and component (b) would have a synergistic effect if the combination composition's effect on lung inflammation was greater than 70%.

A synergistic combination composition can have an effect that is greater than the predicted additive effect of administering each component of the combination composition alone as if each component exerted its effect independently. For example, if the predicted additive effect is 70%, an actual effect of 140% is 70% greater than the predicted additive effect or is 1 fold greater than the predicted additive effect. The synergistic effect can be at least, or at least about, 20, 50, 75, 90, 100, 150, 200 or 300% greater than the predicted additive effect. In some embodiments, the synergistic effect can be at least, or at least about, 0.2, 0.5, 0.9, 1.1, 1.5, 1.7, 2, or 3 fold greater than the predicted additive effect.

In some embodiments, the synergistic effect of the combination compositions can also allow for reduced dosing amounts, leading to reduced side effects to the subject and reduced cost of treatment. Furthermore, the synergistic effect can allow for results that are not achievable through any other treatments. Therefore, proper identification, specification, and use of combination compositions can allow for significant improvements in the reduction and prevention of lung inflammation.

The additional therapeutic agents provided herein can include antagonists of transient receptor potential cation channels, including but not limited to transient receptor potential ankyrin A1 (TRPA1) antagonists {e.g., camphor, isopentenyl pyrophosphate, A967079, GRC-17536, (4R)-1, 2,3,4-tetrahydro-4-[3-(3-methoxypropoxy)phenyl]-2-thioxo-5H-indeno[1,2-d]pyrimidin-5-one, 2-amino-4-arylthiazole compounds disclosed in WO 2012/085662 A1, and specialized pro-resolving mediators (SPMs) (e.g., metabolites of polyunsaturated fatty acids [PUFAs])}, transient receptor potential vanilloid (TRPV) antagonists (e.g., TRPV1 antagonists [e.g., capsazepine, iodo-resiniferatoxin, AMG-517, GRC-6211, NGD-8243, SB-705498 and SPMs {e.g., PUFA metabolites}] and TRPV3 antagonists [e.g., SPMs {e.g., PUFA metabolites}]), and analogs, derivatives and salts thereof.

The additional therapeutic agents provided herein can include TRPV1 agonists that cause decrease in TRPV1 activity (desensitization) upon prolonged exposure of TRPV1 to the stimuli, including but not limited to capsaicin, camphor, carvacrol, menthol, methyl salicylate, resiniferatoxin, tinyatoxin, and analogs, derivatives and salts thereof.

The additional therapeutic agents provided herein can include antagonists of protease-activated receptors (PARs) and inhibitors of activating proteases, including but not limited to PAR1 antagonists (e.g., SCH-530,348), PAR2 antagonists {e.g., AY-117, ENMD-1068, ENMD-106836, GB-83, tetracyclines (e.g., doxycycline, minocycline and tetracycline), FSLLRY-NH$_2$(PAR-3888-PD, Ac-FSLLRY-NH$_2$ and anti-PAR2 antibodies (e.g., SAM-11 [SC-13504], P2pal-21 and P2pal-2135}, PAR4 antagonists {e.g., ethanol, YD-3, statins atorvastatin, cerivastatin, fluvastatin, lovastatin, pitavastatin, pravastatin, rosuvastatin and simvastatin), pepducin P4 pal-10, pepducin P4 pal-15, trans-cinnamoyl-APGKF-NH$_2$, trans-cinnamoyl-YPGKF-NH$_2$, and anti-PAR4 antibodies (e.g., C-19 and SC-1249)}, inhibitors of serine proteases {e.g., benzamidine hydrochloride, 4-iodo-1-benzothiophene-2-carboximidamide hydrochloride (inhibits trypsin and tryptase), inhibitors of kallikreins (e.g., camostat, nafamostat, gabexate, ecallantide and $\alpha_1$-inhibitor), trypsin inhibitors tosyllysine chloromethyl ketone [TLCK] hydrochloride, $\alpha_1$-antitrypsin, aprotinin, ovomucin and soybean trypsin inhibitor), and tryptase inhibitors (e.g., camostat, nafamostat, gabexate, AMG-126737 and APC-366)}, inhibitors of cysteine proteases {e.g., E-64 (non-specific inhibitor), JNJ-10329670, RWJ-445380, cystatin C, leupeptin, stefin A, stefin B, testican-1, chloroquine, fluoromethyl ketone, naphthalene endoperoxide (inhibits cathepsin B, L and S), CA-074 (inhibits cathepsin B), odanacatib (MK-0822, inhibits cathepsin K), CLIK-148 and CLIK-195 (inhibit cathepsin L), and CLIK-60 and E-6438 (inhibit cathepsin S)}, and analogs, derivatives, fragments and salts thereof;

The additional therapeutic agents provided herein can include antagonists of endothelin receptors, including but not limited to selective endothelin A receptor (ETAR) antagonists {e.g., ambrisentan, atrasentan, sitaxentan, zibotentan, BQ-123, 4-amino-N-(3,4-dimethylisoxazol-5-yl) benzenesulfonamide; (2R)-2-[[(2R)-2-[[(2 S)-2-(azepane-1-carbonylamino)-4-methylpentanoyl]amino]-3-(1-formylindol-3-yl)propanoyl]amino]-3-(1H-indol-3-yl) propanoic acid; 3-benzodioxol-5-yl)-1-[2-(dibutylamino)-2-oxoethyl]-2-(4-methoxyphenyl)pyrrolidine-3-carboxylic acid; (2R,3R,4S)-4-(1,3-benzodioxol-5-yl)-1-[2-(dibutylamino)-2-oxoethyl]-2-(4-methoxyphenyl)pyrrolidine-3-carboxylic acid; (2R,3R,4S)-4-(1,3-benzodioxol-5-yl)-1-[2-(dibutylamino)-2-oxoethyl]-2-(2-methoxyphenyl) pyrrolidine-3-carboxylic acid; 3-(1,3-benzodioxol-5-yl)-5-hydroxy-5-(4-methoxyphenyl)-4-[(3,4,5-trimethoxyphenyl) methyl]furan-2-one; 2-(1,3-benzodioxol-5-yl)-4-(4-methoxyphenyl)-4-oxo-3-[(3,4,5-trimethoxyphenyl)methyl] but-2-enoate; 5-(4-bromophenyl)-6-[2-(5-bromopyrimidin-2-yl)oxyethoxy]-N-(propylsulfamoyl)pyrimidin-4-amine; 4-tert-butyl-N-[6-(2-hydroxyethoxy)-5-(2-methoxyphenoxy)-2-(pyrimidin-2-yl)pyrimidin-4-yl]benzenesulfonamide; [(7R)-5-chloro-3-[(1E,3E,5S)-3,5-dimethylhepta-1,3-dienyl]-7-methyl-6,8-dioxoisochromen-7-yl]acetate; N-(4-chloro-3-methyl-1,2-oxazol-5-yl)-2-[2-(6-methyl-2H-1,3-benzodioxol-5-yl)acetyl]thiophene-3-sulfonamide; (2S)-2-(4,6-dimethoxypyrimidin-2-yl)oxy-3-methoxy-3,3-diphenylpropanoic acid; (2S)-2-[(4,6-dimethylpyrimidin-2-yl)oxyl-3-methoxy-3,3-diphenylpropanoic acid; N-[6-(2-hydroxyethoxy)-5-(2-methoxyphenoxy)-2-[2-(2H-tetrazol-5-yl)pyridin-4-yl]pyrimidin-4-yl]-5-methylpyridine-2-sulfonamide; N-[6-(2-hydroxyethoxy)-5-(2-methoxyphenoxy)-2-[2-(2H-tetrazol-5-yl)pyridin-4-yl] pyrimidin-4-yl]-5-propan-2-ylpyridine-2-sulfonamide; 6-(2-hydroxy-ethoxy)-5-(2-methoxyphenoxy)-2-[2-(1,2,3-triaza-4-azoniacyclopenta-2,5-dien-5-yl)pyridin-4-yl]pyrimidin-4-yl]-(5-methylpyridin-2-yl)sulfonylazanide; 2-[(3R,6R,9S,12R,15S)-6-(1H-indol-3-ylmethyl)-9-(2-methylpropyl)-2,5,8,11,14-pentaoxo-12-propan-2-yl-1,4,7, 10,13-pentaazabicyclo[13.3.0]octadecan-3-yl]acetic acid; N-[6-methoxy-5-(2-methoxyphenoxy)-2-pyridin-4-ylpyrimidin-4-yl]-5-methylpyridisulfonamide; N-(3-methoxy-5-methylpyrazin-2-yl)-2-[4-(1,3,4-oxadiazol-2-yl)phenyl] pyridine-3-sulfonamide; and N-[5-(2-methoxyphenoxy)-2-pyridin-4-yl-6-(trideuteriomethoxy)pyrimidine-4-yl]-5-methylpyridine-2-sulfonamide}, selective endothelin B receptor (ETBR) antagonists (e.g., A-192621 and BQ-788), dual ETAR/ETBR antagonists (e.g., bosentan, macitentan and tezosentan), and analogs, derivatives and salts thereof.

The additional therapeutic agents provided herein can include inhibitors of Toll-like receptors (TLRs), including, but not limited to TIR7/non-TLR9 inhibitors (e.g., ODN 2087, ODN 20958 and ODN 20959), dual TLR7/TLR9 inhibitors (e.g., chloroquine, hydroxychloroquine, quinacrine, AT791, DV056, E6446, IMO-3100, IMO-8400 and ODN 2088), and analogs, derivatives, fragments and salts thereof.

The additional therapeutic agents provided herein can include inhibitors of mitogen-activated protein (MAP) kinases, including but not limited to p38 MAP kinase inhibitors {e.g., BMS-582949, CPSI-2364, 4-(4-fluorophenyl)-2-(4-hydroxyphenyl)-5-(4-pyridyl)-1H-imidazole, trans-4-[4-(4-fluorophenyl)-5-(2-methoxy-4-pyrimidinyl)-1H-imidazole-1-yl-]cyclohexanol, and 4-(4-fluorophenyl)-2-(4-methylsulfinylphenyl)-5-(4-pyridyl)-1H-imidazole}, and analogs, derivatives and salts thereof.

The additional therapeutic agents provided herein can include inhibitors of mitogen-activated protein kinase kinases (MEKs), including but not limited to MEK 1 inhibitors {e.g., N-[3-[5-(2-aminopyrimidin-4-yl)-2-tert-butyl-1, 3-thiazol-4-yl]-2-fluorophenyl]-2,6-difluorobenzenesulfonamide; N-[3-[5-(2-aminopyrimidin-4-yl)-2-tert-butyl-1,3-thiazol-4-yl]-2-fluorophenyl]-2,6-difluorobenzenesulfonamide, methanesulfonic acid; 6-(4-bromo-2-chloroanilino)-7-fluoro-N-(2-hydroxyethoxy)-3-methylbenzimidazole-5-carboxamide; 5-bromo-N-(2,3-dihydroxypropoxy)-3,4-difluoro-2-(2-fluoro-4-iodoanilino) benzamide; 6-(4-bromo-2-fluoroanilino)-7-fluoro-N-(2-hydroxyethoxy)-3-methylbenzimidazole-5-carboxamide; 2-[4-[(2-butyl-4-oxo-1,3-diazaspiro[4.4]non-1-en-3-yl) methyl]-2-(ethoxymethyl)phenyl]-N-(3,4-dimethyl-1,2-oxazol-5-yl)benzenesulfonamide; 2-[4-[(2-butyl-4-oxo-1,3-diazaspiro[4.4]non-1-en-3-yl)methyl]-2-(ethoxymethyl) phenyl]-N-(4,5-dimethyl-1,2-oxazol-3-yl) benzenesulfonamide; 2-[4-[(2-butyl-4-oxo-1,3-diazaspiro [4.4]non-1-en-3-yl)methyl]-2-propylphenyl]-N-(4,5-dimethyl-1,2-oxazol-3-yl)benzenesulfonamide; 2-(2-chloro-4-iodoanilino)-N-(cyclopropylmethoxy)-3,4-difluorobenzamide; N-[3-[3-cyclopropyl-5-(2-fluoro-4-iodoanilino)-6,8-dimethyl-2,4,7-trioxopyrido[4,3-d]pyrimidin-1-yl]phenyl] acetamide; 3,4-difluoro-2-(2-fluoro-4-iodoanilino)-N-(2-hydroxyethoxy)-5-[(3-oxooxazinan-2-yl)methyl] benzamide; N-[3,4-difluoro-2-(2-fluoro-4-iodoanilino)-6-methoxyphenyl]-[(2S)-2,3-dihydroxypropyl]cyclopropane-1-sulfonamide; [3,4-difluoro-2-(2-fluoro-4-iodoanilino) phenyl]-[3-hydroxy-3-[(2S)-piperidin-2-yl]azetidin-1-yl] methanone; N-[(2R)-2,3-dihydroxypropoxy]-3,4-difluoro-2-(2-fluoro-4-iodoanilino)benzamide; (2S,3 S)-2-[(4R)-4-[4-[(2R)-2,3-dihydroxypropoxy]phenyl]-2,5-dioxoimidazolidin-1-yl]-N-(2-fluoro-4-iodophenyl)-3-phenylbutanamide; 3-[(2R)-2,3-dihydroxypropyl]-6-fluoro-5-(2-fluoro-4-iodoanilino)-8-methylpyrido[2,3-(1] pyrimidine-4,7-dione; N-[(2S)-2,3-dihydroxypropyl]-3-(2-fluoro-4-iodoanilino)pyridine-4-carboxamide, and 2-(2-fluoro-4-iodoanilino)-N-(2-hydroxyethoxy)-1,5-dimethyl-6-oxopyridine-3-carboxamide}, and analogs, derivatives and salts thereof.

The additional therapeutic agents provided herein can include inhibitors of calcitonin gene-related peptide (CGRP) or receptor therefor or the production thereof, including but not limited to CORP receptor antagonists (e.g., olcegepant, telcagepant, ubrogepant, eptinezumab [ALD-403], AMG-334, LY-2951742 and TEV-48125), and analogs, derivatives, fragments and salts thereof.

The additional therapeutic agents provided herein can include inhibitors of gastrin-releasing peptide (GRP) or the receptor therefor (GRPR, aka bombesin receptor 2 [BBR2]) or the production thereof, including but not limited to CRPR antagonists (e.g.; RC-3095), and analogs, derivatives and salts thereof.

The additional therapeutic agents provided herein can include inhibitors of nerve growth factor (NGF) or receptors therefor tropomyosin kinase receptor A [TrkA]) or the production thereof, including but not limited to NGF inhibitors (e.g., fulranumab and tanezumab), NGF receptor inhibitors (e.g., TrkA inhibitors such as A0879, CT327 and K252a), and analogs, derivatives, fragments and salts thereof.

The additional therapeutic agents provided herein can include inhibitors of neurotensin or receptors therefor (e.g., neurotensin receptor 1 [NTSR1], NTSR2 and so 1) or the production thereof, including but not limited to selective NTSR1 antagonists (e.g., SR-48,692), selective NTSR2 antagonists (e.g., levocabastine), unselective receptor antagonists (e.g., SR-142,948), and analogs, derivatives and salts thereof.

The additional therapeutic agents provided herein can include inhibitors of somatostatin or receptors therefor (e.g., somatostatin receptors [SSTRs] 1 to 5) or the production thereof, including but not limited to selective SSTR2 antagonists (e.g., CYN 154806), selective SSTRS antagonists (e.g., BIM 23056), unselective SSTR antagonists (e.g., cyclosomatostatin), and analogs, derivatives, fragments and salts thereof.

The additional therapeutic agents provided herein can include inhibitors of vasoactive intestinal peptide (VIP) or receptors therefor (e.g., VIPR1 and VIPR2) or the production thereof, including but not limited to VIP receptor antagonists {e.g., PG 97-269, ViPhyb, VIP(6-28)—NH$_2$, [p-Cl-D-Phe$^6$, Leu$^{17}$]VIP-NH$_2$, [Ac-His$^1$, D-Phe$^2$, Lys$^{15}$, Arg$^{16}$]VIP(3-7)GRF(8-27)—NH$_2$, and [Ac-Tyr$^1$, D-Phe$^2$]GRF(1-29)—NH$_2$}, and analogs, derivatives, fragments and salts thereof.

The additional therapeutic agents provided herein can include inhibitors of bradykinin or receptors therefor (e.g., B1 and B2) or the production thereof, including but not limited to bradykinin inhibitors (e.g., aloe, bromelain and polyphenols), bradykinin receptor B2 antagonists (e.g., icatibant and FR-173657), inhibitors of kallikreins (e.g., ecallantide, camostat, nafamostat, gabexate and C1-inhibitor), and analogs, derivatives and salts thereof.

The additional therapeutic agents provided herein can include inhibitors of corticotropin-releasing hormone (CRH, aka corticoliberin) or receptors therefor (e.g., CRHR1 and CRHR2) or the production thereof, including but not limited to CRHR1 antagonists (e.g., antalarmin, pexacerfont, CP-154,526 LWH-234, NBI-27914 and R-121,919), CRHR2 antagonists (e.g., astressin-B), and analogs, derivatives and salts thereof.

The additional therapeutic agents provided herein can include antihistamines, including but not limited to antihistamines that inhibit action at the histamine H$_1$ receptor (e.g., acrivastine, antazoline, astemizole, azatadine, azelastine, bepotasiine, bilastine, bromodiphenhydramine, brompheniramine, buclizine, carbinoxamine, cetirizine, chlorocyclizine, chlorodiphenhydramine, chlorpheniramine, chlorpromazine, chloropyramine, cidoxepin, clemastine, cyclizine, cyproheptadine, desloratadine, dexbrompheniramine, dexchlorpheniramine, dimenhydrinate, dimetindene, diphenhydramine, doxepin, doxylamine, ebastine, embramine, esmirtazapine [(S)-(+)-enantiomer of mirtazapine], fexofenadine, hydroxyzine, ketotifen, levocabastine, levocetirizine, loratadine, meclozine mepyramine, mirtazapine, mizolastine, olopatadine, orphenadrine, phenindamine, pheniramine, phenyltoloxamine, promethazine, pyrilamine, quetiapine, quifenadine, rupatadine, terfenadine, trimeprazine tripelennamine and triprolidine), antihistamines that inhibit action at the histamine H$_3$ receptor (e.g., betahistine, burimamide, ciproxifan, clobenpropit, conessine, failproxifan, impentamine, iodophenpropit, irdabisant, pitolisant, thioperamide, A-349,821, ABT-239 and VUF-568), antihistamines that inhibit action at the histamine H$_4$ receptor (e.g., clobenpropit, thioperamide, A943931, A987306, JNJ-7777120, VUF-6002 and ZPL-389), and analogs, derivatives and salts thereof.

The additional therapeutic agents provided herein can include inhibitors of phospholipase A2 (e.g., secreted and cytosolic PLA2), including but not limited to arachidonyl trifluoromethyl ketone, bromoenol lactone, chloroquine, cytidine 5-diphosphoamines, darapladib, quinacrine, vitamin E, RO-061606, ZPL-521, lipocortins (annexins), and analogs, derivatives, fragments and salts thereof.

The additional therapeutic agents provided herein can include inhibitors of pro-inflammatory prostaglandins (e.g., prostaglandin E2) or receptors therefor or the production thereof, including but not limited to non-steroidal anti-inflammatory drugs (NSAIDs) (e.g., non-selective COX-1/COX-2 inhibitors such as aspirin and selective COX-2 inhibitors such as coxibs), glucocorticoids, cyclopentenone prostaglandins (e.g., prostaglandin J2 [PGJ2], Δ12-PGJ2 and 15-deoxy-Δ12,14-PGJ2), and analogs, derivatives and salts thereof, inhibitors of leukotrienes or receptors therefor or the production thereof, including but not limited to leukotriene receptor antagonists (e.g., cinalukast, gemilukast, iralukast, montelukast, pranlukast, tomelukast, verlukast, zafirlukast, CP-199330, HAMI-3379, ICI-198615 and MK-571), 5-lipoxygenase inhibitors (e.g., baicalein, caffeic acid, curcumin, hyperforin, meclofenamic acid, meclofenamate sodium, zileuton and MK-886), and analogs, derivatives and salts thereof.

The additional therapeutic agents provided herein can include mast cell stabilizers, including but not limited to cromoglicic acid (cromolyn), ketotifen, methylxanthines, nedocromil, olopatadine, omalizumab, pemirolast, quercetin. β$_2$-adrenoreceptor agonists {including short-acting β$_2$-adrenergic agonists (e.g., bitolterol, fenoterol, isoprenaline [isoproterenol], levosalbutamol [levalbuterol], orciprenaline [metaproterenol], pirbuterol, procaterol, ritodrine, salbutamol [albuterol] and terbutaline), long-acting β$_2$-adrenergic agonists arformoterol, bambuterol, clenbuterol, formoterol and salmeterol), and ultralong-acting β$_2$-adrenergic agonists (e.g., carmoterol, indacaterol, milveterol, olodaterol and vilanterol)}, and analogs, derivatives and salts thereof.

The additional therapeutic agents provided herein can include Janus kinase (JAX) inhibitors, including, but not limited to JAK1 inhibitors (e.g., GLPG0634 and GSK2586184). JAK2 inhibitors (e.g., lestaurtinib, pacritinib, CYT387 and TG101348), JAK3 inhibitors (e.g., ASP-015K, 8348 and VX-509), dual JAK1/JAK2 inhibitors (e.g., baricitinib and ruxolitinib), dual JAK1/JAK3 inhibitors (e.g., tofacitinib), and analogs, derivatives and salts thereof.

The additional therapeutic agents provided herein can include immunomodulators, including but not limited to imides (e.g., thalidomide, lenalidomide, pomalidomide and apremilast), xanthine derivatives (e.g., lisofylline, pentoxifylline and propentofylline), and analogs, derivatives and salts thereof.

The additional therapeutic agents provided herein can include immunosuppressants, including but not limited to glucocorticoids, antimetabolites (e.g., hydroxyurea [hydroxycarbamide], antifolates [e.g., methotrexate], and purine analogs [e.g., azathioprine, mercaptopurine and thioguanine]), calcineurin inhibitors (e.g, ciclosporin [cyclosporine A], pimecrolimus and tacrolimus), inosine-5'-monophosphate dehydrogenase (IMPDH) inhibitors (e.g., mycophenolic acid and derivatives thereof [e.g., mycophenolate sodium and mycophenolate mofetil]), mechanistic/mammalian target of rapamycin (mTOR) inhibitors (e.g., rapamycin [sirolimus], deforolimus [ridaforolimus], everolimus, temsirolimus, umirolimus [biolimus A9], zotarolimus and RTP-801), modulators of sphingosine-1-phosphate receptors (e.g., S1PR1) (e.g., fingolimod), serine C-palmitoyltransferase inhibitors (e.g., myriocin), and analogs, derivatives and salts thereof.

The additional therapeutic agents provided herein can include corticosteroids/glucocorticoids, including but not limited to hydrocortisone types (e.g., cortisone and derivatives thereof [e.g., cortisone acetate], hydrocortisone and derivatives thereof [e.g., hydrocortisone acetate, hydrocortisone-17-aceponate, hydrocortisone-17-buteprate, hydrocortisone-17-butyrate and hydrocortisone-17-valerate], prednisolone, methylprednisolone and derivatives thereof [e.g., methylprednisolone aceponate], prednisone, and tixocortol and derivatives thereof [e.g., tixocortol pivalate]), betamethasone types (e.g., betamethasone and derivatives thereof [e.g., betamethasone dipropionate, betamethasone sodium phosphate and betamethasone valerate], dexamethasone and derivatives thereof [e.g., dexamethasone sodium phosphate], and fluocortolone and derivatives thereof [e.g., fluocortolone caproate and fluocortolone pivalate]), halogenated steroids (e.g., alclometasone and derivatives thereof [e.g., alclometasone dipropionate], beclometasone and derivatives thereof [e.g., beclometasone dipropionate], clobetasol and derivatives thereof [e.g., clobetasol-17-propionate], clobetasone and derivatives thereof [e.g., clobetasone-17-butyrate], desoximetasone and derivatives thereof [e.g., desoximetasone acetate], diflorasone and derivatives thereof [e.g., diflorasone diacetate], diflucortolone and derivatives thereof [e.g., diflucortolone valerate], fluprednidene and derivatives thereof [e.g., fluprednidene acetate], fluticasone and derivatives thereof [e.g., fluticasone propionate], halobetasol [ulobetasol] and derivatives thereof [e.g., halobetasol proprionate], halometasone and derivatives thereof [e.g., halometasone acetate], and mometasone and derivatives thereof [e.g., mometasone furoate]), acetonides and related substances (e.g., amcinonide, budesonide, ciclesonide, desonide, fluocinonide, fluocinolone acetonide, flurandrenolide [flurandrenolone or fludroxycortide], halcinonide, triamcinolone acetonide and triamcinolone alcohol), carbonates (e.g., prednicarbate), and analogs, derivatives and salts thereof.

The additional therapeutic agents provided herein can include inhibitors of pro-inflammatory cytokines or receptors therefor, including but not limited to inhibitors of (e.g., antibodies to) tumor necrosis factor-alpha (TNF-α) (e.g, adalimumab, certolizumab pegol, golimumab, infliximab, etanercept, bupropion and ART-621), inhibitors of (e.g., antibodies to) pro-inflammatory interferons (e.g., interferon-alpha [IFN-α]) or receptors therefor, inhibitors of (e.g., antibodies to) pro-inflammatory interleukins or receptors therefor (e.g., IL-1 [e.g., IL-1α and IL-1β] or IL-1R [e.g., EBI-005 {isunakinra}], IL-2 or IL-2R [e.g., basiliximab and daclizumab], IL-4 or IL-4R [e.g., dupilumab], IL-5 [e.g., mepolizumab] or IL-5R, IL-6 [e.g., clazakizumab, elsilimomab, olokizumab, siltuximab and sirukumab] or IL-6R [e.g., sarilumab and tocilizumab], IL-8 or IL-8R, IL-12 [e.g., briakinumab and ustekinumab] or IL-12R, IL-13 or IL-13R, IL-15 or IL-15R, IL-17 [e.g., ixekizumab and secukinumab] or IL-17R [e.g., brodalumab], IL-18 or IL-18R, IL-20 [e.g., the antibody 7E] or IL-20R, IL-22 [e.g., fezakinumab] or IL-22R, IL-23 [e.g., briakinumab, guselkumab, risankizumab, tildrakizumab SCH-9002221, ustekinumab and BI-655066] or IL-23R, IL-31 or IL-31R [e.g., anti-IL-31 receptor A antibodies such as nemolizumab], IL-33 or IL-33R, and IL-36 or IL-36R), and analogs, derivatives, fragments and salts thereof.

The additional therapeutic agents provided herein can include inhibitors of the production of pro-inflammatory cytokines or receptors therefor, including but not limited to inhibitors of the production of TNF-α (e.g., myxoma virus M013 protein, *Yersinia* YopM, protein, glucocorticoids, immunomodulatory imides, PDE4 inhibitors, p38 MAP kinase inhibitors, inhibitors of TLRs such as TLR7 and TLR9, scrim protease inhibitors [e.g., gabexate and nafamostat], and prostacyclin, carbacyclin and analogs and derivatives thereof [e.g., beraprost, cicaprost, ciprosten, eptaloprost, iloprost and treprostinil]), IFN-α (e.g., alefacept and inhibitors of TLRs such as TLR7 and TLR9), IL-1 (e.g., IL-1α, and IL-1β) (e.g., M013 protein, YopM protein, nafamostat, prostacyclin, glucocorticoids, TNF-α inhibitors, inhibitors of TLRs such as TLR7 and TLR9, and PAR1 antagonists), IL-2 (e.g., glucocorticoids, calcineurin inhibitors and PDE4 inhibitors), IL-4 (e.g., glucocorticoids and serine protease inhibitors [e.g., gabexate and nafamostat]), IL-5 (e.g., glucocorticoids), IL-6 M013 protein, nafamostat, prostacyclin, tranilast, glucocorticoids, immunomodulatory imides, TNF-α inhibitors, and inhibitors of TLRs such as TLR7 and TLR9), IL-8 alefacept, glucocorticoids and PAR2 antagonists [e.g., tetracyclines]), IL-12 (e.g., apilimod, YopM protein, PDE4 inhibitors, and inhibitors of TLRs such as TLR7 and TLR9), IL-15 (e.g., YopM protein), IL-17 (e.g., protein kinase C [PKC] inhibitors such as sotrastaurin), IL-18 (e.g., MOD protein and YopM protein), and IL-23 (e.g., apilimod, alefacept and PDE4 inhibitors), and analogs, derivatives, fragments and salts thereof.

The additional therapeutic agents provided herein can include other kinds of anti-inflammatory agents, including but not limited to inhibitors of pro-inflammatory transcription factors e.g., inhibitors of NF-κB [e.g., nafamostat, M013 protein, penetranin, (−)-DHMEQ, IT-603, IT-901 and PBS-1086] and inhibitors of STAT [signal transducer and activator of transcription] proteins [e.g., JAK1, JAK2 and JAK3 inhibitors]), antagonists of the prostaglandin $D_2$ receptor ($DP_1$) or/and the chemoattractant receptor homologous molecule expressed on $TH_2$ cells (CRTH2) (e.g., TS-022), phosphodiesterase (PDE) inhibitors (e.g., PDE4 inhibitors such as apremilast, cilomilast, ibudilast, piclamilast, roflumilast, crisaborole, diazepam, luteolin, mesembrenone, rolipram, AN2728 and E6005), IgE inhibitors (e.g., anti-IgE antibodies such as omalizumab), myeloperoxidase inhibitors (e.g., dapsone), specialized pro-resolving mediators (SPMs) (e.g., metabolites of polyunsaturated fatty acids such as lipoxins, resolvins [including resolvins derived from 5Z,8Z,11Z,14Z,17Z-eicosapentaenoic acid {EPA}, resolvins derived from 4Z,7Z,10Z,13Z,16Z,19Z-docosahexaenoic acid {DHA}, and resolvins derived from 7Z,10Z,13Z,16Z,19Z-docosahexaenoic acid {n−3 DPA}], protectins/neuroprotectins [including DHA-derived protectins/neuroprotectins and n−3 DPA-derived protectins/neuroprotectins], maresins [including DHA-derived maresins and n−3 DPA-derived maresins], n−3 DPA metabolites, n-6 DPA {4Z,7Z,10Z,13Z,16Z-docosapentaenoic acid}metabolites, oxo-DHA metabolites, oxo-DPA metabolites, docosahexaenoyl ethanolamide metabolites, cyclopentenone prostaglandins [e.g., Δ12-PGJ2 and 15-deoxy-Δ12, 14-PGJ2], and cyclopentenone isoprostanes [e.g., 5,6-epoxyisoprostane A2 and 5,6-epoxyisoprostane E2]), disease-modifying antirheumatic drugs (DMARDs, e.g., sulfasalazine and mesalazine [5-aminosalicylic acid]), anti-allergic agents (e.g., antihistamines, inhibitors of leukotrienes or receptors therefor or the production thereof, mast cell stabilizers, glucocorticoids, epinephrine [adrenaline] and tranilast), ultraviolet radiation (e.g., ultraviolet A and B), and analogs, derivatives, fragments and salts thereof.

The additional therapeutic agents provided herein can include antagonists of serotonin receptors, including but not limited to $5\text{-}HT_2$ antagonists (e.g., clozapine, cyproheptadine ketanserin, pizotifen [pizotyline] and quetiapine), $5\text{-}HT_3$ antagonists (e.g., alosetron, bemesetron, cilansetron, dolasetron, granisetron, ondansetron, palonosetron, ricasetron, tropanserin, tropisetron, zatosetron, mirtazapine, esmirtazapine and substances present in ginger [e.g., galanolactone, gingerols and shogaols]), and analogs, derivatives and salts thereof.

The additional therapeutic agents provided herein can include antagonists of muscarinic acetylcholine receptors (e.g., M1 to M5), including but not limited to aclidinium, atropine, benzatropine, biperiden, chlorpheniramine, cyclopentolate, darifenacin, dicyclomine, dimenhydrinate, diphenhydramine, doxepin, doxylamine, flavoxate, glycopyrrolate, hyoscyamine, ipratropium, orphenadrine, oxitropium, oxybutynin, pirenzepine, procyclidine, scopolamine (hyoscine), solifenacin, tolterodine, tiotropium, trihexyphenidyl, tropicamide, tricyclic antidepressants, and analogs, derivatives and salts thereof.

Examples of non-steroidal anti-inflammatory drugs (NSAIDs) the can be employed with the compounds provided herein include, but are not limited to: acetic acid derivatives, such as aceclofenac, bromfenac, diclofenac, etodolac, indomethacin, ketorolac, nabumetone, sulindac, sulindac sulfide, sulindac sulfone and tolmetin; anthranilic acid derivatives (fenamates), such as flufenamic acid, meclofenamic acid, mefenamic acid and tolfenamic acid; enolic acid derivatives (oxicams), such as droxicam, isoxicam, lornoxicam, meloxicam, piroxicam and tenoxicam; propionic acid derivatives, such as fenoprofen, flurbiprofen, ibuprofen, dexibuprofen, ketoprofen, dexketoprofen, loxoprofen, naproxen and oxaprozin; salicylates, such as diflunisal, salicylic acid, acetylsalicylic acid (aspirin), choline magnesium trisalicylate, and salsalate; COX-2-selective inhibitors, such as apricoxib, celecoxib, etoricoxib, firocoxib, fluorocoxibs (e.g., fluorocoxibs A-C), lumiracoxib, mavacoxib, parecoxib, rofecoxib, tilmacoxib (JTE-522), valdecoxib, 4-O-methylhonokiol, niflumic acid, DuP-697, CG100649, GW406381, NS-398, SC-58125, benzothieno[3,2-d]pyrimidin-4-one sulfonamide thio-derivatives, and COX-2 inhibitors derived from Tribulus *terrestris*; other kinds of NSAIDs, such as monoterpenoids (e.g., eucalyptol and phenols [e.g., carvacrol]), anilinopyridinecarboxylic acids (e.g., clonixin), sulfonanilides (e.g., nimesulide), and dual inhibitors of lipoxygenase (e.g., 5-LOX) and cyclooxygenase (e.g., COX-2) [e.g., chebulagic acid, licofelone, 2-(3,4,5-trimethoxyphenyl)-4-(N-methylindol-3-yl)thiophene, and di-tert-butylphenol-based compounds (e.g., DTPBHZ, DTPINH, DTPNHZ and DTPSAL)]; and analogs, derivatives and salts thereof.

The one or more antiviral agents and/or the one or more additional therapeutic agents can one or more of the following: Gimsilumab, an anti-granulocyte-macrophage colony stimulating factor monoclonal antibody, a non-viral gene therapy producing monoclonal antibodies, EB05, a non-steroidal anti-inflammatory molecule (sPLA2 inhibitor), Opdivo (nivolumab), a PD-1 blocking antibody, IC14, a recombinant chimeric anti-CD14 monoclonal antibody, avastin (bevacizumab), a vascular endothelial growth factor inhibitor, a PD-1 blocking antibody, Thymosin, meplazumab, an anti-CD147 antibody, an antibody combination REGN-COV2 (REGN10933+REGN10987) against the spike protein MEDI3506, a monoclonal antibody targeting interleukin 33, OmniChicken platform antibodies, antibodies from recovered COVID-19 patients, Antibody 47D11, Polyclonal hyperimmune globulin (H-IG), LY-CoV555 antibody, otilimab, an anti-granulocyte macrophase colony-stimulating factor (GM-CSF) antibody, LY3127804, an anti-Angiopoietin 2 (Ang2) antibody, a CXC10 antagonist, polyclonal hyperimmune globulin (H-IG), Octagam, intravenous Immunoglobulin (IVIG), single domain antibodies (sdAbs), an engineered monoclonal antibody derived from camelids, a super-antibody or antibody cocktail to target potential mutations of SARS-CoV-2, AiRuiKa (camrelizumab), an anti-programmed cell death protein (PD-1) antibody, Linked nanobody antibody, antibodies from recovered COVID-19 patients, OmniRat platform antibodies, Soliris (eculizumab), a complement inhibitor, CT-P59, Ultomiris (ravulizumab-cwvz), rCIG (recombinant anti-coronavirus 19 hyperimmune gammaglobulin), VIR-7831, VIR-7832, Gamifant (emapalumab), an anti-interferon gamma antibody, leronlimab (PRO 140), an CCR5 antagonist, polyclonal hyperimmune globulin (H-IG), Sylvant (siltuximab), an interleukin-6 targeted monoclonal antibody, Actemra (tocilizumab), an interleukin-6 receptor antagonist, Kevzara (sarilumab), an interleukin-6 receptor antagonist, purified ovine immunoglobulin from immunized sheep, lenzilumab, an anti-granulocyte-macrophage colony stimulating factor antibody, Ilaris (canakinumab), an interleukin-1beta blocker, JS016 antibody, TJM2 (TJ003234), an anti-granulocyte-macrophage colony stimulating factor antibody, COVI-SHIELD antibody cocktail, an antibody targeting the S protein, COVID-EIG plasma, SAB-185, polyclonal hyperimmune globulin (H-IG), IFX-1, an anti-C5a antibody, CERC-002, an anti-LIGHT monoclonal antibody, Remsima (infliximab), an anti-TNF antibody, TY027, a monoclonal antibody targeting SARS-CoV-2, IgY-110, an anti-CoV-2 antibody (nasal spray application), mavrilimumab, an anti-granulocyte-macrophase colony-stimulating factor receptor-alpha monoclonal antibody, BDB-100, monoclocnal anti-C5a antibody, TZLS-501, an anti-interleukin-6 receptor monoclonal antibody, itolizumab, anti-CD6 IgG1 monoclonal antibody, GC5131A, BTL-tml, galidesivir, emetine hydrochloride, DAS181, recombinant sialidase (nebulized), Favilavir/Favipiravir/T-705/Avigan, Vicromax, ISR-50, Levovir (clevudine), AB001, EIDD-2801, an oral ribonucleoside analog, ASC09, an HIV protease inhibitor, Tamiflu (oseltamivir), a neuraminidase inhibitor, Truvada, emtricitabine, tenofovir, a HIV-1 nucleoside analog reverse transcriptase inhibitor, Virazole, ribavirin for inhalation solution, AT-527, an oral purine nucleotide prodrug, Ganovo (danoprevir), a hepatitis C virus NS3 protease inhibitor, ritonavir, remdesivir, a nucleotide analog, Arbidol (umifenovir), Prezcobix (darunavir, HIV-1 protease inhibitor/cobicistat, CYP3A inhibitor), Kaletra/Aluvia (lopinavir/ritonavir), an HIV-1 protease inhibitor, prophylactic antiviral CRISPR in human cells (PAC-MAN), GC376, AmnioBoost, concentrated allogeneic MSCs and cytokines derived from amniotic fluid, Astrostem-V, allogenic adipose-derived mesenchymal stem cells (HB-adMSCs), bone marrow-derived allogenic mesenchymal stem cells (BM-Allo-MSC), mesenchymal stem cells, allogenic adipose-derived mesenchymal stem cells (HB-adMSCs) haNK, natural killer cells, Ryoncil (remestemcel-L), allogenic mesenchymal stem cells, MultiStem, bone marrow stem cells, allogeneic T-cell therapies, Autologous Adipose-Tissue Derived Mesenchymal Stem Cells (ADMSCs) and allogeneic MSCs, CYNK-001, CAP-1002, allogenic cardiosphere-derived cells, PLX cell product, placenta-based cell therapy, Chimeric antigen receptors (CAR)/T cell receptors (TCR)-T cell therapy, natural killer cell-based therapy, small mobile stem (SMS) cells, IMS001, human embryonic stem cell-derived mesenchymal stem cells (hES-MSC), VIR-2703 (ALN-COV) siRNA, OT-101, a TGF-Beta antisense drug, inhaled mRNA, peptide conjugated antisense oligonucleotides, Ampligen, rintatolimod, BXT-25, glycoprotein, EDP1815, Ivermectin, tradipitant, a neurokinin-1 receptor antagonist, piclidenoson, A3 adenosine receptor agonist, Ryanodex (dantrolene sodium), a skeletal muscle relaxant, Jakafi/jakavi (ruxolitinib), nitazoxanide, antiprotozoal, peptides targeting the NP protein, interferon/peginterferon alpha-2b, PegIntron, Sylatron, IntronA, PegiHep, roscovitine seliciclib, cyclin-dependent kinase (CDK)2/9 inhibitor, ATYR1923, a fusion protein comprising immuno-modulatory domain of histidyl tRNA synthetase fused to the Fc region of a human antibody, a modulator of neuropilin-2, Leukine (sargramostim, rhu-Granulocyte macrophage colony stimulating factor), ADX-1612, HSP 90 inhibitor, DSTAT (dociparstat sodium), glycosaminoglycan derivative of heparin, BIO-11006, Recombinant human interferon alpha-1b, ST-001 nanoFenretinide (fenretinide), Activase (alteplase), tissue plasminogen activator (tPA), camostat mesylate, a transmembrane protease serine 2 (TMPRSS2) inhibitor, nitric oxide, Cozaar (losartan), an angiotensin II receptor blocker (ARB), Otezla (apremilast), an inhibitor of phosphodiesterase 4 (PDE4), IMU-838, a selective oral dihydroorotate dehydrogenase (DHODH) inhibitor, Colchicine, Brilacidin, a defensin mimetic, Metablok (LSALT peptide), a selective dipeptidase-1 antagonist, nafamostat, CD24Fc, an agent comprising nonpolymorphic regions of CD24 attached to the Fc region of human IgG1, Aplidin (plitidepsin), fadraciclib (CYC065), a cyclin-dependent kinase (CDK)2/9 inhibitor, Aviptadil, a synthetic form of Vasoactive Intestinal Polypeptide (RLF-100), solnatide, a synthetic molecule with a structure based on the lectin-like domain of human Tumour Necrosis Factor alpha, PP-001, MRx-4DP0004, a strain of *Bifidobacterium breve* isolated from the gut microbiome of a healthy human, ARMS-1, BLD-2660, a small molecule inhibitor of calpain (CAPN) 1, a small molecule inhibitor of CAPN2, a small molecule inhibitor of CAPN9, LAU-7b (fenretinide), N-803, an IL-15 "superagonist" (Nogapendekin alfa inbakicept), Rebif, interferon beta-1a, DIBI, an iron-binding polymer, EPAspire, an oral formulation of highly purified eicosapentaenoic acid free fatty acid (EPA-FFA) in gastro-resistant capsules, MN-166 (ibudilast), a small molecule macrophase migration inhibitory factor (MIF) inhibitor, a phosphodiesterase (PDE) 4 inhibitor, a PDE10 inhibitor, ADX-629, an orally available reactive aldehyde species (RASP) inhibitor, Calquence (acalabrutinib), a Bruton's tyrosine kinase (BTK) inhibitor, Auxora (CM4620-IE), a calcium release-activated calcium (CRAC) channel inhibitor Neumifil, a multivalent carbohydrate binding molecule, Diovan (valsartan), an angiotensin II receptor blocker (ARB), Yeliva (opaganib, ABC294640), an oral sphingosine kinase-2 (SK2) selective inhibitor, WP1122, a glucose decoy prodrug, Kineret (anakinra), an interleukin-1 receptor antagonist, a microbiome therapeutic, Coronzot, bemcentinib, a selective AXL kinase inhibitor, a synthesized nanoviricide drug, Chloroquine/Hydroxychloroquine, an antimalarial drug Senicapoc, vazegepant, a CGRP receptor antagonist, APN01, a recombinant soluble human Angiotensin Converting Enzyme 2, GP1681, a small molecule inhibitor of cytokine release, ST266, a cell-free biologic made from anti-inflammatory proteins secreted by placental cells, recombinant human plasma gelsolin (rhu-pGSN), pacritinib, an oral kinase inhibitor with specificity for JAK2, IRAK1 and CSFIR, Ruconest (recombinant human C1 esterase inhibitor), Cerocal (ifenprodil), NP-120, an NDMA receptor glutamate receptor antagonist targeting Glu2NB, Peginterferon lambda, Pepcid (famotidine), a histamine-2 (H2) receptor antagonist, heparin, a low molecular weight heparin (enoxaparin), an anticoagulant, Xeljanz (tofacitinib), a Janus kinase (JAK) inhibitor, Xpovio (selinexor), a selective inhibitor of nuclear export (SINE) compound, a pH barrier, transepithelial nebulized alkaline treatment, Luvox (fluvoxamine), a selective serotonin reuptake inhibitor, Micardis (telmisartan), brensocatib, a reversible inhibitor of dipeptidyl peptidase 1 (DPP1) Novaferon, RHB-107 (upamostat, WX-671), a serine protease inhibitor, UNI9011, FW-1022, DWRX2003, niclosamide, Lysteda/Cyklokapron/ LB1148 (tranexamic acid), an antifibrinolytic PUL-042 inhalation solution, ABX464, Gleevac (imatinib), Traumakine (interferon beta 1-a), Veyonda (idronoxil), Farxiga (dapagliflozin), a sodium-glucose cotransporter 2 (SGLTs) inhibitor, Gilenya (fingolimod), a sphingosine 1-phosphate receptor modulator, sPIF, a synthetic pre implantation factor, SNG001, an inhaled formulation of interferon beta-1a, Methylprednisolone, ciclesonide (Alvesco), hydrocortisone, corticosteroids Olumiant (baricitinib), a Janus kinase (JAK) inhibitor, dipyridamole (Persantine), an anticoagulant, AT-001, an aldose reductase inhibitor, Vascepa (icosapent ethyl), a form of eicosapentaenoic acid, OP-101, a dendrimer-based therapy, apabetalone (RVX-208), a selective BET (bromodomain and extra-terminal) inhibitor, Flarin (lipid ibuprofen), Almitrine, VP01, an Angiotensin II Type 2 receptor activator, leflunomide, a pyrimidine synthesis inhibitor, Pulmozyme (nebulised dornase alfa), a recombinant DNase enzyme, AQCH, MSTT1041A (anti-ST2, the receptor for IL-33), UTTR1147A (IL-22-Fc), CIGB-258, FSD-201, ultramicronized palmitoylethanolamide, PB1046, a long-acting sustained release human vasoactive intestinal peptide (VIP) analogue, PTC299, an oral small molecule inhibitor of dihydroorotate dehydrogenase (DHODH), raloxifene (Evista), an estrogen agonist/antagonist, losmapimod, an oral selective p38 mitogen activated protein kinase inhibitor, dutasteride, an anti-androgen, M5049, small molecule capable of blocking the activation of Toll-like receptor (TLR)7 and TLR8, Eritoran, a TLR-4 antagonist, desidustat, a hypoxia inducible factor prolyl hydroxylase inhibitor, merimepodib, an TMIPDH inhibitor, azithromycin, Cenicriviroc, a chemokine receptor 2 and 5 dual antagonist, Firazyr (icatibant), a bradykinin B2 antagonist, Razoprotafib, Tie 2 activating compound (AKB-9778), or any combination thereof.

Antiviral agents provided include, but are not limited to abacavir; acemannan; acyclovir; acyclovir sodium; adefovir; alovudine; alvircept sudotox; amantadine hydrochloride; amprenavir; aranotin; arildone; atevirdine mesylate; avridine; cidofovir; cipamfylline; cytarabine hydrochloride; delavirdine mesylate; desciclovir; didanosine; disoxaril; edoxudine; efavirenz; enviradene; enviroxime; famciclovir; famotine hydrochloride; fiacitabine; fialuridine; fosarilate; trisodium phosphonoformate; fosfonet sodium; ganciclovir;

ganciclovir sodium; idoxuridine; indinavir; kethoxal; lamivudine; lobucavir; memotine hydrochloride; methisazone; nelfinavir; nevirapine; palivizumab; penciclovir; pirodavir; ribavirin; rimantadine hydrochloride; ritonavir; saquinavir mesylate; somantadine hydrochloride; sorivudine; statolon; stavudine; tilorone hydrochloride; trifluridine; valacyclovir hydrochloride; vidarabine; vidarabine phosphate; vidarabine sodium phosphate; viroxime; zalcitabine; zidovudine; zinviroxime, interferon, cyclovir, alpha-interferon, and/or beta globulin. In certain aspects, other antibodies against viral proteins or cellular factors may be used in combination with a therapeutic composition described herein.

Antibacterial agents provided herein include, but are not limited to, β-lactam antibiotics, penicillins (such as natural penicillins, aminopenicillins, penicillinase-resistant penicillins, carboxy penicillins, ureido penicillins), cephalosporins (first generation, second generation, and third generation cephalosporins), and other β-lactams (such as imipenem, monobactams), β-lactamase inhibitors, vancomycin, aminoglycosides and spectinomycin, tetracyclines, chloramphenicol, erythromycin, lincomycin, clindamycin, rifampin, metronidazole, polymyxins, sulfonamides and trimethoprim, and quinolines. Anti-bacterials also include, but are not limited to: Acedapsone, Acetosulfone Sodium, Alamecin, Alexidine, Amdinocillin, Amdinocillin Pivoxil, Amicycline, Amifloxacin, Amifloxacin Mesylate, Amikacin, Amikacin Sulfate, Aminosalicylic acid, Aminosalicylate sodium, Amoxicillin, Amphomycin, Ampicillin, Ampicillin Sodium, Apalcillin Sodium, Apramycin, Aspartocin, Astromicin Sulfate, Avilamycin, Avoparcin, Azithromycin, Azlocillin, Azlocillin Sodium, Bacampicillin Hydrochloride, Bacitracin, Bacitracin Methylene Disalicylate, Bacitracin Zinc, Bambermycins, Benzoylpas Calcium, Berythromycin, Betamicin Sulfate, Biapenem, Biniramycin, Biphenamine Hydrochloride, Bispyrithione Magsulfex, Butikacin, Butirosin Sulfate, Capreomycin Sulfate, Carbadox, Carbenicillin Disodium, Carbenicillin Indanyl Sodium, Carbenicillin Phenyl Sodium, Carbenicillin Potassium, Carumonam Sodium, Cefaclor, Cefadroxil, Cefamandole, Cefamandole Nafate, Cefamandole Sodium, Cefaparole, Cefatrizine, Cefazaflur Sodium, Cefazolin, Cefazolin Sodium, Cefbuperazone, Cefdinir, Cefepime, Cefepime Hydrochloride, Cefetecol, Cefixime, Cefinenoxime Hydrochloride, Cefinetazole, Cefinetazole Sodium, Cefonicid Monosodium, Cefonicid Sodium, Cefoperazone Sodium, Ceforanide, Cefotaxime Sodium, Cefotetan, Cefotetan Disodium, Cefotiam Hydrochloride, Cefoxitin, Cefoxitin Sodium, Cefpimizole, Cefpimizole Sodium, Cefpiramide, Cefpiramide Sodium, Cefpirome Sulfate, Cefpodoxime Proxetil, Cefprozil, Cefroxadine, Cefsulodin Sodium, Ceftazidime, Ceftibuten, Ceftizoxime Sodium, Ceftriaxone Sodium, Cefuroxime, Cefuroxime Axetil, Cefuroxime Pivoxetil, Cefuroxime Sodium, Cephacetrile Sodium, Cephalexin, Cephalexii Hydrochloride, Cephaloglycini, Cephaloridine, Cephalothin Sodium, Cephapirin Sodium, Cephradine, Cetocycline Hydrochloride, Cetophenicol, Chloramphenicol, Cliloramphenicol Palmitate, Chloramphenicol Pantotheniate Complex, Chloramphenicol Sodium Succinate, Chlorhexidine Phosphanilate, Chloroxylenol, Chlortetracycline Bisulfate, Chlortetracycline Hydrochloride, Cinoxacin, Ciprofloxacin, Ciprofloxacin Hydrochloride, Cirolemycin, Clarithromycin, Clinafloxacin Hydrochloride, Clildamycin, Clindamycin Hydrochloride, Clindamycin Palmitate Hydrochloride, Clindamycin Phosphate, Clofazimine, Cloxacillin Benzathine, Cloxacillin Sodium, Cloxyquin, Colistimethate Sodium, Colistin Sulfate, Coumermycin, Coumermycin Sodium, Cyclacillin, Cycloserine, Dalfopristin, Dapsone, Daptomycin, Demeclocycine, Demeclocycine Hydrochloride, Demecycline, Denofungin, Diaveridine, Dicloxacillin, Dicloxacillin Sodium, Dihydrostreptomycin Sulfate, Dipyrithione, Dirithromycin, Doxycycline, Doxycycline Calcium, Doxycycline Fosfatex, Doxycycline Hyclate, Droxacin Sodium, Enoxacin, Epicillin, Epitetracycline Hydrochloride, Erythromycin, Erythromycin Acistrate, Erythromycin Estolate, Erythromycin Ethylsuccinate, Erythromycin Gluceptate, Erythromycin Lactobionate, Erythromycin Propionate, Erythromycin Stearate, Ethambutol Hydrochloride, Ethionamide, Fleroxacin, Floxacillin, Fludalanine, Flumequine, Fosfomycin, Fosfomycin Tromethamine, Fumoxicillin, Furazolium Chloride, Furazolium Tartrate, Fusidate Sodium, Fusidic Acid, Gentamicin Sulfate, Gloximonam, Gramicidin, Haloprogin, Hetacillin, Hetacillin Potassium, Hexedine, Ibafloxacin, Imipenem, Isoconazole, Isepamicin, Isoniazid, Josamycin, Kanamycin Sulfate, Kitasamycin, Levofuraltadone, Levopropylcillin Potassium, Lexithromycin, Lincomycin, Lincomycin Hydrochloride, Lomefloxacin, Lomefloxacin Hydrochloride, Lomefloxacin Mesylate, Loracarbef, Mafenide, Meclocycline, Meclocycline Sulfosalicylate, Megalomicin Potassium Phosphate, Mequidox, Meropenem, Methacycline, Methacycline Hydrochloride, Methenamine, Methenamine Hippurate, Methenamine Mandelate, Methicillin Sodium, Metioprim, Metronidazole Hydrochloride, Metronidazole Phosphate, Mezlocillin, Mezlocillin Sodium, Minocycline, Minocycline Hydrochloride, Mirincamycin Hydrochloride, Monensin, Monensin Sodium, Nafcillin Sodium, Nalidixate Sodium, Nalidixic Acid, Natamycin, Nebramycin, Neomycin Palmitate, Neomycin Sulfate, Neomycin Undecylenate, Netilmicin Sulfate, Neutramycin, Nifuradene, Nifuraldezone, Nifuratel, Nifuratrone, Nifurdazil, Nifurimide, Nifuirpirinol, Nifurquinazol, Nifurthiazole, Nitrocycline, Nitrofurantoin, Nitromide, Norfloxacin, Novobiocin Sodium, Ofloxacin, Ormetoprim, Oxacillin Sodium, Oximonam, Oximonam Sodium, Oxolinic Acid, Oxytetracycline, Oxytetracycline Calcium, Oxytetracycline Hydrochloride, Paldimycin, Parachlorophenol, Paulomycin, Pefloxacin, Pefloxacin Mesylate, Penamecillin, Penicillin G Benzathine, Penicillin G Potassium, Penicillin G Procaine, Penicillin G Sodium, Penicillin V, Penicillin V Benzathine, Penicillin V Hydrabamine, Penicillin V Potassium, Pentizidone Sodium, Phenyl Aminosalicylate, Piperacillin Sodium, Pirbenicillin Sodium, Piridicillin Sodium, Pirlimycin Hydrochloride, Pivampicillin Hydrochloride, Pivampicillin Pamoate, Pivampicillin Probenate, Polymyxin B Sulfate, Porfiromycin, Propikacin, Pyrazinamide, Pyrithione Zinc, Quindecamine Acetate, Quinupristin, Racephenicol, Ramoplanin, Ranimycin, Relomycin, Repromicin, Rifabutin, Rifametane, Rifamexil, Rifamide, Rifampin, Rifapentine, Rifaximin, Rolitetracycline, Rolitetracycline Nitrate, Rosaramicin, Rosaramicin Butyrate, Rosaramicin Propionate, Rosaramicin Sodium Phosphate, Rosaramicin Stearate, Rosoxacin, Roxarsone, Roxithromycin, Sancycline, Sanfetrinem Sodium, Sarmoxicillin, Sarpicillin, Scopafungin, Sisomicin, Sisomicin Sulfate, Sparfloxacin, Spectinomycin Hydrochloride, Spiramycin, Stallimycin Hydrochloride, Steffimycin, Streptomycin Sulfate, Streptonicozid, Sulfabenz, Sulfabenzamide, Sulfacetamide, Sulfacetamide Sodium, Sulfacytine, Sulfadiazine, Sulfadiazine Sodium, Sulfadoxine, Sulfalene, Sulfamerazine, Sulfameter, Sulfamethazine, Sulfamethizole, Sulfamethoxazole, Sulfamonomethoxine, Sulfamoxole, Sulfanilate Zinc, Sulfanitran, Sulfas alazine, Sulfasomizole, Sulfathiazole, Sulfazamet, Sulfisoxazole, Sulfisoxazole Acetyl, Sulfisoxazole Diolamine, Sulfomyxin, Sulopenem, Sultamicillin, Suncillin Sodium, Talampicillin Hydrochloride, Teicoplanin, Temafloxacin Hydrochloride, Temocillin, Tetracycline, Tetracycline Hydrochloride, Tetracycline Phosphate Complex, Tetroxoprim, Thiamphenicol, Thiphencillin Potassium, Ticarcillin Cresyl Sodium, Ticarcillin Disodium, Ticarcillin Monosodium, Ticlatone, Tiodonium Chloride, Tobramycin, Tobramycin Sulfate, Tosufloxacin, Trimethoprim, Trimethoprim Sulfate, Trisulfapyrimidines, Troleandomycin, Trospectomycin Sulfate, Tyrothricin, Vancomycin, Vancomycin Hydrochloride, Virginiamycin, and/or Zorbamycin.

Anti-fungal agents provided herein include, but are not limited to, azoles, imidazoles, polyenes, posaconazole, fluconazole, itraconazole, amphotericin B, 5-fluorocytosine, miconazole, ketoconazole, Myambutol (Ethambutol Hydrochloride), Dapsone (4,4'-diaminodiphenylsulfone), Paser Granules (aminosalicylic acid granules), rifapentine, Pyrazinamide, Isoniazid, Rifadin IV, Rifampin, Pyrazinamide, Streptomycin Sulfate and Trecator-SC (Ethionamide) and/or voriconazole (Vfend™).

Figure 6:
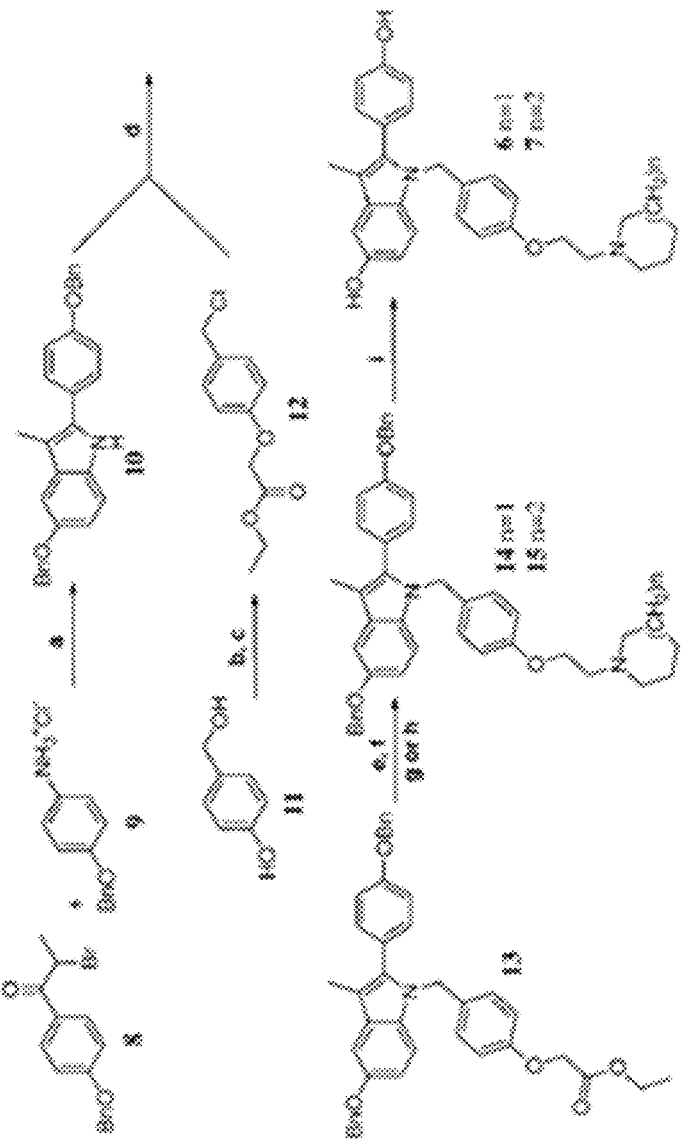
FIG. 6 depicts a non-limiting exemplary indole synthesis scheme, reproduced from Miller, Chris P., et al. ("Design, synthesis, and preclinical characterization of novel, highly selective indole estrogens." Journal of medicinal chemistry 44.11 (2001): 1654-1657), the content of which is incorporated herein by reference in its entirety.

Synthesis, Pro-drugs, Analogues, and Metabolites of Disclosed Compounds Pipendoxifene Kingdom: Organic compounds
Super Class: Organoheterocyclic compounds
Class: 2-phenylindoles, Indoles and derivatives
Sub Class: Indoles
Direct Parent: 2-phenylindoles
Alternative Parents: Phenylpyrroles/N-alkylindoles/Hydroxyindoles/3-methylindoles/Phenoxy compounds/ Phenol ethers/Alkyl aryl ethers/1-hydroxy-2-unsubstituted benzenoids/Piperidines/Heteroaromatic compounds/Trialkylamines/Azacyclic compounds/Organopnictogen compounds/Hydrocarbon derivatives
Substituents: 1-hydroxy-2-unsubstituted benzenoid/2-phenylindole/2-phenylpyrrole/3-alkylindole/3-methylindole/Alkyl aryl ether/Amine/Aromatic heteropolycyclic compound/Azacycle/Benzenoid/Ether/Heteroaromatic compound/Hydrocarbon derivative/Hydroxyindole/Monocyclic benzene moiety/N-alkylindole/Organic nitrogen compound/Organic oxygen compound/Organonitrogen compound/Organooxygen compound/Organopnictogen compound/Phenol/Phenol ether/Phenoxy compound/Piperidine/Pyrrole/Substituted pyrrole/Tertiary aliphatic amine/Tertiary amine
Molecular Framework: Aromatic Heteropolycyclic Compounds Discovery (Miller 2001): After various explorations around the core and side chain, ERA-923 and TSE-424 were discovered, both novel, highly selective estrogens with particularly non-estrogenic profiles on rat uterine tissue. FIG. 6 depicts a non-limiting exemplary indole synthesis scheme.

Pipendoxifene Metabolism (Cotreau 2002): In rat and monkey studies, ERA-923 was found to be primarily metabolized to an indole glucuronide, whereas one of the secondary metabolites was a phenyl glucuronide. In vitro studies with human liver slices and microsomes indicate that the primary human metabolite is the same indole glucuronide as found in the preclinical models.

BZA Metabolism: Bazedoxifene is highly metabolized in mice, rats and monkeys to the phenyl and indole glucuronides (4'- and 5-glucuronides). The relative levels of these two metabolites were found to be different among species, with both 4'- and 5-glucuronides present in mouse and the 5-glucuronide predominant in rats, monkeys, human. The metabolites are pharmacologically active and antagonized the effect of estrogen in the rat uterus. Comparison of in vitro and in vivo metabolism data suggested that the bazedoxifene-4'-glucuronide is formed in monkeys and humans but preferentially excreted in the bile. Minor metabolites included the diglucuronide (monkey, human) and N-oxide (Tg.Ras mouse urine, human feces). CYP enzymes played a minor role in metabolism. In vitro studies showed that human UGT1A1 and UGT1A10 were active in glucuronidating parent compound. The primary route of excretion was biliary/fecal in mice, rats, monkeys, and humans. Urinary excretion was minor. In mice, >50% of an oral dose was recovered within 24 hours. In rats, recovery of radioactivity was >97% and in monkeys and women it was ca. 85% within 7 days. Less than 1% of dose was recovered in urine. In feces, unchanged drug was the predominant form (>90%). The major urinary metabolite in rats was bazedoxifene-5-glucuronide in rats and bazedoxifene-4'-glucuronide in monkeys.

Berzosertib

Kingdom: Organic compounds
Super Class: Benzenoids
Class: Benzene and substituted derivatives
Subclass: Benzenesulfonyl compounds
Direct Parent: Benzenesulfonyl compounds
Alternative Parents: Phenylmethylamines/Benzylamines/Aminopyrazines/Aralkylamines/Imidolactams/Sulfones/Heteroaromatic compounds/Isoxazoles/Oxacyclic compounds/Azacyclic compounds/Dialkylamines/Primary amines/Organopnictogen compounds/Organooxygen compounds/Hydrocarbon derivatives/Organic oxides
Substituents: Amine/Aminopyrazine/Aralkylamine/Aromatic heteromonocyclic compound/Azacycle/Azole/Benzenesulfonyl group/Benzylamine/Heteroaromatic compound/Hydrocarbon derivative/Imidolactam/Isoxazole/Organic nitrogen compound/Organic oxide/Organic oxygen compound/Organoheterocyclic compound/Organonitrogen compound/Organooxygen compound/Organopnictogen compound/Organosulfur compound/Oxacycle/Phenylmethylamine/Primary amine/Pyrazine/Secondary aliphatic amine/Secondary amine/Sulfone/Sulfonyl
Molecular Framework: Aromatic heteromonocyclic compounds
Metabolism: VX-970 appears to be mainly metabolized by cytochrome P450 (CYP) 3A4 in human liver microsomes. VX-970 was found to be primarily eliminated by oxidative metabolism, with CYP3A4 as the principle isozyme responsible. Metabolites were found to be excreted in the urine and bile. All metabolites observed in human hepatocyte incubations were also observed in either rat or dog hepatocyte incubations and in the blood, bile, or urine from rats or dogs. The systemic clearance (CL) values of VX-970 following IV administration were determined to be 82, 26, 13, and 29 mL/min/kg in the mouse, rat, dog, and monkey, respectively.

AZD-5991

Macrocyclic Indole

Discovery of the Macrocyclic Inhibitor (Ra)-7

Other substituents within and appended to the macrocyclic ring were investigated but ultimately chose to optimize 5; stepwise improvements led to N-Me indole derivative, 6 (Mcl-1 FRET IC50=4 nM) and 6-Cl indole derivative, 7 (Mcl-1 FRET IC50<3 nM). A crystal structure of 7 confirmed that the new macrocyclic conformation bound as expected to Mcl-1; only the (Ra)-enantiomer was observed to bind, despite the racemate being used for the co-crystallization. The incorporation of both the 6-Cl substituent and indole-1-N-Me substituent led to restricted rotation around the biaryl bond and therefore atropisomers could be separated and were stable at room temperature. In addition, the indole-1-N-Me forces the carboxylic acid to be orthogonal to the indole, thereby improving the interaction with Arg263 of Mcl-1, whereas the 6-Cl is only 3.2 Å from the backbone carbonyl oxygen of Ala227-likely a favorable halogen-carbonyl bond. The 1H NMR chemical shift of the pyrazole 3-H of (Ra)-7 was found to be shifted drastically upfield ($\delta$ 4.75 ppm) vs. the predicted chemical shift from the 2D structure33 ($\delta$ 5.83 ppm). This shift was indicative of strong anisotropic shielding and it was suspected the macrocyclic structure adopted a rigid conformation in solution. To further explore this, an extensive NMR solution structural analysis was carried out, which demonstrated that (Ra)-7 adopted a free ligand conformation very similar to the bound conformation observed in the Mcl1 co-crystal structure. It was found to be apparent that the upfield chemical shift of H38 was due to its interaction with the pi-cloud of the indole phenyl ring. These data validated the hypothesis of macrocyclic design leading to a dominant bioactive free ligand conformation with improved binding affinity driven by rapid on-rate kinetics (vide infra). As expected, the Ra enantiomer of 7 was also found to be far more potent, with any activity of the Sa enantiomer likely a result of residual impurity of (Ra)-7 ((Sa)-7 was purified by chiral SFC to an enantiomeric excess (e.e.) of >98.8%).

Tocladesine

Kingdom: Organic Compounds
Super Class: Nucleosides, nucleotides and analogues
Class: Purine nucleotides
Sub Class: Cyclic purine nucleotides
Direct Parent: 3',5'-cyclic purine nucleotides
Alternative Parents: Pentose phosphates/Glycosylamines/6-aminopurines/Monosaccharide phosphates/Aminopyrimidines and derivatives/Aryl chlorides/Imidolactams/N-substituted imidazoles/Organic phosphoric acids and derivatives/Tetrahydrofurans/Heteroaromatic compounds/Secondary alcohols/Oxacyclic compounds/Azacyclic compounds/Hydrocarbon derivatives/Primary amines/Organic oxides/Organochlorides/Organopnictogen compounds Substituents: 3',5'-cyclic purine ribonucleotide/6-aminopurine/Alcohol/Amine/Aminopyrimidine/Aromatic heteropolycyclic compound/Aryl chloride/Aryl halide/Azacycle/Azole/Glycosyl compound/Heteroaromatic compound/Hydrocarbon derivative/Imidazole/Imidazopyrimidine/Imidolactam/Monosaccharide/Monosaccharide phosphate/N-glycosyl compound/N-substituted imidazole/Organic nitrogen compound/Organic oxide/Organic oxygen compound/Organic phosphoric acid derivative/Organochloride/Organohalogen compound/Organoheterocyclic compound/Organonitrogen compound/Organooxygen compound/Organopnictogen compound/Oxacycle/Pentose phosphate/Primary amine/Purine/Pyrimidine/Secondary alcohol/Tetrahydrofuran Molecular Framework: Aromatic Heteropolycyclic Compounds
Base Modified Purine Nucleosides 8-Chloro-adenosine and Tocladesine Biologies. In the 1980s, 8-chloro-adenosine and tocladesine (50; 8-chloroadenosine 3',5'-monophosphate; 8-C1-cAMP) were reported to have potent anticancer activities. 624-627Tocladesine50 is converted extracellularly to 8-chloro-adenosine28, which is then transported by hCNT1 and hCNT2 into the cell. Once in the cell, this agent is converted via adenosine kinase to 8-chloro-adenosine-5'-monophosphate, and ultimately to the active metabolite 8-chloro-adenosine-5'-triphosphate by cellular kinases. 8-Chloro-adenosine-5'-triphosphate accumulates to almost millimolar concentration in the cell. 6308-Chloro-adenosine is a poor substrate for adenosine deaminase, and therefore, deamination of the agent is minimal.

Synthesis of 8-chloroadenosine has been achieved in one step from adenosine240 by using either tetrabutylammonium iodotetrachloride as the chlorinating reagent or m-CPBA and acid (HCl or acetyl chloride) in aprotic solvents. Additionally, the synthesis of 8-chloroadenosine has been achieved by direct coupling of 8-chloroadenosine with 2,3,5-tri-O-benzoyl-D-ribofuranosyl bromide. However, the major product of the reaction is the N3 glycosylated product and not the desired N9 product. 643Tocladesine50 can be prepared by treatment of 8-chloroadenosine with phosphoryl chloride in triethyl phosphate.

Predicted 3CL Protease Inhibitor Compounds

Apixaban

CAS Registry No.: 503612-47-3; Formal Name: 4,5,6,7-tetrahydro-1-(4-methoxyphenyl)-7-oxo-6-[4-(2-oxo-1-piperidinyl)phenyl]-1H-pyrazolo[3,4-c]pyridine-3-carboxamide; Synonym: BMS 562247-01; MF: $C_{25}H_{25}N_5O_4$; FW: 459.5; Purity: ≥98%; UV/Vis: $\lambda_{max}$: 281 nm; Supplied as: A crystalline solid; Storage: −20° C.; Stability: ≥2 years Apixaban is an orally bioavailable, selective inhibitor of both free and prothrombinase-bound factor Xa ($K_i$s=0.8 nM). In vivo, apixaban has antithrombotic effects in a rabbit model of venous thrombosis. Apixaban (357.5 mg) also prevents thrombus formation without inducing adverse bleeding events in a porcine model of aortic heterotopic valve replacement. Formulations containing apixaban have been used to prevent blood clot formation in patients with atrial fibrillation. A non-limiting exemplary structure of Apixaban is shown in FIG. 8A.

Dabrafenib

CAS Registry No.: 1195765-45-7; Formal Name: N-[3-[5-(2-amino-4-pyrimidinyl)-2-(1,1-dimethylethyl)-4-thiazolyl]-2-fluorophenyl]-2,6-difluorobenzenesulfonamide; Synonym: GSK2118436; MF: $C_{23}H_{20}F_3N_5O_2S_2$; FW: 519.6; Purity: ≥98%; UV/Vis.: $\lambda_{max}$: 281, 333 nm; Supplied as: A crystalline solid; Storage: −20° C.; Stability: ≥2 years Dabrafenib is an ATP-competitive inhibitor of Raf kinases ($IC_{50}$s=0.64, 0.68, and 5 nM for wild-type B-RAF kinase, mutant B-RAFv$^{600E}$, and wild-type C-RAF kinase, respectively). It also inhibits the tyrosine kinase-like kinases ALK5 and LIMK1 ($IC_{50}$s=11 and 15 nM, respectively) and the calcium/calmodulin-dependent protein kinases SIK2 and PDK2 ($IC_{50}$s=27 and 57 nM, respectively), as well as NEK11, CK1, and BRK ($IC_{50}$s=20, 41, and 79 nM, respectively) in a panel of 270 kinases at 300 nM. Dabrafenib inhibits the growth of 16 cancer cell lines expressing mutant B-RAFv$^{600E}$ ($GI_{50}$s=<200 nM), five cell lines expressing other B-RAF mutants ($GI_{50}$s=<30 nM), and 19 cell lines expressing wild-type Ras and RAF ($GI_{50}$s=<7,000 nM). However, it does not inhibit the growth of four cancer cell lines expressing mutant B-RAFv$^{600E}$, 133 cell lines expressing wild-type Ras and Raf, or 18 cell lines expressing mutant Ras (GI$_{50}$s=>10 μM) in a panel of 195 cancer cell lines. Dabrafenib (8 nM) inhibits MAPK signaling, inhibiting phosphorylation of MEK and ERK, and activates caspase-3/7 in B-RAFV$^{600E}$-expressing A375P melanoma cells but not in wild-type B-RAF-expressing human foreskin fibroblasts (EC$_{200}$s=71 and >10,000 nM, respectively). It reduces tumor growth in an A375P mouse xenograft model when administered at doses ranging from 3 to 100 mg/kg. Formulations containing dabrafenib have been used in the treatment of B-RAFV$^{600E}$-expressing cancers. A non-limiting exemplary structure of Dabrafenib is shown in FIG. 8B.

Galantamine

CAS Registry No.: 357-70-0; Formal Name: (4aS,6R,8aS)-4a,5,9,10,11,12-hexahydro-3-methoxy-11-methyl-6H-benzofuro[3a,3,2-ef][2]benzazepin-6-ol; Synonym: NSC 100058; MF: $C_{17}H_{21}NO_3$; FW: 287.4; Purity: ≥98%; UV/Vis.: $\lambda_{max}$: 210 nm; Supplied as: A crystalline solid; Stability: ≥2 years at −20° C.

Galantamine is an alkaloid originally isolated from the bulbs and flowers of various *Galanthus* species. It allosterically potentiates nicotinic acetylcholine receptors, as well as inhibits acetylcholinesterase (IC$_{50}$=636-2,010 nM), thereby promoting acetylcholine activity in the brain. Galantamine has been used in the clinical treatment of vascular dementia and Alzheimer's disease symptoms and as a nootropic for other cognitive impairments. A non-limiting exemplary structure of Galantamine is shown in FIG. 8C.

Naloxone (Hydrochloride)

CAS Registry No.: 357-08-4; Formal Name: (5α)-4,5-epoxy-3,14-dihydroxy-17-(2-propen-1-yl)-morphinan-6-one, monohydrochloride; Synonym: N-Allyldihydro-14-hydroxynormorphinone, NIH 7890; MF: $C_{19}H_{21}NO_4 \cdot HCl$; FW: 363.8; Purity: ≥95%; Storage: −20° C.; Stability: ≥2 years Naloxone (hydrochloride) is an analytical reference standard categorized as an opioid antagonist. Formulations containing naloxone have been used as antidotes for opioid overdose and the prevention of overdose. They have also been used in combination with buprenorphine in the treatment of opiate addiction and in pain management. A non-limiting exemplary structure of Naloxone (hydrochloride) is shown in FIG. 8D.

Noscapine (Hydrochloride)

CAS Registry No.: 912-60-7; Formal Name: (3S)-6,7-dimethoxy-3-[(5R)-5,6,7,8-tetrahydro-4-methoxy-6-methyl-1,3-dioxolo[4,5-g]isoquinolin-5-yl]-1(3H)-isobenzofuranone, monohydrochloride; Synonym: Narcotine, Opianine; MF: $C_{22}H_{23}NO_7 \cdot HCl$; FW: 449.9; Purity: ≥98%; UV/Vis.: $\lambda_{max}$: 214, 313 nm; Supplied as: A crystalline solid; Storage: −20° C.; Stability: ≥2 years Noscapine is an opioid alkaloid with antitussive and antimitotic properties. It binds to tubulin and arrests mammalian cells in mitosis at a concentration of 20 μM. Noscapine induces apoptosis (IC$_{50}$=25 and 10 μM in HeLa cells and thymocytes, respectively) and demonstrates antitumor activity both in vitro (IC$_{50}$=42.3 and 39.1 μM in MCF-7 and Renal 1983 cell lines, respectively) and in mice. A non-limiting exemplary structure of Noscapine (hydrochloride) is shown in FIG. 8E.

Predicted ACE2 Inhibitor Compounds

Clindamycin

Figure 9B:
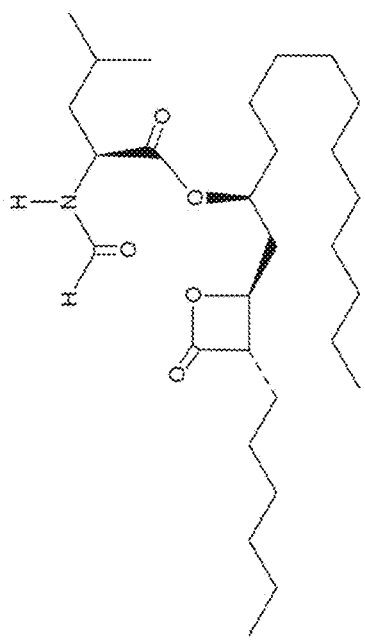
FIG. 9A-FIG. 9D depict non-limiting exemplary structures of predicted ACE2 inhibitor compounds Clindamycin (FIG. 9A), Orlistat (FIG. 9B), Semagacestat (FIG. 9C), and Tipranavir (FIG. 9D).
Figure 9D:
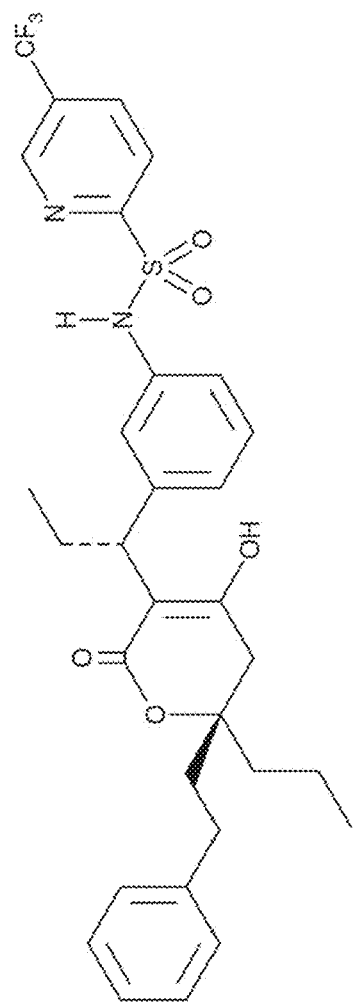
Figure 9A:
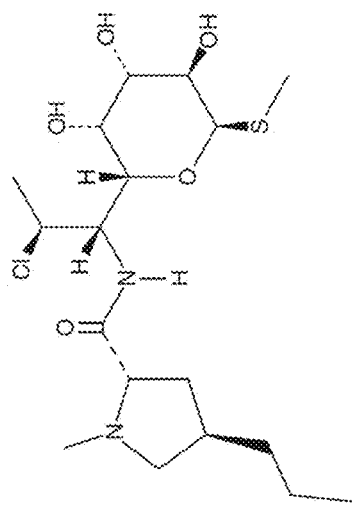

CAS Registry No.: 18323-44-9; Formal Name: methyl 7-chloro-6,7,8-trideoxy-6-[[[(2S,4R)-1-methyl-4-propyl-2-pyrrolidinyl]carbonyl]amino]-1-thio-L-threo-α-D-galacto-octopyranoside; Synonym: U 21251; MF: $C_{18}H_{33}ClN_2O_5S$; FW: 425.0; Purity: ≥95%; Supplied as: A crystalline solid; Storage: −20° C.; Stability: ≥2 years Clindamycin is a lincosamide antibiotic. It is active against Gram-positive bacteria, including various strains of *S. pneumoniae*, *S. viridans*, *S. aureus*, and *S. epidermidis* (MICs=0.002-0.1, 0.005-0.2, 0.04-1.6, and 0.1-0.2 μg/ml, respectively). Clindamycin is also active against chloroquine-resistant and -sensitive strains of *P. falciparum* (IC$_{50}$s=3.12 and 8.81 nM, respectively). It inhibits bacterial protein synthesis by interacting with the 50S ribosome. Clindamycin increases survival in a mouse model of a secondary *S. pneumoniae* infection when administered at a dose of 15 mg/kg twice daily for seven days. Formulations containing clindamycin have been used in the treatment of bacterial infections. A non-limiting exemplary structure of Clindamycin is shown in FIG. 9A.

Orlistat

CAS Registry No.: 96829-58-2; Formal Name: N-formyl-L-leucine-(1S)-1-[[(2S,3S)-3-hexyl-4-oxo-2-oxetanyl] methyl]dodecyl ester; Synonym: Tetrahydro lipstatin; MF: $C_{29}H_{53}NO_5$; FW: 495.7; Purity: ≥98%; Supplied as: A crystalline solid; Storage: −20° C.; Stability: ≥2 years Orlistat inhibits gastric, pancreatic, and carboxyl ester lipases, preventing the hydrolysis of triglycerides to free fatty acids and monoglycerides, and as such is widely used to treat obesity. With a 120 mg dose before each meal in healthy subjects, orlistat is reported to accelerate gastric emptying and attenuates the secretion of glucose-dependent insulinotropic peptide without affecting plasma responses of cholecystokinin, glucagon-like peptide-1, pancreatic polypeptide, or insulin. It also targets additional serine hydrolases in the nervous system, such as diacylglycerol lipase (DAGL), which is responsible for the conversion of DAG to 2-AG. Orlistat potently inhibits human recombinant DAGLα with an IC$_{50}$ value of 60 nM and at 1 μM inhibits the formation of 2-AG in intact cells in vitro. A non-limiting exemplary structure of Orlistat is shown in FIG. 9B.

Semagacestat

Figure 9C:
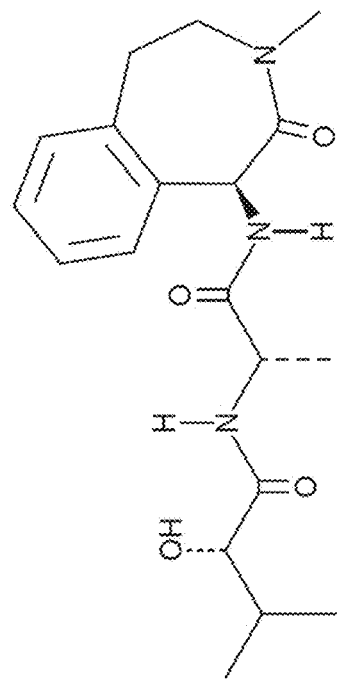

CAS Registry No.: 425386-60-3; Formal Name: (2S)-2-hydroxy-3-methyl-N-[(1S)-1-methyl-2-oxo-2-[[(1S)-2,3,4,5-tetrahydro-3-methyl-2-oxo-1H-3-benzazepin-1-yl]amino] ethyl]-butanamide; Synonym: LY450139; MF: $C_{19}H_{27}N_3O_4$; FW: 361.4; Purity: ≥95%; Supplied as: A crystalline solid; Storage: −20° C.; Stability: ≥2 years Semagacestat is a potent inhibitor of γ-secretase that blocks the production of Aβ38, Aβ40, and Aβ42 with IC$_{50}$ values of 12.0, 12.1, and 10.9 nM, respectively. It also blocks Notch signaling (IC$_{50}$=14.1 nM). Semagacestat modulates γ-secretase activity in vivo, altering Aβ levels in brain, cerebrospinal fluids, and plasma in a dose-dependent fashion. Although semagacestat does not improve cognitive status in humans, it is useful as a pan γ-secretase inhibitor for research purposes. A non-limiting exemplary structure of Semagacestat is shown in FIG. 9C.

Tipranavir

CAS Registry No.: 174484-41-4; Formal Name: N-[3-[(1R)-1-[(6R)-5,6-dihydro-4-hydroxy-2-oxo-6-(2-phenylethyl)-6-propyl-2H-pyran-3-yl]propyl]phenyl]-5-(trifluoromethyl)-2-pyridinesulfonamide; Synonym: PNU-140690; MF: $C_{31}H_{33}F_3N_2O_5S$; FW: 602.7; Purity: ≥95%; UV/Vis.: $\lambda_{max}$: 254 nm; Supplied as: A crystalline solid; Storage: −20° C.; Stability: ≥2 years Tipranavir is a potent, orally bioavailable nonpeptidic HIV aspartyl protease inhibitor (K$_i$=<1 nM) that prevents cleavage and thus activation of functional HIV cleaved proteins. Formulations containing tipranavir, in combination with other HIV treatments, are effective against multidrug resistant viruses and are used in the treatment of HIV infection progression in patients who have not responded well to initial treatments. A non-limiting exemplary structure of Tipranavir is shown in FIG. 9D.

Predicted Furin Inhibitor Compounds (R)-Lisofylline

Figure 10B:
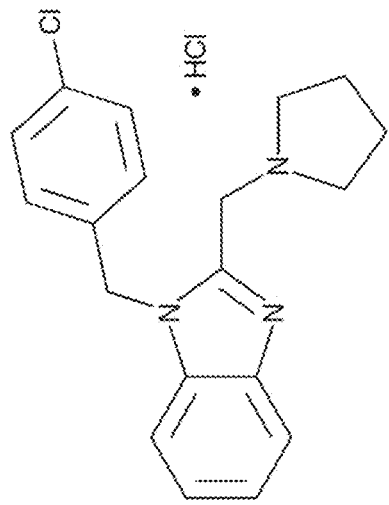
FIG. 10A-FIG. 10D depict non-limiting exemplary structures of predicted Furin inhibitor compounds (R)-Lisofylline (FIG. 10A), Clemizole (hydrochloride) (FIG. 10B), Pentoxifylline (FIG. 10C), and Trimetazidine (hydrochloride) (FIG. 10D).
Figure 10D:
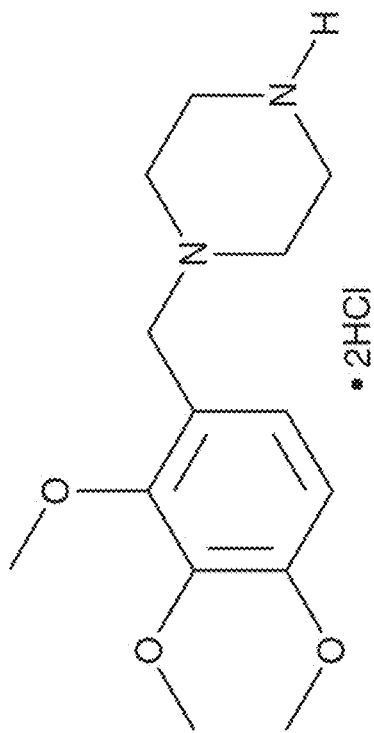
Figure 10A:
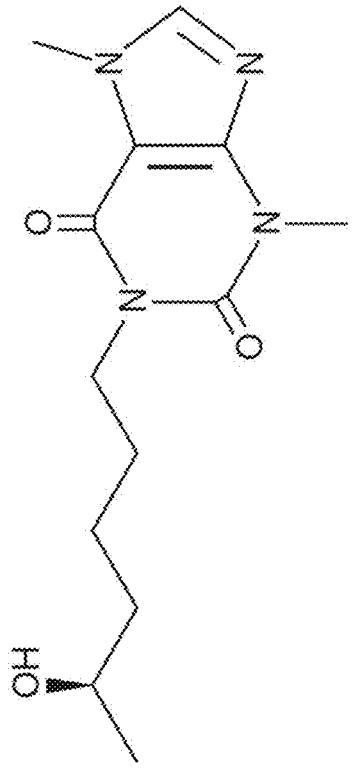

CAS Registry No.: 100324-81-0; Formal Name: 3,7-dihydro-1-[(5R)-5-hydroxyhexyl]-3,7-dimethyl-1H-purine-2,6-dione; Synonym: (−)-Lisofylline, (R)-LSF; MF: $C_{13}H_{20}N_4O_3$; FW: 280.3; Purity: ≥97%; UV/Vis.: $\lambda_{max}$: 273 nm; Supplied as: A crystalline solid; Storage: −20° C.; Stability: ≥2 years (R)-LSF is the biologically active isomer of LSF. It is a potent inhibitor of the generation of phosphatidic acid ($IC_{50}$=0.6 μM) from cytokine-activated lysophosphatidic acyl transferase (LPAAT), which has been shown to protect mice from endotoxic shock. (R)-LSF suppresses the production of the proinflammatory insulin secretion, reducing the onset of diabetes in a non-obese diabetic mouse model. A non-limiting exemplary structure of (R)-Lisofylline is shown in FIG. 10A.

Clemizole (Hydrochloride)

CAS Registry No.: 1163-36-6; Formal Name: 1-[(4-chlorophenyl)methyl]-2-(1-pyrrolidinylmethyl)-1H-benzimidazole, monohydrochloride; Synonym: AL 20, Allercur; MF: $C_{19}H_{20}ClN_3 \cdot HCl$; FW: 362.3; Purity: ≥98%; UV/Vis.: $\lambda_{max}$: 205, 252, 276, 283 nm; Supplied as: A crystalline solid; Storage: −20° C.; Stability: ≥2 years Clemizole is an antihistamine that antagonizes the histamine 1 receptor at high nanomolar concentrations. It less potently blocks transient receptor potential canonical channel 5 (TRPC5; $IC_{50}$=1.0-1.3 μM), with at least 6-fold selectivity for TRPC5 over other TRP channels. Clemizole also has hepatitis C antiviral action through inhibition of NS4B function, showing synergy with boceprevir, and it inhibits seizures in a zebrafish model of Dravet Syndrome. A non-limiting exemplary structure of Clemizole (hydrochloride) is shown in FIG. 10B.

Pentoxifylline

Figure 10C:
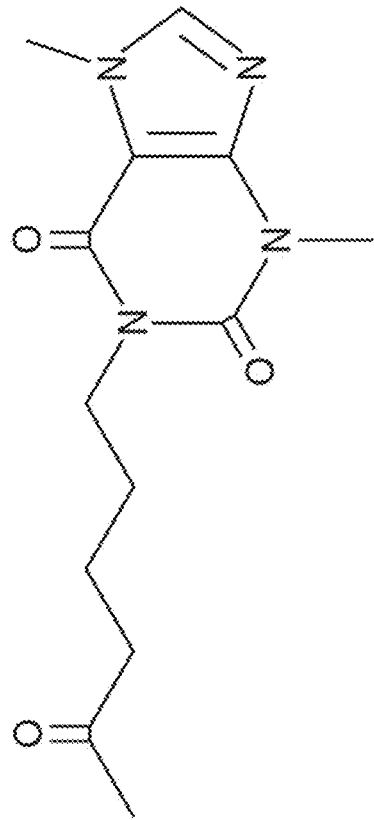

CAS Registry No.: 6493-05-6; Formal Name: 3,7-dihydro-3,7-dimethyl-1-(5-oxohexyl)-1H-purine-2,6-dione; Synonym: NSC 637086, Oxpentifylline; MF: $C_{13}H_{18}N_4O_3$; FW: 278.3; Purity: ≥98%; UV/Vis.: $\lambda_{max}$: 273 nm; Supplied as: A crystalline solid; Storage: −20° C.; Stability: ≥2 years Pentoxifylline is a methylxanthine derivative. It has been shown to have anti-inflammatory activity, inhibiting LPS-induced TNF-α production in isolated peripheral blood mononuclear cells ($IC_{50}$=85 μM) and suppressing LPS-induced leukopenia in mice. Pentoxifylline weakly inhibits the generation of phosphatidic acid ($IC_{50}$=500 μM) from LPS-activated lysophosphatidic acyl transferase (LPAAT), and weakly antagonizes $A_1$ and $A_2$ adenosine receptors. It also inhibits human acidic mammalian chitinase, human chitotriosidase, and chitinase B1 from *Aspergillus fumigatus* ($IC_{50}$s=49, 98, and 126 μM, respectively). A non-limiting exemplary structure of Pentoxifylline is shown in FIG. 10C.

Trimetazidine (Hydrochloride)

CAS Registry No.: 13171-25-0; Formal Name: 1-[(2,3,4-trimethoxyphenyl)methyl]-piperazine, dihydrochloride; MF: $C_{14}H_{22}N_2O_3 \cdot 2HCl$; FW: 339.3; Purity: ≥98%; UV/Vis.: $\lambda_{max}$: 270 nm; Supplied as: A crystalline solid; Stability: ≥2 years at −20° C.

Trimetazidine (hydrochloride) is an analytical reference standard that is structurally categorized as a piperazine. It decreases fatty acid β-oxidation by reversibly inhibiting mitochondrial long-chain 3-ketoacyl thiolase ($IC_{50}$=75 nM). This, in turn, stimulates glucose oxidation. In ischemic heart, trimetazidine reduces ischemia/reperfusion injury in clinical trials. Compounds that reduce mitochondrial fatty acid β-oxidation, including trimetazidine, have shown clinical efficacy against chronic stable angina in clinical trials. In part because of its ability to ameliorate testosterone cardiotoxicity, trimetazidine has been classified as a prohibited substance by the World Anti-Doping Agency. A non-limiting exemplary structure of Trimetazidine is shown in FIG. 10D.

Predicted Papain-Like Protease Inhibitor Compounds

Amprenavir

Figure 11C:
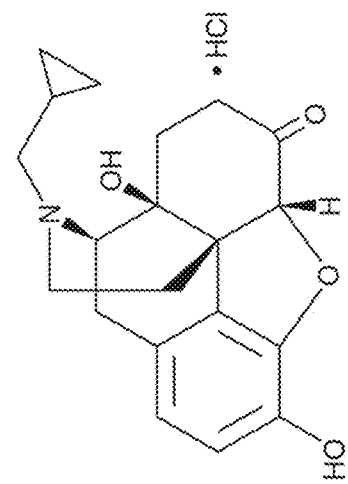
FIG. 11A-FIG. 11E depict non-limiting exemplary structures of predicted PLpro inhibitor compounds Amprenavir (FIG. 11A), Indinavir (sulfate) (FIG. 11B), Naltrexone (hydrochloride) (FIG. 11C), Saquinavir (mesylate) (FIG. 11D), and Topotecan (hydrochloride) (FIG. 11E).
Figure 11B:
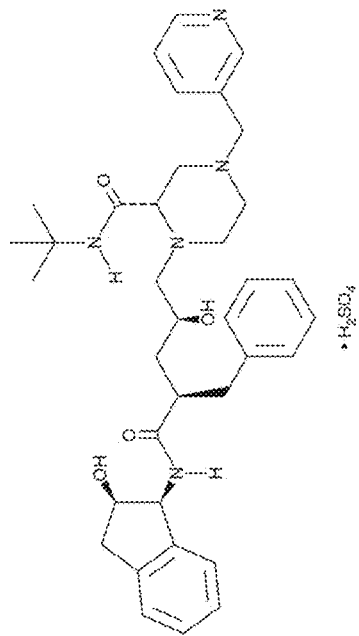
Figure 11A:
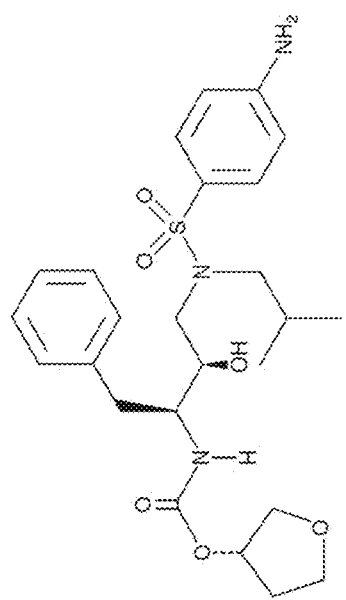

CAS Registry No.: 161814-49-9; Formal Name: N-[(1S,2R)-3-[[(4-aminophenyl) sulfonyl](2-methylpropyl)amino]-2-hydroxy-1-(phenylmethyl)propyl]-carbamic acid, (3S)-tetrahydro-3-furanyl ester; Synonym: VX-478; MF: $C_{25}H_{35}N_3O_6S$; FW: 505.6; Purity: ≥95%; UV/Vis.: $\lambda_{max}$: 268 nm; Supplied as: A crystalline solid; Storage: −20° C.; Stability: ≥2 years Amprenavir is an inhibitor of HIV protease ($K_i$=0.04 nM). It inhibits the cytopathic effects of HIV-1 in MT-4 cells ($IC_{50}$=150 nM). Formulations containing amprenavir have been used in combination with other antiretroviral agents in the treatment of HIV-1 infection. A non-limiting exemplary structure of Amprenavir is shown in FIG. 11A.

Indinavir (Sulfate)

CAS Registry No.: 157810-81-6; Formal Name: 2,3,5-trideoxy-N-[(1S,2R)-2,3-dihydro-2-hydroxy-1H-inden-1-yl]-5-[(2S)-2-[[(1,1-dimethylethyl)amino]carbonyl]-4-(3-pyridinylmethyl)-1-piperazinyl]-2-(phenylmethyl)-D-erythro-pentonamide, monosulfate; Synonym: L-735,524, MK-639; MF: $C_{36}H_{47}N_5O_4 \cdot H_2SO_4$; FW: 711.9; Purity: ≥98%; UV/Vis.: $\lambda_{max}$: 260 nm; Supplied as: A crystalline solid; Storage: −20° C.; Stability: ≥2 years Indinavir is an HIV-1 protease inhibitor ($K_i$=0.358 nM). It is selective for HIV-1 protease over HIV-2 protease ($K_i$=3.316 nM), as well as human cathepsin D, porcine pepsin, bovine chymosin, human plasma renin, Factor Xa, and elastase at 10 μM. It is also selective for wild-type HIV-1 protease over the protease inhibitor-resistant mutants A-44, K-60, and V-18 ($K_i$s=0.24, 15, 50, and 40 nM, respectively). Indinavir is active against multiple HIV-1 variants in cell-based assays ($IC_{95}$s=12-100 nM). Formulations containing indinavir have been used in combination with antiretroviral agents in the treatment of HIV infection. A non-limiting exemplary structure of Indinavir is shown in FIG. 11B.

Naltrexone (hydrochloride)

CAS Registry No.: 16676-29-2; Formal Name: 17-(cyclopropylmethyl)-4,5α-epoxy-3,14-dihydroxy-morphinan-6-one, monohydrochloride; Synonym: NIH 8503; MF: $C_{20}H_{23}NO_4 \cdot HCl$; FW: 377.9; Purity: ≥98%; Supplied as: A neat solid; Storage: −20° C.; Stability: ≥5 years Naltrexone is an analytical reference material categorized as an opioid antagonist. Formulations containing naltrexone have been used in the treatment of alcohol dependence and in the prevention of relapse to opioid dependence. A non-limiting exemplary structure of Naltrexone (hydrochloride) is shown in FIG. 11C.

Saquinavir (mesylate)

Figure 11E:
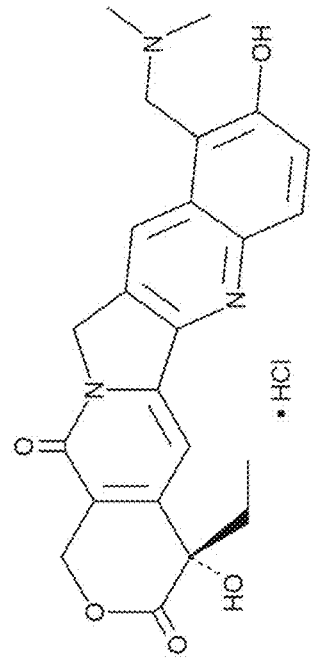
Figure 11D:
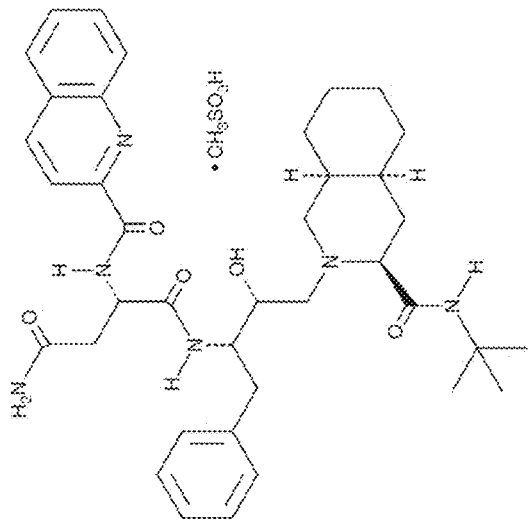

CAS Registry No.: 149845-06-7; Formal Name: (2S)—$N^1$—[(1S,2R)-3-[(3S,4aS,8aS)-3-[[(1,1-dimethylethyl)amino]carbonyl]octahydro-2(1H)-isoquinolinyl]-2-hydroxy-1-(phenylmethyl)propyl]-2-[(2-quinolinylcarbonyl)amino]-butanediamide, monomethanesulfonate; Synonym: Ro 31-8959/003; MF: $C_{38}H_{50}N_6O_5 \cdot CH_3SO_3H$; FW: 767.0; Purity: ≥98%; UV/Vis.: $\lambda_{max}$: 206, 239, 291 nm; Supplied as: A crystalline solid; Storage: −20° C.; Stability: ≥2 years Saquinavir is an HIV protease inhibitor ($K_i$s=0.12 and <0.1 nM for HIV-1 and HIV-2 protease, respectively) that exhibits antiviral activity with low cytotoxicity. When co-administered with 50 mg/kg ritonavir, the bioavailability of 20 mg/kg saquinavir has been shown to increase 325-fold in mice through a mechanism that inhibits its metabolism by CYP3A. A non-limiting exemplary structure of Saquinavir (mesylate) is shown in FIG. 11D.

Topotecan (hydrochloride)

CAS Registry No.: 119413-54-6; Formal Name: 10-[(dimethylamino)methyl]-4S-ethyl-4,9-dihydroxy-1H-pyrano[3',4':6,7]indolizino[1,2-b]quinoline-3,14(4H,12H)-dione, monohydrochloride; Synonym: NSC 609669, SKF 104864A; MF: $C_{23}H_{23}N_3O_5 \cdot HCl$; FW: 457.9; Purity: ≥98%; UV/Vis.: $\lambda_{max}$: 224, 267, 318, 333, 384 nm; Supplied as: A crystalline solid; Storage: −20° C.; Stability: ≥2 years Topotecan is an inhibitor of DNA topoisomerase I and a derivative of the DNA topoisomerase I inhibitor camptothecin. Topotecan inhibits DNA topoisomerase I in human MCF-7 breast and DU-145 prostate cancer cells with $IC_{50}$ values of 13 and 2 nM, respectively, in a cell-based luciferase reporter assay. Topotecan induces cytotoxicity and DNA damage in HT-29 human colon adenocarcinoma cells with $IC_{50}$s=33 and 280 nM, respectively. Formulations containing topotecan have been used in the treatment of small-cell lung cancer. A non-limiting exemplary structure of Topotecan (hydrochloride) is shown in FIG. 11E.

Predicted RdRP Inhibitor Compounds

Adefovir Dipivoxil

CAS Registry No.: 142340-99-6; Formal Name: 2,2-dimethyl-propanoic acid, 1,1'-[[[[2-(6-amino-9H-purin-9-yl)ethoxy]methyl]phosphinylidene]bis(oxymethylene)]ester; Synonym: GS 0840; MF: $C_{20}H_{32}N_5O_8P$; FW: 501.5; Purity: ≥98%; UV/Vis.: $\lambda_{max}$: 260 nm; Supplied as: A crystalline solid; Storage: −20° C.; Stability: ≥2 years Adefovir dipivoxil is a prodrug form of the antiviral nucleoside analog adefovir. Adefovir dipivoxil inhibits hepatitis B virus (HBV) DNA synthesis in HepG2 2.2.15 cells infected with HBV ($EC_{50}$=0.517 µM). It is cytotoxic to HepG2 2.2.15 cells with a 50% cytotoxicity concentration ($CC_{50}$) value of 540 µM. Adefovir dipivoxil inhibits HBV replication in the liver of HBV transgenic mice ($ED_{50}$=0.2 µmol/kg per day). Formulations containing adefovir dipivoxil have been used in the treatment of chronic HBV infection. A non-limiting exemplary structure of Adefovir dipivoxil is shown in FIG. 12A.

Bazedoxifene (acetate)

CAS Registry No.: 198481-33-3; Formal Name: 1-[[4-[2-(hexahydro-1H-azepin-1-yl)ethoxy]phenyl]methyl]-2-(4-hydroxyphenyl)-3-methyl-1H-indol-5-ol, acetate; Synonym: TSE 424; MF: $C_{30}H_{34}N_2O_3 \cdot C_2H_4O_2$; FW: 530.7; Purity: ≥98%; UV/Vis.: $\lambda_{max}$: 227, 299 nm; Supplied as: A crystalline solid; Storage: −20° C.; Stability: ≥2 years Bazedoxifene (acetate) is a third generation selective estrogen receptor modulator (SERM). It is an indole-based ER ligand that binds to both ERα ($IC_{50}$=26 nM) and ERβ ($IC_{50}$=99 nM). Bazedoxifene (acetate) antagonizes 17β-estradiol-dependent MCF-7 and T47D breast cancer cell proliferation in vitro as well as hormone-independent growth of MCF-7:C cells that are resistant to long-term estrogen deprivation (80% reduction with 10 nM). It has been shown to arrest cell cycling by downregulating cyclin D1 and ERα. A non-limiting exemplary structure of Bazedoxifene (acetate) is shown in FIG. 12B.

Capecitabine

CAS Registry No.: 154361-50-9; Formal Name: 5'-deoxy-5-fluoro-N-[(pentyloxy)carbonyl]-cytidine; Synonym: Ro 09-1978; MF: $C_{15}H_{22}FN_3O_6$; FW: 359.4; Purity: ≥98%; UV/Vis.: $\lambda_{max}$: 215, 243, 308 nm; Supplied as: A crystalline solid; Storage: −20° C.; Stability: ≥2 years Capecitabine is a prodrug of 5-fluorouracil(5-FU). It is converted to 5-FU via several enzymatic steps beginning in the liver and ending with conversion in tumor tissue by thymidine phosphorylase, an enzyme that is more concentrated in tumor tissue compared with normal tissue. Capecitabine is cytotoxic only at high concentrations in Scaber, SIHA, and MKN45 cells ($IC_{50}$s=97, 578, and 994 µM, respectively) and is inactive in a variety of cancer cell lines, including COLO205, HCT116, and MCF-7 cells ($IC_{50}$s=>1,000 µM). A non-limiting exemplary structure of Capecitabine is shown in FIG. 12C.

Indiplon

CAS Registry No.: 325715-02-4; Formal Name: N-methyl-N-[3-[3-(2-thienylcarbonyl)pyrazolo[1,5-a]pyrimidin-7-yl]phenyl]-acetamide; Synonym: NBI 34060; MF: $C_{20}H_{16}N_4O_2S$; FW: 376.4; Purity: ≥95%; UV/Vis.: $\lambda_{max}$: 230, 312, 347 nm; Supplied as: A crystalline solid; Storage: −20° C.; Stability: ≥2 years γ-Aminobutyric acid (GABA) is an important inhibitory neurotransmitter in mammals. Indiplon is a pyrazolopyrimidine that acts as a high-affinity positive allosteric modulator of the $GABA_A$ receptor, potentiating GABA-activated chloride currents in a dose-dependent and reversible manner. Indiplon is elective for $\alpha_1$ subunits ($EC_{50}$=2.6 nM) as compared with $\alpha_2$ or $\alpha_5$ ($EC_{50}$=24, 60, and 77 nM). Through this action, indiplon has sedative and hypnotic effects that can improve sleep onset, maintenance, and duration. A non-limiting exemplary structure of Indiplon is shown in FIG. 12D.

INNO-8875

CAS Registry No.: 871108-05-3; Formal Name: N-cyclopentyl-adenosine, 5'-nitrate; Synonym: PJ 875, Trabodenoson; MF: $C_{15}H_{20}N_6O_6$; FW: 380.4; Purity: ≥95%; UV/Vis.: $\lambda_{max}$: 268 nm; Supplied as: A crystalline solid; Storage: −20° C.; Stability: ≥2 years INNO-8875 is an adenosine $A_1$ receptor agonist. It binds to adenosine $A_1$ receptors ($K_i$=0.97 nM) and is greater than 10,000-fold selective for adenosine $A_1$ over $A_2$ receptors. Topical application of INNO-8875 (25 µg/eye) reduces intraocular pressure in a rabbit model of ocular hypertension. INNO-8875 (1-50 µg/kg) decreases atrial refractoriness and heart rate, as well as slows atrioventricular nodal conduction, in anesthetized rats. A non-limiting exemplary structure of INNO-8875 is shown in FIG. 12E.

LOXO-101

Figure 12G:
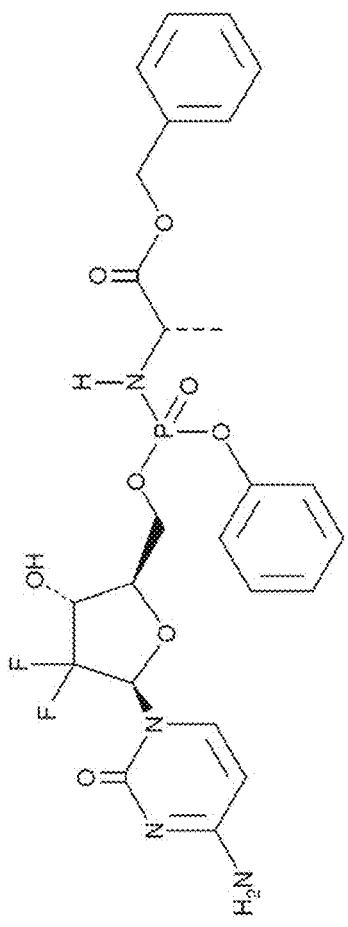
Figure 12F:
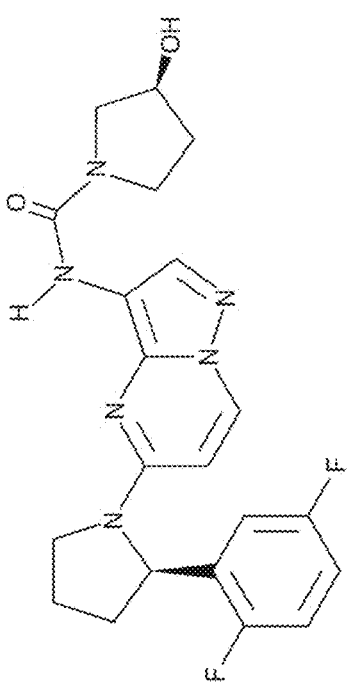

CAS Registry No.: 1223403-58-4; Formal Name: (3S)—N-[5-[(2R)-2-(2,5-difluorophenyl)-1-pyrrolidinyl]pyrazolo[1,5-a]pyrimidin-3-yl]-3-hydroxy-1-pyrrolidinecarboxamide; Synonym: ARRY-470, Larotrectinib; MF: $C_{21}H_{22}F_2N_6O_2$; FW: 428.4; Purity: ≥98%; UV/Vis.: $\lambda_{max}$264 nm; Supplied as: A crystalline solid; Storage: −20° C.; Stability: ≥2 years LOXO-101 is an inhibitor of the tropomyosin-related kinases TrkA, TrkB, and TrkC ($IC_{50}$s=2-20 nM). It is selective for TrkA, -B, and -C over a panel of 226 kinases at 1 µM. LOXO-101 inhibits the growth of CUTO-3.29, KM12, and MO-91 patient-derived cancer cell lines ($IC_{50}$s=<100, <10, and <10 nM, respectively). In vivo, LOXO-101 (60 and 200 mg/kg) reduces tumor growth in a KM12 mouse xenograft model. A non-limiting exemplary structure of LOXO-101 is shown in FIG. 12F.

NUC-1031

CAS Registry No.: 840506-29-8; Formal Name: N-(2'-deoxy-2',2'-difluoro-P-phenyl-5'-cytidylyl)-L-alanine, phenylmethyl ester; MF: $C_{25}H_{27}F_2N_4O_8P$; FW: 580.5; Purity: ≥98% (mixture of diastereomers); UV/Vis.: $\lambda_{max}$: 245 nm; Supplied as: A crystalline solid; Storage: −20° C.; Stability: ≥2 years NUC-1031 is a prodrug form of the anticancer nucleoside analog gemcitabine. NUC-1031 is more lipophilic than gemcitabine and enters cells through passive diffusion. It inhibits the growth of L1210, CEM, MP-2, and BxPC-3 cancer cells in vitro ($IC_{50}$=35, 30, 60, and 40 nM, respectively). NUC-1031 (0.076 mmol/kg) reduces tumor growth in Mia-PaCa-2 and BxPC-3 mouse xenograft models, which are partially responsive and resistant to gemcitabine, respectively. A non-limiting exemplary structure of NUC-1031 is shown in FIG. 12G.

Piclidenoson

Figure 12J:
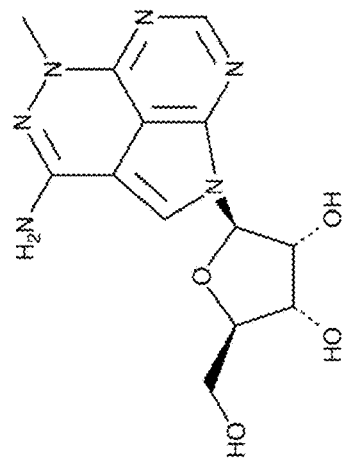
Figure 12I:
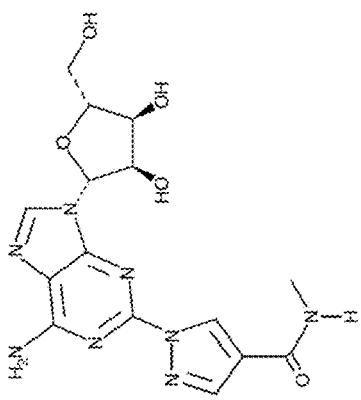
Figure 12H:
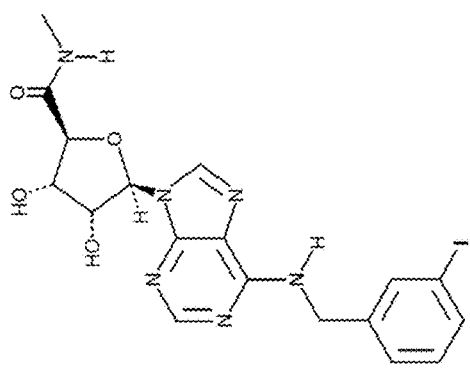

CAS Registry No.: 152918-18-8; Formal Name: 1-deoxy-1-[6-[[(3-iodophenyl)methyl]amino]-9H-purin-9-yl]-N-methyl-β-D-ribofuranuronamide; Synonym: CF-101, IB-IMECA; MF: $C_{18}H_{19}IN_6O_4$; FW: 510.3; Purity: ≥98%; UV/Vis.: $\lambda_{max}$: 268 nm; Supplied as: A crystalline solid; Storage: ≥98%; Stability: −20° C. ≥2 years Piclidenoson is an adenosine $A_3$ receptor agonist ($K_i$=1.7 nM). It is selective for adenosine $A_3$ over $A_1$ and $A_2$ receptors ($K_i$s=55.3 and 3,099 nM, respectively). In vivo, piclidenoson (100 μg/kg) reduces wall thickening in a rabbit model of ischemia-reperfusion injury induced by coronary artery occlusion, an effect that can be reversed by the adenosine receptor antagonist 8-p-sulfophenyl theophylline. It reduces hepatocellular tumor growth, liver inflammation, and neuropathy in a rat model of bone-residing breast cancer and decreases the number of lung metastases in a model of metastatic murine melanoma. Piclidenoson (1 and 3 mg/kg) also reduces colonic inflammatory cell infiltration and damage in a mouse model of colitis induced by dextran sulfate (DSS) and in IL-10$^{-/-}$ mice. A non-limiting exemplary structure of Piclidenoson is shown in FIG. 12H.

Regadenoson

CAS Registry No.: 313348-27-5; Formal Name: 2-[4-[(methylamino)carbonyl]-1H-pyrazol-1-yl]-adenosine; Synonym: CVT-3146, Lexiscan; MF: $C_{15}H_{18}N_8O_5$; FW: 390.4; Purity: ≥98%; UV/Vis.: $\lambda_{max}$: 247, 271 nm; Supplied as: A crystalline solid; Stability: ≥2 years at −20° C.

Regadenoson is a selective, short-acting adenosine $A_{2A}$ receptor agonist ($K_i$=1.1 nM for pig striatum $A_{2A}$ receptor). It increases coronary blood flow 3.4- to 3.8-fold with a half-time to reversal of 1.9-2.6 minutes in open-chest anesthetized pigs. Regadenoson is used to induce hyperemia (increased blood flow), particularly in the context of myocardial perfusion imaging. It has also been found to increase the delivery of compounds to the central nervous system through the blood-brain barrier in animals. A non-limiting exemplary structure of Regadenoson is shown in FIG. 12I.

Triciribine

CAS Registry No.: 35943-35-2; Formal Name: 1,5-dihydro-5-methyl-1-β-D-ribofuranosyl-1,2,5,6,8-pentaazaacenaphthylen-3-amine; Synonym: API 2, NSC 154020, Tricyclic Nucleoside; MF: $C_{13}H_{16}N_6O_4$; FW: 320.3; Purity: ≥98%; UV/Vis.: $\lambda_{max}$: 295 nm; Supplied as: A crystalline solid; Storage: −20° C.; Stability: ≥2 years Triciribine is a cell-permeable tricyclic nucleoside that inhibits the phosphorylation, activation, and signaling of Akt-1, -2, and -3. It does not inhibit phosphatidylinositol 3 (PI3)-Kinase or PDK1, the direct upstream activators of Akt, nor does it inhibit PKC, PKA, ERK1/2, serum- and glucocorticoid-inducible kinase, p38, STAT3, or INK signaling pathways. Triciribine effectively inhibits growth of Akt-overexpressing human cancer cell lines in vitro with 50% inhibition at ~5-10 μM. It also inhibit growth of tumor xenografts in mice by greater than 80% at a dose of 1 mg/kg/day. A non-limiting exemplary structure of Triciribine is shown in FIG. 12J.

Predicted TMPRSS2 Inhibitor Compounds

Lifitegrast

Figure 13C:
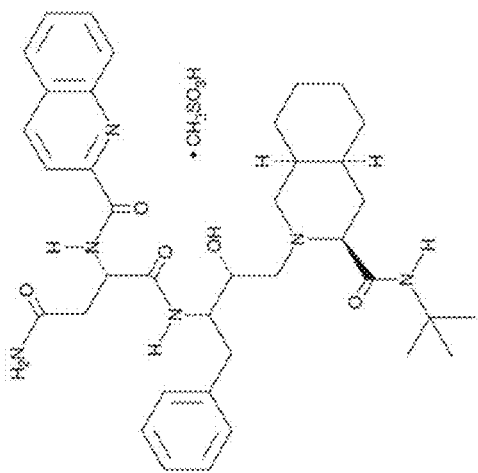
FIG. 13A-FIG. 13D depict non-limiting exemplary structures of predicted TMPRSS2 inhibitor compounds Lifitegrast (FIG. 13A), Lopinavir (FIG. 13B), Saquinavir (mesylate) (FIG. 13C), and Zafirlukast (FIG. 13D).
Figure 13D:
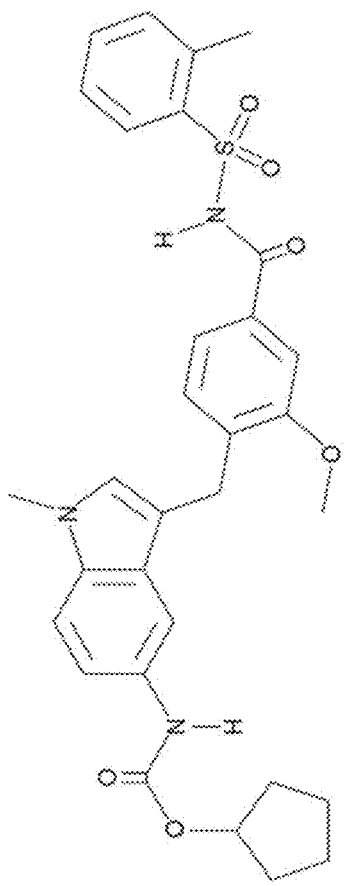
Figure 13A:
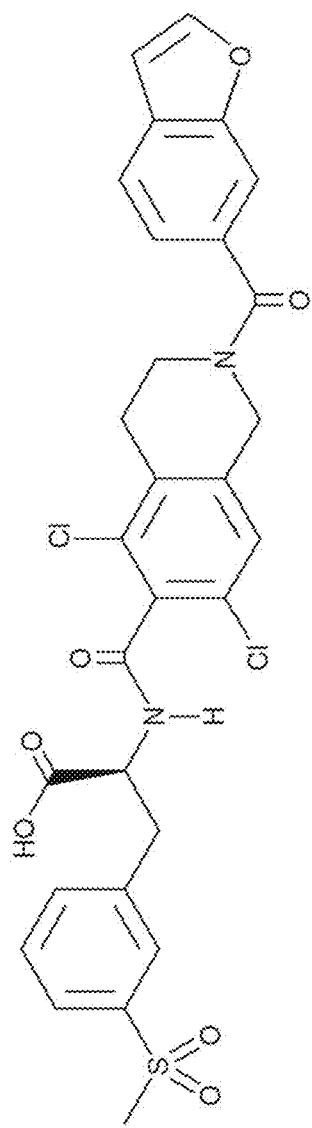

CAS Registry No.: 1025967-78-5; Formal Name: N-[[2-(6-benzofuranylcarbonyl)-5,7-dichloro-1,2,3,4-tetrahydro-6-isoquinolinyl]carbonyl]-3-(methylsulfonyl)-L-phenylalanine; Synonym: SAR 1118; MF: $C_{29}H_{24}Cl_2N_2O_7S$; FW: 615.5; Purity: ≥98%; UV/Vis.: $\lambda_{max}$: 260 nm; Supplied as: A crystalline solid; Storage: −20° C.; Stability: ≥2 years Lifitegrast binds to lymphocyte function-associated antigen-1 (LFA-1) on T cells and inhibits interaction with intercellular adhesion molecule-1 (ICAM-1; $IC_{50}$=2.98 nM in Jurkat T cells), which decreases T cell-mediated inflammation. It inhibits secretion of cytokines associated with dry eye disease, including INF-γ, TNF-α, MIP-1α, IL-1α, IL-1β, IL-2, IL-4, and IL-6. In a T cell adhesion assay, lifitegrast blocks adhesion of HuT 78 cells to ICAM-1 with an $IC_{50}$ value of 9 nM. It also increases tear production in dogs with idiopathic keratoconjunctivitis sicca (dry eye syndrome). Topical application of lifitegrast in mouse models of corneal and bacterial inflammation inhibits LFA-1-dependent neutrophil recruitment to the eye. Formulations containing lifitegrast are used for the treatment of dry eye disease. A non-limiting exemplary structure of Lifitegrast is shown in FIG. 13A.

Lopinavir

Figure 13B:
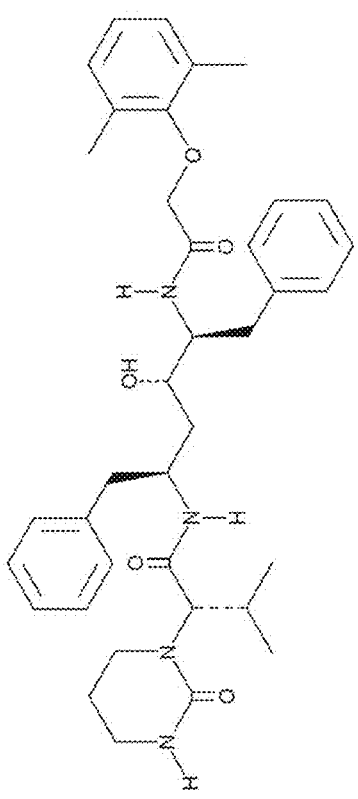

CAS Registry No.: 192725-17-0; Formal Name: N-[(1S,3S,4S)-4-[[2-(2,6-dimethylphenoxy)acetyl]amino]-3-hydroxy-5-phenyl-1-(phenylmethyl)pentyl]tetrahydro-aS-(1-methylethyl)-2-oxo-1(2H)-pyrimidineacetamide; Synonym: A-157378.0, ABT-378; MF: $C_{37}H_{48}N_4O_5$; FW: 628.8; Purity: ≥98%; UV/Vis.: $\lambda_{max}$: 259 nm; Supplied as: A crystalline solid; Storage: −20° C.; Stability: ≥2 years Lopinavir is a potent HIV-1 protease inhibitor ($K_i$=1.3 μM for wild-type enzyme). It inhibits the replication of clinical isolates of HIV-1 ($EC_{50}$s=5-52 nM). A non-limiting exemplary structure of Lopinavir is shown in FIG. 13B.

Saquinavir (mesylate)

CAS Registry No.: 149845-06-7; Formal Name: (2S)—$N^1$—[(1S,2R)-3-[(3S,4aS,8aS)-3-[[(1,1-dimethylethyl)amino]carbonyl]octahydro-2(1H)-isoquinolinyl]-2-hydroxy-1-(phenylmethyl)propyl]-2-[(2-quinolinylcarbonyl)amino]-butanediamide, monomethanesulfonate; Synonym: Ro 31-8959/003; MF: $C_{38}H_{50}N_6O_5 \cdot CH_3SO_3H$; FW: 767.0; Purity: ≥98%; UV/Vis.: $\lambda_{max}$: 206, 239, 291 nm; Supplied as: A crystalline solid; Storage: −20° C.; Stability: ≥2 years;

Saquinavir is an HIV protease inhibitor ($K_i$s=0.12 and <0.1 nM for HIV-1 and HIV-2 protease, respectively) that exhibits antiviral activity with low cytotoxicity. When co-administered with 50 mg/kg ritonavir, the bioavailability of 20 mg/kg saquinavir has been shown to increase 325-fold in mice through a mechanism that inhibits its metabolism by CYP3A. A non-limiting exemplary structure of Saquinavir (mesylate) is shown in FIG. 13C.

Zafirlukast

CAS Registry No.: 107753-78-6; Formal Name: [3-[[2-methoxy-4-[[[(2-methylphenyl)sulfonyl]amino]carbonyl]phenyl]methyl]-1-methyl-1H-indol-5-yl]-carbamic acid, cyclopentyl ester; MF: $C_{31}H_{33}N_3O_6S$; FW: 575.7; Purity:

≥97%; UV/Vis.: $\lambda_{max}$: 203, 215, 241, 299 nm; Supplied as: A crystalline solid; Storage: −20° C.; Stability: ≥2 years The cysteinyl leukotrienes (CysLTs), $LTC_4$ and $LTD_4$, are potent mediators of asthma and hypersensitivity. They induce bronchoconstriction, increase microvascular permeability, and are vasoconstrictors of coronary arteries. Their biological effects are transduced by a pair of G protein-coupled receptors, $CysLT_1$ and $CysLT_2$. Zafirlukast is a potent, selective $CysLT_1$ receptor antagonist sold under the trade name Accolate for the treatment of asthma as well as for the symptoms associated with allergic rhinitis. It binds to the human $CysLT_1$ and $CysLT_2$ receptors with $IC_{50}$ values of approximately 5 and 7,400 nM, respectively. A non-limiting exemplary structure of Zafirlukast is shown in FIG. 13D.

EXAMPLES

Some aspects of the embodiments discussed above are disclosed in further detail in the following examples, which are not in any way intended to limit the scope of the present disclosure.

Example 1

Angiotensin-Converting Enzyme II (ACE2)

Identification: UniProtKB-Q9BYF1 (ACE2_HUMAN)
Gene: ACE2
Alternative Names/Synonyms
Angiotensin-converting enzyme-related carboxypeptidase, Carboxypeptidase ACE2, ACE2, APN 01, Angiotensin I converting enzyme II, Angiotensin I converting enzyme 2, E.C. 3.4.17.23, ACE-II, ACE-2, Angiotensin-converting enzyme II, ACE-related carboxypeptidase, Angiotensin-converting enzyme homolog (ACEH), Metalloprotease MPROT15
Structure and Sequence
Discovered in 2000, Angiotensin-Converting Enzyme II (ACE2) is a Type I transmembrane carboxypeptidase involved in regulation of the renin-angiotensin system (RAS). ACE2 is a chimeric protein made up of 805 amino acids and is located on the X chromosome. Its creation is a result of duplication of 2 genes: homology with ACE at the catalytic domain and homology of Collectrin in the transmembrane C-terminal domain. This human homolog of ACE, ACE2, has its N-terminus exposed to the external side of the cell membrane while its C-terminus is intracellularly positioned. The enzyme's exposure to circulating substrates allows for regulation of this receptor to be focused on its expression on the cell surface. The detailed structure of the ACE2 receptor bound with the SARS-CoV-2 Spike protein is disclosed in Lan et al., 2020.
Known Locations and Abundance
ACE2 is primarily found on endothelial cells in tissues such as lung, intestine, testis, kidney, heart, liver and brain. More specifically, ACE2 is expressed in the endothelium and cardiomyocytes of the heart, vascular endothelial cells, luminal surface of gastrointestinal tract epithelial cells, and on the luminal surface of tubular epithelial cells of the kidney (Kuba, Imai et al. 2013).
Physiology and Disease
One of ACE2's main contributions to the RAS system is its ability to negatively regulate the RAS through breakdown of angiotensin-II into angiotensin-(1-7). The resultant peptides interact with the G protein-coupled receptor Mas to carry out their vasodilating effects. Angiotensin-II acts as a strong vasoconstricting peptide. This key function of ACE2's ability to decrease the abundance of Ang-2 has led to the discovery of therapeutics related to alleviation of hypertension.

ACE2 is also a regulator of cardiovascular function; particularly the carboxypeptidase that is located in the brain. It also protects baroreflex and autonomic function, heart function, stimulates nitric oxide release and reduces oxidative stress. For a detailed explanation of the mechanism behind ACE2's regulation of the cardiovascular system, see (Xia and Lazartigues 2010) and (Crackower et al, 2002).

Aberrant levels of ACE2 have been hypothesized to be involved in the pathogenesis of diabetes, kidney disease, and cardiovascular disease given its role in injury response, renoprotection and blood pressure regulation.

In lung-injury models such as sepsis ARDS, SARS-mediated ARDS, bleomycin-induced lung fibrosis and monocrotaline-induced pulmonary hypertension, ACE2 has proven to serve as a protection against respiratory failure (Kuba, Imai et al. 2013). ACE2 has been identified as the key receptor for recognition and cell-entry by SARS-CoV and the novel SARS-CoV-2 (Kuba, Imai et al. 2013).
Known Inhibitors
Various ACE2 inhibitors and information thereof are provided in Table 1. As disclosed herein, these compounds can be used alone, or in combination with other therapeutic agent(s) (e.g., one or more compounds listed in Tables 1-6) for preventing, delaying the onset of, or treating an infection or a disease caused by a RNA virus (e.g., SARS-CoV-2), and/or for preventing, delaying the onset of, or treating an inflammatory effect of an infection or a disease caused by a RNA virus (e.g., SARS-CoV-2).

Non-limiting examples of known ACE2 inhibitors include azilsartan, candesartan, eprosartan, irbesartan, losartan, olmesartan, telmisartan, valsartan, moexipril, cilazapril and MLN-4760.
Target Relevance to RNA Viral Infection
ACE2 is used by the novel coronavirus as a cellular entry receptor. Once the S Protein of the virus is cleaved at the S1/S2 specific cleavage site, the S1 subunit contains the receptor binding domain (RBD) which has a high affinity for and in response interacts with ACE2. Patients with comorbidities associated with severe COVID-19 have been shown to have increased expression of ACE2 in the lungs. The ACE2-binding affinity to the RBD in the S1 subunit of the S glycoprotein of SARS-CoV-2 is 10-20-fold higher than that of SARS-CoV. These findings suggest that ACE2 is a dominant player in receptor recognition of the virus as well as its infectious properties.

In efforts to block receptor-recognition, the potential for ACE2 inhibitors has been explored. However, a number of studies have revealed some side effects in response to ACE2 receptor blocking. ACE2 inhibitors and blockers can result in upregulation of the receptor expression. There is an unclear explanation and inconsistency in results for the effects when ACE/ACE2 inhibitors are taken, especially for those whom have currently prescribed medication for cardiovascular diseases. However, some scientists do not think that the risks outweigh the benefits for these already prescribed inhibitors and blockers. A large portion of the antagonistic effects on ACE and ACE2 in humans remains unclear. Without being bound by any particular theory, an ACE2 antagonist could potentially serve as an antiviral therapy by decreasing COVID-19 infection by blocking the entry mediated fusion through ACE2. A recent analysis of approximately 12,600 patients tested for COVID-19 was conducted to investigate the relationship between a number of medications, including ACE inhibitors, and the infection and/or severity of the virus. The results showed no significant increase in the likelihood of testing positive for the virus or the possibility of the viral infection becoming severe among those that tested positive and were taking the medications in question. If successful, an ACE2 inhibitor form of treatment could be addressable to a global audience of infected individuals by blocking viral entry.

Example 2

Furin

Identification: UniProtKB-P09958 (FURIN_HUMAN)
Gene: FURIN
Alternative Names/Synonyms
Furin (enzyme), PACE, Furin, Paired basic amino acid converting enzyme, Paired basic amino acid cleaving enzyme, Serine proteinase PACE, Saccharomyces cerevisiae gene QDS1 proteinase PACE-furin protease Serine proteinase PCSK3 E.C. 3.4.21.75, EC 3.4.21.75, Dibasic-processing enzyme, Paired basic amino acid residue-cleaving enzyme (PACE).
Structure and Sequence
Discovered in 1990, Furin is a 794-amino-acid TYPE-I-Transmembrane Protein belonging to the subtilisin superfamily of serine endoproteases. This endoprotease is encoded in the FURIN gene which is expressed on human chromosome 15 and possesses four potential isoforms. The enzyme's detailed crystal structure, including its active site, catalytic and P domains, has been explored and made available as an aid in the process to discover antiviral therapies. The enzyme's strict substrate specificity requires a specific inhibitor of furin for proper antagonization.
Known Locations and Abundance
Furin is found in all vertebrates and many invertebrates and is ubiquitously expressed.
Physiology and Disease
The overarching function of furin is to cleave substrates (inactive protein precursors) into their active protein form. Furin's proteolytic activation is calcium-dependent and shows significant enzymatic activity between the pH of 5 and 8 (Thomas 2002). Some of the main mammalian substrates of furin include cytokines, hormones, growth factors and receptors. In addition to proteolytic activation, furin also produces morphogen gradients during embryogenesis (Thomas 2002).
Aberrant furin activity can lead to tumor development, diabetes, inflammation and neurological diseases such as dementia and Alzheimer's (Thomas 2002). Furin's enzymatic activity also has a role in facilitating various bacterial infections and virulence. For instance, it increases pathogenicity by acting as an activating protease for viruses such as HPAIV, HIV, Ebola, Measles, SARS-CoV, MERS-CoV and Yellow fever.
Bacterial toxins, such as Anthrax toxin and aerolysin toxin, are activated by cell-surface furin cleavage. Once activated, these lethal toxins are able to penetrate cellular membranes resulting in the formation of pores. The importance of furin's ability to activate these toxins was exemplified by the protease's absence resulted in failed assemblage of the toxins and unlethal effects.
Cancer progression and metastasis is also notable of excessive furin activity. For example, furin is upregulated in non-small-cell lung carcinomas, squamous-cell carcinomas of the head and neck and glioblastomas. The protease's role in tumor metastasis is likely due to the increased prevalence of its substrates such as membrane type 1-matrix metalloproteinase which leads to accelerated tumor progression. Furin is also essential to the progression of colon, breast and prostate cancers. The furin substrate, insulin-like growth factor-1 and its receptor, IGF1R, are both upregulated in the metastatic conditions. In addition to these diseases, the protease furin is involved in a positive feedback loop that worsens rheumatoid arthritis and is also linked to neurodegenerative diseases and dementia in response to cleaving particular substrates.
Known Inhibitors
Furin small molecule inhibitors of high efficacy and specificity have not yet been discovered. Potent irreversible inhibitors used for HIV infection such as chloromethyl ketones and peptidyl-chloromethyl ketones have shown some effect.
Chronic inhibition of this gene and/or enzyme has shown to have detrimental effects in animal models.
Various furin inhibitors and information thereof are provided in Table 2. As disclosed herein, these compounds can be used alone, or in combination with other therapeutic agent(s) (e.g., one or more compounds listed in Tables 1-6) for preventing, delaying the onset of, or treating an infection or a disease caused by a RNA virus (e.g., SARS-CoV-2), and/or for preventing, delaying the onset of, or treating an inflammatory effect of an infection or a disease caused by a RNA virus (e.g., SARS-CoV-2).
Target Relevance to RNA Viral Infection
SARS-CoV-2 has a heavily glycosylated, trimeric cell-surface protein known as "S protein" that mediates viral entry into host cells. This S Protein requires cleavage to form two functional domains, S1 and S2, in order to successfully enter a cell. S1 contains a conserved receptor binding domain (RBD) for viral attachment and entry while S2 contains the fusion peptide and a second proteolytic site (S2'). This site is followed by an internal fusion peptide which is responsible for fusion of the cell and viral membrane. Through proteolysis, an essential cleavage at the S1/S2 site is performed by furin, a host protein convertase. The furin cleavage sequence in the S glycoprotein of SARS-CoV-2 is PRRARS|V. Furin is highly expressed in the lungs in addition to other tissue locations. This concentrated localization works to the advantage of SARS-CoV-2 given the virus' prevalence in the respiratory tract.

Example 3

Transmembrane Protease, Serine 2 (TMPRSS2)

Identification: UniProtKB-015393 (TMPS2_HUMAN)
Gene: TMPRSS2
Alternative Names/Synonyms
Serine protease 20P1F12/TMPRSS2, Proteinase, 20P1F12/TMPRSS2, Proteinase TMPRSS2, Epitheliasin, Serine proteinase TMPRSS2, Transmembrane serine protease 2, Proteinase, transmembrane serine, 2, TMPRSS2, Proteins, TMPRSS2, Protein TMPRSS2, Transmembrane protein TMPRSS2, Protease TMPRSS2, Proteins, epitheliasin, Proteins, transmembrane, TMPRSS2, Serine protease 10
Structure and Sequence
TMPRSS2 is a host-produced cellular serine protease that is expressed on human chromosome 21. Composed of 492 amino acids, this type II transmembrane serine protease is expressed on cell surfaces.
Known Locations and Abundance
TMPRSS2 is extensively expressed in epithelial tissues, basal cells of prostate epithelium, kidney tubules, upper airway epithelium and alveoli, colonic epithelium, bile duct and ovaries. TMPRSS2 mRNA is expressed in prostate, breast, bile duct, kidney, colon, small intestine, pancreas, ovary, salivary gland, stomach, and lung tissue. Within these tissues, the protein and mRNA of this protease are mostly in epithelial cells (Antalis, Bugge et al. 2011).

Physiology and Disease

TMPRSS2 has involvement in normal physiological function such as digestion, tissue remodeling, blood coagulation, fertility, the inflammatory response pathway, tumor cell invasion and apoptosis. It is hypothesized that TMPRSS2 modulates epithelial sodium currents in lung tissue by activating the epithelial sodium channel through proteolytic cleavage. This family of serine proteases (TTSPs) are often hormone or growth factor activators and initiate proteolytic cascades.

Aside from the serine protease's normal physiological functions, it is also tied to a number of disease and irregular responses during abnormal enzymatic activity. TMPRSS2 is involved in the inflammatory response pathway in the prostate by activating PAR-2, a protease-activated receptor with a role in prostate cancer metastasis. Alongside PAR-2, a series of substrates are activated by the protease that ultimately leads to extracellular matrix disruption and metastasis of prostate cancer cells. TMPRSS2 is also known to be directly involved in the pathogenesis of prostate cancer. This is due to C-terminally truncated TMPRSS2 proteins that are fused to N-terminally truncated ERG/ETV proteins which are a consequence of gene fusion. The products subsequently cause androgen-regulated and increased expression of cell growth-regulating proto-oncogenes. Supporting this, TMPRSS2-ERG fusion mRNAs are abundant in prostate cancer cells.

The serine protease also functions to activate a number of respiratory viruses. For instance, the influenza virus is activated by TMPRSS2 conducting proteolytic cleavage of hemagglutinin.

Known Inhibitors

Examples of TMPRSS2 inhibitors include Nafamostat and camostat mesylate. Nafamostat was previously approved as a clinically proven protease inhibitor of TMPRSS2 in cystic fibrosis. Nafamostat has also progressed to a phase 2/3 clinical trial under a SARS-CoV-2 indication. Camostat mesylate is currently approved for human use in Japan under another indication, however, it is being repurposed for use against COVID-19 infection and is in the recruiting phase of clinical trials.

Various TMPRSS2 inhibitors and information thereof are provided in Table 3. As disclosed herein, these compounds can be used alone, or in combination with other therapeutic agent(s) (e.g., one or more compounds listed in Tables 1-6) for preventing, delaying the onset of, or treating an infection or a disease caused by a RNA virus (e.g., SARS-CoV-2), and/or for preventing, delaying the onset of, or treating an inflammatory effect of an infection or a disease caused by a RNA virus (e.g., SARS-CoV-2).

Target Relevance to RNA Viral Infection

This host-produced cellular serine protease is exploited by the novel coronavirus for S protein priming. It has also been shown to facilitate viral entry into host cells by proteolytically cleaving and activating viral envelope glycoproteins. TMPRSS2's two essential roles in viral infection of SARS-CoV-2 are to 1) proteolytically cleave the ACE2 receptor to increase viral uptake and 2) cleave the Coronavirus Spike protein for host-cell entry. Proteolytic processing of the coronavirus S protein by host cell proteases is essential for viral entry into cells and encompasses S protein cleavage at the S1/S2 and the S2' sites. Without being bound by any particular theory, it is speculated that there is a relation between furin-mediated cleavage at the S1/S2 site that promotes TMPRSS2-dependent entry into target cells.

This protease's activity is essential for viral spread and pathogenesis in the infected host. Its expression promotes SARS-CoV-2 replication and syncytium formation. An engineered cell line that was constructed to overexpress TMPRSS2 exhibited an abnormally high susceptibility to infection by SARS-CoV-2. Without being bound by any particular theory, this result is likely due to the increased availability of the protease to proteolytically activate the virus thereby facilitating cell entry. An inhibitor of TMPRSS2, camostat mesylate, has been shown to block SARS-CoV-2 infection of lung cells. Investigating a drug therapy, such as an inhibitor, for this protease would be worthwhile considering its vital role in viral pathogenicity.

Example 4

Chymotrypsin-Like Protease (3CLpro)

Identification: UniProtKB-P0DTD1 (R1AB_SARS2), P0C6X7, P0C6U8

Gene: ORF1ab

Alternative Names/Synonyms

SARS proteinases, SARS proteinase NSP5, SARS proteinase, SARS protease, SARS proteases, SARS cysteine proteinases, SARS cysteine proteinase, SARS-CoV Mpro, SARS CoV main proteases, SARS-CoV main protease, SARS CoV 3C-like proteases, SARS 3C-like protease, SARS coronavirus proteinases, SARS coronavirus proteinase, SARS coronavirus main proteinases, SARS coronavirus main proteinase, Coronavirus picarian-like cysteine proteinase, Coronavirus main protease Mpro, Coronavirus main protease, Proteinase 3CLpro NSP5, 3CLpro NSP5, Coronavirus nonstructural protein NSP5, Coronavirus nonstructural protein 5, Coronavirus NSP5, SARS-CoV-2 NSP5, SARS-coronavirus nonstructural protein 5, SARS-coronavirus nonstructural protein NSP5, 3-Chymotrypsin-like protease NSP5, 3-Chymotrypsin-like proteinase NSP5, SARS-3-chymotrypsin-like protease NSP5, SARS-3-chymotrypsin-like proteinase NSP5, Proteinase NSP5, Protease NSP5, NSP5, SARS-CoV-2 3CLpro, Severe acute respiratory syndrome coronavirus nonstructural protein 5, Severe acute respiratory syndrome coronavirus NSP5, Coronavirus proteinase 3CLpro NSP5, Coronavirus endopeptidase C30, E.C. 3.4.22.69, E.C. 3.4.22.69, SARS-CoV-2 main protease, SARS coronavirus 3CLpro, SARS 3CLpro, Coronavirus 3CLpro, Coronavirus protease 3CLpro, Coronavirus proteinase, 3CLpro Coronavirus proteinase NSP5, Coronavirus protease NSP5, SARS-CoV NSP5, SARS-CoV-2 Mpro, SARS Mpro, Coronavirus Mpro, CoV Mpro, Nonstructural protein 5, Nonstructural protein NSP5, SARS coronavirus nonstructural protein 5

Structure and Sequence

The coronavirus main proteinase ($3CL^{pro}$ or $M^{pro}$) is functionally and structurally conserved among coronaviruses. $3CL^{pro}$ is located at the 3' end and consequently exhibits high variance. The proteinase is made up of 306 amino acids and shares a strong sequence identity with SARS-CoV (96.08%) and MERS-CoV (87%), respectively. The receptor-binding pocket conformation of both SARS-CoV and SARS-CoV-2 resemble one another but a known inhibitor of SARS-CoV $3CL^{pro}$ did not bind with the same affinity (Ki) to the novel coronavirus (SARS-CoV-2) $3CL^{pro}$ receptor-binding pocket. Despite the similar sequence identity, new inhibitors for SARS-CoV-2 are of interest.

Physiology and Disease

3CL$^{pro}$ is a nonstructural main proteinase encoded by the viral genome that controls the activities of and is essential for the coronavirus replication complex. Alongside PLpro, 3CLpro cleaves viral polyproteins that are translated from viral RNA into nonstructural effector viral proteins. Specifically, 3CL$^{pro}$ cleaves the viral polypeptide that is produced by transcription of the genome at 11 definite sites.

3CLpro is a replication/transcription complex element of coronaviruses. Its function is essential for proper coronavirus replication.

Known Inhibitors

Various 3CLpro inhibitors and information thereof are provided in Table 4. As disclosed herein, these compounds can be used alone, or in combination with other therapeutic agent(s) (e.g., one or more compounds listed in Tables 1-6) for preventing, delaying the onset of, or treating an infection or a disease caused by a RNA virus (e.g., SARS-CoV-2), and/or for preventing, delaying the onset of, or treating an inflammatory effect of an infection or a disease caused by a RNA virus (e.g., SARS-CoV-2).

Non-limiting examples of experimental 3CLpro inhibitors include lopinavir, ML188 and 3CL-pro-1.

Target Relevance to RNA Viral Infection

The 3CLPro protease is considered a potential target for the design of antiviral drugs with broad-spectrum activities against these viral infections by blocking proper replication. Without being bound by any particular theory, targeting this viral protease would have a low likelihood of exerting toxic or off-target effects on human hosts because there currently are no known human proteases that share the same cleavage pattern specificity. Inhibition experiments have revealed that an inhibitor will bind to a shallow substrate-binding site located at the surface of each promoter between domains I and II.

Example 5

Papain-Like Protease (PLpro)

Identification: UniProtKB-P0DTC1 (R1A_SARS2), K4LC41

Gene: ORF1a

Alternative Names/Synonyms

Proteinase, PLpro, Coronavirus papain-like endopeptidase, Papain-like protease PLP2, Papain-like protease PLP1, Arterivirus papain-like protease, Papain-like protease 2, Papain-like protease PLpro, Protease PLpro, Protease, papain-like protease PLP1, Papain-like proteinase PLpro, Proteinase, papain-like proteinase PLPro, Protease, papin-like protease PLP2, Papain-like protease 1

Structure and Sequence

Papain-like protease (PLpro) is a nonstructural protein encoded by the viral genome. Although the structure of the SARS-CoV-2 PLpro has not yet been published, the structural details of the SARS-CoV PLpro can be viewed at Ratia et al, 2014. Given the structural similarity and highly conserved sequence of SARS-CoV-2 and SARS-CoV, it would be productive to utilize the structure of the SARS-CoV PLpro for inhibitor design.

Physiology and Disease

PLpro is a replication/transcription complex element of coronaviruses. Its function is essential for proper coronavirus replication. This protease is responsible for cleavage at the N-terminus of the replicase polyprotein to release Nsp1,2 and 3 which are essential nonstructural proteins that correct virus replication. In addition to cleaving viral polyproteins, PLpro is also a deubiquitinase (DUB) and deISGylating enzyme that strips ubiquitin and ISG15 from host-cell proteins. This in turn helps coronaviruses in their evasion by consequently causing immunosuppression and antagonization. Both Ub and ISG15 are important signaling elements of the host innate immune response against viral infection, which can be negatively regulated by viral deubiquitinases and deISGylating enzymes. PLPro protease antagonization of host's immune system leads to subsequent complications.

Known Inhibitors

Various PLpro inhibitors and information thereof are provided in Table 5. As disclosed herein, these compounds can be used alone, or in combination with other therapeutic agent(s) (e.g., one or more compounds listed in Tables 1-6) for preventing, delaying the onset of, or treating an infection or a disease caused by a RNA virus (e.g., SARS-CoV-2), and/or for preventing, delaying the onset of, or treating an inflammatory effect of an infection or a disease caused by a RNA virus (e.g., SARS-CoV-2).

There are currently no existing FDA approved PLpro inhibitors. Lopiavir is being tested as an experimental drug candidate against PLpro.

Target Relevance to RNA Viral Infection

PLPro of SARS-CoV and SARS-CoV-2 share 79.6% sequence identity. PLpro sequences of SARS-CoV-2 and SARS-CoV also share similar active sites. SARS-CoV PLpro has been shown to act as a strong antagonist of many Ub-dependent cellular responses to viral infection. SARS-CoV PLpro also blocks the production of important cytokines involved in the activation of the host's innate immune response against viral infection, including the Type I interferon β (IFNβ) and chemokines such as CXCL10 and CCL5.

Without being bound by any particular theory, targeting PLpro with antiviral drugs may have an advantage in not only inhibiting viral replication but also inhibiting the dysregulation of signaling cascades in infected cells that may lead to cell death in surrounding, uninfected cells.

Example 6

RNA-Dependent RNA Polymerase (RdRp)

Identification: UniProtKB: A0A5H2X758, A0A5H2WYC2, A0A5H2WTX4, A0A5H2WUC6, A0A5H2WYC7

Alternative Names/Synonyms

RdRp NSP12, Coronaviral RdRp NSP12, SARS NSP12, SARS-CoV NSP12, SARS coronavirus nonstructural protein NSP12, Coronavirus nonstructural protein NSP12, SARS nonstructural protein NSP12, SARS coronavirus nonstructural protein 12, Coronavirus nonstructural protein 12, Nonstructural protein 12, RNA polymerase NSP12, NSP12, Proteins, NSP12, SARS-CoV-2 NSP12, Severe acute respiratory syndrome coronavirus NSP12, Coronavirus RNA-dependent RNA polymerase NSP12, Viral nonstructural protein NS12 (coronavirus), RNA-dependent RNA polymerase NSP12, Coronavirus NSP12 Coronaviral RdRp, SARS RdRp, CoV RdRp, SARS-CoV-2 RdRp, SARS-CoV RdRp, Coronavirus RNA-dependent RNA polymerase, SARS RNA-dependent RNA polymerase, SARS RNA-directed RNA polymerase, Coronavirus RNA-directed RNA polymerase, SARS-CoV RNA-directed RNA polymerase, SARS-CoV-2 RNA-directed RNA polymerase, SARS-CoV-2 RNA replicase, SARS-CoV RNA replicase, SARS RNA replicase, CoV RNA replicase, Coronavirus RNA replicase, Severe acute respiratory syndrome coronavirus RNA replicase, CoV replicase, SARS-CoV replicase, SARS-CoV-2 replicase, RNA replicase NSP12

Structure and Sequence

The RNA-dependent RNA polymerase (RdRp), also known as Nsp12, of SARS-CoV-2 is composed of 6 sections: nsp7, nsp8-1, nsp-8-2, "thumb", "palm" and "fingers". The replication/transcription complex includes small proteins nsp7 and nsp8 as accessory factors that increase the template binding and enzymatic activity of Nsp12. The sequence of Nsp12 is highly conserved across coronaviruses such as SARS-CoV, MERS-CoV and SARS-CoV-2. The SARS-CoV-2 RdRp sequence shares 97% similarity to SARS-CoV. The highly conserved active site has two successive and surface accessible aspartates in a beta-turn structure. The detailed structure of the novel coronavirus' RdRp complex and role of each domain is described in Gao et al, 2020, Yin et al 2020, and Venkataraman et al, 2018.

Physiology and Disease

RdRP, also known as Nsp12, is a polymerase that catalyzes the replication of RNA from an RNA template and is a vital enzyme for RNA viruses' replication/transcription complex. This enzyme synthesizes a full-length negative-strand RNA template that can subsequently be used to replicate and transcribe the viral genome. RdRp is a core replication/transcriptional element of all RNA viruses.

Known Inhibitors

RdRp's crucial role in the life cycle of RNA viruses has led to its targeted inhibition for a number of viral infections such as hepatitis C virus, Zika virus, and coronaviruses. Current experimental drugs for this target include remdesivir, galidesivir, sofosbuvir, ribavirin, and favipiravir. Remdesivir is an antiviral inhibitor of RdRp that has shown to be effective against RNA viruses such as SARS-CoV, MERS-CoV and Ebola virus. The antiviral activity of Remdesivir is proposed due to its resemblance to an ATP used by RdRp. Remdesivir may be adequate to bind to the polymerase and hinder the enzyme's ability to incorporate additional RNA subunits, resulting in a failed genome replication. A recently discovered potent inhibitor known as ID-184 has been shown to bind RdRp more tightly than other experimental inhibitors.

Various RdRP inhibitors and information thereof are provided in Table 6. As disclosed herein, these compounds can be used alone, or in combination with other therapeutic agent(s) (e.g., one or more compounds listed in Tables 1-6) for preventing, delaying the onset of, or treating an infection or a disease caused by a RNA virus (e.g., SARS-CoV-2), and/or for preventing, delaying the onset of, or treating an inflammatory effect of an infection or a disease caused by a RNA virus (e.g., SARS-CoV-2).

Target Relevance to RNA Viral Infection

The RNA-dependent RNA polymerase of SARS-CoV-2 is essential for replication and transcription of the virus. This polymerase is identified as a main viral target for COVID-19 drug therapies. Given the highly conserved sequence of RdRp across all RNA viruses, there is a number of RdRp inhibitors that have been tested against SARS CoV-2 (Howes 2020). Without being bound by any particular theory, targeted inhibition of Nsp12-RdRp would presumably not cause toxicity and side-effects on host cells. A drug therapy that could act to stop or disrupt viral replication could attenuate viral propagation.

Example 7

Combinatorial Approaches

One or more pharmaceutical compositions from one or more of the compounds listed in Tables 1-6 (e.g., Tocladesine, PRX-07034, AZD-5991, Berzosertib, Pipendoxifene, Bazedoxifene, R-428) may serve as combination therapies for treating RNA viral infections. For example, a compound from Table 2 and a compound from Table 3 may have synergistic effects when administered together.

Viruses that contain envelope proteins, such as SARS CoV-2, have surface proteins that require specific cleavage in order to properly fuse with and form a syncytium with the host cell. A recent study, has successfully demonstrated furin's essential role in activating and propagating the novel coronavirus in human airway epithelial cells. The importance of an additional protease, TMPRSS2, was also investigated given the speculation of its ability to further activate the virus. The results of this experiment found that furin cleaves the SARS CoV-2 S Protein at the S1/S2 specific cleavage site while TMPRSS2 cleaves at the S2' site on the S protein. Furthermore, the actions of these proteases were found to lack compensation for one another's site-specific cleavage. Knockdown and downregulated activity of TMPRSS2 significantly blocked viral replication in comparison to control cells. Significant reductions in viral spread was seen at low concentrations of furin inhibitors while a dose-dependent response was observed for TMPRSS2 inhibitors. Interestingly, a synergistic effect of viral suppression was observed when inhibitors of both proteases are administered. This 10 to 30-fold difference in comparison to the individual effects of each inhibitor alludes to a novel idea that a combinational drug therapy could be highly efficacious. The study concluded with evidence that the S protein of SARS CoV-2 is activated by both TMPRSS2 and furin. Details of the study's methods and results can be seen at Bestle et at, 2020.

The evidence of an observed synergistic effect in response to a dual inhibition against SARS CoV-2 targets, furin and TMPRSS2, opens the door for combinational drug therapies that would aim to reduce and/or block viral infection. In one embodiment, the treatment may be a reversible and selective inhibitor for each of the targets. In another embodiment, the inhibition of furin would be transient.

Beyond a combined targeted inhibition of human proteases that facilitate viral entry and fusion, a combinational approach could also be effective against the viral replication process which would subsequently slow and decrease viral multiplication and propagation. For instance, aimed inhibition of RdRp, PLpro or 3CLpro could demonstrate these effects. Moreover, drug combinations of both the human proteases and viral proteases could also be sought after for potentially synergistic antiviral activity.

Example 8

Pipendoxifene, Berzosertib, AZD-5991, PRX-07034 and Tocladesine: Discovery and Validation of Antivirals with Activity Against SARS-CoV2 Using the ActivPred Digital Chemistry Platform and a HeLa-ACE2 Cell-Based High-Content Imaging Assay Summary In December 2019, a novel coronavirus (known as COVID-19 or SARS-CoV-2) broke out in Wuhan, China.

Since the outbreak, this global pandemic has infected more than 100 M people and killed more than 2.4 M as of Feb. 1, 2021. While there has been a rush towards vaccine development, a vast amount of research efforts have also focused their efforts towards discovering SARS-CoV-2 therapeutics. Traditional drug development methods began this process from scratch, but as of recently, researchers have grown accustomed to a faster and more affordable drug discovery approach known as drug repurposing. The ActivPred Digital Chemistry AI Drug Discovery Platform discovered hundreds of drugs that were identified to bind four targets including one host and three viral targets (ACE2, 3CLpro, PLpro and RdRp) necessary for infection and infection propagation of COVID-19. Those drugs were priority ranked using several factors and 35 small molecule drugs that ActivPred predicted would have activity against COVID-19 were selected for experimental testing. These 35 compounds were tested in a CoV-2/HeLa-ACE2 cell-based phenotypic assay. A total of 5 small molecule drugs demonstrated measurable antiviral activity in the CoV-2/HeLa-ACE2 cellular assay; yielding a 14.3% hit rate for ActivPred's discoveries. A total of 2 drugs (pipendoxifene and berzosertib) were found to be potent ($EC_{50}$<9.6 uM), nontoxic and selective ($CC_{50}$>39.8 uM and/or SI >10); yielding a hit rate of 5.7% for this higher threshold. These hit rates are encouraging as compared to the hit rates obtained by a best in class COVID-19 High Throughput Screen (HTS) of the ReFrame library, which yielded hit rates of 2.75% and 0.56%, respectively, and were significantly higher than typical hit rates reported elsewhere in the literature for HTS. These results demonstrate that ActivPred was 5× and 10× more efficient in identifying potent, nontoxic and selective drugs active against COVID-19 as compared to the best in class COVID-19 HTS approach, which was one to two orders of magnitude more efficient than typical HTS studies. The results and subsequent analysis demonstrated that pipendoxifene was potent ($EC_{50}$=8.24 uM), nontoxic ($CC_{50}$>39.8 uM) and selective (SI=17-35+) and that berzosertib was potent ($EC_{50}$=0.114 uM), non-toxic ($CC_{50}$=3.14 uM) and selective (SI=27.56). Furthermore, as compared to the remdesivir control, the only current FDA approved COVID-19 therapeutic, pipendoxifene has a larger Hill coefficient, a preferred clinical cytotoxicity profile, a significantly longer half-life and a preferred oral administration route. Berzosertib is more potent than remdesivir while exhibiting an acceptable safety profile, a significantly longer half-life and a preferred oral administration potential. According to the experimental results and analysis, pipendoxifene and berzosertib are the most suitable compounds to be considered for further clinical development out of those discovered by the ActivPred platform and experimentally validated. With additional pre-clinical and clinical validation, pipendoxifene and berzosertib may represent an alternative to remdesivir in the treatment of COVID-19 and other RNA virus infections.

ActivPred Discovery and Selection Protocol:

The ActivPred platform was trained using relevant small molecules from the public database PubChem. ActivPred then discovered compounds, using the compound libraries PubChem and DrugBank, that bind targets relevant to SARS-CoV-2 infection, replication and propagation. Targets of interest for this study included the host target ACE2 (UniProtKB-Q9BYF1 (ACE2_HUMAN)) and the viral targets 3CLpro (UniProtKB-P0DTD1 (R1AB_SARS2), P0C6X7, P0C6U8), PLpro (UniProtKB-P0DTC1 (R1A_SARS2), K4LC41) and RdRp (UniProtKB: A0A5H2X758, A0A5H2WYC2, A0A5H2WTX4, A0A5H2WUC6, A0A5H2WYC7). ActivPred discovered several hundred compounds that could exhibit antiviral activity against SARS-CoV-2 and potentially other viruses and indications via the targets indicated above. The inventions were then downselected to a list of 35 compounds based upon a selection criteria. Specifically, the highest priority ranked in silico discoveries that had never previously been found to exhibit any antiviral activity and had not yet been mentioned with the target of interest were selected to move forward into in vitro testing.

CoV-2/HeLa-ACE2 Protocol

A total of 35 small molecule discoveries made by the ActivPred platform were subjected to a cell-based phenotypic assay involving a HeLa host cell line that was engineered to constitutively express human ACE2. ACE2 is a host cell receptor that is utilized by SARS-CoV-2 for cellular entry. This assay was used to identify compounds that could inhibit SARS-CoV-2 viral entry or replication. The 38 small molecules that were tested in this assay included 3 controls (remdesivir, apilimod, and puromycin) and the 35 molecules discovered by the ActivPred Digital Discovery Platform and predicted to have antiviral activity. 25 nL of the dry compounds and controls (remdesivir, apilimod, and puromycin) were spotted in 384-well plates at final concentrations of 1.9 µM or 9.6 µM dependent on the library stock. Remdesivir was used as the positive control whereas apilimod and puromycin were for toxicity control. The assay plates were then seeded with HeLa-ACE2 cells and infected with SARS-CoV-2 an hour later. After a 24-hour incubation period, the plates were fixed and stained with detection reagents such as anti-SARS-CoV-2 antibodies paired with an Alexa488 to visualize the virus and DAPI to visualize host cell nuclei. The stained plates were then observed using ImageXpress Micro Confocal (IXMC) imaging with immunofluorescence. Lastly, an algorithm quantified the number of infected cells present after the incubation period. The details of this procedure and findings are listed below. The protocol used was published previously in Bakowski et al (2020).

Overview

To identify compounds that could inhibit entry or replication of SARS-CoV-2 in human cells, a high-content imaging (HCI) 384-well format assay was used, involving HeLa cells expressing the human SARS-CoV-2 receptor, the angiotensin-converting enzyme 2, or ACE2 (HeLa-ACE2). In this assay HeLa-ACE2 cells are infected with SARS-CoV-2 virus in the presence of compounds of interest, and viral infection is quantified 24 hours later. The assay relies on immunofluorescent detection of SARS-CoV-2 proteins with sera purified from patients exposed to the virus, which together with host cell nuclear staining allows for quantification of the percent infected cells in each well.

Virus Generation

Vero E6 cells (ATCC CRL-1586) were plated in a T225 flask with complete DMEM (Corning 15-013-CV) containing 10% FBS, 1×PenStrep (Corning 20-002-CL), 2 mM L-Glutamine (Corning 25-005-CL) overnight at 37 5% CO2. The media in the flask was removed and 2 mL of SARS-CoV-2 strain USAWA1/2020 (BEI Resources NR-52281) in complete DMEM was added to the flask at a multiplicity of infection (MOI) of 0.5 and was allowed to incubate for 30 minutes at 34° C. 5% C02. After incubation, 30 mL of complete DMEM was added to the flask. The flask was then placed in a 34° C. incubator at 5% CO2 for 5 days. On day 5 post infection the supernatant was harvested and centrifuged at 1,000×g for 5 minutes. The supernatant was filtered through a 0.22 µM filter and stored at −80° C.

Compound Management

High-purity compounds (>95%) dissolved in high-quality dimethyl sulfoxide (DMSO) were used in the study. Compound quality control was performed by liquid chromatography-mass spectrometry and/or 1H-NMR when required. The library was prepared at two concentrations, 2 and 10 mM, to support low-concentration (2-10 µM) and high-concentration (10-50 µM) screening formats. Echo-qualified 384-well low dead volume plus microplates (LP-0200-BC; Labcyte Inc.) were used as the library source plates to support acoustic transfer with an Echo 555 Liquid Handler (Labcyte Inc.). Compounds not soluble in DMSO were plated in water (129 compounds); compounds lacking long-term solubility in DMSO were suspended just before dispensing to avoid precipitation (71 compounds). Additional details available at https://reframedb.org/about.

Controls

Remdesivir at elevated concentrations was able to eliminate infected cells almost completely and it was used at a concentration of 2.5 µM as a positive control, with data normalized to it and neutral DMSO control wells. While apilimod was more potent than remdesivir, it had a fractionally lower maximal efficacy (85-90% of uninfected cells at the highest effective concentrations) compared to remdesivir. Additionally, compound toxicity in the context of infection was assessed by quantifying the total cell numbers per well, with cytotoxic protein synthesis inhibitor puromycin as a positive control (average EC50=547±27 nM, average±sem of 5 independent experiments; HeLa-ACE2 CC50=2.45±0.23 µM, average±sem of 5 independent experiments). Notably, a concomitant increase in cell numbers coincided with the antiviral activity of remdesivir and apilimod, likely due to reduction in proliferation of infected cells. Altering the multiplicity of infection had modest effects on the potency of control compounds in the same experiment, with a 2.7-fold increase in remdesivir's EC50 from MOI=1 to MOI=26, and a 3.7-fold increase in apilimod's EC50, but not that of puromycin.

HeLa-ACE2 Stable Cell Line

HeLa-ACE2 cells were generated through transduction of human ACE2 lentivirus. The lentivirus was created by co-transfection of HEK293T cells with pBOB-hACE2 construct and lentiviral packaging plasmids pMDL, pREV, and pVSV-G (Addgene) using Lipofectamine 2000 (Thermo Fisher Scientific, 11668019). Supernatant was collected 48 h after transfection then used to transduce pre-seeded HeLa cells. 12 h after transduction stable cell lines were collected, scaled up and stored. Cells were maintained in DMEM (Gibco, 11965-092) with 10% FBS (Gibco, 10438026) and 1× sodium pyruvate (Gibco, 11360070) at 37 5% CO2.

SARS-CoV-2 HeLa-ACE2 High-Content Screening Assay

Compounds were acoustically transferred into 384-well clear-bottom plates (Greiner, Part. No. 781090-2B). HeLa-ACE2 cells were seeded in 13 µL DMEM with 2% FBS at a density of 1.0×10³ cells per well. Plated cells were transported to the BSL3 facility where 13 µL of SARS-CoV-2 diluted in assay media was added per well at a concentration of 2.0×10⁶ PFU/mL (assay multiplicity of infection (MOI)=2.2). Plates were incubated for 24 h at 34 5% CO2, and then fixed with 25 µL of 8% formaldehyde for 1 h at 34 5% CO2. Plates were washed with 1×PBS 0.05% Tween 20 in between fixation and subsequent primary and secondary antibody staining. Human polyclonal sera diluted 1:500 in Perm/Wash buffer (BD Biosciences 554723) was added to the plate and incubated at RT for 2 h. Six µg/mL of goat anti-human H+L conjugated Alexa 488 (Thermo Fisher Scientific A11013) together with 8 µM of antifade-46-diamidino-2-phenylindole (DAPI; Thermo Fisher Scientific D1306) in SuperBlock T20 (PBS) buffer (Thermo Fisher Scientific 37515) was added to the plate and incubated at RT for 1 h in the dark. Plates were imaged using the ImageXpress Micro Confocal High-Content Imaging System (Molecular Devices) with a 10× objective, with 4 fields imaged per well. Images were analyzed using the Multi-Wavelength Cell Scoring Application Module (MetaXpress), with DAPI staining identifying the host-cell nuclei (the total number of cells in the images) and the SARS-CoV-2 immunofluorescence signal leading to identification of infected cells.

Uninfected Host Cell Cytotoxicity Counter Screen

Compounds were acoustically transferred into 1,536-well clear plates (Greiner Part. No. 789091). HeLa-ACE2 cells were maintained as described for the infection assay and seeded in the assay-ready plates at 400 cells/well in DMEM with 2% FBS and plates were incubated for 24 hours at 37 5% CO2. To assess cell viability, the Image-iT DEAD green reagent (Thermo Fisher) was used according to manufacturer instructions. Cells were fixed with 4% paraformaldehyde, and counterstained with DAPI. Fixed cells were imaged using the ImageXpress Micro Confocal High-Content Imaging System (Molecular Devices) with a 10× objective, and total live cells per well quantified in the acquired images using the Live Dead Application Module (MetaXpress).

Data Analysis

Image analysis was carried out with MetaXpress (version 6.5.4.532). Primary in vitro screen and the host cell cytotoxicity counter screen data were uploaded to Genedata Screener, Version 16.0.3-Standard. Data were normalized to neutral (DMSO) minus inhibitor controls (2.5 µM remdesivir for antiviral effect and 10 µM puromycin for infected host cell toxicity). For the uninfected host cell cytotoxicity counter screen 40 µM puromycin (Sigma) was used as the positive control. For dose response experiments compounds were tested in technical triplicates on different assay plates and dose curves were fitted with the four parameter Hill Equation. Technical replicate data were analyzed using median condensing.

Results/Discussion

ActivPred Platform Predictive Metrics Versus Traditional Drug Discovery Methods

Using the ActivPred Digital Chemistry AI Drug Discovery Platform, 35 small molecule drugs were discovered that ActivPred predicted would have activity against COVID-19 via 4 targets that are relevant to SARS-CoV-2 infection, replication and propagation. This included the host target ACE2 (UniProtKB-Q9BYF1 (ACE2_HUMAN)), as well as the viral targets 3CLpro (UniProtKB-PODTD1 (R1AB_SARS2), P0C6X7, P0C6U8), PLpro (UniProtKB-PODTC1 (R1A_SARS2), K4LC41) and RdRp(UniProtKB: A0A5H2X758, A0A5H2WYC2, A0A5H2WTX4, A0A5H2WUC6, A0A5H2WYC7). Five compounds from that group of 35 demonstrated activity in the HeLa-ACE2 cell-based SARS-CoV-2 assay: PRX-07034, AZD-5991, VE-822/berzosertib, tocladesine and pipendoxifene (ERA-923)-yielding a 14.3% hit rate for these discoveries. For comparison, a best-in-class high-throughput screen (HTS) of the nearly 12,000 compound ReFrame library for activity against COVID-19 demonstrated a hit rate of 2.75%. Thus, the ActivPred platform was 5× more efficient at predicting COVID-19 active drug compounds than the gold-standard COVID-19 HTS method from similar drug libraries. It has been reported elsewhere that HTS methods typically yield hit rates between 0.01% and 0.14%. Thus, the "gold-standard" HTS method was 10-100× (one to two orders of magnitude) better than traditional HTS approaches and the ActivPred platform was 100-1000× (two to three orders of magnitude) more efficient at predicting active COVID-19 compounds than typical HTS methods.

Compounds identified by a "gold-standard" HTS as active against COVID-19 were considered to be potent, safe and selective (i.e. candidates for further development) if they were found to have EC50's<9.6 µM, CC50's >39.8 µM and/or SI's >10 in a 10 point dose response assay. A hit rate of 0.56% (66/11,861) was reported for this more selective screen. In the present disclosure, 2 of 35 drugs discovered by the ActivPred platform (pipendoxifene and berzosertib) met this threshold, revealing a 5.7% hit rate for this more selective threshold and demonstrating that the ActivPred platform was 10.2× (an order of magnitude) more efficient in identifying potent, safe and selective drugs against COVID-19 than high performing HTS discovery methods.

The efficiency of ActivPred as compared to traditional HTS drug development can also be measured in terms of capital required to obtain a "hit". The cost to use ActivPred and validate 35 drug compounds is a fraction of the cost required to screen nearly 12,000 compounds in a primary screen and over 300 drugs in a secondary screen.

5 Drugs Discovered by ActivPred and Experimentally Validated

Tocladesine Results

Figure 1B:
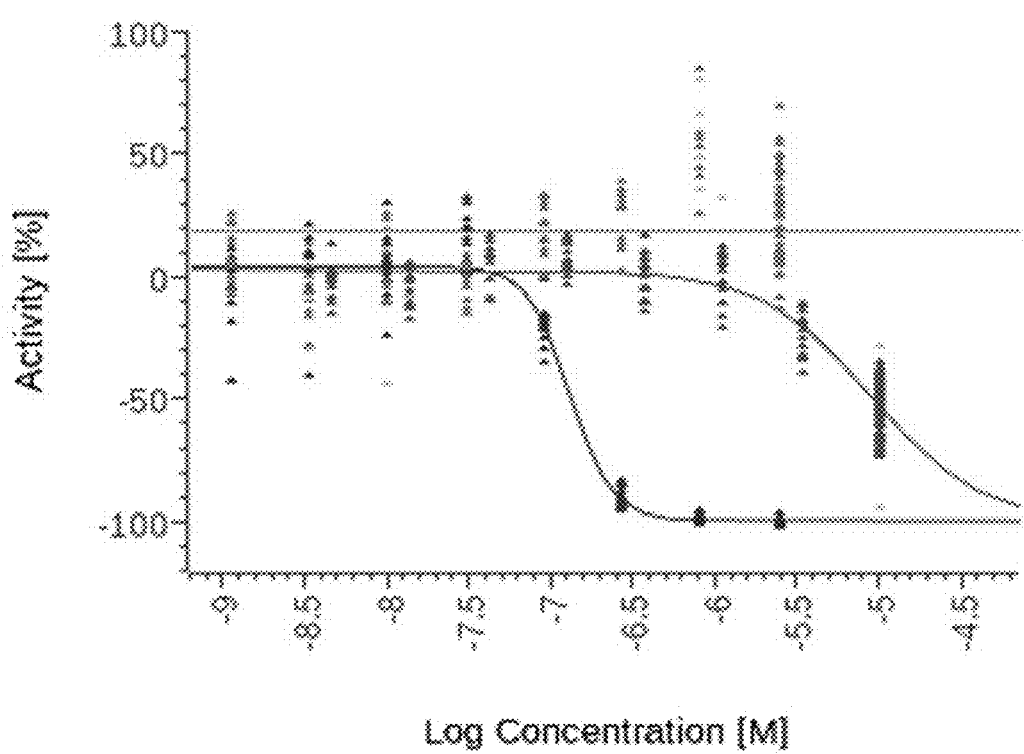

Tocladesine reported an $EC_{50}$ of >9.59 µM, indicating that the $EC_{50}$ was not achieved within the concentration range sampled in this experiment. Tocladesine also reported a $CC_{50}$ of >39.80 µM because no cell death was observed within the concentrations tested in this study. Thus, the $EC_{50}$ and $CC_{50}$ are unknown based on the results of this experiment. Consequently, the selectivity calculation of $CC_{50}/EC_{50}$ is unknown as well. However, the assay demonstrated that Tocladesine was active against COVID-19 as predicted by the ActivPred Platform. The large $CC_{50}$ of Tocladesine indicates that the drug has low cytotoxicity, which makes the drug an attractive development candidate. (See FIGS. 1A-1B).

PRX-07034 Results

Figure 2A:
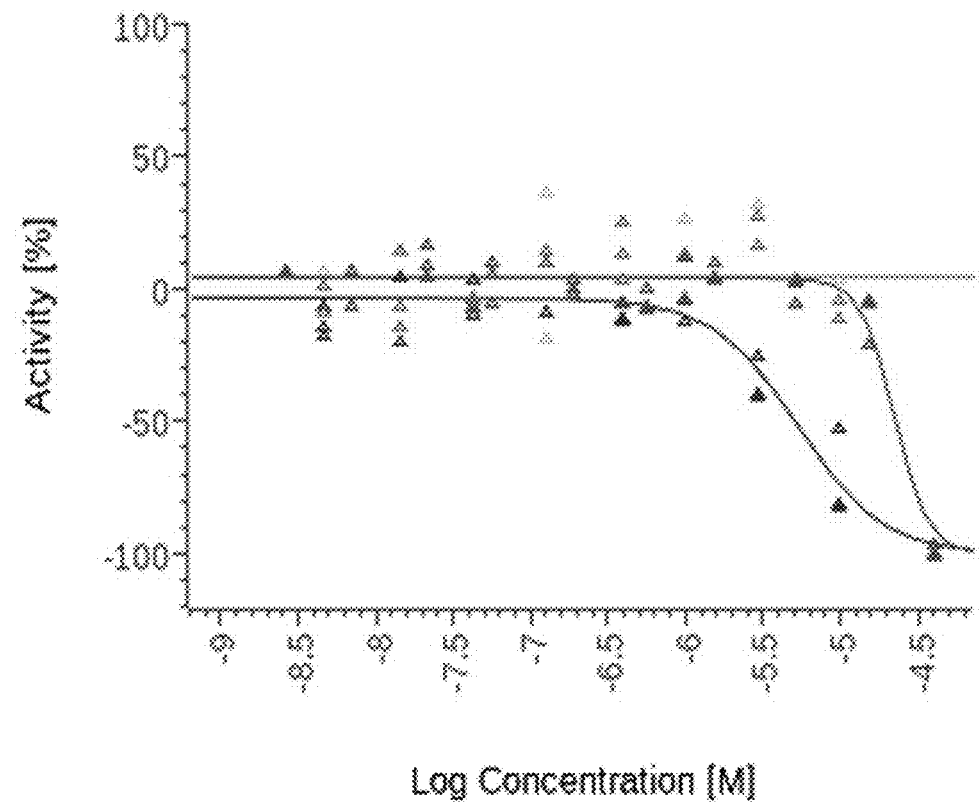
FIG. 2A-FIG. 2B depict non-limiting exemplary data related to PRX-07034 and Remdesivir (control).
Figure 2B:
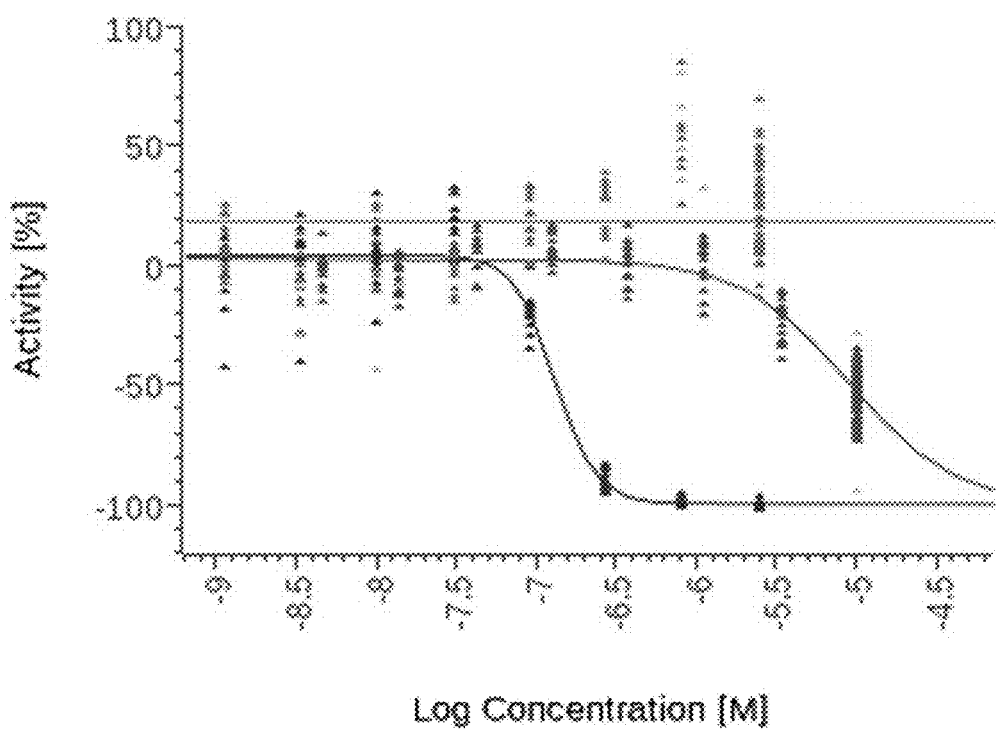

PRX-07034 has a higher measured $EC_{50}$ concentration (5.29 µM) in comparison to the positive control (remdesivir, $EC_{50}$=0.130 µM). However, PRX-07034 also has a higher $CC_{50}$ than remdesivir (22.13 µM vs 8.87 µM), meaning that a larger concentration of PRX-07034 can be administered before uninfected cell viability is reduced by 50%. Nonetheless, PRX-07034 has a low selectivity index ($CC_{50}/EC_{50}$) that is not competitive with the selectivity index of remdesivir (4 vs. 68). PRX-07034 has demonstrated activity against COVID-19 as predicted by the ActivPred model. (See FIGS. 2A-2B).

AZD-5991 Results

Figure 3A:
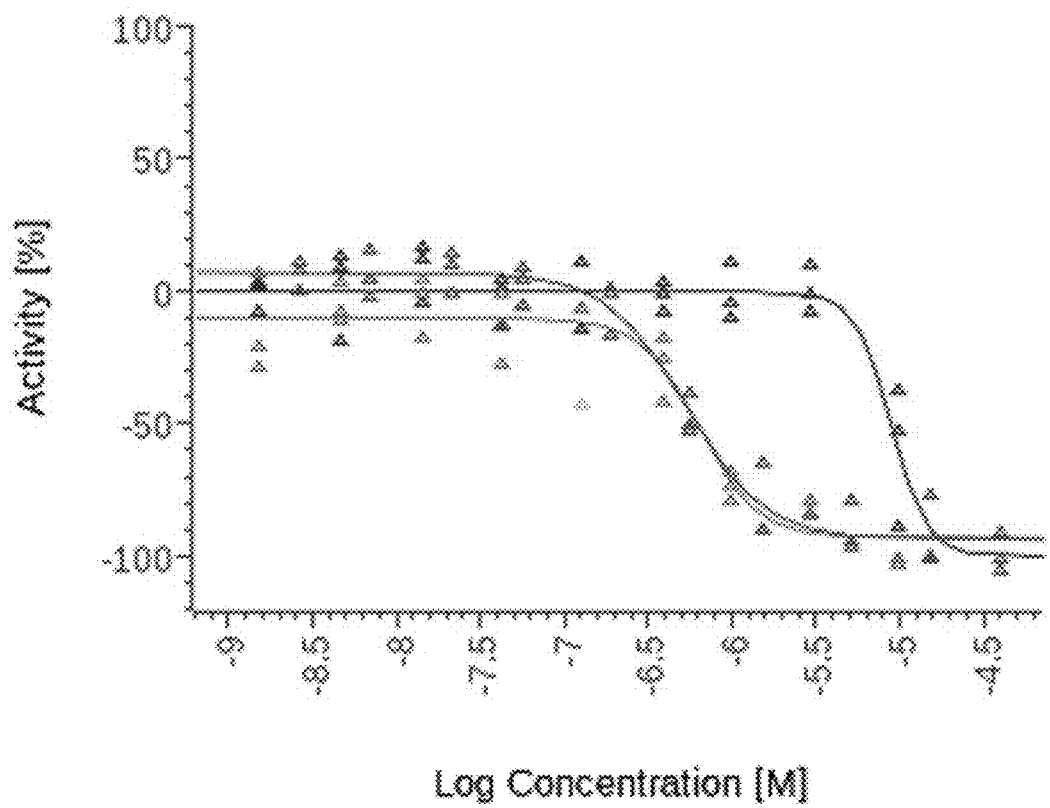
FIG. 3A-FIG. 3B depicts non-limiting exemplary data related to AZD-5991 and Remdesivir (control).
Figure 3B:
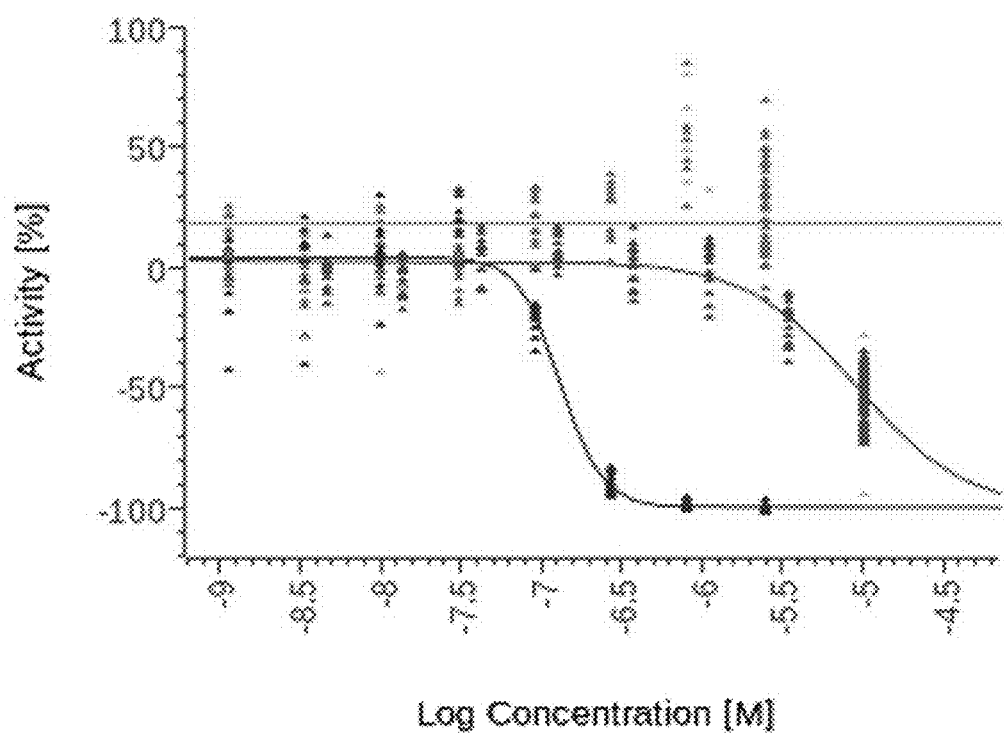

AZD-5991 reported an $EC_{50}$, of 8.81 µM, $CC_{50}$ of 0.527 µM and a selectivity of 0.06. Due to the measured $EC_{50}$ value being greater than the $CC_{50}$, this compound is considered toxic, relative to the concentration that its activity occurs at. Nonetheless, AZD-5991 is still considered as having antiviral properties and potent, as its $EC_{50}$ is less than 10 µM. These findings further support theActivPred predictive abilities. (See FIGS. 3A-3B).

Berzosertib Results

Berzosertib (VE-822) reported an $EC_{50}$ of 0.114 µM, a $CC_{50}$ of 3.14 µM and a selectivity index of 27.56. This $EC_{50}$ classifies berzosertib as more potent than the control and currently FDA approved therapeutic, remdesivir (0.114 vs 0.130 µM). The selectivity of this compound is the largest experimentally observed SI in this study, in comparison to the four experimental compounds that demonstrated measurable activity. Despite having a slightly higher $CC_{50}$ than remdesivir (8.87 µM vs 3.14 µM), the $CC_{50}$ is still 27× above the $EC_{50}$ of Berzosertib, allowing for its therapeutic effects to be exerted well before entering concentrations that would raise safety concerns.

Figure 4A:
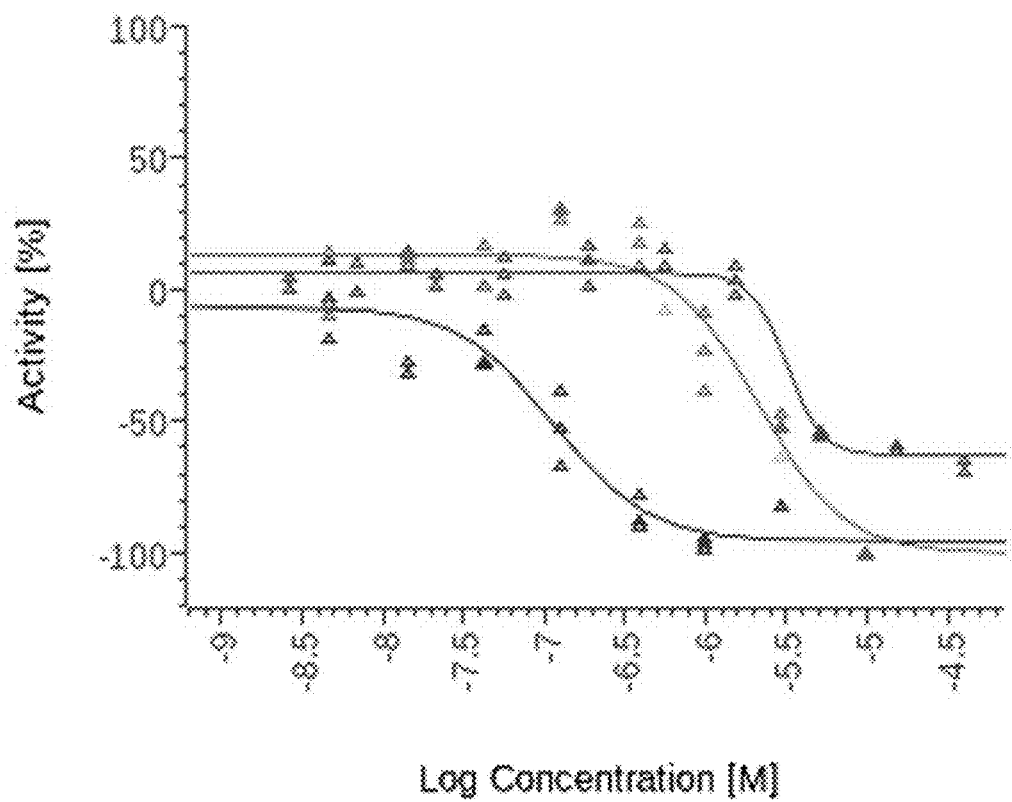
FIG. 4A-FIG. 4B depicts non-limiting exemplary data related to Berzosertib Remdesivir (control).
Figure 4B:
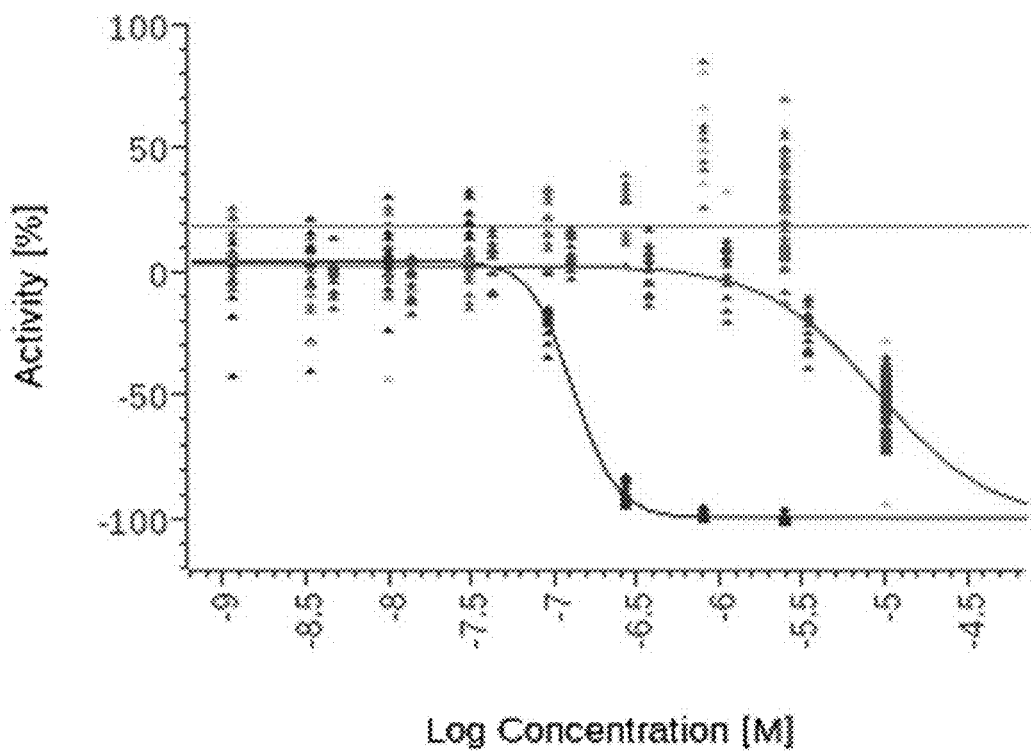

The Hill Coefficient measures the slope of the dose response curve. A coefficient greater than 1 indicates positively cooperative binding—i.e. Once a ligand molecule is bound to the target, its affinity for other ligand molecules increases. For example, the Hill coefficient of oxygen binding to haemoglobin (an example of positive cooperativity) falls within the range of 1.7-3.2. The Hill coefficient of Berzosertib is 1.485, indicating positively cooperative binding. However, the Hill Coefficient is lower than the control, remdesivir (3.3).(See FIGS. 4A-4B).

Pipendoxifene Results

Figure 5A:
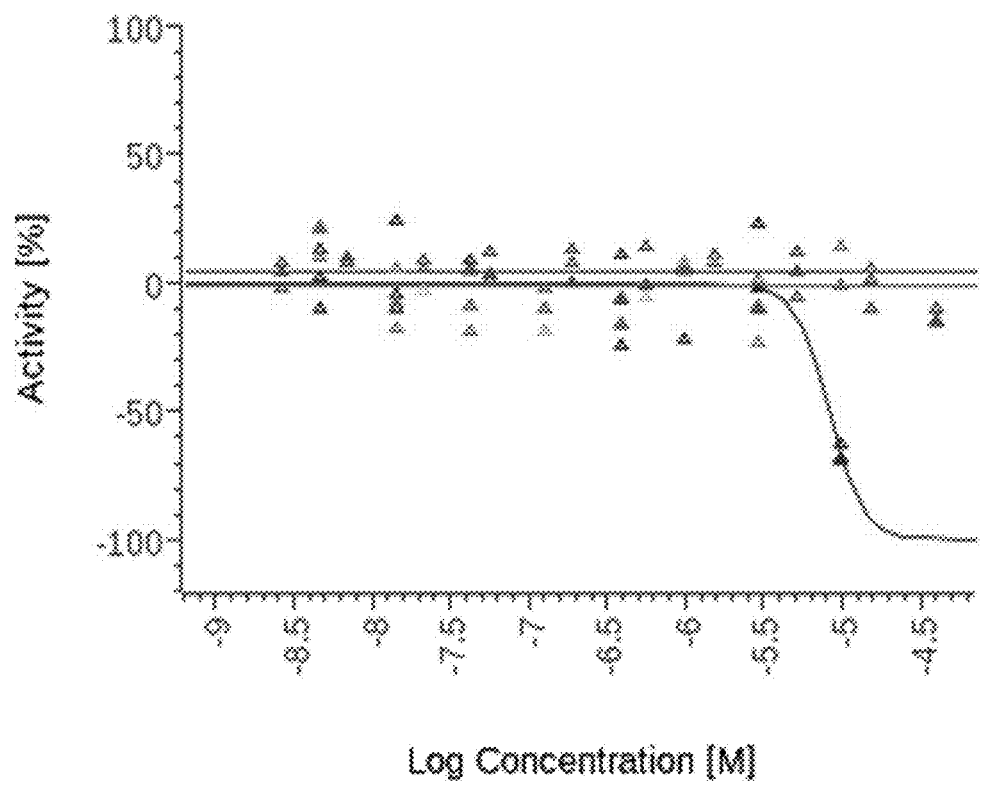
FIG. 5A-FIG. 5B. depicts non-limiting exemplary data related to Pipendoxifene and Remdesivir (control).
Figure 5B:
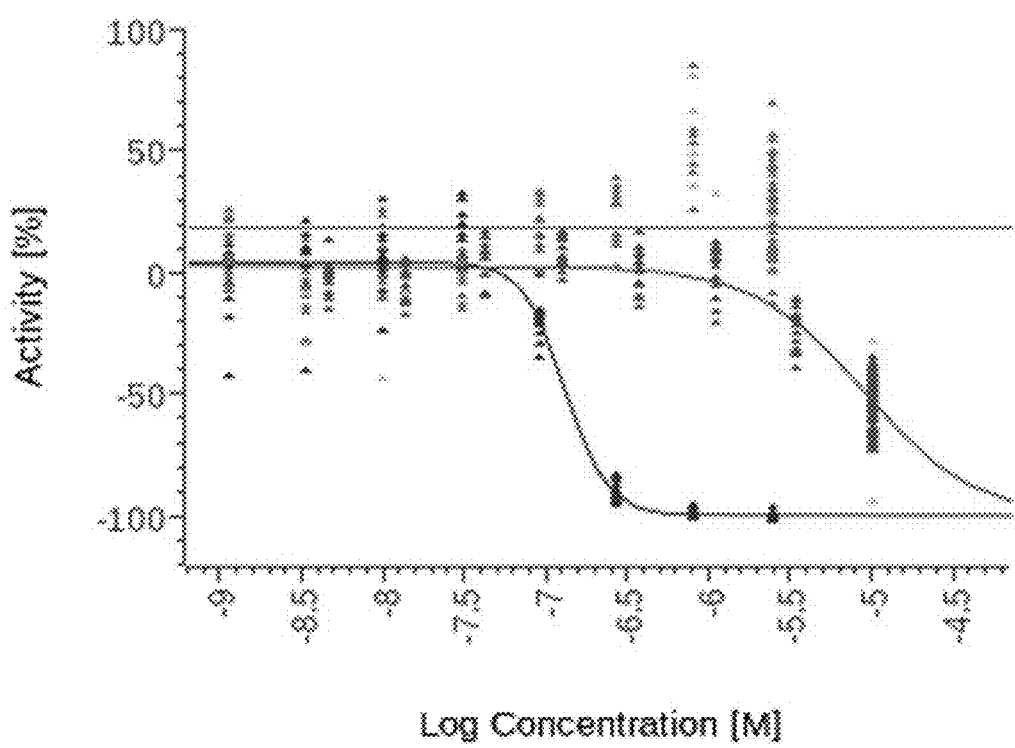

Pipendoxifene reported a $EC_{50}$ higher than the remdesivir control (8.24 µM vs 0.13 µM), indicating that remdesivir is more potent. However, pipendoxifene reported a $CC_{50}$ of >39.80 µM because no cell death was observed within the concentrations tested in this study, as compared to a $CC_{50}$ of 8.87 µM for remdesivir. Without being bound by any particular theory, this can means that pipendoxifene is disrupting viral replication at a concentration far lower than the concentration that leads to any cell death. The selectivity index of pipendoxifene to remdesivir was calculated to be >4.83 vs 68, respectively, based on experimental data. However, this calculation is a misnomer, as it is impossible to calculate a true selectivity index of pipendoxifene based on this assay, as pipendoxifene's $CC_{50}$ is greater than 39.80 µM, but otherwise unknown, making the SI infinite without additional information. Additional cytotoxicity testing could be performed to assess the selectivity index of the compound at some point in the future. However, mathematical approximations of selectivity index based upon using the concentration of pipendoxifene safely administered in FDA approved clinical trials as an underapproximation of $CC_{50}$, suggest that pipendoxifene has a SI of at least 10-20+, but more likely at least 35+(see Tables 8-10 below). Pipendoxifene has a larger $N_h$ (Hill) coefficient (4), than remdesivir (3.3) and berzosertib (1.485). Without being bound by any particular theory, this suggests that once an initial pipendoxifene molecule binds its target, the drug exerts its full effect on viral replication within a smaller concentration range than remdesivir, which is a significant finding given pipendoxifene's $CC_{50}$. (See FIGS. 5A-5B).

Conclusions

Taken together, pipendoxifene and berzosertib demonstrate the strongest profile out of the 5 compounds that showed measurable antiviral activity when taking $EC_{50}$, $CC_{50}$, Hill Coefficient and SI into account relative to the remdesivir control in this study. A separate published study using the same experimental protocol and analysis classified potent drugs as those having an $EC_{50}$<9.6 uM and safe and selective drugs as those having a $CC_{50}$>39.8 uM and/or CC50/EC50>10. Based on the above-described analysis paradigm, pipendoxifene and Benzosertib are both potent, non-toxic and selective.

Pipendoxifene and Berzosertib Analysis

Another important factor to consider besides the $EC_{50}$, $CC_{50}$, Hill Coefficient and SI of a compound when priority ranking drugs to advance from in vitro to in vivo studies is their half-life (t 1/2). The t 1/2 of a species is the time it takes for the concentration of that substance to fall to half of its initial value. Pipendoxifene's t ½ is 15.8-27.3 hours and berzosertib's is about 17 hours, whereas remdesivir's t ½ is 1 hour. Half-lives are vital for dosing regimens and peak-to-trough ratios at the steady state. Without being bound by any particular theory, it is possible that because pipendoxifene's and berzosertib's t 12 is significantly longer than remdesivir's t ½, that both compounds could serve as longer acting antivirals that inhibit more viral replication cycles per dose. Based on the consideration of half-life, remdesivir may be expected to effectively inhibit viral replication for only a few hours each day (i.e. per dose), while pipendoxifene and berzosertib may be expected to effectively inhibit viral replication for essentially the entirety of each day (i.e. per dose). The long half-life and strong potency of these drugs makes them potentially ideal once a day antiviral therapeutics. In contrast, based on its half life, remdesivir would have to be taken several times a day in order to exert its maximal effect (note—it is approved for once daily use only). Thus, in some embodiments, pipendoxifene and berzosertib could potentially be more effective than remdesivir in a clinical setting.

The current standard of care for SARS-CoV-2 infection, remdesivir, can only be administered intravenously. This route of administration (r.o.a.) is a limitation for many patients that are either not able to obtain a bed in a hospital to receive remdesivir due to ICUs being at capacity and/or for those that cannot bear the financial burdens of occupying hospital beds in order to receive medication. If SARS-CoV-2 infected individuals had the option to be prescribed an oral medication that can easily be self-administered at home, then patients/payers would be saving substantial amounts of money as well as putting less people at risk by further exposing health-care professionals and other non-covid related patients in hospitals.

Pipendoxifene was predicted to bind to the viral protein RdRp. RdRp is vital to the viral replication process of SARS-CoV-2. Importantly, it is vital to the replication process of all RNA viruses. Remdesivir binds the same target. Without being bound by any particular theory, pipendoxifene offers an expansive clinical and market opportunity and a direct alternative to remdesivir. There is a possibility that the $EC_{50}$ (8.42 uM) of pipendoxifene reported in this study may be artificially high due to the assay's design. COVID-19 targets such as ACE2 are "early acting targets" because they are involved in initial infection of the cell by the virus. Therefore, drugs that bind targets such as ACE2, are enriched in 24 hour screens of activity. RdRp is a "late acting target" of COVID-19. Drugs that bind RdRp are exhibit maximal effectiveness after initial infection and multiple viral replication cycles, i.e. at later time points. Consequently, in some embodiments, a 72 hour study of pipendoxifene against COVID-19 would likely enhance its effectiveness, relative to other potential drugs.

Berzosertib was predicted to bind to the 3CLpro coronavirus protein. This protease belongs to the coronavirus family and is necessary for the cleavage at 11 sites of the coronavirus polyprotein. This cleavage generates functional viral proteins that are involved in the virus' replicative and propagative process. Beyond the Coronavirus family, the cysteine protease is homologous to the 3Cpro of Picornaviruses. The therapeutic opportunity for this target encompasses the 7 infective strains of Coronaviruses and the five genera (enteroviruses, rhinoviruses, hepatoviruses, cardioviruses, and aphthoviruses) that are included in the picornaviridae family. Without being bound by any particular theory, berzosertib has an opportunity as a broad spectrum antiviral. Like RdRp, 3CLpro is also a "late acting target".

Thus, the drug's "true" $EC_{50}$ might be found to be lower in a 72-hour study versus the 24-hour study it was evaluated in here.

Based on the analysis above and below, pipendoxifene and berzosertib are recommended for in vivo validation based on the results of this study.

Pipendoxifene—Background, Novelty and Clinical/Preclinical Dosing Justification

Pipendoxifene was originally developed as a selective estrogen receptor modulator by Ligand and Wyeth (now Pfizer). Two other drugs, bazedoxifene and raloxifene, were previously identified as active against COVID-19 that were also originally developed as estrogen receptor modulators in a ReFRAME screen for SARS-CoV-2 activity of 11,861 compounds using the same methods used in this study (Bakowski et al, 2020) published on Jun. 16, 2020. These two selective estrogen receptor modulators (bazedoxifene, $EC_{50}$=3.47 µM and raloxifene $EC_{50}$=4.13 µM) have been previously found to inhibit Ebola virus infection. There has been speculation, without a definitive conclusion, on the exact mechanism of action for Ebola virus inhibition by raloxifene and bazedoxifene. One proposed mechanism of action for inhibition of Ebola virus by raloxifene is by downregulating a viral protein necessary for progeny assembly (VP40) in a dose-dependent manner. Bazedoxifene and raloxifene are speculated to be active compounds that block Ebola VLP entry in vitro at an IC50<10 µM and SI >10 and it is hypothesized that viral entry into host cells is blocked by interfering with Ebola virus surface glycoprotein. Finally, Raloxifene and bazedoxifene have been hypothesized to inhibit Ebola virus-like particle entry into cells by blocking TPC ion channels that are utilized as a host factor for cellular entry by the Ebola virus. Notably, the ActivPred Platform discovered that pipendoxifene inhibited COVID-19 via RdRp and RdRp is absent from these hypothesized MOAs for bazedoxifene and raloxifene Ebola inhibition demonstrating the surprising nature of the discoveries provided herein and the strength of the ActivPred platform. Interestingly, pipendoxifene was not identified in the High Throughput Screen (HTS) of the ReFrame library that identified bazedoxifene and raloxifene, even though pipendoxifene is part of the ReFrame library, nor was it identified previously to inhibit Ebola virus, further indicating the surprising nature of the discoveries provided herein and the strength of the ActivPred platform.

Bazedoxifene was discovered by the ActivPred computational platform to have antiviral activity against COVID-19 by targeting RdRp, which is a novel and non-obvious invention based on what has previously been published (see above)—i.e. a bazedoxifene< >RdRp binding appears to be previously undiscovered. We have found that bazedoxifene inhibits viral infection by targeting RdRp. This demonstrates another drug that was correctly predicted by the ActivPred platform to have activity against COVID-19. Interestingly, raloxifene is being pursued as a COVID-19 therapeutic in Italy with a clinical trial involving 450 patients that began as of late October of 2020.

Pipendoxifene has reached phase 2 in terms of clinical trial development and was developed as a back-up drug to bazedoxifene. Pipendoxifene was discontinued when bazedoxifene demonstrated success in clinical trials. Available preclinical and clinical data show that pipendoxifene can be safely tolerated up to at least 20 mg/kg/day in mice and up to 200 mg/daily in humans. However, based on FDA accepted mathematics, which allow clinical researchers to convert between human and various animal dosing using various Km values (for instance 3 for mice and 5 for hamsters), a study was conducted in mice and submitted to the FDA with an apparent dosing of at least 66.67 mg/kg/day to justify the 200 mg/day dosing in human clinical trials. Furthermore, the mouse dosing was likely significantly higher than 66.67 mg/kg/day because a significant safety factor is typically applied when moving from mouse to human studies and applying the FDA Km factor of 3. Thus, mice may have been dosed at 133.33 mg/kg/day or greater without AE's (adverse events) to arrive at a FDA accepted clinical dose of 200 mg/day.

Since bazedoxifene was successful (FDA approved late 2013), it has more publicly available preclinical and clinical data than its backup drug, pipendoxifene. Therefore, it may be reasonable to use publicly available data for bazedoxifene to estimate or model pipendoxifene dosing that could be tolerated in a mouse in vivo model. Bazedoxifene is known to be safely tolerated at 100 mg/kg/day in rats and 20 mg/day in humans (FDA approved dosing). As can be seen, the highest concentration tested in rats for Bazedoxifene (100 mg/kg/day) is 14.9× greater than the highest concentration justified by using the clinical dose and the FDA Km value (20/3=6.7 mg/kg/day), indicating that the 2× rat dose concentration number assumed in the previous paragraph for pipendoxifene (133.33 mg/kg/day) clinical to non-clinical dosing is reasonable.

Thus, pipendoxifene mouse dosing of 66.67 mg/kg/day is justified by the clinically tolerated dose of pipendoxifene (200 mg/day) and dosing of up to at least 133.33 mg/kg/day is justified in mouse testing after applying the dosing logic above.

Comparison of $EC_{50}$ and $EC_{90}$ In Vitro Concentrations to Clinical Concentrations of Pipendoxifene Pipendoxifene's known clinical doses and derived preclinical doses that do not elicit Grade 2 or higher adverse events (AEs) were used to calculate approximate equivalent in vitro concentrations. These values were then compared to the $EC_{50}$ (given) and $EC_{90}$ (calculated) values from the in vitro HeLa-ACE2 cell-based SARS-CoV-2 assay.

The $EC_{90}$ of pipendoxifene was calculated using the Hill equation (Equation I below), given the $n_h$ coefficient of 4 and $EC_{10}$ (5.01187 µM) derived from the graph in the experimental data described herein.

$$^nH = \frac{\log_{10} 81}{\log_{10}(EC_{90}/EC_{10})} \quad \text{(I)}$$

The Hill equation calculated the $EC_{90}$ to be 15.03 µM, meaning that there is 90% response from the drug at this concentration.

$$4 = \frac{\log_{10} 81}{\log_{10}(EC_{90}/5.01187)}$$

$$\log EC_{90} - \log(5.01184) = \frac{\log 81}{4}$$

$$\log EC_{90} - 0.6999 = 0.47712$$

$$\log EC_{90} = 1.1771$$

$$EC_{90} = 10^{1.1771}$$

$$EC_{90} = 15.03 \, \mu M$$

The $EC_{90}$ was also calculated using Equation II where the variables F equals the percent response, H equals the Hill slope coefficient and $EC_{50}$ equals 8.24 µM from the in vitro data of pipendoxifene. This equation calculated the $EC_{90}$ to be 14.27 µM, meaning that there is 90% response from the drug at this concentration.

$$EC_F = \left(\frac{F}{100-F}\right)^{1/H} * EC_{50} \quad \text{(II)}$$

$$EC_F = \left(\frac{F}{100-F}\right)^{1/H} * EC_{50}$$

$$EC_{90} = \left(\frac{90}{100-90}\right)^{1/4} * 8.24$$

$$EC_{90} = 9^{(0.25)} * 8.24$$

$$EC_{90} = 14.27 \, \mu M$$

These equations result in an $EC_{90}$ range of 14.27-15.02 µM, and are used for comparison to the approximated equivalent in vitro concentrations of pipendoxifene calculated below.

Two methods were used to calculate pipendoxifene equivalent in vitro concentrations beginning with either 1) the known, tolerated Phase 1 clinical dosage or 2) a mouse and hamster dosage derived from the known tolerated Phase 1 clinical dosage (see above). Both methods can be found here: https://www.researchgate.net/post/How-to-extrapolate-result-from-in-vitro-ug-mL-to-in-vivo and http://microbiology.ucdavis.edu/privalsky/tc-growth-area.

Method 1.a

The first method was used to calculate an approximate equivalent in vitro concentration beginning with the highest known safely tolerated clinical dose of pipendoxifene (200 mg/day, oral administration). When calculating mouse dosages, 2× the derived pipendoxifene animal dosage (133.33 mg/kg, justified above), and the mid-point of those two dosages (100 mg/kg/day) were used as well. The clinical dosage is then converted to a mouse dosage using the Km value of 3 (FDA). Next, the average mass of a mouse is multiplied by the mouse dosage in equal metrics to find the amount administered to each mouse in grams. The molar mass is then divided from the mouse dosage and this value is then multiplied by 1 over the volume of mouse equivalent; this method uses the molarity formula (M=(m/MW)*(1/V)). The same method of calculation was also used for a hamster example by converting the clinical dose to an equivalent hamster dose using the FDA Km value of 5. The result is a pipendoxifene equivalent in vitro concentration derived from the highest known safely tolerated clinical dose of the drug.

$$\text{mice dosage} \to \text{amount adminstered to each mouse} \to \quad \text{(III)}$$

$$\text{concentration of drug in vitro} (uM)$$

$$\frac{C}{Km} = A \to \frac{A}{1000} * \frac{MM(g)}{1} * \frac{1}{1000} = B \to \frac{B}{MW} * \frac{1}{V} * \frac{1000000}{1} = D$$

Method 1.a Formula (Equation III). C=clinical dosage (mg/m²), Km=FDA conversion factor, A=Animal dosage (mg/kg), MW=molecular weight (g/mol), MM=average animal mass (g), B=animal dosage per subject (g), V=volume of animal equivalent (L), D=concentration of drug in vitro (uM).

TABLE 7A

CONVERSION OF A CLINICAL DOSAGE OF PIPENDOXIFENE TO AN EQUIVALENT IN VITRO CONCENTRATION

| clinical dosage of pipendoxifene (mg/m2) | molar mass (g/mol) | mice dosage (mg/kg) | average mouse mass (g) | amount administered to each mouse (mg) | amount administered to each mouse (g) |
|---|---|---|---|---|---|
| 200 | 456.6 | 66.6666667 | 25 | 1.66666667 | 0.00166667 |
| 200 * 1.5 | 456.6 | 100 | 25 | 2.5 | 0.0025 |
| 200 * 2 | 456.6 | 133.3 | 25 | 3.325 | 0.003325 |
| clinical dosage of pipendoxifene (mg/m2) | molar mass (g/mol) | hamster dosage (mg/kg) | average hamster mass (g) | amount administered to each hamster (mg) | amount administered to each hamster (g) |
| 200 | 456.6 | 40 | 125 | 5 | 0.005 |

* The selectivity index here was calculated using the $EC_{50}$ (8.23 μM) from the in vitro experiment and the approximate equivalent in vitro concentration as the $CC_{50}$. By definition, this calculation underestimates the $CC_{50}$ and the SI because no toxicity was observed at the human dose of 200 mg/day that these numbers were derived from. Compounds with an SI > 10 are considered to be "selective".

TABLE 7B

CONVERSION OF A CLINICAL DOSAGE OF PIPENDOXIFENE TO AN EQUIVALENT IN VITRO CONCENTRATION

| clinical dosage of pipendoxifene (mg/m2) | volume of mouse equivalent (L) | concentration of drug in vitro (M) | concentration of drug in vitro (μM) | Selectivity Index (CC50/EC50) |
|---|---|---|---|---|
| 200 | 0.025 | 0.000146007 | 146.006716 | 17.719 * |
| 200 * 1.5 | 0.025 | 0.00021901 | 219.010074 | 26.58 |
| 200 * 2 | 0.025 | 0.00029128 | 291.94043 | 35.43 |
| clinical dosage of pipendoxifene (mg/m2) | volume of hamster equivalent (L) | concentration of drug in vitro (M) | concentration of drug in vitro (μM) | Selectivity Index (CC50/EC50) |
| 200 | 0.125 | 8.7604E−05 | 87.6040298 | 10.631557 * |

* The selectivity index here was calculated using the $EC_{50}$ (8.23 μM) from the in vitro experiment and the approximate equivalent in vitro concentration as the $CC_{50}$. By definition, this calculation underestimates the $CC_{50}$ and the SI because no toxicity was observed at the human dose of 200 mg/day that these numbers were derived from. Compounds with an SI > 10 are considered to be "selective".

As seen in Table 7, the equivalent in vitro drug concentrations (146-291 μM, via mouse, and 87.6 μM, via hamster, calculations) of pipendoxifene derived from the known safe and well tolerated human clinical dosing are well above the $EC_{50}$ (8.24 μM) and $EC_{90}$ of pipendoxifene (15.03 μM) observed in the HeLa-ACE2 SARS-CoV-2 assay. This difference between the observed in vitro $EC_{50}$ and $EC_{90}$ of pipendoxifene and the calculated in vitro concentrations derived from the clinically justified safe and tolerated dosing allows for a significant buffer that might be expected to account for any error in the calculation due to factors such as absorption and metabolism, which the calculation is unable to take into account. Since the 200 mg/m² clinical dosage of pipendoxifene was well tolerated in a Phase 1 clinical trial, it is also logical to use the equivalent in vitro concentration as a minimum $CC_{50}$ to calculate a new selectivity index. By definition, this calculation underestimates the $CC_{50}$ and the SI because no toxicity was observed at the human dose of 200 mg/day that these numbers were derived from, but it does provide a more precise understanding of SI than the currently undefined experimental value. This approximation allows for calculating a minimum potential selectivity of pipendoxifene of 10.63-35.43, versus the experimentally observed value of ">4.83", when the $CC_{50}$ is 87.6-146 μM. Taken together, this analysis leads to the conclusion that there is evidence to support that pipendoxifene may be effective against COVID-19 in hamster or mouse models of disease at the clinically supported safe and well tolerated dose.

Based on this analysis, there appears to be definitive justification for dosing pipendoxifene in mice at, at least 66.67 mg/kg/day and justification at 100 and/or 133.33 mg/kg/day, and in hamsters at 40 mg/kg and justification at 60 and/or 80 mg/kg/day, based on a lack of toxicity at the equivalent clinical doses. It also appears that those concentrations are predicted to elicit a measurable antiviral response, based on the in vitro results and the mathematics above, in a mouse or hamster model.

Method 1.b

The first method beginning with the clinical dosage of the drug can also be converted to an equivalent in vitro dose per well by using the growth area and working assay volume of a single well in a 384w plate. The growth area (0.1 cm²) of a single well in a 384w plate and assay volume used in the experiment is provided in Table 8. Next, the calculated in vitro dose per well was then converted to a resultant concentration using the molarity formula (M=(m/MW)*(1/V)). See Equation IV below. Without being bound by any particular theory, this method of conversion is potentially more accurate as the variables used are representative of the same values used in the in vitro experiment and the method converts from human to in vitro directly, rather than via an animal model. Method 1.b formula is shown in Equation IV. D=clinical dosage (mg/m$^2$), MW=molecular weight (g/mol), G=growth area of each well in greiner uclear 384w plates (m$^2$), V=volume for in vitro (L), C=concentration in vitro (µM), I=equivalent in vitro dose (g).

$$\text{equivalent in vitro dose (g)} \rightarrow \text{concentration in vitro}(uM) \quad (IV)$$

$$\frac{D}{1} * \frac{G}{1} * \frac{1}{1000} = I \rightarrow \frac{I}{MW} * \frac{1}{V} * \frac{1*10^6}{1} = C$$

TABLE 8

CONVERSION OF CLINICAL DOSAGE (MG/M$^2$) OF PIPENDOXIFENE TO AN APPROXIMATE IN VITRO CONCENTRATION (µM)

| clinical dosage of pipendoxifene (mg/m2) | molar mass (g/mol) | growth area of each well in Greiner uclear 384-well plates (cm$^2$) | growth area of each well in Greiner uclear 384-well plates (m$^2$) | equiv. in vitro dose in each well(mg) | equiv. in vitro dose (g) | volume for in vitro (L) | concentration in vitro (M) | concentration in vitro (µM) | Selectivity Index (CC50/EC50) |
|---|---|---|---|---|---|---|---|---|---|
| 200 | 456.6 | 0.1 | 0.00001 | 0.002 | 0.000002 | 2.60E-05 | 0.000168469 | 168.469288 | 20.4453019 |

As seen in Table 8, Method 1.b arrives at a resultant in vitro concentration of 168.47 µM that was calculated from the highest known safe and well tolerated clinical dosage of pipendoxifene (200 mg). The concentration is higher than the EC$_{50}$ (8.24 µM) and EC$_{90}$ (15.03 µM) values of pipendoxifene observed in the HeLa-ACE2 cell-based SARS-CoV-2 assay reported here. This difference between the observed in vitro EC$_{50}$ and EC$_{90}$ of pipendoxifene and the calculated in vitro concentrations derived from the clinically justified safe and tolerated dosing allows for a significant buffer that might be expected to account for any error in the calculation due to factors such as absorption and metabolism, which the calculation is unable to take into account. Since the 200 mg/m$^2$ clinical dosage of pipendoxifene was well tolerated in a Phase 1 clinical trial, it is therefore also logical to use the equivalent in vitro concentration as a minimum CC$_{50}$ to calculate a new selectivity index. By definition, this calculation underestimates the CC$_{50}$ and the SI because no toxicity was observed at the human dose of 200 mg/day that these numbers were derived from, but it does give us a more precise understanding of SI than the currently undefined experimental value. This approximation allows for calculation of a minimum potential selectivity of pipendoxifene of 20.45, (versus the experimentally observed value of ">4.83"), when the CC$_{50}$ is 168.47 µM. Taken together, this analysis suggests that there is evidence to support that pipendoxifene may be effective against COVID-19 clinically at the clinically supported safe and well tolerated dose.

Berzosertib (VE-822, VX-970, M6620)—Background, Novelty and Clinical/Pre-Clinical Dosing Justification Berzosertib was originally invented by Vertex Pharmaceuticals and licensed to Merck KGa for development as an anticancer drug. More specifically, it has been investigated as potential treatment for ovarian neoplasms, ovarian serous tumors, adult solid neoplasm, advanced solid tumors, small cell lung cancers and advanced solid neoplasms. The existing data around berzosertib as a potential treatment for lung cancer suggests that the drug is present in sufficient concentrations in lung tissue to be able to exert its effects. This information is relevant given that SARS-CoV-2 is a respiratory virus that enters cells using ACE2 receptors abundantly found in human lung tissue. Berzosertib is currently in phase 2 trials for cancer treatment and has completed Phase 1 assessments for safety in humans. Berzosertib belongs to the sulfonamides chemical group that is oftentimes used as antibiotics to treat bacterial infections and some fungal infections. This compound was discovered by the ActivPred platform as an antiviral agent against SARS-CoV-2 and proven as such in in vitro experiments. Berzosertib was predicted to execute its antiviral activity against the novel coronavirus by inhibiting viral replication via binding 3CLpro.

Berzosertib was also found to have antiviral activity against SARS-CoV-2 in a study using Vero-E6/CoV-2 (IC$_{50}$ below 25 nM), 239T-ACE2/Cov-2 (100 nM) and human induced pluripotent stem cell (hIPSC)-derived cardiomyocytes cellular assays (250 nM), published on Jun. 25, 2020 (Garcia et al, 2020). According to Garcia et al researcher's standards, this compound is deemed as potent and safe in the above assays. Garcia et al has stated that the MOA of berzosertib against SARS-CoV-2 is by acting as the ATR (ataxia telangiectasia and Rad3-related protein) inhibitor, which it is known to be, to disable a DNA repair pathway in damaged cells. This DNA repair pathway is commonly hijacked by coronaviruses for efficient viral replication and subsequent growth. While this hypothesized MOA may be relevant to the coronavirus family, it is entirely different from the antiviral MOA provided herein for berzosertib which is via 3CLpro. Furthermore, to the best of our knowledge, Garcia et al hypothesized that berzosertib inhibited COVID-19 via ATR because that is the pathway known to mediate its activity in cancer.

A study published on Aug. 18, 2020, reported that berzosertib inhibited CPE of SARS-CoV-2 in a large scale drug repurposing cytopathic assay (Tempestilli et al, 2020). This assay was done using Vero E6 cells that were selected for high ACE2 expression with an accompanying cytotoxicity counter-assay. Berzosertib reported a CPE EC$_{50}$ of 0.71 µM and a CC$_{50}$ of 11.2 µM. This study failed to report any hypothesized mechanism of action for berzosertib.

Without being bound by any particular theory, the varied EC$_{50}$ values reported above can be explained by the different assay design between the present disclosure, Tempestilli et al, and Garcia et al. The present disclosure used an immortalized human cell line that was engineered to constitutively express ACE2 (HeLa-ACE2) whereas Garcia et al used a human epithelial cell line and human induced pluripotent stem cell (hIPSC)-derived cardiomyocytes, and Tempestilli et al used a cell line that is from African Green Monkeys (Vero E6). The difference in species can alter experimental results. Without being bound by any particular theory, the assay design of the present disclosure is a more accurate representation of how humans are affected by SARS-CoV-2 infection and how the human cells are to react to an antiviral therapeutic for said indication.

Based on the analysis above, the discovery provided herein of berzosertib as a 3CLpro binder and antiviral agent against SARS-CoV-2 is unexpected and surprising.

The publicly available, safe and well tolerated clinical doses of berzosertib are reported to be once-weekly 480 mg/m2 and twice weekly 240 mg/m2 intravenously, with no dose-limiting toxicities (DLTs) observed. Since these 480 mg/m2 once weekly and 240 mg/m2 twice weekly clinical dosages were well tolerated in a Phase 1 clinical trial, it is logical to use these values to calculate equivalent in vitro concentrations as comparative approximations. However, it is important to note that intravenous route of administration is not directly translatable to oral, intraperitoneal or subcutaneous routes of administration (r.o.a). Absorption, distribution, metabolism and excretion of a drug may vary by route of administration (r.o.a) and affect the dose necessary for each r.o.a to demonstrate efficacy, The FDA has clearly indicated that they are comfortable with a total weekly dose of berzosertib of up to 480 mg/m2. Since daily dosing is contemplated in some embodiments, this would indicate that a dose of 69 mg/m2/day i.v. (480/7) is likely to be an acceptable starting daily clinical dose. Based on FDA accepted mathematics, which allow clinical researchers to convert between human and small mammal dosing, using a Km of 3, a mouse dose of 23 mg/kg/day i.v. is justified from the hypothetical clinical dose of 69 mg/day i.v. This dosing fits underneath the STD10 for this drug of 30 mg/kg/day i.v. observed in a 28 day rat study in which subjects were dosed daily. It seems reasonable to also test a second, higher mouse/rat dose above 30 mg/kg/day because an antiviral time-course of drug administration in either humans or animals is likely to only extend 5-10 days or only a single day in the case of a loading dose, a far shorter period than the 28 day study mentioned above.

Berzosertib has also been studied in mouse cancer xenograft models using an oral r.o.a. In this case, 30-60 mg/kg of berzosertib was administered via oral gavage. This route of administration can be more ideal in some embodiments than intravenous for in vivo studies as it is easier to administer to small mammals (ex. mouse and hamster). Both 30 mg/kg and 60 mg/kg doses reported no adverse effects or toxicity in the mice. In addition to oral administration being advantageous for ease in animal studies, an oral administration will also be beneficial in a clinical setting.

Comparison of $EC_{50}$ In Vitro Concentration to Clinical Concentrations of Berzosertib Berzosertib's known clinical doses and derived preclinical doses that do not elicit Grade 2 or higher adverse events (AEs) were used to calculate approximate equivalent in vitro concentrations. These values were then compared to the $EC_{50}$ values from the in vitro HeLa-ACE2 cell-based SARS-CoV-2 assay.

Two methods were used to calculate berzosertib equivalent in vitro concentrations beginning with either 1) the known, tolerated Phase 1 clinical dosage or 2) a mouse/hamster dosage derived from the known tolerated Phase 1 clinical dosage (see above). Both methods can be found here, https://www.researchgate.net/post/How-to-extrapolate-result-from-in-vitro-ug-mL-to-in-vivo and http://microbiology.ucdavis.edu/privalsky/tc-growth-area.

Method 1

The clinical dosage of berzosertib can be converted to an equivalent in vitro dose per well by using the growth area and working assay volume of a single well in a 384w plate. The growth area (0.1 $cm^2$) of a single well in a 384w plate and assay volume used in the experiment is provided in Table 9. Next, the calculated in vitro dose per well was then converted to a resultant concentration using the molarity formula (M=(m/MW)*(1/V)). Refer to Equation III for a formula description. This method of conversion is extremely accurate as the variables used are representative of the same values used in the in vitro experiment.

TABLE 9A

CONVERSION OF THEORETICAL DAILY CLINICAL I.V. DOSAGE 69 (MG/M2) OF BERZOSERTIB TO AN APPROXIMATE IN VITRO CONCENTRATION (μM)

| clinical dosage of berzosertib (mg/m2) | molar mass (g/mol) | growth area of each well in Greiner uclear 384-well plates (cm2) | growth area of each well in Greiner uclear 384-well plates (m2) | equiv. in vitro dose in each well (mg) | equiv. in vitro dose (g) |
|---|---|---|---|---|---|
| 69 | 463.6 | 0.1 | 0.00001 | 0.002 | 0.000002 |

TABLE 9B

CONVERSION OF THEORETICAL DAILY CLINICAL I.V. DOSAGE 69 (MG/M2) OF BERZOSERTIB TO AN APPROXIMATE IN VITRO CONCENTRATION (μM)

| clinical dosage of berzosertib (mg/m2) | volume for in vitro (L) | concentration in vitro (M) | concentration in vitro (μM) | Selectivity Index (CC50/EC50) |
|---|---|---|---|---|
| 69 | 0.000026 | 0.00016593 | 165.93 | 1455.487 |

Method 1 gives a resultant 165.93 μM equivalent in vitro concentration that was calculated from the highest theoretical daily safe clinical dosage of berzosertib (69 mg/kg/day derived dose, see above). The concentration range is significantly higher than the $EC_{50}$ (0.114 μM) value of berzosertib in the HeLa-ACE2 cell-based SARS-CoV-2 assay. These findings suggest that berzosertib could be efficacious and well-tolerated at the in vivo equivalent dose in both animal and human models. In some embodiments, metabolism and absorption can affect the necessary concentration to be effective.

Method 2

The second method for in vivo to in vitro conversion began by converting a mouse dosage of 30 and 60 mg/kg/day (oral admin) to the amount of drug that would be administered to each mouse using the average mouse mass of 25 g. The in vitro concentration was then found using the molarity formula (M=(m/MW)*(1/V)) where the volume was determined by using the average mass of a mouse in Table 10.

TABLE 10

CONVERSION OF MOUSE DOSAGES (MG/KG) OF BERZOSERTIB (30 AND 60 MG/KG ORAL ADMIN) TO AN APPROXIMATE IN VITRO CONCENTRATION (μM), VOLUMES DETERMINED FROM AVERAGE MOUSE MASS

| mouse dosage (mg/kg) | molar mass (g/mol) | average mouse mass (g) | amount administered to each mouse (mg) | amount administered to each mouse (g) | volume of mouse equivalent (L) | concentration of drug in vitro (M) | concentration of drug in vitro (μM) |
|---|---|---|---|---|---|---|---|
| 30 | 463.6 | 25 | 0.75 | 0.00075 | 0.025 | 6.4711E−05 | 64.71095772 |
| 60 | 463.6 | 25 | 1.5 | 0.0015 | 0.025 | 0.00012942 | 129.4219154 |

As explained earlier, the dosages in Table 10 were selected from the experimental dosages of berzosertib in mice that were well tolerated. The approximate equivalent in vitro concentrations are both ~561-1131× larger than the $EC_{50}$ (0.114 μM) of berzosertib in this experimental study. In some embodiments, absorption and metabolism could increase the required concentration of berzosertib in a mouse-infected model in order to be effective, however, the large gap between efficacy in vitro and safely tolerated doses in vivo and clinical indicates that there should be room to increase concentration without encountering toxicity issues.

Based on this analysis, there appears to be justification for dosing berzosertib in mice at least 30 mg/kg/day and up to 60 mg/kg/day with oral administration. It also appears that those concentrations are predicted to elicit a measurable antiviral response, based on the in vitro $EC_{50}$ results (0.114 μM) being substantially lower than the approximate equivalent doses above. With this information, it is justified to assume that a mouse-infected model may demonstrate reduced viral replication in response to berzosertib administration up to 60 mg/kg.

Conclusions

The ActivPred platform discovered 5 active compounds that exhibited antiviral activity against COVID-19. The ActivPred platform discovered 2 active antiviral compounds against COVID-19 that were found to be potent ($EC_{50}$<9 μM) and selective ($CC_{50}/EC_{50}$>10 or $CC_{50}$>39.8 μM). The ActivPred platform yielded a success rate of 14.3% for identifying novel and active antiviral compounds from the prioritized list of 35, which is higher than a "gold-standard" HTS success rate of 2.75%. Furthermore, ActivPred's success rate for discovering novel potent and selective antivirals is 5.7% in comparison to a "gold-standard" HTS rate of 0.56%. ActivPred was 5× and 10× more efficient in identifying active or potent and selective drugs against COVID-19, respectively, compared to a "gold-standard" HTS approach. ActivPred is significantly more successful, affordable and faster than the traditional HTS approach to drug discovery that is utilized by the majority of scientific researchers.

Both pipendoxifene and berzosertib are defined as potent and selective antiviral agents against SARS-CoV-2. Based on the in vitro data presented herein and in vivo dosage to in vitro drug concentration conversions, there is scientific justification to support that pipendoxifene may demonstrate antiviral activity at safely tolerated doses in vivo. Based on the in vitro data from this study and in vivo dosage to in vitro drug concentration conversions, there is scientific justification to support that berzosertib may demonstrate antiviral activity at safely tolerated doses in vivo.

When considering the ability of the ActivPred platform, the in vitro data from this experiment and the equivalent dosage to concentration conversions, it appears that in vivo development of berzosertib and pipendoxifene is scientifically justified. The significantly longer half-life of berzosertib and pipendoxifene as compared to remdesivir means that these drugs may potentially be preferred to remdesivir, assuming in vivo and clinical success relative to efficacy. It is expected that the compound concentrations predicted herein will elicit a measurable antiviral response (e.g., in a mouse or hamster model).

Example 9

Additional Compounds for Treating Viral Infections

Two additional drugs, Bazedoxifene and R-428, were discovered by the ActivPred Platform to be active against COVID-19 and experimentally validated. The 2 drugs were not part of the group of 35 drugs priority ranked for experimental validation. These 2 drugs were tested using the same experimental design used in this study, in a screen of the nearly 12,000 member ReFrame library in a study published on Jun. 16, 2020 (Bakowski et al, 2020).

Bazedoxifene was discovered by the ActivPred platform to bind RdRp and exhibit antiviral activity, which is a surprising and important finding given what has previously been published (see above) (e.g., a Bazedoxifene< >RdRp binding appears to be previously undiscovered). Bazedoxifene was found to have antiviral activity in a drug repositioning and synergistic remdesivir combinations study published on Jun. 16, 2020 (Bakowski et al, 2020). In the present disclosure, bazedoxifene was found by the ActivePred platform to inhibit viral infection by targeting RdRp. This demonstrates another drug that was correctly predicted by the ActivPred platform to have activity against COVID-19.

Another compound, R-428 (Bemcentinib), was predicted by the ActivPred platform to bind 3CLpro of SARS-CoV-2. R-428 has an $EC_{50}$ of 2.88 μM, a $CC_{50}$>40 μM and a synergy score of 7.22 with remdesivir against SARS-CoV-2. This compound has reached phase 2 clinical trials and is an AXL kinase inhibitor. In April 2020 Bemcentinib became the first candidate to be selected as part of the UK Government's ACCORD (Accelerating COVID-19 Research & Development) for Phase II clinical trial in patients with COVID-19.

Example 10

In Vivo Validation of Berzosertib and Pipendoxifene

Definitions

Viral load/burden/titre/titer. Viral load, also known as viral burden, viral titre or viral titer, is a numerical expression of the quantity of virus in a given volume of fluid; sputum and blood plasma being two bodily fluids.

Virus Shedding. Viral shedding refers to the expulsion and release of virus progeny following successful reproduction during a host-cell infection. Once replication has been completed and the host cell is exhausted of all resources in making viral progeny, the viruses may begin to leave the cell by several methods.

Inoculum. A small amount of material containing bacteria, viruses, or other microorganisms that is used to start a culture.

PFU. A plaque-forming unit (PFU) is a measure used in virology to describe the number of virus particles capable of forming plaques per unit volume.

qRT-PCR. Quantitative reverse transcription polymerase chain reaction (qRT-PCR) technology can detect viral SARS-CoV-2 RNA in the upper respiratory tract for a mean of 17 days (maximum 83 days) after symptom onset.

sgRT-qPCR (subgenomic RT-qPCR).

TCID50 (Median Tissue Culture Infectious Dose) assay is one method used to verify the viral titer of a testing virus. Host tissue cells are cultured on a well plate titer, and then varying dilutions of the testing viral fluid are added to the wells.

Relation of viral titer to pfu. The viral titer is a quantitative measurement of the biological activity of your virus and is expressed as plaque forming units (pfu) per ml.

PBS (phosphate buffered saline) is a balanced salt solution used for a variety of cell culture applications, such as washing cells before dissociation, transporting cells or tissue, diluting cells for counting, and preparing reagents.

Control groups can comprise positive, negative, test, vehicle groups. Positive control group: This group is also called a "disease control group" meaning, animals belonging to this group will be induced with the disease. Negative control group: Animals belonging to this group will not be induced with the disease and will not receive any treatment as well. Test group: This group is also called a "treatment group". Animals belonging to this group will be first induced with the disease and after induction of the disease, the animals are treated with a pre-decided dose of drug "X" based on the literature review and its efficacy is evaluated in the disease, by different evaluation parameters. The drug "X" either is given orally, intraperitoneally, or intramuscularly after dissolution into a particular solvent based on its oil or water solubility. Vehicle control group: Animals belonging to this group are induced with the disease and after induction of the disease, a similar quantity of the vehicle to that of test group which is used to dissolve the drug "X" is administered by the same route and for the same duration to the animals, in order to evaluate the effect of vehicle on the disease, whether it also has some impact on the disease activity or any side effect.

Introduction

Berzosertib (VX-970, VE-822) and pipendoxifene (ERA-923) bind the viral proteins 3C-like protease (3CLpro) and RNA-dependent RNA polymerase(RdRp), respectively. By binding these viral proteins that are necessary for proper viral replication, berzosertib and pipendoxifene are able to inhibit SARS-CoV-2 replication and subsequent propagation. These in silico discoveries were validated as having potent (<9.6 µM) and selective (SI >10 or $CC_{50}$<30 µM) antiviral activity in an in vitro HeLa-ACE2/SARS-CoV-2 high-content imaging (HCI) assay as described herein. Accordingly, pipendoxifene and berzosertib are advanced into in vivo efficacy studies. Antiviral efficacy is first evaluated in an Ad-hACE2/SARS-CoV-2 mouse model and subsequently in a more complex in vivo study involving Golden Syrian hamsters.

In Vivo SARS-CoV-2 Infection Animal Models

TABLE 11A

COMPARATIVE SARS-COV-2 IN VIVO MODEL CHARACTERISTICS

| Animal | ACE2 (present naturally that can bind SARS-COV-2 spike protein) | Susceptibility | BSL3 adaptable | Evidence of viral shedding |
|---|---|---|---|---|
| Transgenic mice (k18-hACE2) |  | ✓ | ✓ | ✓ |
| Syrian hamster | ✓ | ✓✓ | ✓ | ✓✓ |
| ferrets | ✓ | ✓ | ✓ | ✓ |
| rhesus macaques | ✓ | ✓ | ✓ | ✓ |
| pigs | ✓ |  | ✓ |  |
| fruit bats | ✓ | ✓ | ✓ |  |
| cats | ✓ | ✓ |  |  |
| chickens and ducks | ✓ |  | ✓ |  |
| dogs | ✓ |  | ✓ |  |
| minks | ✓ | ✓ |  | ✓ |

TABLE 11B

COMPARATIVE SARS-COV-2 IN VIVO MODEL CHARACTERISTICS

| Animal | Histopathological basis of disease | Transmission | Clinical signs of disease | SARS-COV-2 survival |
|---|---|---|---|---|
| Transgenic mice (k18-hACE2) | ✓ (mild to lethal dependent on hACE2 expression) |  | ✓ |  |
| Syrian hamster | ✓✓ | ✓ | ✓✓ | ✓✓ |
| ferrets | ✓ | ✓✓ | ✓ | ✓ |
| rhesus macaques | ✓ |  |  |  |
| pigs |  |  |  |  |
| fruit bats |  |  |  |  |

TABLE 11B-continued

COMPARATIVE SARS-COV-2 IN VIVO MODEL CHARACTERISTICS

| Animal | Histopathological basis of disease | Transmission | Clinical signs of disease | SARS-COV-2 survival |
|---|---|---|---|---|
| cats | ✓ | ✓ | | ✓ |
| chickens and ducks | | | | |
| dogs | | | | |
| minks | | ✓✓ | | |

Selection of an in vivo model is important when designing an efficacy study. The chosen animal model is representative of the disease in humans while also providing sufficient data and measurements to achieve significant results. There are numerous animal models that have been developed and explored to assess antiviral efficacy of drugs such as transgenic mice, Syrian hamsters (Mesocricetus auratus), ferrets (Mustela putorius furo), non-human-primates such as rhesus macaques (Macaca mulatta), pigs (Sus scrofa domesticus), fruit bats (Rousettus aegyptiacus), chickens and ducks, dogs (Canis lupus familiaris), and minks (Neovison vison). When selecting an animal model, one should consider a number of factors including clinical signs of disease, laboratory handling, susceptibility, transmission, evidence of viral shedding, histopathological evidence of disease, microscopic findings, disease timeline and cost-effectiveness to name a few.

Without being bound by any particular theory, the susceptibility of an animal to SARS-CoV-2 infection is primarily based on the ability of the SARS-CoV-2 spike protein being able to perform cellular entry by interacting its receptor binding domain (RBD) with the Angiotensin-converting Enzyme 2 (ACE2). The level of susceptibility to SARS-CoV-2 varies across organisms given that the DNA sequence of the ACE2 receptor differs as well. In terms of susceptibility, cats, non-human-primates, minks, ferrets, hamsters, transgenic mice and fruit bats have demonstrated susceptibility to SARS-CoV-2 whereas dogs (very mild), pigs, chicken and ducks have not. Mice have to be genetically engineered to express hACE2 or sensitized to hACE2 in order to be susceptible to the virus. These transgenic mice face a limitation on the length of experimentation because the mutation has lethal effects due to neuroinvasion by SARS-CoV-2. Nonetheless, they serve as a useful model to study SARS-CoV-2 replication in the lungs in shorter periods. Contrastingly, Syrian hamsters express an ACE2 receptor that has high functional interaction with the receptor binding domain of SARS-CoV-2.

Biosafety level 3 (BSL-3) is applicable to clinical, diagnostic, teaching, research, or production facilities where work is performed with agents that may cause serious or potentially lethal disease through inhalation, to the personnel, and may contaminate the environment. The conditions in an environment of a biosafety level-3 (BSL-3) lab can influence the magnitude of difficulty researchers will experience when handling certain animals. A BSL3 lab is necessary for SARS-CoV-2 isolation according to the CDC guidelines. Cats and minks are not suitable for the conditions of a BSL3 lab and have been reported to be difficult to handle in this type of setting. Despite being susceptible to SARS-CoV-2 and demonstrating some basis of disease, these two models cannot be considered as a well-suited animal model to study therapeutics because the difficulty of handling could pose complications for data collection.

Evidence and the degree of virus replication and viral shedding is another important aspect of in vivo model selection. These measurable aspects of SARS-CoV-2 are especially important given that pipendoxifene and berzosertib inhibit targets that are vital to viral replication; RdRp and 3CLpro, respectively. Syrian golden hamsters, non-human-primates, transgenic mice and ferrets exhibit detectable virus replication in the respiratory tract. Notably, Syrian hamsters have shown to have high levels of viral RNA present in oral swabs, high viral loads, and extensive virus shedding. It is valuable that the hamster/SARS-CoV-2 model exhibits these characteristics as they allow for multiple measurements of viral replication and propagation to be taken and to evaluate the potential attenuation that a therapeutic may have.

The clinical signs of disease and the ability to observe changes in haematological parameters, like body weight and lung inflammation, can be invaluable for analysis of a therapeutics effect on not only the level of virus replication and shedding but also for the overall immune response of an animal to SARS-CoV-2 infection. The transgenic mice models can develop severe clinical signs of disease and have high detectable levels of viral replication in response to SARS-CoV-2 infection. Ferrets, as a mild model of disease, have been shown to display little to no clinical signs of disease when infected with SARS-CoV-2. The same mild findings in ferrets are applicable to the haematological parameters, body weight and lung inflammation. Mild disease and clinical signs are observed in non-human-primates, but they do exhibit haematological changes. Syrian hamsters demonstrate clinical signs of disease such as ruffed hair, hunched posture, labored breathing, and dramatic weight loss. They also are shown to model mild-to-moderate disease in response to SARS-CoV-2 infection. It has been shown that Syrian hamster lungs experience significant inflammation and edema that is valuable when evaluating a therapeutic attenuation of these disease effects inflicted by SARS-CoV-2.

Transmission of SARS-CoV-2 is a valuable action to study when concerned with the epidemiology of a virus and/or for vaccination efficacy. Both Syrian hamsters, non-human primates and ferrets are able to transmit the virus to uninfected individuals as they all are susceptible to the virus in a BSL3 setting. However, ferrets are a favorable model to study SARS-CoV-2 transmission given that they are able to very efficiently transmit the virus. In regards to the study design proposed in this report, disease transmission is not accounted for nor is it feasible given the experimental design not requiring an uninfected control. Given this, ferrets are a valuable preclinical model to study disease transmission (i.e. for vaccine development) but not the best-suited for therapeutic attenuation of moderate SARS-CoV-2 disease effects.

The timeline of an experiment can be important when considering a drug with a longer half-life that may require a few days to reach its steady-state necessary to exert its full effects. When considering an experiment longer than 3 days and one to study the long-term effects of a drug, transgenic mice that are genetically engineered to express human ACE2 or are sensitized to hACE2 are not well-suited for this. Mice develop mild to lethal disease dependent on the expression of human ACE2 and can die from neurological infection caused by SARS-CoV-2 after 3 days. Hamster, ferrets, and non-human primates are better suited for longer complex studies. Transgenic mice can still be useful for shorter study periods that have less complex endpoints. On the other hand, hamsters are able to resolve the infection on their own within approximately 2 weeks. This timeline allows for a longer assessment of a therapeutic effect without requiring concern for the possibility of the subjects having a lethal response to the infection and compromising the experimental results.

An in vivo study is conducted that aims to assess the antiviral efficacy of berzosertib and pipendoxifene. For a study that is solely evaluating a therapeutic ability to reduce viral load, a transgenic mice model is well suited and cost-effective before advancing into a more complex study. In order for an animal to be considered as a well-suited model for a complex SARS-CoV-2 efficacy study, they should be highly susceptible to SARS-CoV-2, able to be handled with relative ease in a BSL3 setting, exhibit measurable clinical signs of disease, and have a high likelihood of surviving the virus. If the mouse efficacy study is successful, the literature suggests that the Syrian golden hamster encapsulates the necessary complex experimental features and is the best-suited animal model to advance with when evaluating therapeutic efficacy against SARS-CoV-2.

IND-Enabling COVID-19 Drugs that Used Syrian Hamster Design

As of Feb. 18, 2021, there are a total of at least 7 drugs in human clinical trials that used Syrian Hamsters as part of their preclinical data to support the efficacy of each drug against SARS-CoV-2. The success demonstrated by these drugs in their ability to begin clinical trials supports the preclinical acceptance of Syrian hamsters serving as a proper model to study therapeutic efficacy against SARS-CoV-2. This further supports that Syrian hamsters are not only the best-suited in vivo model for the experimental design that can be used to test the antiviral efficacy of pipendoxifene and berzosertib, but that they also serve as an FDA-accepted representative model of SARS-CoV-2 disease.

TABLE 12

IND-ENABLING DRUGS THAT USED SYRIAN HAMSTERS AS PRECLINICAL DATA

| Drug | Hamster age (weeks) | Quantity of COVID-19 Clinical Trials | References |
| --- | --- | --- | --- |
| Favipiravir | Syrian hamsters (6-10 weeks old) | 43 COVID clinical trials listed | https://pubmed.ncbi.nlm.nih.gov/33037151/<br>https://clinicaltrials.gov/ct2/results?cond=Covid19&term=Favipiravir&entry=&state=&city=&dist= |
| Ivermectin | 5-6 weeks old | 59 COVID clinical trials listed | https://www.biorxiv.org/content/10.1101/2020.11.21.392639v1<br>https://clinicaltrials.gov/ct2/results?recrs=&cond=Covid19&term=Ivermectin&entry=&state=&city=&dist= |
| STI-2020 | 6 weeks old | 3 COVID Clinical Trials | https://www.biorxiv.org/content/10.1101/2020.10.28.359836v1<br>https://clinicaltrials.gov/ct2/results?recrs=&cond=Covid19&term=STI-2020&entry=&state=&city=&dist= |
| Hydroxychloroquine | ? | 218 COVID studies | https://insight.jci.org/articles/view/143174<br>https://clinicaltrials.gov/ct2/results?term=hydroxychloroquine&cond=Covid19&Search=Apply&recrs=e&age_v=&gndr=&type=&rslt= |
| MK-4482 | ? | 2 COVID studies | https://www.ncbi.nlm.nih.gov/pmc/articles/PMC7553153/<br>https://clinicaltrials.gov/ct2/results?recrs=&cond=Covid19&term=MK-4482&entry=&state=&city=&dist= |
| RITONAVIR | | 87 COVID studies | https://www.biorxiv.org/content/10.1101/2021.02.14.431129v1.full<br>https://clinicaltrials.gov/ct2/results?term=Ritonavir&cond=Covid19&Search=Apply&recrs=b&recrs=a&recrs=f&recrs=d&recrs=e&ag_v=&gndr=&type=&rslt= |
| EIDD-2801 | | 4 COVID Studies | https://www.biorxiv.org/content/10.1101/2021.02.14.431129v1.full<br>https://clinicalytrials.gov/ct2/results?term=EIDD-2801&cond=Covid19&Search=Apply&recrs=b&recrs=a&recrs=f&recrs=d&recrs=e&age_v=&gndr=&type=&rslt= |

IND-Enabling COVID-19 Drugs that Used Syrian Hamster Design

To assess the antiviral activity of berzosertib and pipendoxifene in vivo, they are first tested in an Ad-hACE2 model of SARS-CoV-2 infection in mice. The purpose of conducting this experiment first is to evaluate the in vivo translation of the drug's antiviral efficacy before launching a more complex study in Syrian hamsters. The sole endpoint measures viral titers in lungs on day 3 post SARS-CoV-2 infection. This assesses if the drugs are able to reduce viral load in the mice's lungs, and therefore confirming antiviral activity that was observed in vitro. The experiment consists of 4 infected groups with 6 mice each: pipendoxifene (PO QD), berzosertib (PO QD), remdesivir (positive control, SC BID) and vehicle control (IP QD). The dose selection for pipendoxifene and berzosertib is 66.67 mg/kg and 60 mg/kg, respectively. These doses are chosen as they were given in previous preclinical experiments to the same species (berzosertib) or it is a derived dose from a clinically safe dose in humans using FDA accepted mathematics (pipendoxifene).

Although it is likely that berzosertib and pipendoxifene have been dosed in mice at higher concentrations PO, there is no publicly available evidence of these potential doses. In the clinic, and in hamster animal studies, a loading dose as commonly seen for antivirals is administered. However, due to the lack of published data demonstrating doses at higher concentrations than mentioned above that are nontoxic, a loading dose may not be administered to the mice in this study to prevent compromising the antiviral efficacy study due to possible toxicity issues.

On day 0/hour 0, the mice are inoculated intranasally with $1\times10^4$ PFU SARS-CoV-2, a standard inoculation concentration used by the Garcia-Sastre Laboratory at the Icahn School of Medicine at Mount Sinai. Groups 1-4 are administered the designated dose of each drug or vehicle assigned to a given group starting 1-2 hours prior to inoculation on Day 0 and continues daily to Day 2. All mice are euthanized on Day 3 post SARS-CoV-2 infection. After euthanization, lungs are collected for viral titers to measure viral load. This study outline was proposed by Dr. Adolfo Garcia-Sastre and Dr. Kris White from Mt. Sinai and this method has been published previously The primary goal of this study is to demonstrate whether the two experimental drugs inhibit viral replication by reducing viral load. It is expected that the two experimental drugs inhibit viral replication by reducing viral load. The treated groups are expected to have a significant reduction in viral titers and both pipendoxifene and berzosertib is to advance into phase 1 and 2 preclinical testing in Syrian golden hamsters as this would confirm the compounds' antiviral activity.

Phase 1 In Vivo PK Study (Naive Syrian Hamster)

Prior to assessing the antiviral efficacy of berzosertib and pipendoxifene in Syrian Gold hamsters (*Mesocricetus auratus*), a pharmacokinetic (PK) and biodistribution study are conducted, as there are currently no publicly available references that have evaluated the absorption, distribution, metabolism, and excretion (ADME) effects on berzosertib and pipendoxifene in hamsters. Scientific literature suggests that hamsters metabolism differs from mouse significantly enough that a PK and biodistribution study is useful to perform prior to dose selection for an efficacy study. The resultant concentration in the lungs is important to know before beginning the antiviral efficacy study because SARS-CoV-2 is a respiratory virus that infiltrates host cells via ACE2 receptors in lung tissue. This PK study can assure that the proposed doses will reach sufficient concentration levels to potentially be efficacious. The low dose selected for berzosertib (60 mg/kg) has been safely administered in mice before with no overt toxicity effects and the low dose selected for pipendoxifene (40 mg/kg) was derived from the clinical dose using FDA accepted mathematics. The high doses for these compounds are a multiple of the low dose that is justified by the clinical dosage and follows dose-selection suggestions for preclinical models.

Each test article are evaluated in both 72 M and 72F hamsters. Two cohorts are assembled per drug to assess both a low and high dose level (mg/kg). The 10+ weeks old hamsters are quarantined and acclimated to the lab environment for five days. There is a single dose on day 1 of the study by oral administration. Body weights and detailed observations are taken before the first dose as a baseline and daily throughout the study. Cage-side observations are taken twice daily for mortality and morbidity. Pharmacokinetic blood collections are taken at 1, 2, 4, 6, 8, 12, 24, 36 and 48 hours post dose. 4 animals/sex/group have blood collected (as much as possible prior to euthanasia). Animals are subject to terminal blood collections beginning at 6 hours post dose and terminal lung tissue collections are performed. Pharmacokinetic analysis of plasma samples are done by a qualified LC-MS method applicable to the test materials. The lung tissue are homogenized and analyzed by a qualified LC-MS method. Concentration analysis are completed using WinNonlin Data Analysis software.

TABLE 13

EXPERIMENTAL OUTLINE FOR PHASE 1 PK TESTING

| Group | Treatment | Dose Level (mg/kg) | Dosing Route | Animals No. |
|---|---|---|---|---|
| 1 | Test Article 1 | Low | Oral | 36 M/36 F |
| 2 | Test Article 1 | High | Oral | 36 M/36 F |
| 3 | Test Article 2 | Low | Oral | 36 M/36 F |
| 4 | Test Article 2 | High | Oral | 36 M/36 F |

The results of this study can demonstrate whether or not the proposed doses for the subsequent antiviral efficacy study is high enough to exhibit sufficient concentration in the lungs and other essential organs. Suitable dosing regimens for the disclosed compounds are expected to be identified. After the concentration found sufficient is identified, the doses are used in the following study.

Bioanalytical Assay Development
REGULATORY COMPLIANCE: Non-GLP
OBJECTIVE: Develop method(s) for quantification of Test Article in hamster lung tissue for use in the efficacy and PK studies outlined below.

TABLE 14

BIOANALYTICAL ASSAY DEVELOPMENT DETAIL

| METHOD | LC-MS/MS |
|---|---|
| METHOD DEVELOPMENT | Development of methods to quantify Test Article in hamster lung tissue. |
| MATERIAL REQUIREMENT | Estimated to be 200 mg API (reference standard quality with CoA), 10-20 mg stable label IS. |

Non-GLP Oral Pharmacokinetic Biodistribution Study in Hamster
REGULATORY COMPLIANCE: Non-GLP
OBJECTIVE: To understand Test Article PK in hamsters. This study is expected to enable the assessment of local concentrations and inform dose selection for the efficacy study.

TABLE 15

NON-GLP ORAL PHARMACOKINETIC/BIODISTRIBUTION STUDY IN HAMSTER STUDY DESIGN

| Group | Treatment | Dose | Route | Animals | Time points |
|---|---|---|---|---|---|
| 1 | Control Vehicle | Single Dose | PO | 4 | Body Weights at 48 hr |
| 2 | Berzosertib | Single dose | | 32 | 8 terminal time points out to 48 hours |
| 3 | Pipendoxifene | Single dose | | 32 | (0.5, 1, 2, 4, 8, 12, 24 and 48 hours) |
| | | | | | n = 4 animals at each terminal time point |

TABLE 16

NON-GLP ORAL PHARMACOKINETIC/BIODISTRIBUTION STUDY IN HAMSTER STUDY DETAIL

| | |
|---|---|
| ANIMALS | 68 Syrian Hamster, plus 6 spare animals |
| TEST ARTICLE | Berzosertib, Pipendoxifene |
| DOSE ROUTE/FREQUENCY | Single dose via PO Oral on Day 0 |
| CLINICAL OBSERVATIONS | Twice daily |
| BODY WEIGHT | Prior to treatment |
| NECROPSY/TISSUE HARVEST | Euthanize n = 4 animals at each of 8 time points out to 48 hours. Collect terminal body weight and lung tissue only for bioanalytical analysis. Timepoints (0.5, 1, 2, 4, 8, 12, 24 and 48 hours) |
| BIOANALYSIS | Analysis of 64 lung tissue samples. |
| TOXICOKINETIC DATA ANALYSIS | Non-compartmental analysis performed to focus on $C_{max}$, $T_{max}$, AUC and apparent terminal half-life in each lung tissue. |
| TIMELINES | Pre-Study Activities: 2-3 Weeks<br>In-Life: 1 Week<br>Bioanalysis: 3-4 weeks<br>Provision of Data: 3-4 weeks |

Pre-Clinical In Vivo Antiviral Efficacy (Syrian Hamster/SARS-CoV-2 Model):

REGULATORY COMPLIANCE: Non-GLP

OBJECTIVE: To assess the pharmacology of a repeat dosing of test article via IP delivery in a SARS-CoV-2 challenged hamster model.

TABLE 17

SARS-COV-2 EFFICACY MODEL IN SYRIAN HAMSTER STUDY DESIGN

| Group | Challenge | Compound | Route | Animals | End Points |
|---|---|---|---|---|---|
| 1 | SARS-COV-2 | PBS (Vehicle) Control | PO | 6 | Daily Body weights, Behavior, oral swabs (Day 1, 3, and 5), Collect lung, respiratory tract and (to be fixed, held. Processed to slides by amendment only) |
| 2 | | Remdesivir Control (7.5 mg/kg SID) | IP | 6 | |
| 3 | | TA 1 High | PO | 12 | |
| 4 | | TA 1 Low | | 12 | |
| 5 | | TA 2 High | | 12 | |
| 6 | | TA 2 Low | | 12 | |

TABLE 18

SARS-COV-2 EFFICACY MODEL IN SYRIAN HAMSTER STUDY DETAIL

| | |
|---|---|
| ANIMALS | 60 Hamsters plus 5 spares; (males); approximately 110-150 g |
| TEST ARTICLE | Test Article |
| CHALLENGE | SARS-COV-2 |
| DOSE ROUTE/FREQUENCY | Viral challenge: Intranasal instillation; single dose; Day 0<br>Group 1: BID PO Starting on Day 0<br>Group 2: BID IP Starting on Day 0<br>Groups 3-6 BID PO, 6/12 animals are treated at time of infection and the remaining 6 animals are treated starting 6 hr. post infection. |
| DETAILED OBSERVATIONS | Twice daily starting at Day-3 |
| BODY WEIGHT | Daily starting at day-3 |
| ORAL SWABS | Day 1, 3 and 5 post infection |
| NECROPSY/TISSUE HARVEST (Table 19) | Day 5 (all animals)<br>Terminal Body weights, lung, Lung weight, oral swabs, respiratory tract and (to be fixed, held, and processed to histopathology by amendment only) |
| ORGAN WEIGHTS | Lung |
| HISTOPATHOLOGY (Table 19) | Fix respiratory tract to include nasal, trachea and lungs. Preserved in 10% neutral buffered formalin.<br>Added by Amendment Only: embedded in paraffin and sectioned and stained with hematoxylin and eosin for subsequent histological analysis by board certified pathologist. |
| VIROLOGY (Table 20) | Oral Swab: gRT-qPCR<br>Lung: RT-qPCR and $TCID_{50}$ |
| GENERAL TIMELINE | Pre-study activities: 4 weeks (quarantine & IACUC)<br>In-life: 2 weeks (includes B3 acclimation)<br>Sample Sterilization: 1 week<br>PCR: 3 weeks from sample sterilization<br>TCID50: TBD<br>Report (no histopathology): 4-6 weeks<br>Optional Histopathology: ~10 weeks<br>Report: ~12-14 weeks (concurrent with histopathology) |

TABLE 19

TERMINAL PROCEDURES-ORGAN OR TISSUES TO BE
WEIGHED, PRESERVED, AND MICROSCOPICALLY
EXAMINED

| Tissue | Organ Weight Taken | Collected and Preserved |
|---|---|---|
| Animal Identification | | X |
| Lung | X | X |
| Gross lesions | | X |

TABLE 20

TISSUE COLLECTION

| | | Number of samples per Animal | | |
|---|---|---|---|---|
| Tissues | Number of animals | TCID50[2] | RT-qPCR | Total Number of Samples/animal |
| Oral Swab | 60 | 0 | 3 | 180 |
| Lungs[2] | 60 | 1 | 1 | 120 |
| TOTAL | | 1 | 4 | 300 |

[1]Number of samples per tissue varies based target tissues of interest
[2]To be analyzed by amendment only
[3]Assumes 1 sample from 2 locations in the lungs It is expected that berzosertib and pipendoxifene are successful in phase 0 and phase 1, and berzosertib and pipendoxifene are then evaluated in a more complex, IND-enabling antiviral efficacy study performed in Syrian Golden hamsters (*Mesocricetus auratus*). This animal model was chosen because it has commonly been used in the past for respiratory virus infections. This species of hamster also has a similar ACE2 sequence to that of humans, allowing for proper SARS-CoV-2 infection and the development of mild to moderate disease. Unlike transgenic mice that can die after 3 days of infection from a lethal mutation, hamsters are able to recover from SARS-CoV-2 in approximately 2 weeks, allowing for a longer evaluation of a therapeutic effect on recovery. As elaborated above, this animal model provides the essential qualities of a SARS-CoV-2 model necessary to evaluate if an antiviral is able to reduce viral load, virus shedding, clinical signs of disease, weight loss, and lung inflammation.

Figure 7:
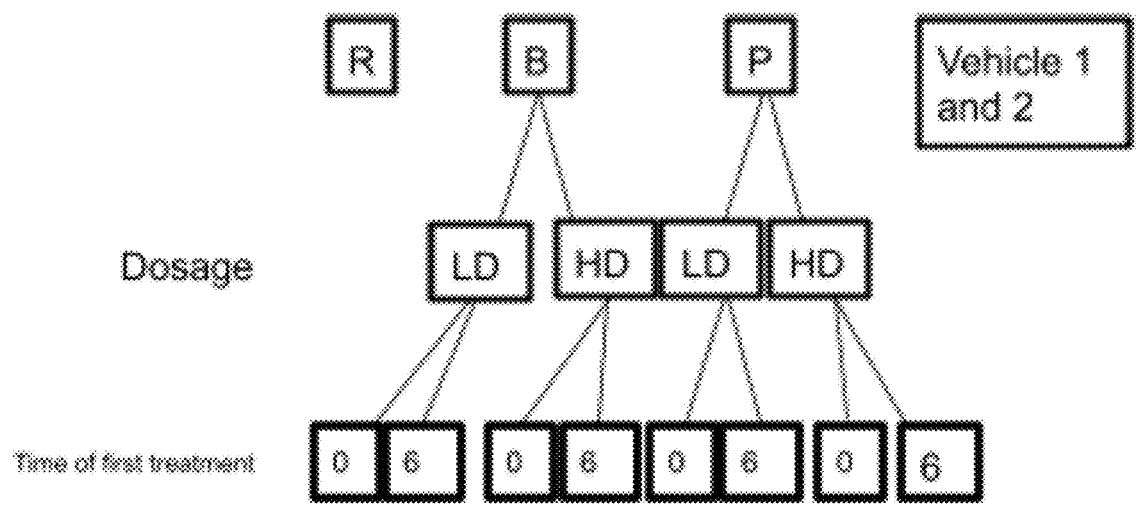
FIG. 7 shows a non-limiting exemplary pre-clinical study group overview. R=remdesivir, B=berzosertib, P=pipendoxifene, Vehicle Control 1 and 2=methylcellulose and vitamin E TPGS, LD=low dose, HD=high dose, time of treatment unit=hours

The main study have about a total of 60 hamsters plus 10 spare animals divided into 4 groups: remdesivir (positive control, n=6), PBS (vehicle control, n=6), berzosertib (low n=12), berzosertib (high n=12) and pipendoxifene (low n=12), pipendoxifene (high, n=12). This study design assesses the dose-ranging antiviral effects of berzosertib and pipendoxifene with two different time points (0 and 6 hr) of initial treatment post challenge. By administering at two different time-points, the results allow for an assessment of when the drugs are best-acting. Pipendoxifene is delivered using 4% methylcellulose as the vehicle whereas berzosertib is delivered using 10% Vitamin E d-alpha tocopheryl polyethylene glycol 1000 succinate (TPGS). These vehicles were previously used for oral administration of each corresponding drug. The endpoints assess antiviral efficacy by measuring daily body weights, behavior, oral swabs with sgRT-qPCR, viral titers with $TCID_{50}$ in the lung, and lung weight for edema and inflammation. The results are quantitatively compared to the positive control and current standard of care for SARS-CoV-2 infection, remdesivir. See FIG. 7 and Tables 17-22 for details of exemplary study conditions.

Hamsters are challenged with SARS-CoV-2 by intranasal inoculation at a chosen PFU on Day 0. The intranasal route of inoculation was selected as it has been shown to result in high viral load and severe inflammation in the lungs, body weight loss, clinical signs of disease, and virus shedding from the oral cavity whereas oral inoculation results in little to none of these disease characteristics. Group 1 (vehicle control) begins dosing BID PO on Day 0 at time of infection, group 2 (positive control) begins dosing at 7.5 mg/kg SID IP on Day 0 at time of infection, and half of groups 3-6 begins dosing either (60 mg/kg or TBD mg/kg) berzosertib or (40 mg/kg or TBD mg/kg) pipendoxifene BID PO at time of infection while the remaining half begins treatment 6 hours post challenge. Oral administration (PO) of the experimental drugs is chosen as they have both been studied in animal models (mice) via this route of administration before and it is advantageous to IP or IV administration in terms of ease, discomfort and accessibility in the clinic.

The initial dose of each drug is a loading dose (amount TBD); a dose that is higher than subsequent doses. The loading dose can be equal to the highest safely tested dose from the PK Phase 1 study. Typically, drugs with a longer half-life are able to reach steady-state relative to half-life when they are first administered with a loading dose. Given that berzosertib (t ½=17 h) and pipendoxifene (t ½=30 h) have relatively long half-lives, a loading dose would be ideal to achieve the necessary therapeutic level on the first dose. It has been supported in a number of different viral cases that a long half-life is a key characteristic to suppressing viral infection and reactivation; some infections resolved with only one dose. The loading dose can be determined by consulting a PK expert and relying on the logic inferred from the in vitro study results. Additional doses may be implemented into the Phase 1 PK study design.

Hamsters lose weight in respiratory distress and so, a baseline body weight is taken and daily body weights starting Day 3. Detailed observations are performed twice daily starting from Day 3. Oral and pharyngeal swabs are taken on day 1, 3 and 5 pi and viral load present in these samples are quantified by sgRT-qPCR. Animals are euthanized on day 5pi and terminal body weights, lung, lung weight, oral and pharyngeal swabs, and respiratory tract tissue is collected. The held tissues are processed for histopathology analysis if necessary.

In conclusion, these studies (phase 0-2) can provide data involving the compound's biodistribution in hamster lungs, and both simple and complex SARS-CoV-2 antiviral efficacy data. While both compounds are being administered orally in the preclinical studies, pipendoxifene has been administered orally in humans whereas berzosertib has only been studied via intravenous administration. The proposed doses are expected to reach sufficient concentration levels in the lungs to be efficacious, including when administered orally. The compounds are expected to demonstrate efficacy versus SARS-CoV-2.

Overall Pre-Clinical In Vivo Experimental Design

Animal model: Syrian Hamster.
Inoculation PFU or $TCID_{50}$: Existing models can be inoculated intranasally with $5 \times 10^2$ (25 uL)-$2 \times 10^6$ (50 uL) $TCID_{50}$ or $1 \times 10^4$-$1 \times 10^5$ PFU of SARS-CoV-2 in 100 uL PBS.
Sample size and groups: n=6 per group, 2 experimental treatment groups, (2 groups per treatment for dose-range and 2 different time points for first dose), 1 positive control (remdesivir) and 1 vehicle control group (PBS, TPGS or methylcellulose). Total of 10 groups. Total of 60 hamsters.

Route of Admin, time and frequency of Dosing: Compounds are administered to both treatment groups orally via oral gavage. Remdesivir needs to be administered Via i.p. injection. Time of 1st is either at the time of infection or 0-6 hr pi. In some embodiments, frequency of dosing is every day. It is expected the disclosed compounds show an advantage over remdesivir's required dosing regimen. In a dose-ranging study, one low and one high dose are administered. In some embodiments, a loading dose is given at the beginning of the course of treatment before dropping down to a lower maintenance dose. A loading dose can be most useful for drugs that are eliminated from the body relatively slowly, e.g. have a long systemic half-life Length of Experiment 4-7 days Measurements Weight, behavior, appearance (clinical signs of disease) are monitored twice daily. Oral and nasal swabs (or pharyngeal) are collected on days 1, 3, and 5 post-infection to measure viral shedding, determined by RT-PCR (genomic). It is expected treatment with the disclosed compounds reduces viral shedding. Lung, respiratory tract and nasal turbinate tissue samples are collected after euthanization for viral and histopathology analysis (tissue samples are collected, held and processed if needed). Viral load is detected by $TCID_{50}$ and RT-qPCR methods in lungs and respiratory tract only. It is expected treatment with the disclosed compounds reduces viral load. Treated lungs are weighed in comparison to uninfected and other controls to assess for lung damage attributed by edema and inflammation caused by SARS-CoV-2. Treatment with the disclosed compounds is expected to reduce, delay, or prevent lung damage attributed by edema and inflammation caused by SARS-CoV-2.

TABLE 21

ANIMAL MODELS USED FOR STUDY CLINICAL MANIFESTATION/PATHOGENESIS, DRUG AND VACCINE EFFICACY

| Animal models | Strains | Dose and route used | Clinical/pathological Lesions | Uses/limitations |
|---|---|---|---|---|
| Mice | KI8-hACE2 transgenic | Intranasal inoculation with SARS-COV-2 stock virus at a dosage of $10^5$ $TCID_{50}$ SARS-CoV-2 | Bodyweight loss from 3-5 days, lethargic with laboured breathing, and all mice died within 7 days Interstitial pneumonia, neural damage of CNS was also seen | Animal model for COVID-19 pathogenesis for evaluating vaccines and therapeutics Limitation: Lethal encephalitis |
| Mice | HFH4-hACE2 transgenic mice | Intranasal inoculation of $3 \times 10^4$ $TCID_{50}$ SARS-COV-2 | Bodyweight loss from day 4 to 6, respiratory distress and neurological symptoms Pathological changes include interstitial pneumonia | Animal model for COVID-19 pathogenesis for evaluating vaccines and therapeutics Limitation: Lethal encephalitis, HFH4-hACE2 mice showed different susceptibility with the infection of SARS-COV-2 based on gender and age |
| Mice | Ad5-hACE2-transduced mice using inbred mice | Intranasal inoculation with $1 \times 10^5$ PFU of SARS-COV-2 | Bodyweight loss at 4 to-6 days, labored breathing, interstitial pneumonia | Useful to study the efficacy of vaccines and therapies such as convalescent plasma therapy Limitation: Don't develop severe disease and no extrapulmonary manifestations of diseases |
| Mice | SARS-COV-2 MA model (Reverse genetics Using BALB/c mice) | Intranasal inoculation with $10^5$ PFU SARS-COV-2 | Bodyweight loss at 3-4 days, Pathological changes in lungs varies depending on mice age | Used for antiviral and vaccine development Inbred mice model, age-related COVID-19 infections studies |
| Mice | C57BL/6 hDPP4 | $1 \times 10^4$ PFU mouse-adapted SARS-MA15 in 50 μl | The antiviral drug had improved pulmonary function and reduced virus titer and body weight loss in C57BL/6 hDPP4 mice | This model can be used to study antivirals drugs for COVID-19 |
| Non-Human Primates | *Macaca mulatta* Rhesus monkey) *acaca fascicularis* Cynomolgus monkey) | 4.75 ml of $10^5$ pfu/ml SARS-COV-2 intratracheally (4 ml), intranasally (0.5 ml) and on the conjunctiva (0.25 ml) | *M. mulatta* showed a good response to SARS-COV-2, with decreased bodyweight, pulmonary abnormality, viral replication. increased inflammatory cytokine expression and | Good animal model for COVID-19 pathogenesis for evaluating drugs and vaccines. A good model for mild to moderate illness studies Limitation: NHPs do not |

TABLE 21-continued

ANIMAL MODELS USED FOR STUDY CLINICAL
MANIFESTATION/PATHOGENESIS, DRUG AND VACCINE EFFICACY

| Animal models | Strains | Dose and route used | Clinical/pathological Lesions | Uses/limitations |
|---|---|---|---|---|
| | | | pathological changes in the lungs | develop the acute lung injury that is observed in mouse models |
| Ferrets | Mustela putorius furo | Intranasal inoculation with $10^{5.5}$ $TCID_{50}$ of NMC-nCoV02 | Weight loss increased body temperatures | Useful for the studies related to disease transmission, antiviral, and new vaccine development |
| Hamsters | Mesocricetus auratus | Intranasal inoculation of $10^5$ plaque-forming units in 100 μl of SARS-CoV-2 | Increased respiratory rate, decreasing activity, progressive weight loss with pathological lesions in the lower tract | Limitations: Mortality was not observed in hamsters |
| Animal models used for disease transmission and neutralization antibodies production studies ||||| 
| Hamsters | Mesocricetus auratus | Intranasal inoculation with $8 \times 10^4$ $TCID_{50}$ SARS-CoV-2 | Disease transmitted from donor to naive contact hamsters by direct contact or via aerosols | Model to study on mild COVID-19 cases that occur in humans and for disease transmission studies |
| Ferrets | Mustela putorius furo | Intranasal dose with $6 \times 10^5$ $TCID_{50}$ of SARS-CoV-2 virus | Virus shedding was found during direct contact and indirect recipient ferrets | A good model for the study transmission between individuals |
| Mice and Rats | BALB/c mice and Wistar rats | Inactivated Vaccine administered at a various dose to see whether neutralizing antibodies are produced | Pico Vacc inactivated vaccine | An inactivated virus vaccine (PiCo Vacc) generated neutralizing antibodies in this strain |
| Mice | Knockout mice $ACE2^{-/-}$ | Intranasal inoculation with SARS-CoV virus $10^{5.23}$ $TCID_{50}$ | ACE2 receptor is needed for acute lung injury | Acute lung injury studies |
| | $STAT-1^{-/-}$ | Intranasal inoculation with $10^5$ pfu/50 μl rMAl5 or the recombinant or biological epidemic virus, icSARS or Urbani. | Increased susceptibility, prolonged virus shedding, and mortality following infection with either virus | Useful in SARS CoV studies but not in SARS-CoV 2 |
| | $TMPRSS2^{-/-}$ | Intranasal inoculation with SARS-CoV $10^5$ TCID50 | TMPRSS2 Is needed for virus entry for pathogenesis | Use to understand virus entry and the development of inhibitors |

Example 11

3CL Protease (Untagged, SARS-CoV-2) Activity Assay

Background

Coronaviruses (CoVs) primarily cause multiple respiratory and intestinal infections in humans and animals. CoVs may enter into the cells with the help of proteases such as Severe Acute Respiratory Syndrome Coronavirus 3C-like protease (SARS-CoV-1 3CL Protease). The 3CL protease, also known as Main Protease (Mpro), plays a vital role in processing the polyproteins that are translated from the viral RNA 3CL Protease inhibitors that can block viral replication are promising potential drug candidates that could be used to treat patients suffering with the coronavirus infection. Galantamine, a predicted 3CL Protease inhibitor described herein, was tested for its ability to inhibit 3CL Protease.

Description

The 3CL Protease Activity Assay described in this example is designed to measure 3CL Protease activity for screening and profiling applications, in a homogeneous assay with no time-consuming washing steps. The assay can be performed in a 96-well format, with purified untagged 3CL Protease, fluorogenic substrate, and 3CL Protease assay buffer for 100 enzyme reactions. 3CL inhibitor GC376 was included as a positive control. See https://bpsbioscience-.com/3cl-protease-intagged-sars-cov-2-assay-kit-78042.

Materials

3CL Protease (SARS-CoV-2), no tag*; 3CL Protease Substrate (10 mM); 3CL Protease Assay Buffer; GC376, MW=507.5; 0.5 M DTT; Black, low binding microtiter plate; Plate sealing film. Fluorescent microplate reader capable of reading exc/em=360 nm/460 nm Methods All Samples and Controls were Tested in Duplicate.

1) Added 0.5 M DTT to 3CL Protease Assay Buffer so final DTT concentration was 1 mM. (e.g., added 10 μl of 0.5 M DTT to 5 ml assay buffer) (DTT was added just before use. Enough DTT-containing buffer as required for the assay was prepared. Remaining assay buffer was stored at −20° C.).

2) Thaw 3CL Protease was thawed on ice. Upon first thaw, tube containing enzyme was briefly spun to recover the full content of the tube. Aliquoted 3CL Protease into single use aliquots. Stored remaining undiluted enzyme in aliquots at −80° C.

3) Diluted 3CL Protease in Assay buffer (with 1 mM DTT) at 0.5 ng/μl (15 ng per reaction).
4) Added 30 μl diluted 3CL Protease enzyme solution to wells designated as "Positive Control", "Inhibitor Control" and "Test Sample". Added 30 μl Assay buffer (with 1 mM DTT) to the "Blank" wells.

TABLE 22

3CL PROTEASE ACTIVITY ASSAY

| Component | Positive Control | Test Sample | Inhibitor Control | Blank |
|---|---|---|---|---|
| 3CL Protease (0.5 ng/μl) | 30 μl | 30 μl | 30 μl | — |
| Assay Buffer (with DTT) | — | — | — | 30 μl |
| GC376 (500 μM) | — | — | 10 μl | — |
| Test Inhibitor | — | 10 μl | — | — |
| 5% DMSO in water (inhibitor buffer) | 10 μl | — | — | 10 μl |
| Substrate solution | 10 μl | 10 μl | 10 μl | 10 μl |
| Total | 50 μl | 50 μl | 50 μl | 50 μl |

5) Diluted 50 μg GC376 in 200 μl water to obtain a 500 μM solution. Aliquoted and stored remaining solution in aliquots at −80° C. Added 10 μl GC376 (500 μM) to the wells labeled "Inhibitor Control".
6) Prepared the inhibitor solution.

The final concentration of DMSO in the assay did not exceed 1%. (If the inhibitor compound was dissolved in DMSO, made a 100-fold higher concentration of the compound than the highest concentration tested in DMSO. Then made a 20-fold dilution in 1× assay buffer (at this step the compound concentration is 5-fold higher than the final concentration)).

If the inhibitor compound is dissolved in water, made a solution of the compound 5-fold higher than the final concentration in 3CL Protease assay buffer (with 1 mM DTT). For example, diluting 50 μg GC376 in 200 μl water (step 5) creates a 500 μM solution. Adding 10 μl to the assay (final volume 50 μl) results in a 100 μM final concentration.

7) Added 10 μl inhibitor to each well designated "Test Sample". Added 10 μl 1× assay buffer or 5% DMSO in water (depending on which inhibitor solution is used) to "Blank" and "Positive Control" wells.
8) Preincubated enzyme with the inhibitor for 30 min at room temperature with slow shaking.
9) Diluted 10 mM 3CL Protease substrate 1:50 in assay buffer with DTT, to make a 200 μM solution. Diluted only enough as was required for the assay.
10) Started reaction by adding 10 μl of the substrate solution to each well (Final concentration of the 3CL Protease substrate in a 50 μl reaction was 40 μM).
11) Incubated for 4 hours at room temperature with slow shaking. Sealed the plate with the plate sealer. Measured the fluorescence intensity in a microtiter plate-reading fluorimeter capable of excitation at a wavelength 360 nm and detection of emission at a wavelength 460 nm. The fluorescence intensity can also be measured kinetically. "Blank" value was subtracted from all other values.

Data Analysis

3CL Protease activity assays were performed in duplicates. The fluorescence data were analyzed using the computer software, Graphpad Prism. In the absence of the compound, the fluorescence (Ft) in each data set was defined as 100% activity. In the absence of the 3CL Protease, the fluorescence ($F_b$) in each data set was defined as 0% activity. The percent activity in the presence of each compound was calculated according to the following equation: % activity= $[(F-F_b)/(F_t-F_b)] \times 100$, where F=the fluorescence in the presence of the compound, $F_b$=the fluorescence in the absence of the 3CL Protease, and $F_t$=the fluorescence in the absence of the compound. The percent activation was calculated according to the following equation: % activation=% activity−100.

The values of % activity versus a series of compound concentrations were then plotted using non-linear regression analysis of Sigmoidal dose-response curve generated with the equation $Y=B+(T-B)/1+10^{((LogEC50-X) \times Hill\ Slope)}$, where Y=percent activity, B=minimum percent activity, T=maximum percent activity, X=logarithm of compound and Hill Slope=slope factor or Hill coefficient. The $IC_{50}$ value was determined by the concentration causing a half-maximal percent activity.

Results

Figure 14:
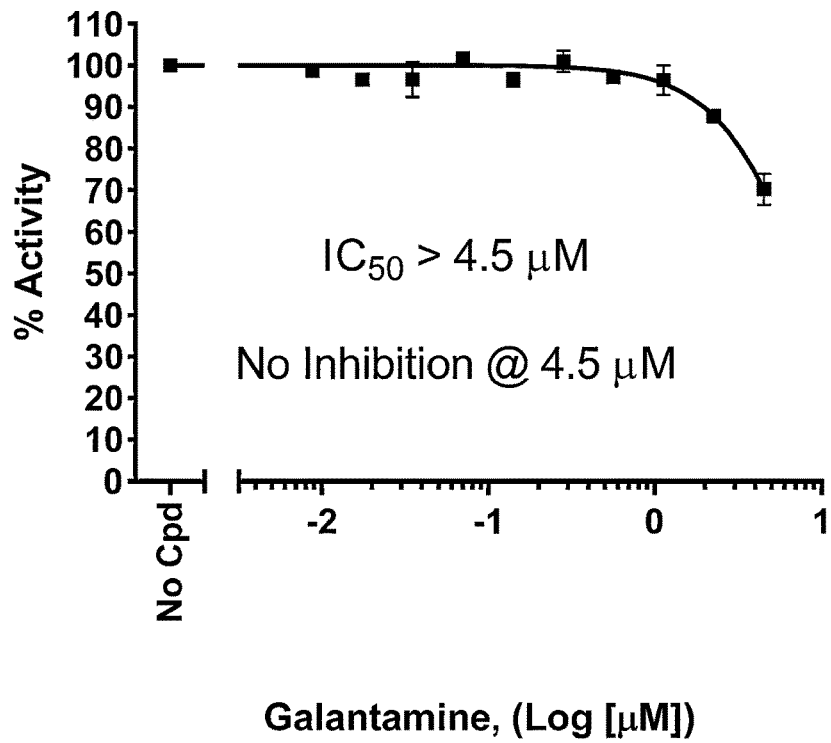
FIG. 14 shows non-limiting exemplary data related to 3CL Protease Activity inhibition by Galantamine.

The effect of the compound Galantamine (Compound Supplied, Powder; Stock Concentration, 10 mM; Dissolving Solvent, DMSO; Test Range (μM), 0.009-4.5; Intermediate Dilution, 5% DMSO in 3CL Protease Assay Buffer) on 3CL Protease activity as determined by this assay is shown in FIG. 14 and Table 23). As predicted, Galantamine inhibited 3CL Protease activity.

TABLE 23

DATA FOR THE EFFECT OF GALANTAMINE ON 3CL PROTEASE ACTIVITY

| Galantamine | 3CL Protease Activity (Fluorescence count) | | % Activity | |
|---|---|---|---|---|
| [μM] | Repeat1 | Repeat2 | Repeat1 | Repeat2 |
| No Compound | 777 | 768 | 101 | 99 |
| 0.009 | 759 | 768 | 98 | 99 |
| 0.018 | 746 | 752 | 96 | 97 |
| 0.035 | 720 | 778 | 92 | 101 |
| 0.070 | 785 | 783 | 102 | 102 |
| 0.14 | 737 | 760 | 95 | 98 |
| 0.28 | 761 | 797 | 98 | 104 |
| 0.56 | 751 | 756 | 97 | 98 |
| 1.13 | 772 | 723 | 100 | 93 |
| 2.25 | 685 | 692 | 87 | 88 |
| 4.5 | 593 | 543 | 74 | 66 |
| Background | 87 | 88 | | |

Example 12

ACE2 Activity Assay

Background

Angiotensin converting enzyme 2 (ACE2) is an exopeptidase that catalyzes the conversion of angiotensin II to angiotensin 1-7 and L-phenylalanine. Angiotensin II is part of the classical renin angiotensin system (RAS), a hormone system that regulates fluid balance, blood pressure and maintains vascular tone. ACE2 has been also proved to be the receptor for the human respiratory coronavirus NL63, the SARS-coronavirus (SARS-CoV) and the novel coronavirus 2019-nCoV/SARS-CoV-2. Semagacestat, a predicted ACE2 inhibitor described herein, was tested for its ability to inhibit ACE2 activity.

Description

The ACE2 Activity Assay described in this example is designed to measure the exopeptidase activity of ACE2 for screening and profiling applications. The ACE2 assay can be performed in a convenient 96-well format, with purified ACE2, its substrate, and ACE2 buffer for 96 reactions. See https://bpsioscience.com/ace2-inhibitor-screening-assay-kit-79923

Materials

ACE2, ACE2 Fluorogenic Substrate, ACE2 buffer, 96-well black microplate. Adjustable micropipettor and sterile tips and Fluorescent microplate reader.

Methods

All Samples and Controls were Tested in Duplicate.

1. Thawed ACE2 on ice. Upon first thaw, tube containing enzyme was briefly spun to recover full contents of the tube. Note: ACE2 is sensitive to freeze/thaw cycles.
2. Prepared Enzyme solution (0.5 ng/μl ACE2) by diluting ACE2 in ACE2 Buffer.
3. Added 20 μl of Enzyme solution (0.5 ng/μl ACE2) to each well designated "Positive Control" and "Test Inhibitor," and 20 μl of ACE2 buffer to each well designated "Blank."
4. Added 5 μl of Test Inhibitor solution to each well designated "Test Inhibitor." For the wells labeled "Positive Control" and "Blank," added 5 μl of 10% DMSO in water (Inhibitor buffer). The final concentration of DMSO in the reaction was kept ≤1%.
5. Added 25 μl of ACE2 Fluorogenic Substrate to all wells. Protected from light and reaction was incubated at room temperature for 60 minutes.

TABLE 24

ACE2 ACTIVITY ASSAY

|  | Positive Control | Test Inhibitor | Blank |
|---|---|---|---|
| Enzyme solution (0.5 ng/μl ACE2) | 20 μl | 20 μl | — |
| ACE2 Buffer | — | — | 20 μl |
| Test inhibitor | — | 5 μl | — |
| 10% DMSO in water (Inhibitor buffer) | 5 μl | — | 5 μl |
| ACE2 Fluorogenic Substrate | 25 μl | 25 μl | 25 μl |
| Total | 50 μl | 50 μl | 50 μl |

6. The fluorescence intensity of the samples ($\lambda_{excitation}$=555 nm; $\lambda_{emission}$=585 nm) was read in an appropriate microplate reader.

Data Analysis

All of the enzyme activity assays were performed in duplicates at each concentration. The fluorescent intensity data were analyzed using the computer software Graphpad Prism. In the absence of the compound, the fluorescent intensity ($F_t$) in each data set was defined as 100% activity. In the absence of the enzyme, the fluorescent intensity ($F_b$) in each data set was defined as 0% activity. The percent activity in the presence of each compound was calculated according to the following equation: % activity=(F−$F_b$)/($F_t$−$F_b$), where F=the fluorescent intensity in the presence of the compound.

The values of percentage activity were plotted on a bar graph.

Results

Figure 15:
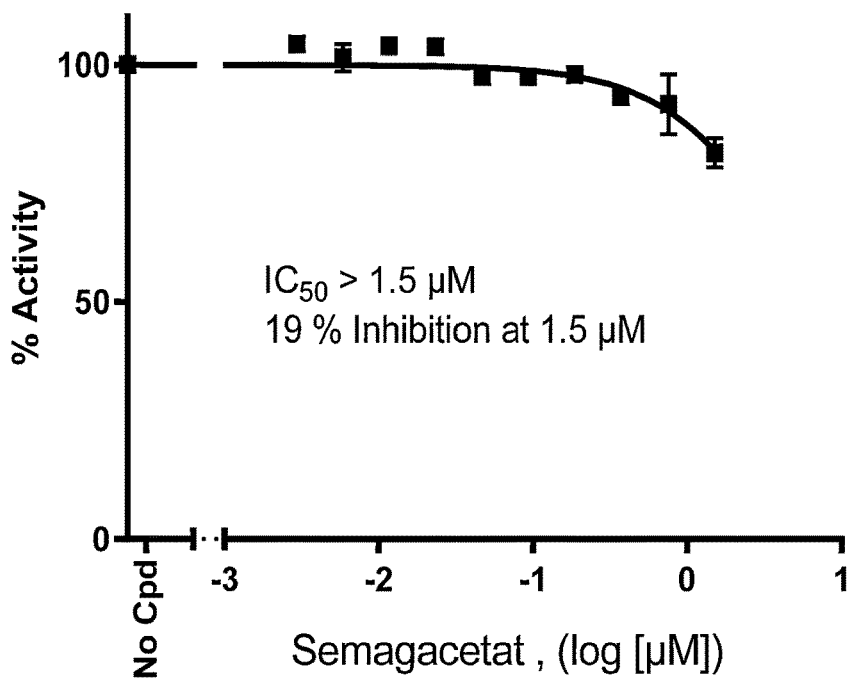
FIG. 15 shows non-limiting exemplary data related to ACE2 activity inhibition by Semagacestat.

The effect of the compound Semagacestat (Compound Supplied, Powder; Stock Concentration, 10 mM; Dissolving Solvent, DMSO; Test Range (βM), 0.0029-1.5; Intermediate Dilution, 10% DMSO in Assay Buffer) on ACE2 activity as determined by this assay is shown in FIG. 15 and in Table 25. As predicted, Semagacestat inhibited ACE2 activity.

TABLE 25

DATA FOR THE EFFECT OF SEMAGACESTAT ON ACE2 ACTIVITY

| Semagacestat | ACE2 Activity (Fluorescence count) | | % Activity | |
|---|---|---|---|---|
| (μM) | Repeat 1 | Repeat 2 | Repeat 1 | Repeat 2 |
| No Compound | 17033 | 16995 | 100 | 100 |
| 0.00293 | 17619 | 17719 | 104 | 105 |
| 0.00586 | 16794 | 17665 | 99 | 104 |
| 0.0117 | 17480 | 17772 | 103 | 105 |
| 0.0234 | 17334 | 17846 | 102 | 105 |
| 0.0469 | 16514 | 16743 | 97 | 98 |
| 0.0938 | 16799 | 16451 | 99 | 96 |
| 0.188 | 16603 | 16796 | 97 | 99 |
| 0.375 | 15723 | 16216 | 92 | 95 |
| 0.75 | 14754 | 16711 | 85 | 98 |
| 1.5 | 13657 | 14621 | 78 | 85 |
| Background | 1505 | 1565 | | |

Example 13

3CL Protease (Untagged. SARS-CoV-2') Activity Assay

This example describes a study to determine the effect of predicted 3CL Protease inhibitors on the activities of recombinant 3CL Protease SARS-CoV-2 using an in vitro enzymatic assay. The materials, methods, and data analysis described in Example 11 is used to test the ability of the predicted 3CL Protease inhibitors listed in Table 26 to inhibit 3CL Protease.

TABLE 26

PREDICTED 3CLPRO INHIBITOR COMPOUNDS

| Compound I.D. | Compound Supplied | Stock Concentration | Dissolving Solvent | Test Range (μM) | Intermediate Dilution |
|---|---|---|---|---|---|
| Dabrafenib | Powder | 10 mM | DMSO | 0.009-4.5 | 5% DMSO in 3CL Protease Assay Buffer |
| Naloxone | Powder | 10 mM | DMSO | 0.009-4.5 | 5% DMSO in 3CL Protease Assay Buffer |
| Noscapine | Powder | 10 mM | DMSO | 0.009-4.5 | 5% DMSO in 3CL Protease Assay Buffer |

TABLE 26-continued

PREDICTED 3CLPRO INHIBITOR COMPOUNDS

| Compound I.D. | Compound Supplied | Stock Concentration | Dissolving Solvent | Test Range (μM) | Intermediate Dilution |
|---|---|---|---|---|---|
| Apixaban | Powder | 10 mM | DMSO | 0.009-4.5 | 5% DMSO in 3CL Protease Assay Buffer |
| GC376* | Powder | 10 mM | DMSO | 0.0003-10 | 5% DMSO in 3CL Protease Assay Buffer |

*Reference Compound

It is expected that the compounds recited above in Table 26 will inhibit 3CL Protease activity.

Example 14

ACE2 Activity Assay

This example describes a study to determine the effects of predicted ACE2 inhibitors on the enzymatic activities of recombinant human ACE2 using an in vitro enzymatic assay. The materials, methods, and data analysis described in Example 12 is used to test the ability of predicted ACE2 inhibitors listed in Table 27 to inhibit ACE2 activity.

TABLE 27

PREDICTED ACE2 INHIBITOR COMPOUNDS

| Compound I.D. | Compound Supplied | Stock Concentration | Dissolving Solvent | Test Range (μM) | Intermediate Dilution |
|---|---|---|---|---|---|
| Orlistat | Powder | 10 mM | DMSO | 0.0029-1.5 | 10% DMSO in Assay Buffer |
| Tipranavir | Powder | 10 mM | DMSO | 0.0029-1.5 | 10% DMSO in Assay Buffer |
| Clindamycin | Powder | 10 mM | DMSO | 0.0029-1.5 | 10% DMSO in Assay Buffer |
| MLN-4760* | Solution | 10 mM | DMSO | 0.00003-1 μM | 10% DMSO in Assay Buffer |

*Reference Compound.

It is expected that the compounds recited above in Table 27 will inhibit ACE2 activity.

Example 15

Furin Activity Assay

This example describes a study to determine the effect of predicted Furin inhibitor compounds on the activities of recombinant Furin Protease using an in vitro enzymatic assay.

Background

Furin is a member of the proprotein convertase (PC) family, which belongs to the subtilisin superfamily of serine protease. This protease is thought to cleave and activate more than 150 mammalian, viral and bacterial substrates. Among them are viral envelope glycoproteins and bacterial toxins, as well as cellular factors that can promote tumor development and growth. Cleavage of the SARS coronavirus spike glycoprotein by Furin is a critical step in viral fusion and entry, making furin a potential target for SARS-CoV-2 therapy.

Description

The Furin Protease Activity Assay described in this example is designed to measure Furin Protease activity for screening and profiling applications, in a homogeneous assay with no time-consuming washing steps. The assay can be performed in a convenient 96-well format, with purified Furin, fluorogenic substrate, and Furin assay buffer. The Furin inhibitor Chloromethylketone is also included as a positive control. See https://bpsbioscience.com/furin-protease-assay-kit-78040

Materials

Recombinant Furin; Furin Protease Substrate (500 μM); Furin Assay Buffer; Chloromethylketone (100 μM); Black, low binding microtiter plate. Fluorescent microplate reader capable of reading $\lambda exc/\lambda em=380$ nm/460 nm Methods All Samples and Controls are Tested in Duplicate.

1) Furin is thawed on ice. The tube containing enzyme is briefly spun upon first thaw to recover the full content of the tube. Furin is aliquoted into single use aliquots. Single-use aliquots shall have no less than 2 μl. Undiluted enzyme is stored in aliquots at −80° C.
2) Furin is diluted in Assay buffer at 0.5 ng/μl (25 ng per reaction).
3) 50 μl diluted Furin enzyme solution is added to wells designated as "Positive Control," "Inhibitor Control," and "Test Sample." 50 μl Assay buffer is added to the "Blank" wells.

TABLE 28

FURIN ACTIVITY ASSAY

| Component | Positive Control | Test Sample | Inhibitor Control | Blank |
|---|---|---|---|---|
| Furin (0.5 ng/μl) | 50 μl | 50 μl | 50 μl | — |
| Assay Buffer | — | — | — | 50 μl |
| Chloromethyl-ketone (0.5 μM) | — | — | 10 μl | — |

TABLE 28-continued

FURIN ACTIVITY ASSAY

| Component | Positive Control | Test Sample | Inhibitor Control | Blank |
|---|---|---|---|---|
| Test Inhibitor | — | 10 µl | — | — |
| Inhibitor Buffer | 10 µl | — | — | 10 µl |
| Substrate solution | 40 µl | 40 µl | 40 µl | 40 µl |
| Total | 100 µl | 100 µl | 100 µl | 100 µl |

4) 100 µM Chloromethylketone is diluted 200-fold in Assay Buffer to obtain a 0.5 µM solution. 10 µl Chloromethylketone (0.5 µM) is added to the wells labeled "Inhibitor Control."

5) The inhibitor solution is prepared.

The final concentration of DMSO in the assay shall not exceed 1%. If the inhibitor compound is dissolved in DMSO, a 100-fold higher concentration of the compound than the highest concentration that is tested in DMSO is made. Then, a 10-fold dilution in 1× assay buffer is made (at this step the compound concentration is 10-fold higher than the final concentration).

If the inhibitor compound is dissolved in 1× buffer, a solution of the compound 10-fold higher than the final concentration in Furin assay buffer is made. For example, 2 µl of 100 µM Chloromethylketone is diluted in 398 µl Assay Buffer (step 4), creating a 0.5 µM solution. 10 µl is added to the assay (final volume 100 µl), resulting in a 0.05 µM final concentration.

6) 10 µl test inhibitor is added to each well designated "Test Sample." 10 µl Inhibitor Buffer (either 1× assay buffer or 10% DMSO in 1× assay buffer, depending on which inhibitor solution is used) is added to "Blank" and "Positive Control" wells.

7) 500 µM Furin protease substrate is diluted 1:100 in assay buffer, to make a 5 µM solution. Only enough is diluted as is required for the assay.

8) The reaction is started by adding 40 µl of the substrate solution to each well (Final concentration of the Furin protease substrate in a 100 µl reaction is 2 µM).

9) The reaction is incubated at room temperature for 30 minutes. The fluorescence intensity is measured in a microtiter plate-reading fluorimeter capable of excitation at wavelength 380 nm and detection of emission at wavelength 460 nm. The fluorescence intensity can also be measured kinetically. "Blank" value is subtracted from all other values.

TABLE 29

PREDICTED FURIN INHIBITOR COMPOUNDS

| Compound I.D. | Compound Supplied | Stock Concentration | Dissolving Solvent | Test Range (µM) | Intermediate Dilution |
|---|---|---|---|---|---|
| Pentoxifylline | Powder | 10 mM | DMSO | 0.008-4 | 10% DMSO in Furin Protease Assay Buffer |
| Clemizole | Powder | 10 mM | DMSO | 0.008-4 | 10% DMSO in Furin Protease Assay Buffer |
| Lisofylline | Powder | 10 mM | DMSO | 0.008-4 | 10% DMSO in Furin Protease Assay Buffer |
| Trimetazidine | Powder | 10 mM | DMSO | 0.008-4 | 10% DMSO in Furin Protease Assay Buffer |
| Chloromethylketone* | Powder | 10 mM | DMSO | 0.00003-1 | 10% DMSO in Furin Protease Assay Buffer |

*Reference Compound

Data Analysis

Furin Protease activity assays are performed in duplicates. The fluorescence data are analyzed using the computer software Graphpad Prism. In the absence of the compound, the fluorescence ($F_t$) in each data set is defined as 100% activity. In the absence of the Furin Protease, the fluorescence ($F_b$) in each data set is defined as 0% activity. The percent activity in the presence of each compound is calculated according to the following equation: % activity=[(F−$F_b$)/($F_t$−$F_b$)]×100, where F=the fluorescence in the presence of the compound, $F_b$=the fluorescence in the absence of the Furin Protease, and $F_t$=the fluorescence in the absence of the compound. The percent activation is calculated according to the following equation: % activation=% activity−100.

The values of % activity versus a series of compound concentrations are then plotted using non-linear regression analysis of Sigmoidal dose-response curve generated with the equation $Y=B+(T-B)/1+10^{((LogEC50-X) \times Hill\ Slope)}$, where Y=percent activity, B=minimum percent activity, T=maximum percent activity, X=logarithm of compound and Hill Slope=slope factor or Hill coefficient. The $IC_{50}$ value is determined by the concentration causing a half-maximal percent activity.

It is expected that the compounds recited above in Table 29 will inhibit Furin activity.

Example 16

Papain-like Protease (SARS-CoV-2) Activity Assay

Protease Activity

This example describes a study to determine the effect of predicted PLPro inhibitor compounds on the protease activities of recombinant PLPro using an in vitro enzymatic assay.

Background

Coronaviruses (CoVs) primarily cause multiple respiratory and intestinal infections in humans and animals. Papain-Like Protease (PLPro), also known as PLP, plays an essential role in polypeptide processing during virus replication. PLPro is also proposed to be a key enzyme in the sustained pathogenesis of SARS-CoV-2. PLP acts as a deubiquitinase that removes ubiquitin and ISG15 from host-cell proteins to aid coronaviruses in their evasion of the host innate antiviral immune responses. As a result, PLPro is an important potential target for antiviral drugs that may inhibit viral replication and simultaneously weaken dysregulation of signaling cascades in infected cells that may lead to cell death in surrounding, uninfected cells. PLPro inhibitors that can block viral replication are promising potential drug candidates that could be used to treat patients suffering with the COVID-19 coronavirus infection.

Description

The Papain-like Protease Activity Assay described in this example is designed to measure Papain-like Protease activity for screening and profiling applications, in a homogeneous assay with no time-consuming washing steps. The assay can be performed in a 96-well format, with purified Papain-like Protease, fluorogenic substrate, and PLPro assay buffer. PLPro inhibitor GRL0617 is also included as a positive control. See https://bpsbioscience.com/papain-like-protease-sars-cov-2-assay-kit-protease-activity-79995

Materials

Recombinant Papain-like Protease, PLPro; PLPro Substrate (5 mM); PLPro Assay Buffer; 10 mM GRL0617; Dithiothreitol (DTT; 0.5 M); Black, low binding microtiter plate; Plate sealing film. Fluorescent microplate reader capable of reading λexc/λem=360 nm/460 nm Methods All Samples and Controls are Tested in Duplicate.

1) 0.5 M DTT is added to PLPro Assay Buffer so final DTT concentration is 1 mM. For example, 10 µl of 0.5 M DTT is added to 5 ml assay buffer. (DTT is added just before use. Only enough DTT-containing buffer is prepared as required for the assay. The remaining assay buffer is stored at −20° C.).

2) PLPro is thawed on ice. The tube containing enzyme is briefly spun upon first thaw to recover the full content of the tube. PLPro is aliquoted into single use aliquots. Remaining undiluted enzyme is stored in aliquots at −80° C. Note: PLPro enzyme is sensitive to freeze/thaw cycles. Diluted enzyme is not re-used.

3) PLPro is diluted in PLPro Assay buffer (with 1 mM DTT) at 0.3-0.5 ng/µl (9-15 ng per reaction).

4) 30 µl diluted PLPro enzyme solution is added to wells designated as "Positive Control", "Inhibitor Control" and "Test Sample". 30 µl Assay buffer (with 1 mM DTT) is added to the "Blank" wells.

TABLE 30

PLPRO ACTIVITY ASSAY

| Component | Positive Control | Test Sample | Inhibitor Control | Blank |
|---|---|---|---|---|
| PLPro (0.3-0.5 ng/µl) | 30 µl | 30 µl | 30 µl | — |
| Assay Buffer (with DTT) | — | — | — | 30 µl |
| GRL0617 (500 µM) | — | — | 10 µl | — |
| Test Inhibitor | — | 10 µl | — | — |
| Inhibitor Buffer (no inhibitor) | 10 µl | — | — | 10 µl |
| Substrate solution | 10 µl | 10 µl | 10 µl | 10 µl |
| Total | 50 µl | 50 µl | 50 µl | 50 µl |

5) 190 µl of PLPro Assay buffer (with 1 mM DTT) is added to 10 µl GRL0617 to obtain a 500 µM solution. 10 µl GRL0617 (500 µM) is added to the wells labeled "Inhibitor Control". Buffer-containing solution is not kept more than one day.

6) The inhibitor solution is prepared.

The final concentration of DMSO in the assay shall not exceed 1%. If the inhibitor compound is dissolved in DMSO, a 100-fold higher concentration of the compound than the highest concentration that is tested in DMSO is made. Then, a 20-fold dilution in PLPro assay buffer with 1 mM DTT is made. (At this step the compound concentration is 5-fold higher than the final concentration.)

If the inhibitor compound is dissolved in water, a solution of the compound 5-fold higher than the final concentration in PLPro assay buffer (with 1 mM DTT) is made.

7) 10 µl inhibitor is added to each well designated "Test Sample". 10 µl 1× PLPro assay buffer with 1 mM DTT or 5% DMSO (depending which inhibitor solution is used) is added to "Blank" and "Positive Control" wells.

8) Enzyme is pre-incubated with the inhibitor for 30 minutes at 37° C.

9) 5 mM PLPro substrate is diluted 1:40 in assay buffer with DTT, to make a 125 µM solution. Only enough is diluted as is required for the assay.

10) The reaction is started by adding 10 µl of the substrate solution to each well (Final concentration of the PLPro substrate in a 50 µl reaction is 25 µM).

11) The plate is sealed with the plate sealer and incubated at 37° C. for 45-60 minutes. The fluorescence intensity is measured in a microtiter plate-reading fluorimeter capable of excitation at a wavelength 360 nm and detection of emission at a wavelength 460 nm. The fluorescence intensity can also be measured kinetically. "Blank" value is subtracted from all other values.

TABLE 31

PREDICTED PLPRO INHIBITOR COMPOUNDS

| Compound I.D. | Compound Supplied | Stock Concentration | Dissolving Solvent | Test Range (µM) | Intermediate Dilution |
|---|---|---|---|---|---|
| Amprenavir | Powder | 10 mM | DMSO | 0.008-4 | 5% DMSO in PLPro Assay Buffer |
| Saquinavir | Powder | 10 mM | DMSO | 0.008-4 | 5% DMSO in PLPro Assay Buffer |

TABLE 31-continued

PREDICTED PLPRO INHIBITOR COMPOUNDS

| Compound I.D. | Compound Supplied | Stock Concentration | Dissolving Solvent | Test Range (μM) | Intermediate Dilution |
|---|---|---|---|---|---|
| Naltrexone | Powder | 10 mM | DMSO | 0.008-4 | 5% DMSO in PLPro Assay Buffer |
| Topotecan | Powder | 10 mM | DMSO | 0.008-4 | 5% DMSO in PLPro Assay Buffer |
| Indinavir | Powder | 10 mM | DMSO | 0.008-4 | 5% DMSO in PLPro Assay Buffer |
| GRL0617* | Liquid | 10 mM | DMSO | 0.0051-100 | 5% DMSO in PLPro Assay Buffer |

*Reference Compound

Data Analysis

PLPro activity assays are performed in duplicates at each concentration. The fluorescent intensity data are analyzed using the computer software Graphpad Prism. In the absence of the compound, the fluorescent intensity ($F_t$) in each data set is defined as 100% activity. In the absence of PLPro, the fluorescent intensity (Fb) in each data set is defined as 0% activity. The percent activity in the presence of each compound is calculated according to the following equation: % activity=(F−Fb)/(Ft−Fb), where F=the fluorescent intensity in the presence of the compound.

The values of % activity versus a series of compound concentrations are then plotted using non-linear regression analysis of Sigmoidal dose-response curve generated with the equation $Y=B+(T-B)/1+10^{((LogEC50-X) \times Hill\ Slope)}$, where Y=percent activity, B=minimum percent activity, T=maximum percent activity, X=logarithm of compound and Hill Slope=slope factor or Hill coefficient. The $IC_{50}$ value is determined by the concentration causing a half-maximal percent activity.

It is expected that the compounds recited above in Table 31 will inhibit PLPro activity.

Example 17

RdRp (SARS-CoV-2) Homogeneous Activity Assay

This example describes a study to determine the effects of predicted RdRp inhibitor compounds on the enzymatic activity of RNA-Dependent RNA polymerase (SARS-COVID-2) using an in vitro enzymatic assay.

Description

The SARS-CoV-2 RdRp Homogeneous Activity Assay described in this example is designed to measure the activity of the SARS-CoV-2 RNA-dependent RNA Polymerase (RdRp) for screening and profiling applications. RdRp operates as a complex of NSP12, NSP7, and NSP8 proteins. RNA-dependent RNA Polymerase is a crucial enzyme in the life cycle of coronaviruses and represents one of the most promising druggable targets for SARS-CoV-2. The assay can be performed in a AlphaLISA® format, with Digoxigenin-labeled RNA duplex, biotinylated ATP, RdRp assay buffer (2 components plus DTT), and purified RdRp. The assay can measure direct incorporation of ATP in the double-stranded RNA chain. The increase in Alpha-counts is proportional to the amount of ATP incorporated in the RNA. With this assay, only three simple steps on a microtiter plate are required for RdRp activity detection. First, a sample containing RdRp enzyme is incubated with the reaction mixture. Next, acceptor beads are added, then donor beads, followed by reading the Alpha-counts. See https://bpsbioscience.com/rdrp-sars-cov-2-homogeneous-assay-kit-78109.

Materials

RdRp/NSP7/NSP8 (SARS-CoV-2) Complex, Digoxigenin-labeled RNA Duplex, Biotinylated ATP, RNAse inhibitor, RdRp assay buffer component 1 (Incomplete Buffer), RdRp assay buffer component 2 (Incomplete Buffer), DTT (0.5 M), 4× Detection buffer 4, Plate sealer. RNAse-free conditions are used. AlphaLISA Anti-Digoxigenin acceptor beads, 5 mg/ml (PerkinElmer #AL113C) AlphaScreen Streptavidin-conjugated donor beads, 5 mg/ml (PerkinElmer #67600025) Optiplate-384 (PerkinElmer #6007290), AlphaScreen microplate reader, Adjustable micropipettor and sterile tips.

Contraindications

Green and blue dyes that absorb light in the AlphaScreen signal emission range (520-620 nm), such as Trypan Blue. The use of the potent singlet oxygen quenchers is avoided such as sodium azide ($NaN_3$) or metal ions ($Fe^{2+}$, $Fe^{3+}$, $Cu^{2+}$, $Zn^{2+}$ and $Ni^{2+}$). The presence of culture medium RPMI 1640 at >1% leads to signal reduction due to the presence of excess biotin and iron in this medium. MEM, which lacks these components, does not affect AlphaScreen assays.

Methods

All samples and controls are tested in duplicate. Antibodies or protein inhibitors are pre-incubated with the target protein. For small molecule inhibitors, pre-incubation is also beneficial, depending on the experimental conditions.

Step 1:

1) Complete RdRp buffer is prepared in two steps. First, 10 μl of 0.5 M DTT is added to a 5-ml bottle with RdRp assay buffer Component 1 (Incomplete buffer 1). This solution is mixed well. Then, 10 μl of RdRp assay buffer Component 2 (Incomplete buffer 2) is added. This solution is mixed again. Two tubes of both RdRp assay buffer Component 1 (Incomplete buffer 1) and 0.5 M DTT are provided for convenience. Tube with RdRp assay buffer Component 2 (Incomplete buffer 2) can be reused. The DTT is not reused.

2) RNAse inhibitor is diluted 8-fold with complete RdRp buffer. Only enough inhibitor is prepared as is required for the assay; remaining amount is stored in aliquots at −20° C.

3) RdRp is thawed on ice. The tube containing enzyme is briefly spun upon first thaw to recover full content of the tube. RdRp enzyme is aliquoted into single use aliquots. Remaining undiluted enzyme is stored in aliquots at −80° C. immediately.

4) RdRp is diluted in complete RdRp buffer at 60 ng/μl (240 ng/4 μl). Diluted enzyme is kept on ice until use. Any unused diluted enzyme is discarded after use.

5) 4 μl of diluted RdRp is added to each well designated for the "Positive Control" and "Test Inhibitor". For the "Blank", 4 μl of Complete RdRp buffer is added.

TABLE 32

RDRP ACTIVITY ASSAY

| Component | Blank | Positive Control | Test Sample |
|---|---|---|---|
| Complete RdRp buffer | 4 µl | — | — |
| RdRp (60 ng/µl) | — | 4 µl | 4 µl |
| RNAse Inhibitor (diluted) | 2 µl | 2 µl | 2 µl |
| Test Inhibitor | — | — | 2 µl |
| Inhibitor buffer (Complete RdRp buffer with DMSO if necessary) | 2 µl | 2 µl | — |
| RdRp Reaction Mixture | 2 µl | 2 µl | 2 µl |
| Total | 10 µl | 10 µl | 10 µl |

6) 2 µl of diluted RNAse Inhibitor is added to each well.
7) Test inhibitor is prepared at 5× the final test concentration in Complete RdRp buffer. 2 µl of inhibitor solution is added to each well designated "Test Inhibitor". For the "Positive Control" and "Blank" 2 µl of the same solution is added without inhibitor. It is recommended to use Complete RdRp buffer with proper amount of DMSO as Inhibitor buffer. The solution is pre-incubated for 30 minutes at room temperature. Note: This incubation is performed with slow shaking on a rotator platform.
8) During RdRp preincubation with the inhibitor(s), RdRP Reaction Mixture is prepared as follows:
9) The amount of each component needed is carefully calculated. Appropriate amounts of diluted components are prepared; dilute only the amount required for the assay. Diluted components are not stored:
a. Digoxigenin-labeled RNA duplex is diluted 125-fold in RdRp Buffer
b. Biotinylated ATP is diluted 160-fold in Complete RdRp Buffer
10) The reaction mixture is prepared using diluted reagents: N wells×(1 µl diluted Digoxigenin-labeled RNA Duplex+1 µl diluted Biotinylated ATP).
11) The reaction is initiated by adding 2 µl of diluted RdRp Reaction Mixture prepared as described above. The wells are sealed with a plate sealer. The reaction is incubated for one hour at 37° C.
Note: Samples are protected from direct exposure to light for steps 2 and 3.
Step 2:
1) 4× Detection buffer is diluted with 3 parts RNAse free water to make 1× Detection Buffer. Only the amount required for the assay is prepared. AlphaLISA Anti-Digoxigenin acceptor beads (PerkinElmer #AL113C) are diluted 500-fold with 1× Detection buffer 4. 10 µl is added per well. The solution is shaken on a rotator platform for 30 minutes at room temperature
Step 3:
1) Streptavidin-conjugated donor beads (Perkin Elmer) are diluted 125-fold with 1× Detection buffer 4. 10 µl is added per well. The solution is shaken on a rotator platform for 30-60 minutes* at room temperature.
2) Read Alpha-counts.
The Signal-to-Noise ratio depends greatly on the performance of the beads from PerkinElmer. Duration of incubation may be extended to 2-3 hours for some lots of the beads, if necessary.
General Considerations
"Blank" Control: The "Blank" control is important to determine the background absorbance in the assay.

TABLE 33

PREDICTED RDRP INHIBITOR COMPOUNDS

| N | Compound I.D. | Provided As | Stock Concentration | Dissolving Solvent | Test Range (nM) |
|---|---|---|---|---|---|
| 1 | Bazedoxifene | Powder | 10 mM | DMSO | 44.44, 133.33, 444.44, 1333.33, 2222.22, 4444.44, 8888.89, 13333.33, 17777.78, 22222.22 |
| 2 | Piclidenoson | Powder | 10 mM | DMSO | 44.44, 133.33, 444.44, 1333.33, 2222.22, 4444.44, 8888.89, 13333.33, 17777.78, 22222.22 |
| 3 | Adefovir dipivoxil | Powder | 10 mM | DMSO | 44.44, 133.33, 444.44, 1333.33, 2222.22, 4444.44, 8888.89, 13333.33, 17777.78, 22222.22 |
| 4 | Indiplon | Powder | 10 mM | DMSO | 44.44, 133.33, 444.44, 1333.33, 2222.22, 4444.44, 8888.89, 13333.33, 17777.78, 22222.22 |
| 5 | Larotrectinib | Powder | 10 mM | DMSO | 44.44, 133.33, 444.44, 1333.33, 2222.22, 4444.44, 8888.89, 13333.33, 17777.78, 22222.22 |
| 6 | Capecitabine | Powder | 10 mM | DMSO | 44.44, 133.33, 444.44, 1333.33, 2222.22, 4444.44, 8888.89, 13333.33, 17777.78, 22222.22 |

TABLE 33-continued

PREDICTED RDRP INHIBITOR COMPOUNDS

| N | Compound I.D. | Provided As | Stock Concentration | Dissolving Solvent | Test Range (nM) |
|---|---|---|---|---|---|
| 7 | NUC-1031 | Powder | 10 mM | DMSO | 44.44, 133.33, 444.44, 1333.33, 2222.22, 4444.44, 8888.89, 13333.33, 17777.78, 22222.22 |
| 8 | Triciribine | Powder | 10 mM | DMSO | 44.44, 133.33, 444.44, 1333.33, 2222.22, 4444.44, 8888.89, 13333.33, 17777.78, 22222.22 |
| 9 | Trabodenoson | Powder | 10 mM | DMSO | 44.44, 133.33, 444.44, 1333.33, 2222.22, 4444.44, 8888.89, 13333.33, 17777.78, 22222.22 |
| 10 | Regadenoson | Powder | 10 mM | DMSO | 44.44, 133.33, 444.44, 1333.33, 2222.22, 4444.44, 8888.89, 13333.33, 17777.78, 22222.22 |
|  | 6-Chloropurine-ribose-5'-triphosphate* | Solution | 100 mM | Water | 44.44, 133.33, 444.44, 1333.33, 2222.22, 4444.44, 8888.89, 13333.33, 17777.78, 22222.22 |

*Reference compound.

Data Analysis

Enzyme activity assays are performed in duplicates at each concentration. The A-screen intensity data are analyzed and compared. The data are analyzed using the computer software Graphpad Prism. In the absence of the compound, the intensity ($C_e$) in each data set is defined as 100% activity. In the absence of enzyme, the intensity ($C_0$) in each data set is defined as 0% activity. The percent activity in the presence of each compound is calculated according to the following equation: % activity=$(C-C_0)/(C_e-C_0)$, where C=the A-screen intensity in the presence of the compound.

Enzyme activity assays are performed in duplicate at each concentration. The data are analyzed using the computer software, Graphpad Prism. In the absence of the compound, the A-screen intensity ($A_t$) in each data set is defined as 100% activity. In the absence of the enzyme, the A-screen signal ($A_b$) in each data set is defined as 0% activity. The percent activity in the presence of each compound is calculated according to the following equation: % activity=$[(A-A_b)/(A_t-A_b)]\times 100$, where A=the A-screen signal in the presence of the compound. The percent inhibition is calculated according to the following equation: % inhibition=100−% activity.

The values of % activity are plotted on a bar graph.

The values of % activity versus a series of compound concentrations are then plotted using non-linear regression analysis of Sigmoidal dose-response curve generated with the equation Y=B+(T−B)/1+10((LogIC50−X)×Hill Slope), where Y=percent activity, B=minimum percent activity, T=maximum percent activity, X=logarithm of compound and Hill Slope=slope factor or Hill coefficient. The IC50 value is determined by the concentration causing a half-maximal percent activity.

It is expected that the compounds recited above in Table 33 will inhibit RdRp activity.

Example 18

TMPRSS2 Fluorogenic Activity Assay

This example describes a study to determine the effect of predicted TMPRSS2 inhibitor compounds on the activities of recombinant TMPRSS2 using an in vitro enzymatic assay.

Background

Transmembrane protease, serine 2 is an enzyme that belongs to the serine protease family. It has been implicated as a target in prostate cancer. TMPRSS2 facilitates SARS-CoV-2 particle entry into host cells via S protein priming, and its inhibition blocks virus fusion with angiotensin-converting enzyme 2 (ACE2). This, in turn, restricts SARS-CoV-2 viral entry, making TMPRSS2 an important therapeutic target.

Description

The TMPRSS2 Fluorogenic Activity Assay described in this example can be performed in a convenient 96-well format, with purified TMPRSS2, TMPRSS2 Fluorogenic Substrate, and TMPRSS2 assay buffer for 96 enzymatic reactions. The key to the assay is the fluorogenic substrate. Using this assay, only one simple step on a microtiter plate is required for TMPRSS2 reactions. A sample containing TMPRSS2 is incubated in a reaction mixture with the fluorogenic substrate and fluorescence ($\lambda_{ex}$=383 nm, $\lambda_{em}$=455 nm) is measured using a plate reader. Camostat is employed as a protease inhibitor control. See https://bpsbioscience.com/tmprss2-fluorogenic-assay-kit-78083.

Materials

TMPRSS2, TMPRSS2 Fluorogenic Substrate (5 mM), 1×TMPRSS2 Assay Buffer, Camostat, 96-well black plate. Fluorescent microplate reader capable of reading fluorescence at $\lambda_{ex}$=383±15 nm, $\lambda_{em}$=455±15 nm, Adjustable micropipettor and tips, Rotating or rocker platform Methods All samples and controls are tested in duplicate.

Step 1:
1) TMPRSS2 is thawed on ice. The tube containing enzyme is briefly spun upon first thaw to recover full content of the tube. TMPRSS2 is aliquoted into single use aliquots. Remaining undiluted enzyme is stored in aliquots at −80° C.
2) TMPRSS2 is diluted in 1×TMPRSS2 Assay Buffer at 5 ng/µl (150 ng/reaction). Diluted enzyme is kept on ice until use. Unused diluted enzyme is discarded after use.
3) 500 µg of Camostat is re-constituted with 20 µl of water (50 mM). Camostat is diluted 1000-fold with assay buffer (50 µM). 10 µl is added to the wells labeled "Inhibitor Control." The final concentration of Camostat in the assay is 10 µM.
4) 10 µl of Inhibitor solution is dispensed to each well labeled as "Test Inhibitor." For the "Positive Control" and "Blank," 10 µl of 5% DMSO in buffer is added (Inhibitor buffer). The same level of DMSO is maintained in the controls as the test sample(s).

Note: Final DMSO concentration is ≤2%. Higher DMSO level can significantly decrease the enzyme activity. For example, to test an inhibitor at 10 µM that is dissolved in 100% DMSO, 1 mM inhibitor is diluted with buffer to make 50 µM inhibitor in 5% DMSO (aqueous). Then, 10 µl of the 50 µM solution is used for the 50 µl assay.

TABLE 34

TMPRSS2 ACTIVITY ASSAY

|  | Positive Control | Inhibitor Control | Test Inhibitor | Blank |
|---|---|---|---|---|
| Camostat | — | 10 µl | — | — |
| Test Inhibitor | — | — | 10 µl | — |
| Inhibitor buffer (5% DMSO in buffer) | 10 µl | — | — | 10 µl |
| 1× TMPRSS2 Assay Buffer | — | — | — | 30 µl |
| TMPRSS2 (5 ng/µl) | 30 µl | 30 µl | 30 µl | — |
| TMPRSS2 Substrate (50 µM) | 10 µl | 10 µl | 10 µl | 10 µl |
| Total | 50 µl | 50 µl | 50 µl | 50 µl |

5) 30 µl of diluted TMPRSS2 (5 ng/µl) is added to all wells except for "Blank". For "Blank," 30 µl of 1×TMPRSS2 Assay buffer is added. The plate is incubated for 30 minutes at room temperature.
6) TMPRSS2 Fluorogenic Substrate (5 mM) is begun to be thawed at room temperature.

Step 2:
Note: TMPRSS2 Fluorogenic Substrate is protected from direct exposure to light.
7) TMPRSS2 Fluorogenic Substrate (5 mM) is diluted 100-fold with 1×TMPRSS2 Assay buffer to 50 µM.
8) Reactions are initiated by adding 10 µl of TMPRSS2 Fluorogenic Substrate (50 µM) to all wells. Final concentration of TMPRSS2 Fluorogenic Substrate is 10 µM.
9) The plate is protected from light by covering with aluminum foil. The plate is incubated for ten minutes at room temperature.

Step 3:
10) Fluorescence is read at $\lambda_{ex}$=383 (±15) nm and $\lambda_{em}$=455 (±15) nm. Alternatively, kinetic measurements is also monitored for up to 30 minutes at 2-5 minute intervals. "Blank" value is subtracted from all measurements. Note: The wells are not exposed to direct light.

TABLE 35

PREDICTED TMPRSS2 INHIBITOR COMPOUNDS

| Compound I.D. | Compound Supplied | Stock Concentration | Dissolving Solvent | Test Range (µM) | Intermediate Dilution |
|---|---|---|---|---|---|
| Lopinavir | Powder | 10 mM | DMSO | 0.06-30 | 5% DMSO in TMPRSS2 Assay Buffer |
| Zafirlukast | Powder | 10 mM | DMSO | 0.06-30 | 5% DMSO in TMPRSS2 Assay Buffer |
| Lifitegrast | Powder | 10 mM | DMSO | 0.06-30 | 5% DMSO in TMPRSS2 Assay Buffer |
| Saquinavir | Powder | 10 mM | DMSO | 0.06-30 | 5% DMSO in TMPRSS2 Assay Buffer |
| Camostat* | Powder | 10 mM | H2O | 0.00003-1 | 10% DMSO in TMPRSS2 Assay Buffer |

*Reference Compound

Data Analysis

TMPRSS2 activity assays are performed in duplicates. The fluorescence data are analyzed using the computer software Graphpad Prism. In the absence of the compound, the fluorescence ($F_t$) in each data set is defined as 100% activity. In the absence of the TMPRSS2, the fluorescence ($F_b$) in each data set is defined as 0% activity. The percent activity in the presence of each compound is calculated according to the following equation: % activity=[(F−$F_b$)/($F_t$−$F_b$)]×100, where F=the fluorescence in the presence of the compound, $F_b$=the fluorescence in the absence of the TMPRSS2, and $F_t$=the fluorescence in the absence of the compound. The percent activation is calculated according to the following equation: % activation=% activity−100.

The values of % activity versus a series of compound concentrations are then plotted using non-linear regression analysis of Sigmoidal dose-response curve generated with the equation $Y=B+(T-B)/1+10^{(LogEC50-X) \times Hill\ Slope}$, where Y=percent activity, B=minimum percent activity, T=maximum percent activity, X=logarithm of compound and Hill Slope=slope factor or Hill coefficient. The $IC_{50}$ value is determined by the concentration causing a half-maximal percent activity.

It is expected that the compounds recited above in Table 35 will inhibit TMPRSS2 activity.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for treating an infection or a disease caused by a coronavirus, comprising administering to a subject in need thereof a composition comprising a compound or a pharmaceutically acceptable salt, ester, solvate, stereoisomer, or tautomer thereof, thereby treating the infection or the disease, wherein the compound is pipendoxifene and the coronavirus is SARS-CoV-2.

2. The method of claim 1, wherein the composition comprises a therapeutically effective amount of the compound.

3. The method of claim 1, wherein the infection or the disease is in the respiratory tract of the subject.

4. The method of claim 1, wherein the subject has been exposed to the coronavirus.

5. The method of claim 1, wherein the infection or disease is COVID-19.

6. The method of claim 1, wherein the composition is a pharmaceutical composition comprising the compound and one or more pharmaceutically acceptable excipients.

7. The method of claim 1, wherein the composition is administered to the subject by intravenous administration, nasal administration, pulmonary administration, oral administration, parenteral administration, or nebulization.

8. The method of claim 1, further comprising measuring the viral titer of the coronavirus in the subject before administering the composition to the subject, after administering the composition to the subject, or both, wherein administrating the composition results in reduction of the viral titer of the coronavirus in the subject as compared to that in the subject before administration of the composition.

9. The method claim 1, further comprising measuring a neutrophil density within the lungs of the subject, wherein administering the composition results in reduction of the neutrophil density within the lungs of the subject as compared to that in the subject before administration of the composition.

10. The method claim 1, further comprising measuring a total necrotized cell count within the lungs of the subject, wherein administering the composition results in reduction of the total necrotized cell count in the subject as compared to that in the subject before administration of the composition.

11. The method claim 1, further comprising measuring a total protein level within the lungs of the subject, wherein administering the composition results in reduction of the total protein level within the lungs of the subject as compared to that in the subject before administration of the composition.

\* \* \* \* \*